United States Patent [19]

Cook et al.

[11] 4,189,769
[45] Feb. 19, 1980

[54] INPUT-OUTPUT SUBSYSTEM FOR DIGITAL DATA PROCESSING SYSTEM

[75] Inventors: Darwen J. Cook, Alhambra; Donald S. Millers, II, San Clemente, both of Calif.

[73] Assignee: Burroughs Corporation, Detroit, Mich.

[21] Appl. No.: 871,144

[22] Filed: Jan. 20, 1977

Related U.S. Application Data

[63] Continuation-in-part of Ser. No. 728,457, Oct. 28, 1977.

[51] Int. Cl.² .................................................. G06F 3/04
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,564,509 | 2/1971 | Perkins et al. | 364/200 |
| 3,702,462 | 11/1972 | England | 364/200 |
| 3,725,871 | 4/1973 | Heuttner et al. | 364/200 |
| 3,825,901 | 7/1974 | Golnek, Sr. et al. | 364/200 |
| 3,846,763 | 11/1974 | Giikonen | 364/200 |
| 3,967,250 | 6/1976 | Senda et al. | 364/200 |
| 3,972,029 | 7/1976 | Bailey, Jr. | 364/200 |
| 4,074,352 | 2/1978 | Cook et al. | 364/200 |

*Primary Examiner*—Mark E. Nusbaum
*Attorney, Agent, or Firm*—Alfred W. Kozak; Nathan Cass; Kevin R. Peterson

[57] ABSTRACT

An input-output subsystem for the handling of data-transfer operations in a digital data processing system. The I/O subsystem provides a series of I/O controller-processors, designated as Line Control Processors, which are organized into groups to form a Base Module. A plurality of such Base Modules are organized to work with a main system interface unit called an Input-Output Translator which is part of the main host system comprising a processor and main memory. The Input-Output Translator (IOT) provides direct memory transfers to and from any connected Line Control Processor independently of the main processor. This arrangement simplifies the expansion of system capability for handling a greater number of peripheral devices on a simple economic basis while increasing data-transfer rates and reducing access errors in individual transfer operations.

5 Claims, 68 Drawing Figures

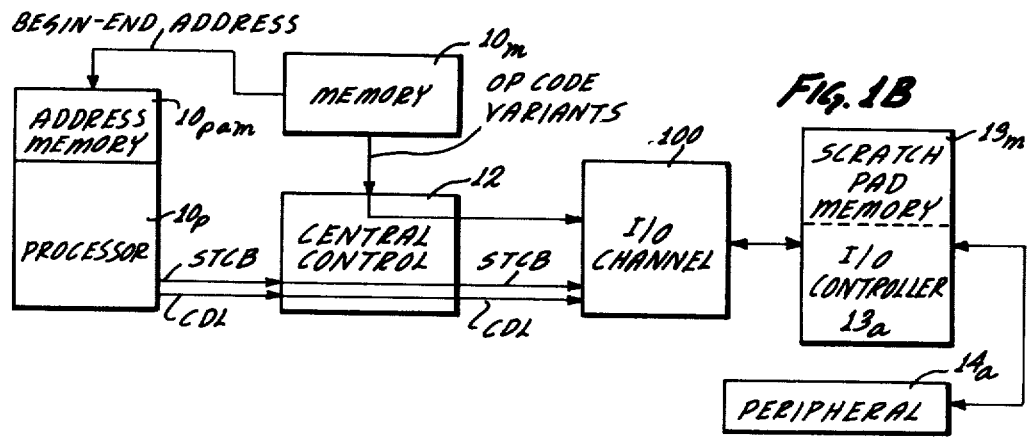
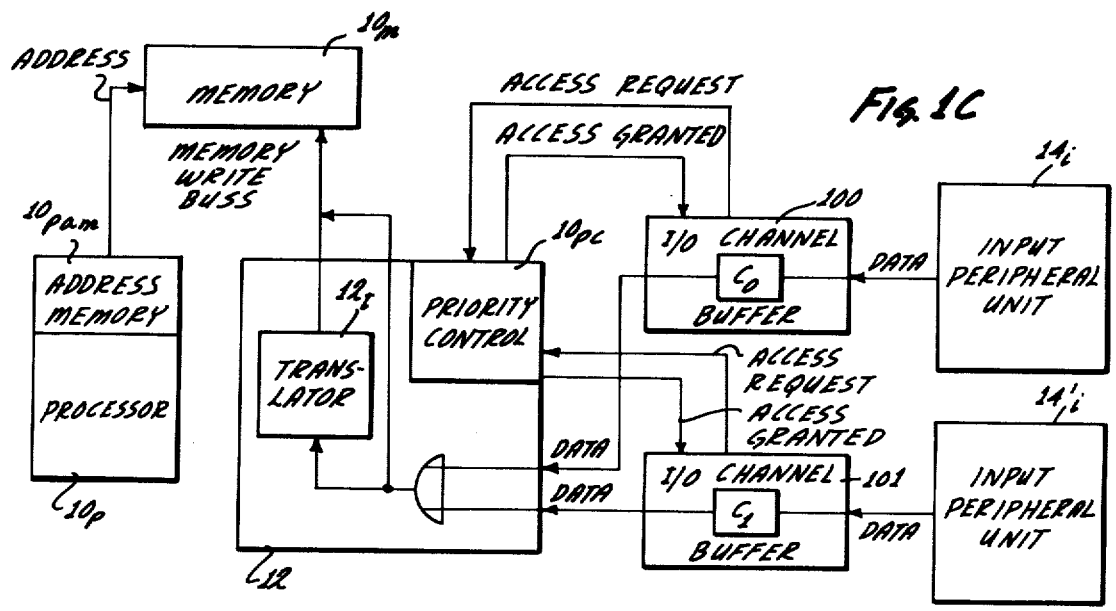
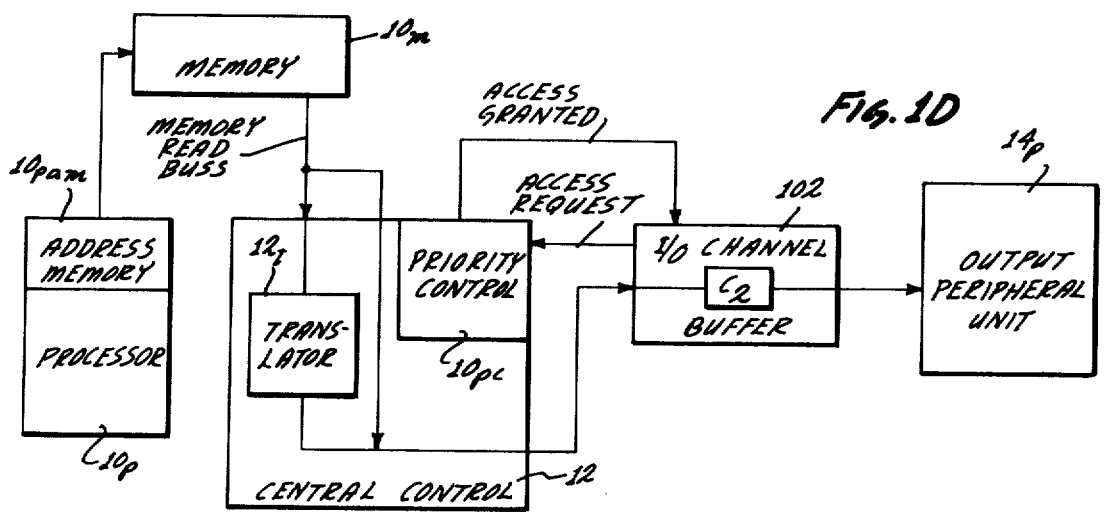

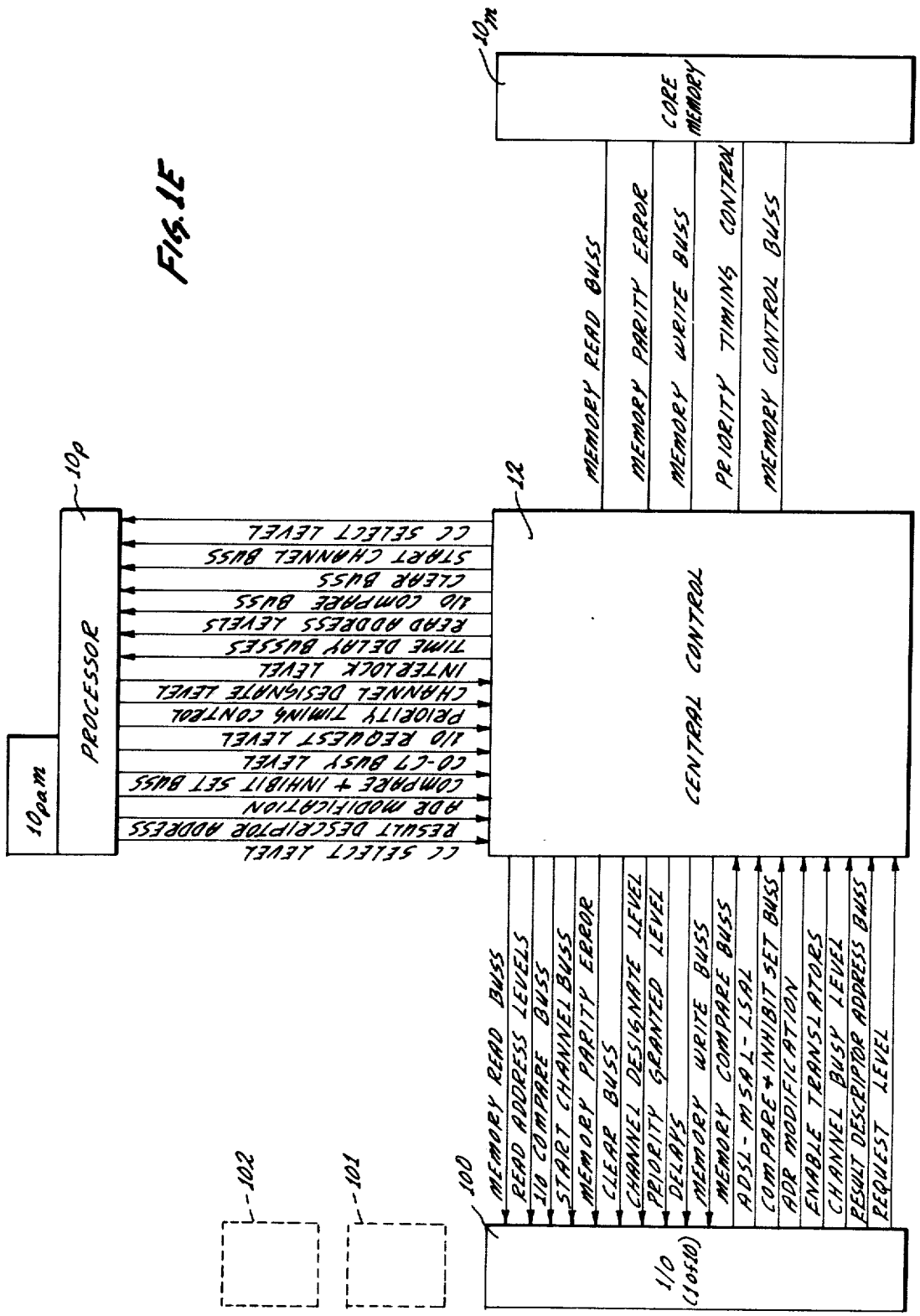

| | | WRITE | READ | WRITE FLIP | TEST | TEST ENABLE | CONDITIONAL CANCEL | ECHO |
|---|---|---|---|---|---|---|---|---|
| OP DIGIT | A8 | 0 | 1 | 0 | 0 | 0 | 0 | 0 |
| | A4 | 1 | 0 | 1 | 0 | 0 | 0 | 0 |
| | A2 | 0 | 0 | 0 | 1 | 1 | 1 | 0 |
| | A1 | 0 | 0 | 0 | 0 | 0 | 0 | 1 |
| VARIANT DIGIT 1 | B8 | 0 | 0 | 1 | 0 | 0 | 1 | 0 |
| | B4 | 0 | 0 | 0 | 0 | 1 | 0 | 0 |
| | B2 | 0 | 0 | 0 | 0 | 0 | 0 | 0 |
| | B1 | 0 | X | X | 0 | X | 0 | — |
| VARIANT DIGIT 2 | C8 C4 C2 C1 | MUST BE EQUAL TO ZERO | | | | | | |
| VARIANT DIGIT 3 | D8 D4 D2 D1 | MUST BE EQUAL TO ZERO | | | | | | |

NOTES: IF BIT B1 OF VARIANT DIGIT 1 IS EQUAL TO 1, THE OCCURRENCE OF "TIMEOUT" WILL BE INHIBITED DURING A READ OPERATION. FOR AN ECHO OPERATION, BIT B1 OF VARIANT DIGIT 1 CAN BE EITHER 0 OR 1

Fig. 4C  RESULT DESCRIPTOR

| A DIGIT | B DIGIT | C DIGIT | D DIGIT |
|---|---|---|---|
| A8 RESERVED | B8 CONDITIONAL CANCEL OPERATION COMPLETED. | C8 TERMINATE SIGNAL RECEIVED DURING TRANSFER OF DATA FROM THE SYSTEM BEFORE AN ENDING CODE WAS RECEIVED BY THE L.C.P. | D8 RESERVED |
| A4 DESCRIPTOR ERROR. | B4 TIMEOUT OCCURRED DURING TRANSMISSION FROM TERMINAL UNIT. | C4 TERMINAL UNIT BLOCK CHECK CHARACTER ERROR. | D4 RESERVED |
| A2 SYSTEM VERTICAL PARITY ERROR. | B2 TERMINAL UNIT BLOCK CHECK CHARACTER ERROR. | C2 ACCESS ERROR. LCP BUFFER NOT SERVICED IN TIME TO COMPLETE A DATA TRANSFER DURING A READ OR WRITE OPERATION. | D2 RESERVED |
| A1 SYSTEM LONGITUDINAL PARITY ERROR. | B1 LCP BUFFER PARITY ERROR DURING TRANSFER OF DATA FROM TERMINAL UNIT TO LCP. | C1 TERMINATE SIGNAL RECEIVED DURING ECHO OPERATION OR DURING TRANSFER OF DATA FROM LCP TO SYSTEM BEFORE AN ENDING CODE WAS RECEIVED BY THE LCP. | D1 RESERVED |

1A DESCRIPTORS USED TO GENERATE LCP COMMAND MESSAGES (IM)

| DESCRIPTION | OP | VARIANT | A ADDRESS | B ADDRESS | C ADDRESS |
|---|---|---|---|---|---|
| READ, FORWARD | 40 | SLLL | AAAAAA | BBBBBB | |
| READ, FORWARD | 50 | SLLL | AAAAAA | BBBBBB | CCCCCC |
| READ, BACKWARD | 41 | SLLL | AAAAAA | BBBBBB | |
| READ, BACKWARD | 51 | SLLL | AAAAAA | BBBBBB | CCCCCC |
| WRITE, FORWARD | 42 | SLLL | AAAAAA | BBBBBB | |
| WRITE, FORWARD | 52 | SLLL | AAAAAA | BBBBBB | CCCCCC |
| WRITE, BACKWARD | 43 | SLLL | AAAAAA | BBBBBB | |
| WRITE, BACKWARD | 53 | SLLL | AAAAAA | BBBBBB | CCCCCC |
| TEST | 44 | SLLL | | | |
| TEST | 54 | SLLL | AAAAAA | BBBBBB | CCCCCC |
| ECHO | 48 | SLLL | AAAAAA | BBBBBB | |
| ECHO | 58 | SLLL | AAAAAA | BBBBBB | CCCCCC |

↑↑↑↑
ABCD DIGITS

NOTES:
S = VARIANTS USED BY THE IOT
    8 = INHIBIT DATA TRANSFER TO MEMORY
    4 = RESERVED
    2 = ASCII TRANSLATION
    1 = RESERVED
L = LCP VARIANTS WHICH ARE SENT UNMODIFIED TO LCP

1B DESCRIPTORS USED BY IOT

EXTENDED RD STORE   70 XX CC   AAAAAA   BBBBBB
CONDITIONAL CANCEL   71 XX CC   (CONVERTS TO TEST OP FOR LCP)
UNCONDITIONAL CANCEL 72 XX CC   (CLEARS THE LCP)
    CC = CHANNEL DESIGNATION (00-77)

FIG. 5A

DATA FIELD BOUNDARIES

IOT DESCRIPTOR REGISTER INFORMATION

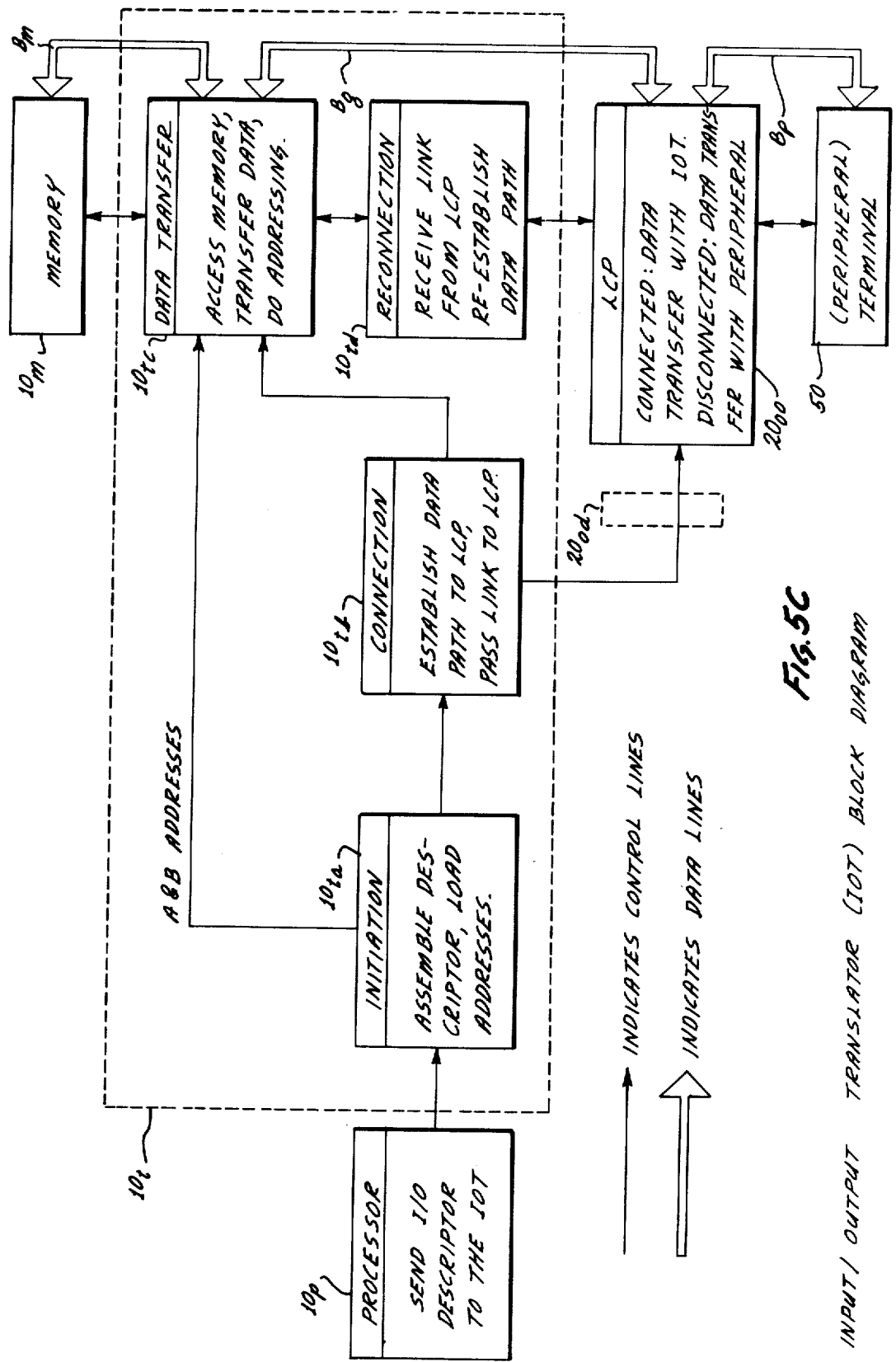

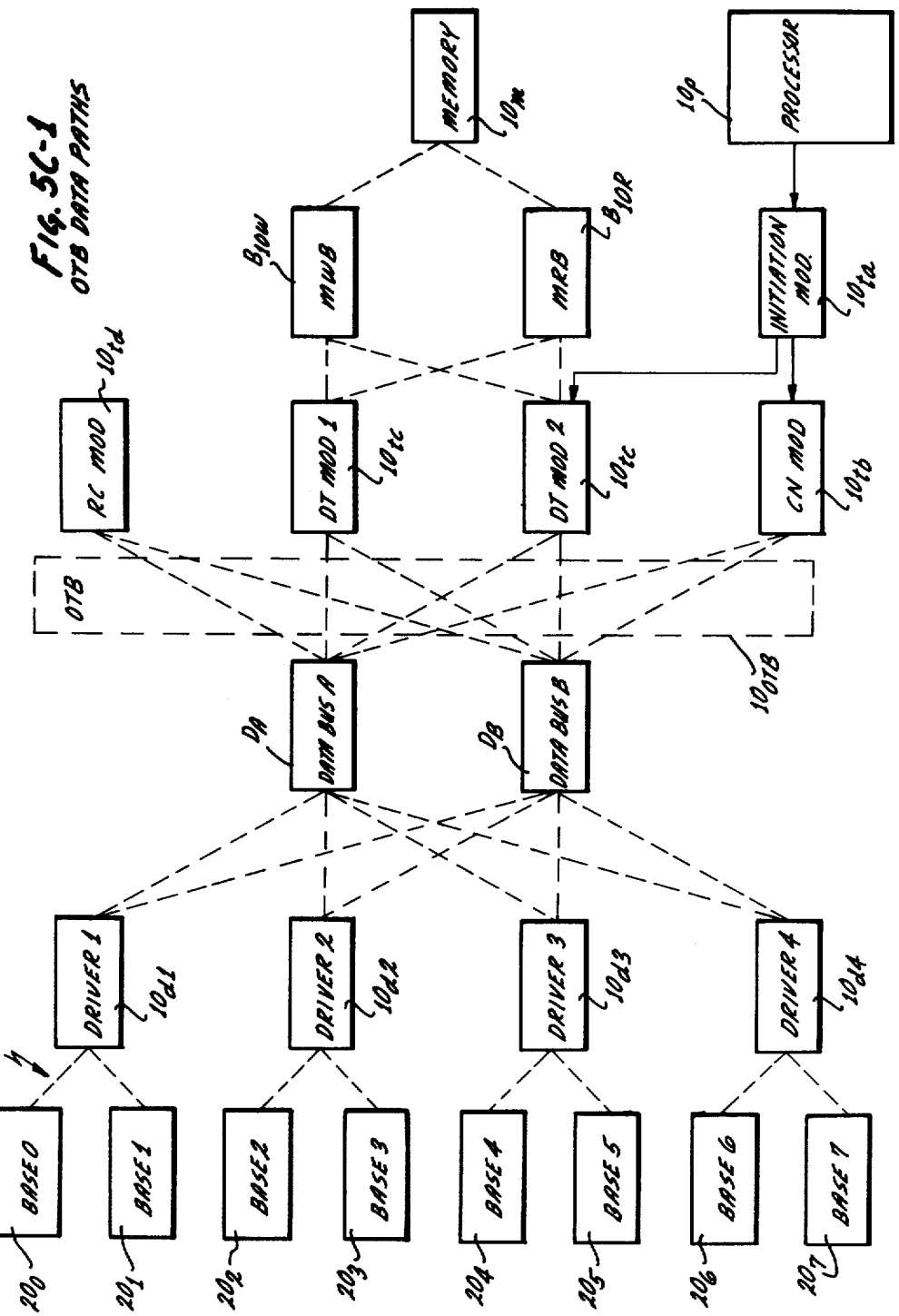

IOT BLOCK DIAGRAM

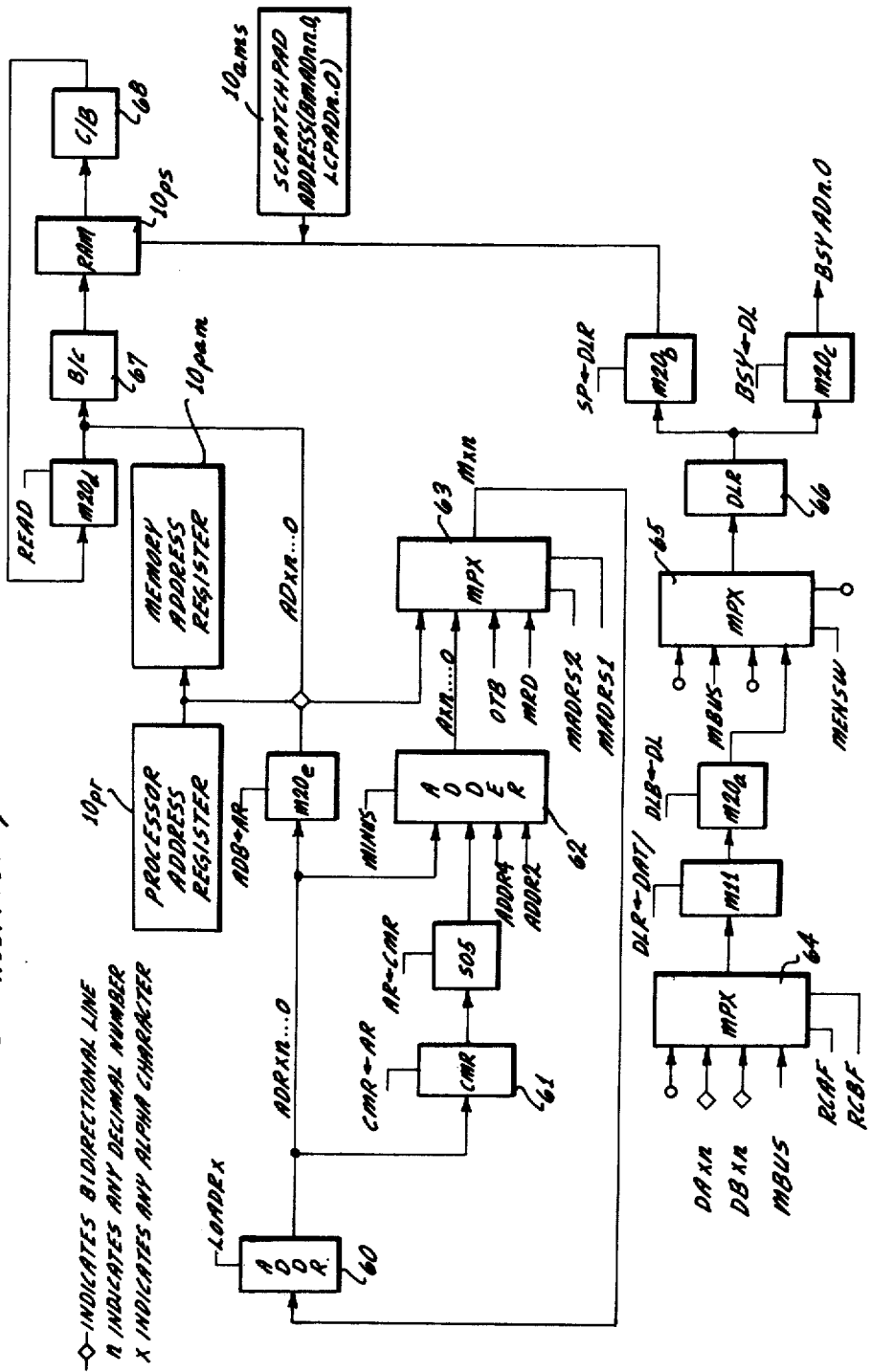

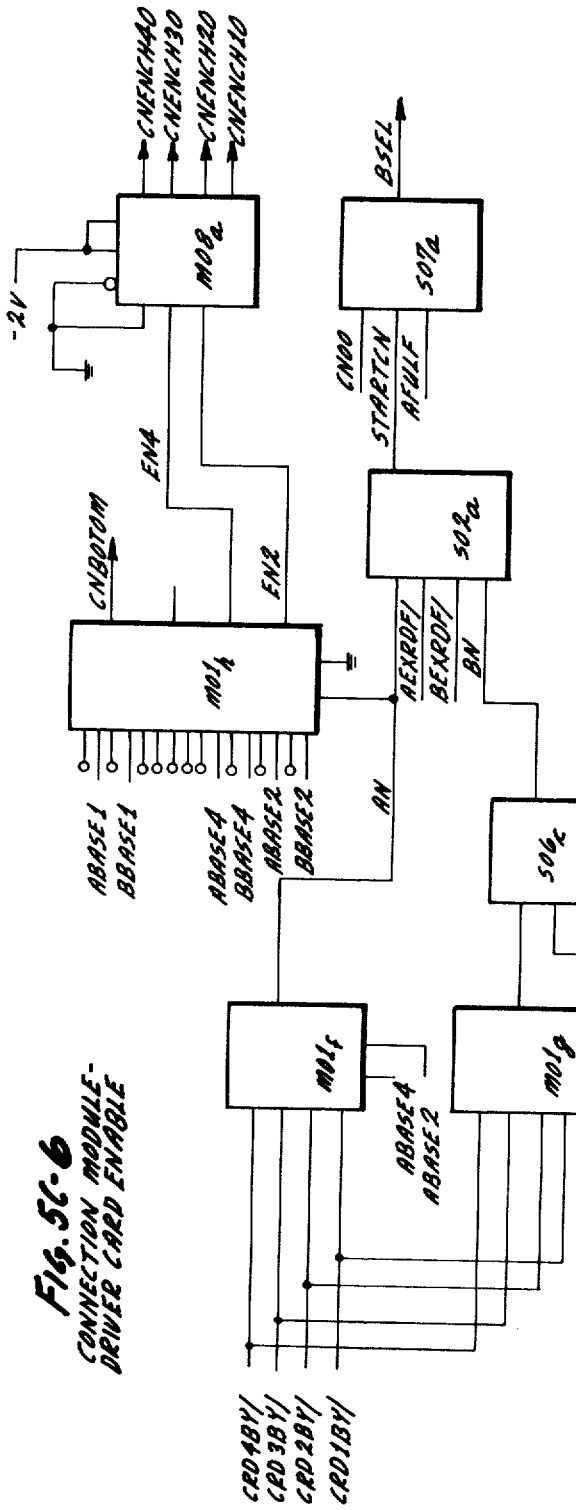
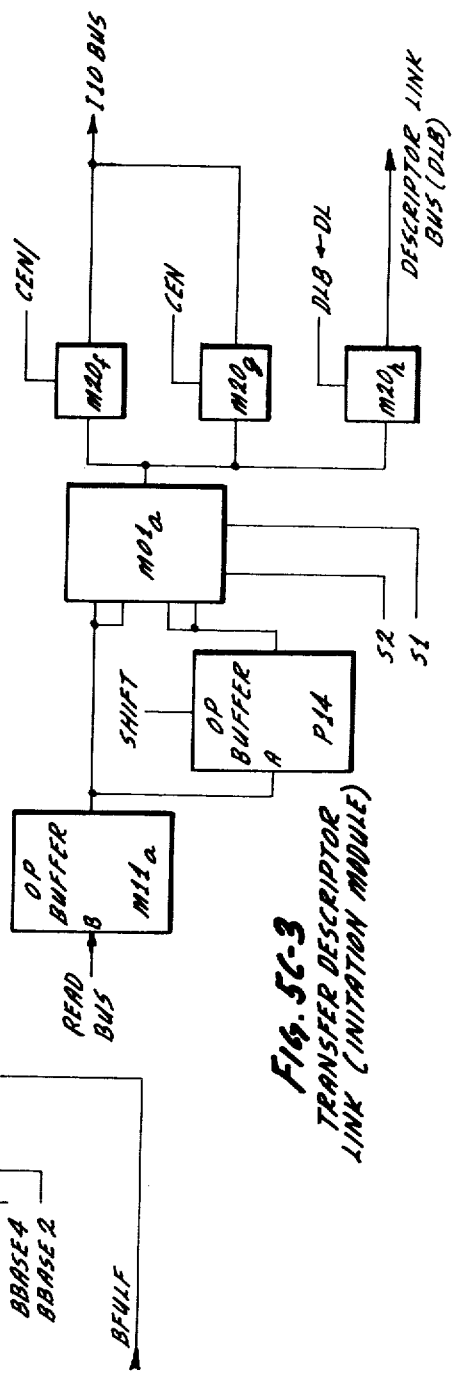
Fig. 5C-6 CONNECTION MODULE-DRIVER CARD ENABLE
Fig. 5C-3 TRANSFER DESCRIPTOR LINK (INITIATION MODULE)

DESCRIPTOR LINK REGISTER

RECEIVE DESCRIPTOR LINK

MULTIPLEXOR INPUT SELECT TERMS

TRANSMIT SELECT LEVELS

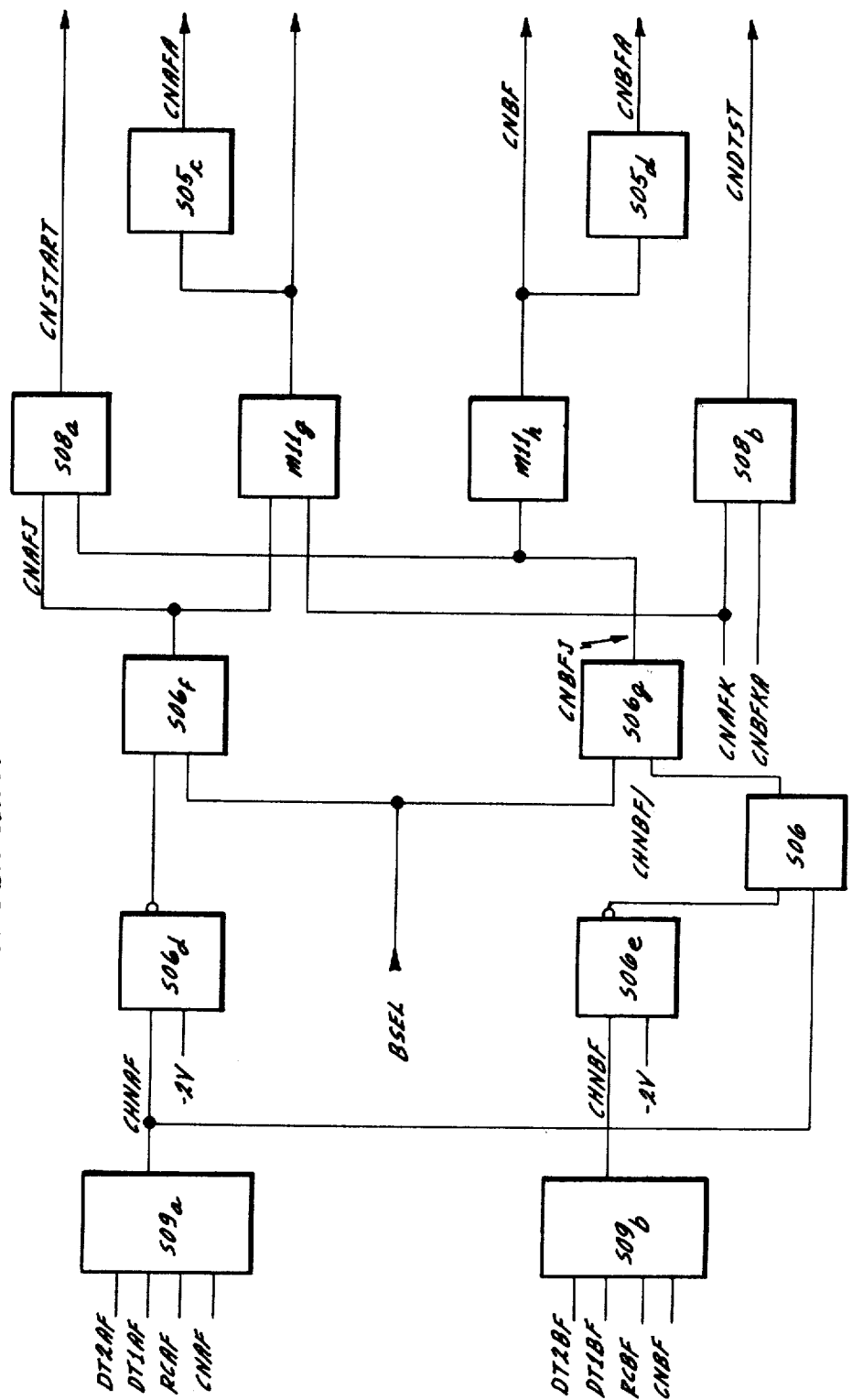

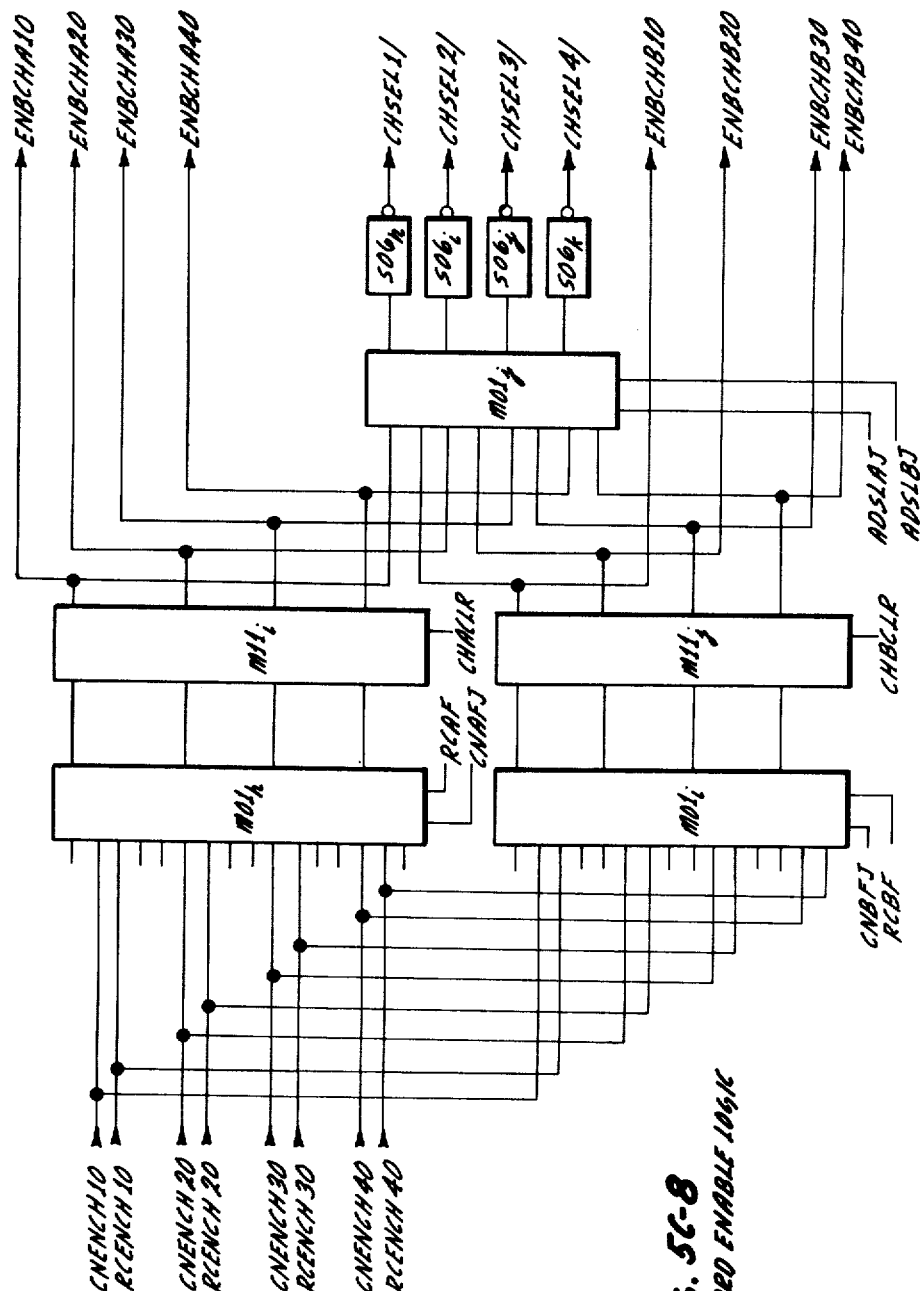
Fig. 5C-8 DRIVER CARD ENABLE LOGIC

OTB DATA PATH SWITCHING

◇ = BIDIRECTIONAL LINE
x = A, B, C, or D
n = 1, 2, 4, or 8

DATA TRANSFER MODULE
(MODULE SELECT LOGIC)

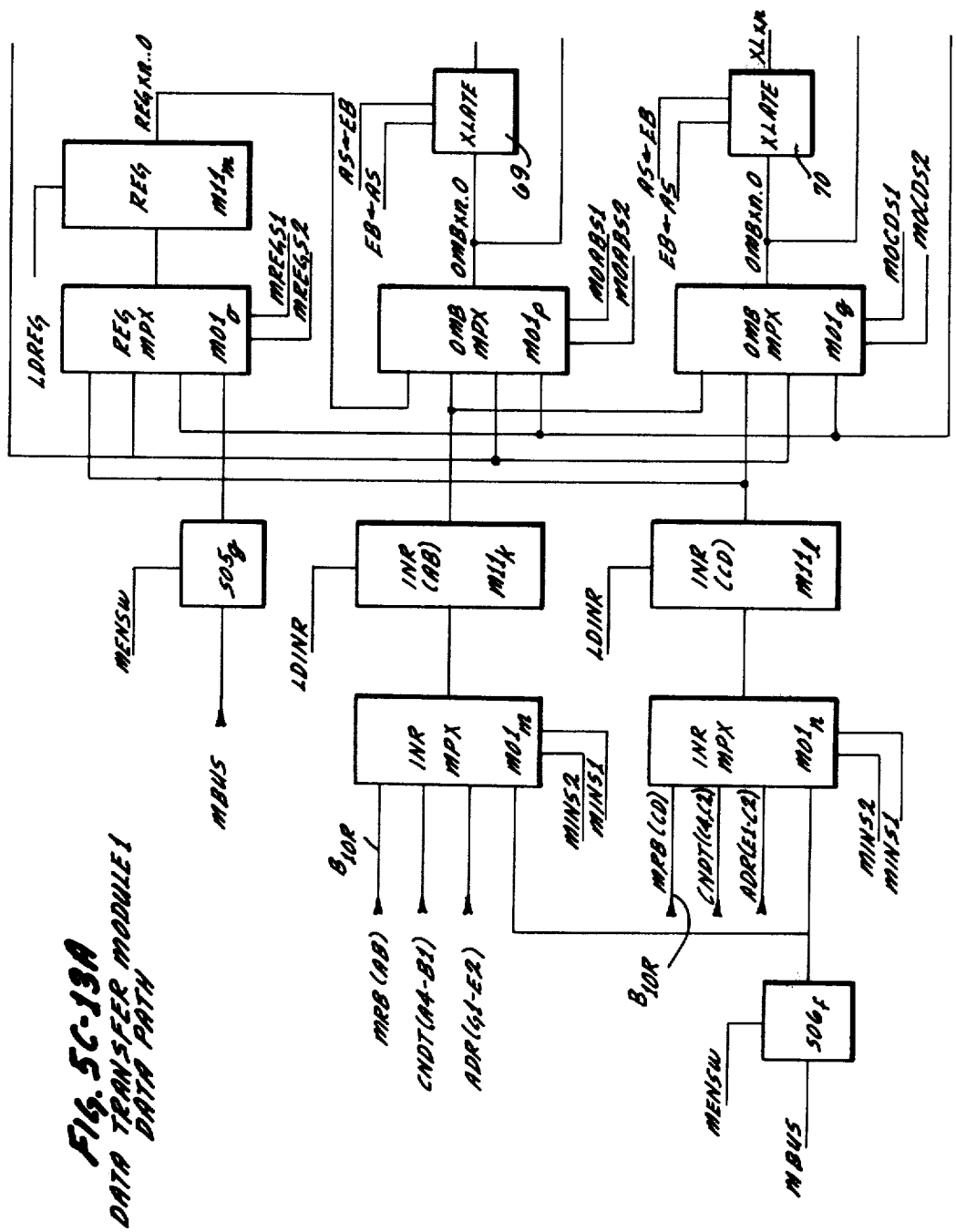

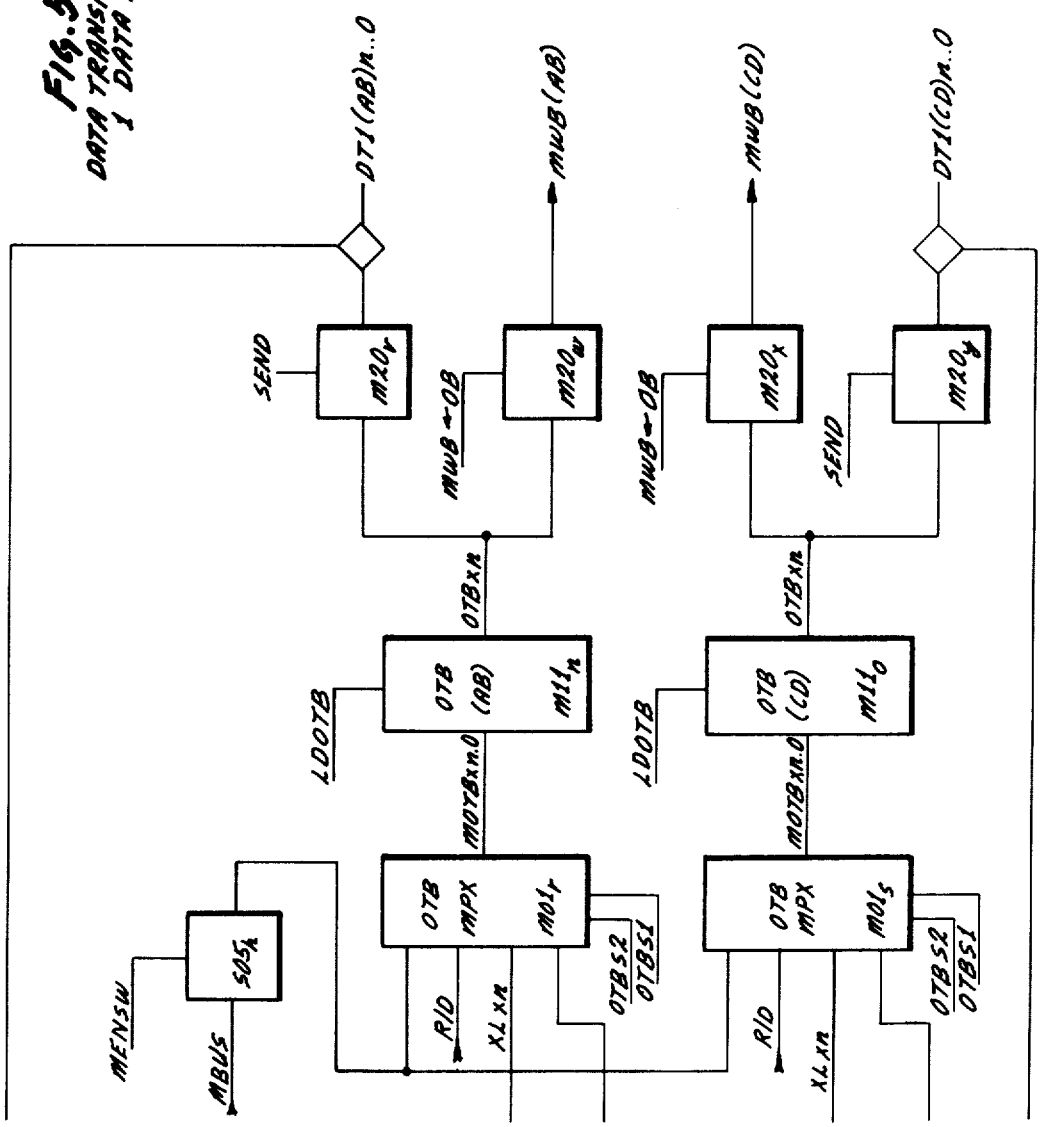
FIG.5C-13B DATA TRANSFER MODULE DATA PATH

BASE DRIVER CARD
DATA PATH

OP BUFFER
SHIFT CONTROL

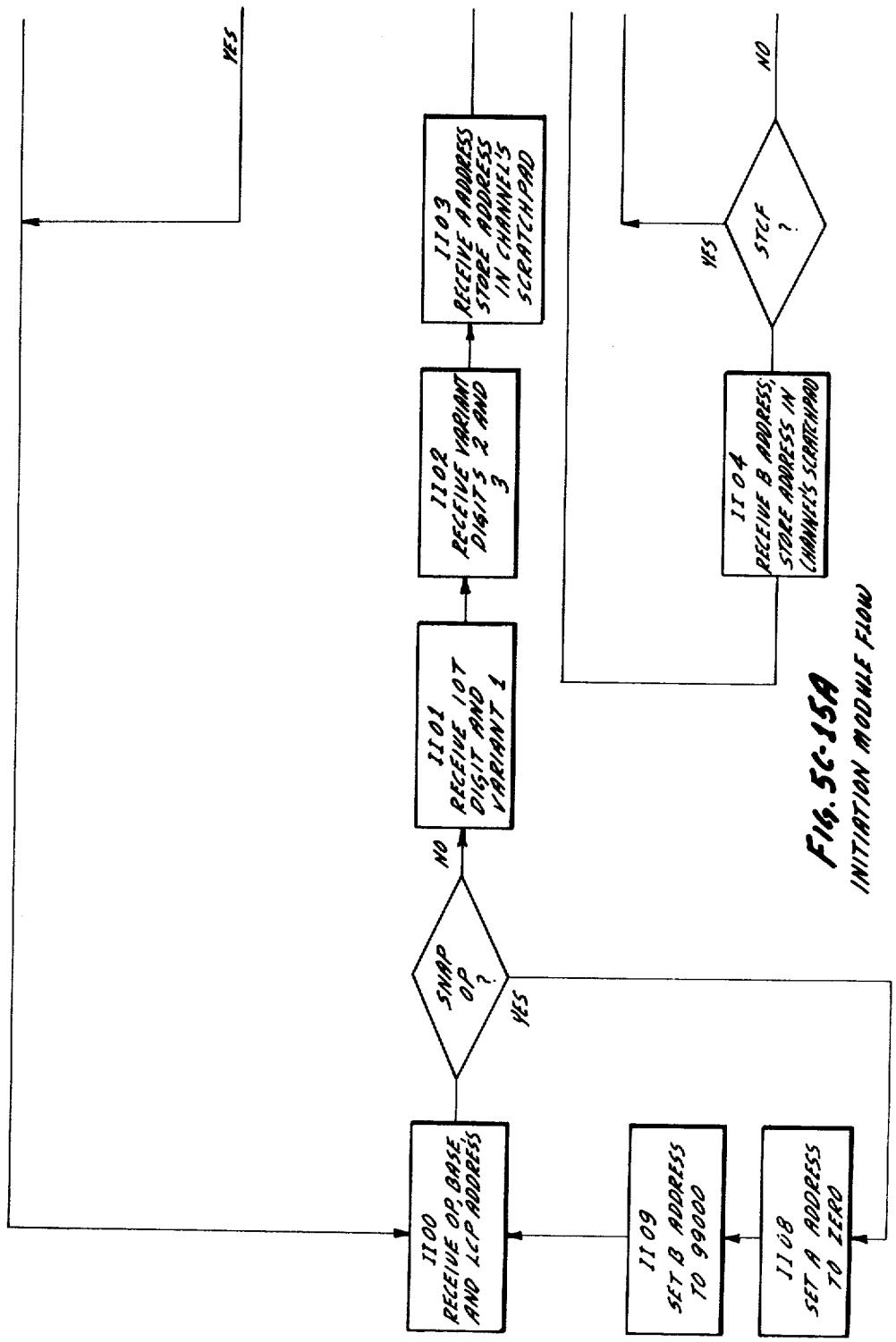

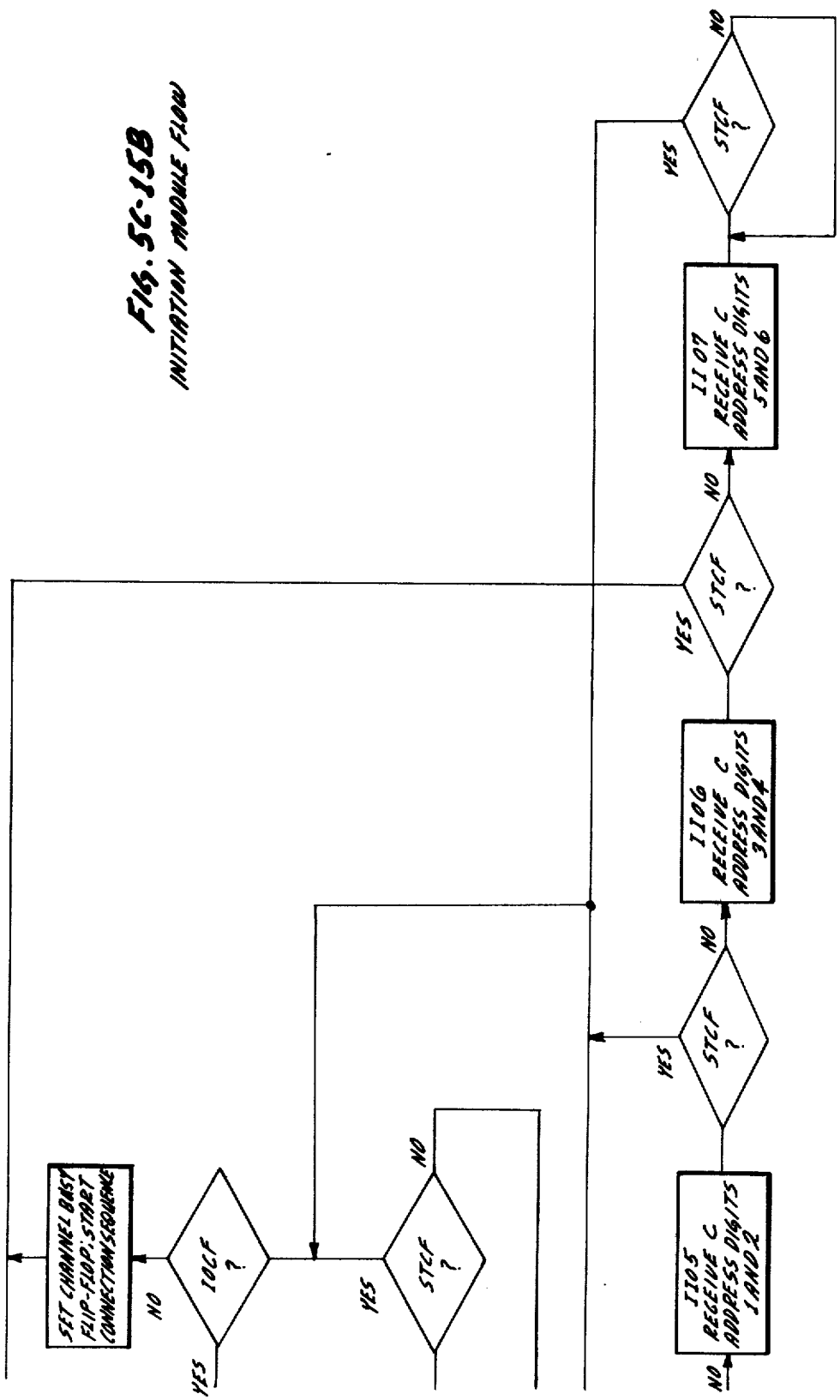

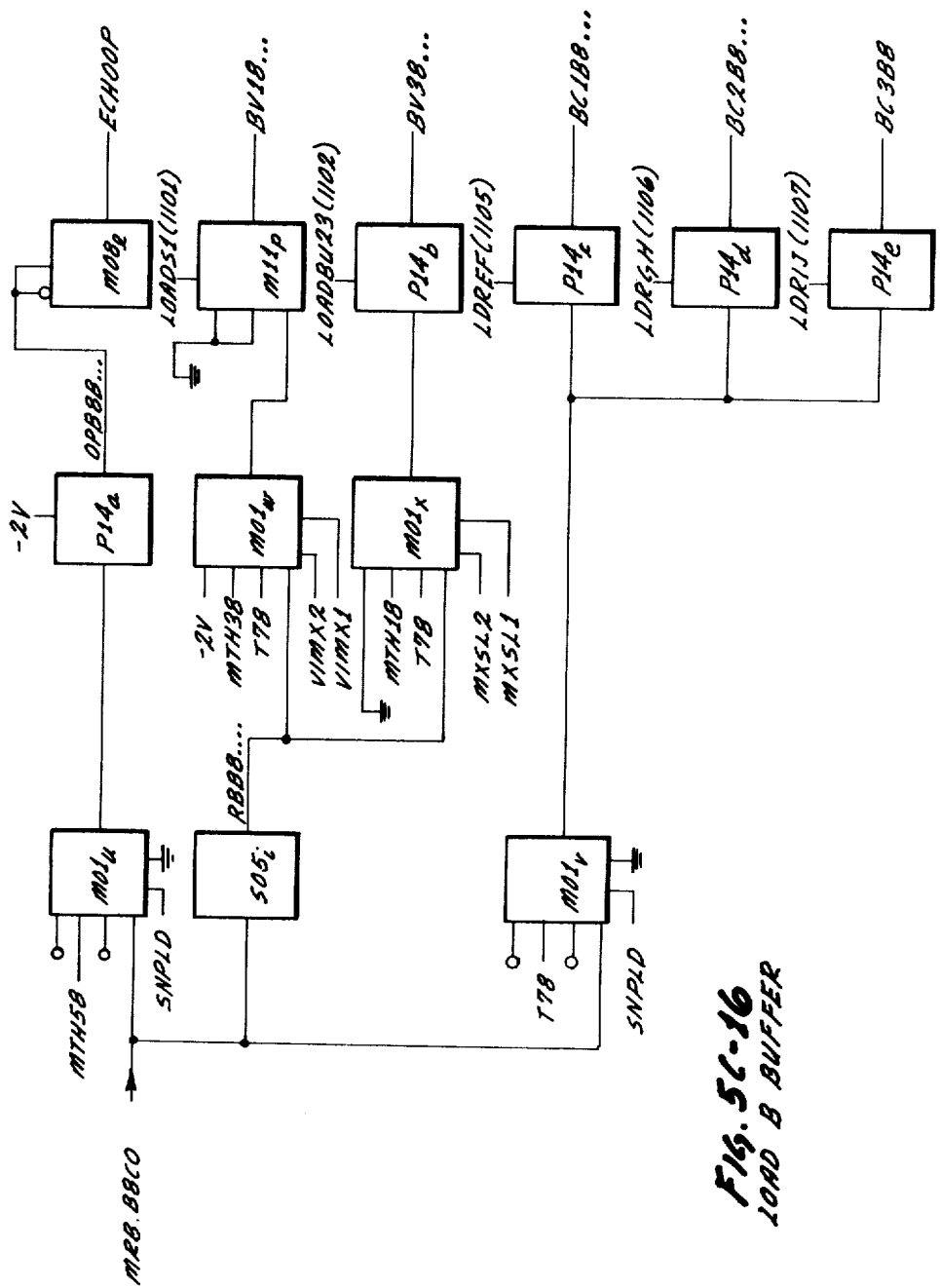

CONNECTION MODULE FLOW

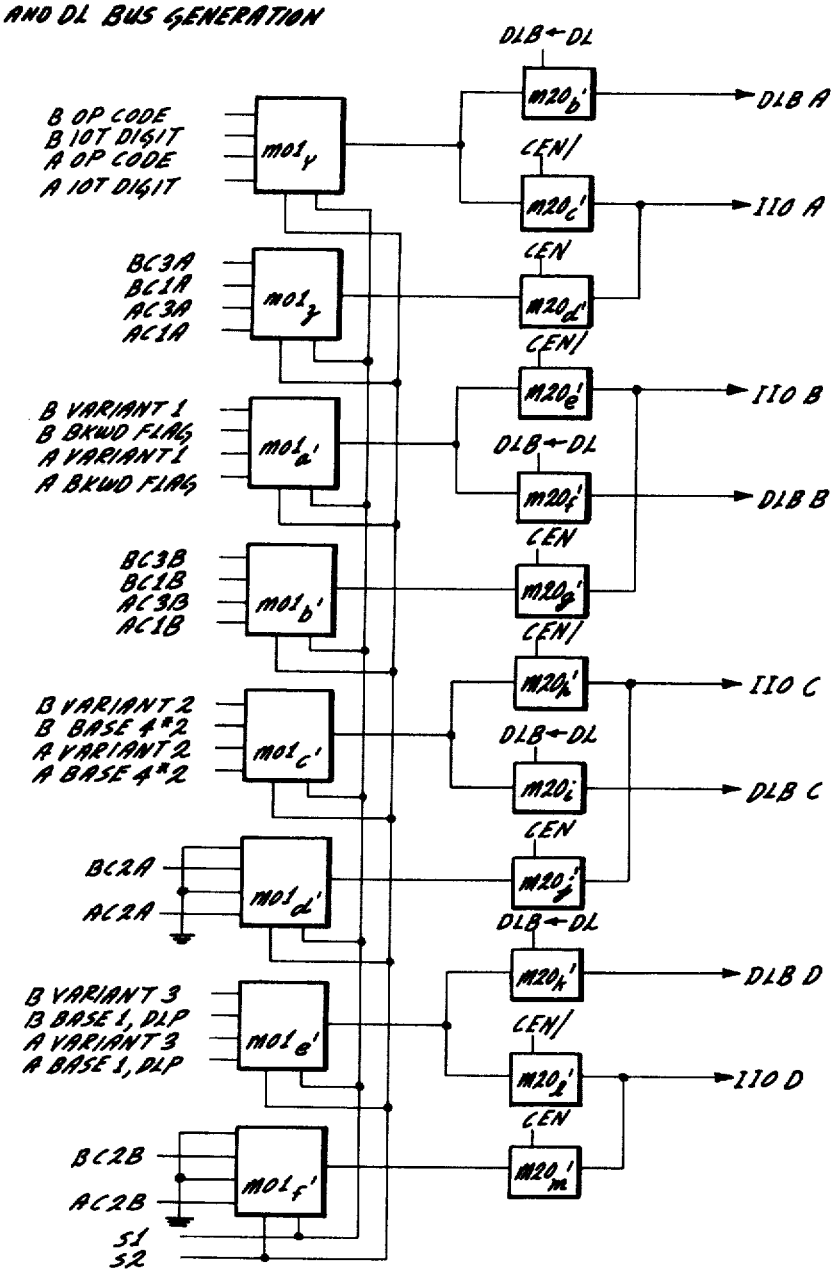

POLL TEST

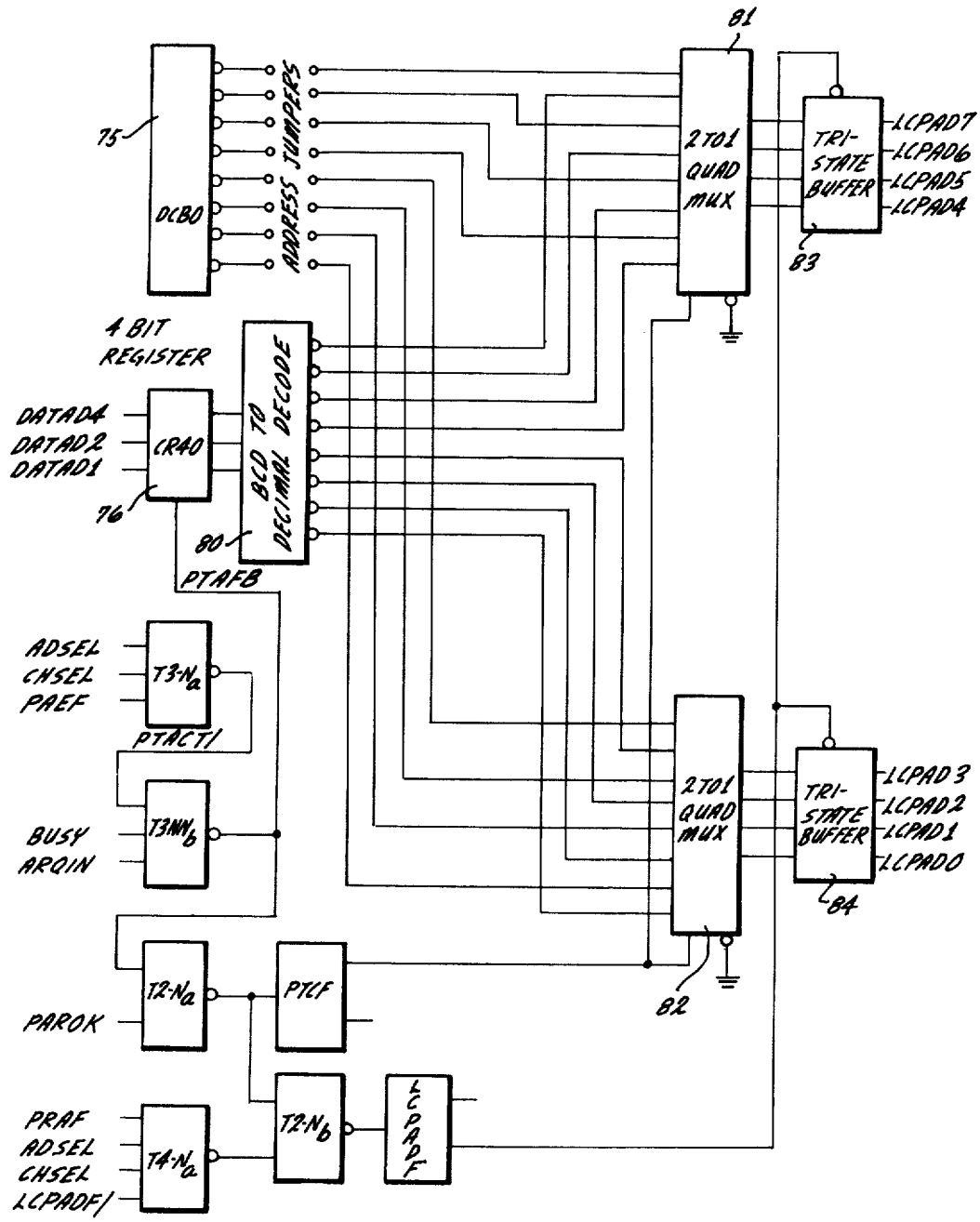

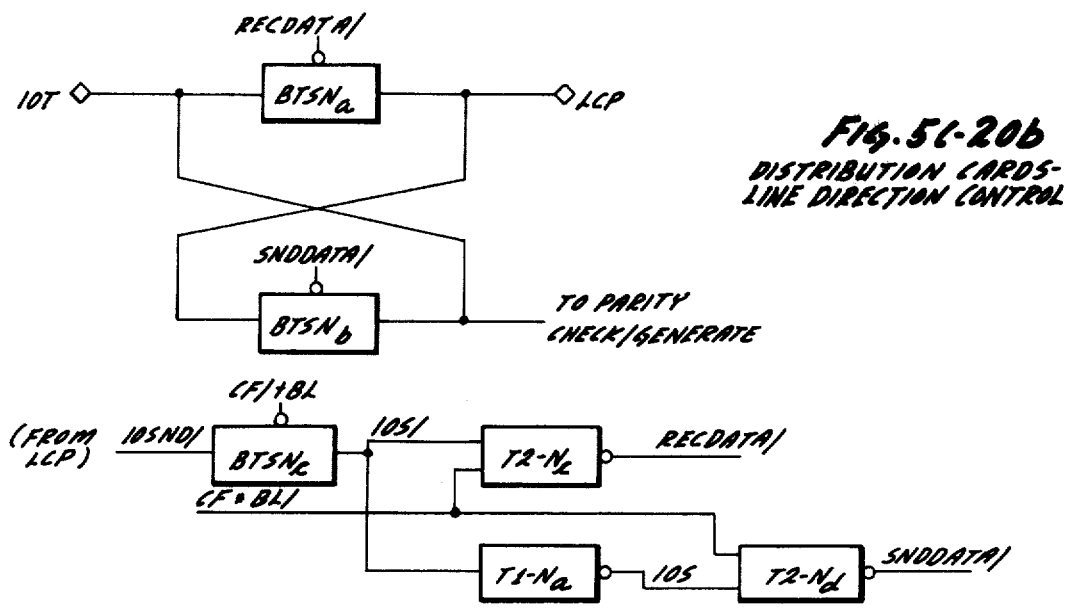
Fig. 5C-20b
DISTRIBUTION CARDS-
LINE DIRECTION CONTROL
Fig. 5C-22
WRITE CYCLE DATA TRANSFERS
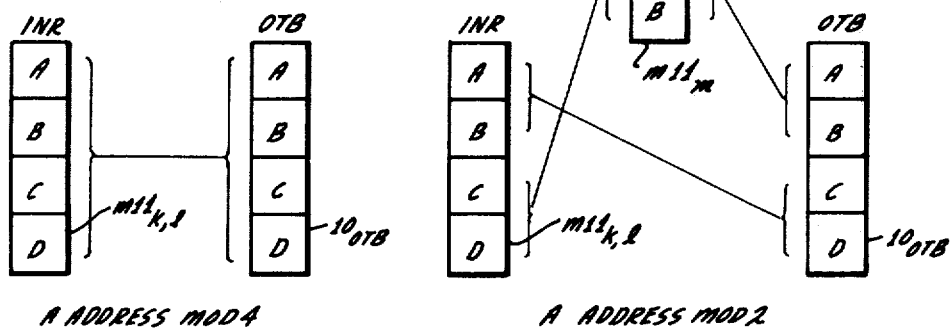
A ADDRESS MOD 4     A ADDRESS MOD 2
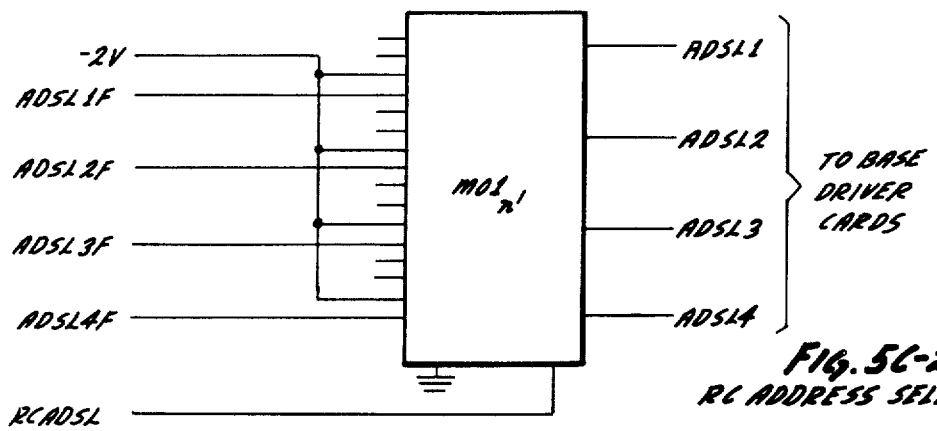
Fig. 5C-29
RC ADDRESS SELECT

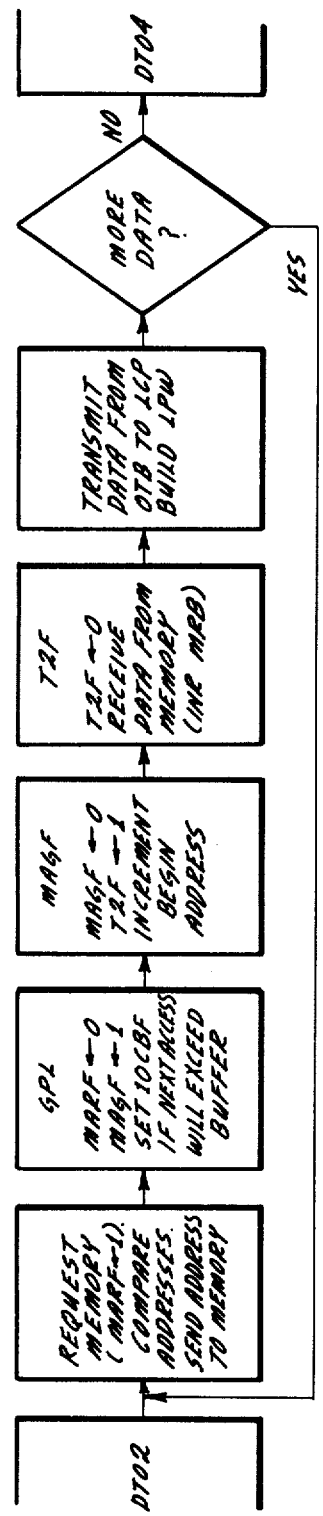
FIG.5C-21a DETAIL A - DTO3 WRITE CYCLE
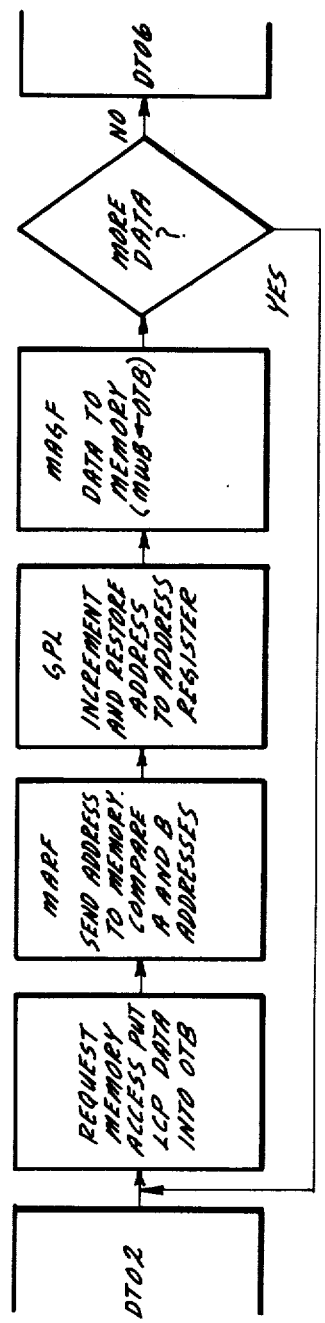
FIG.5C-21b DETAIL B - DTO5 READ CYCLE

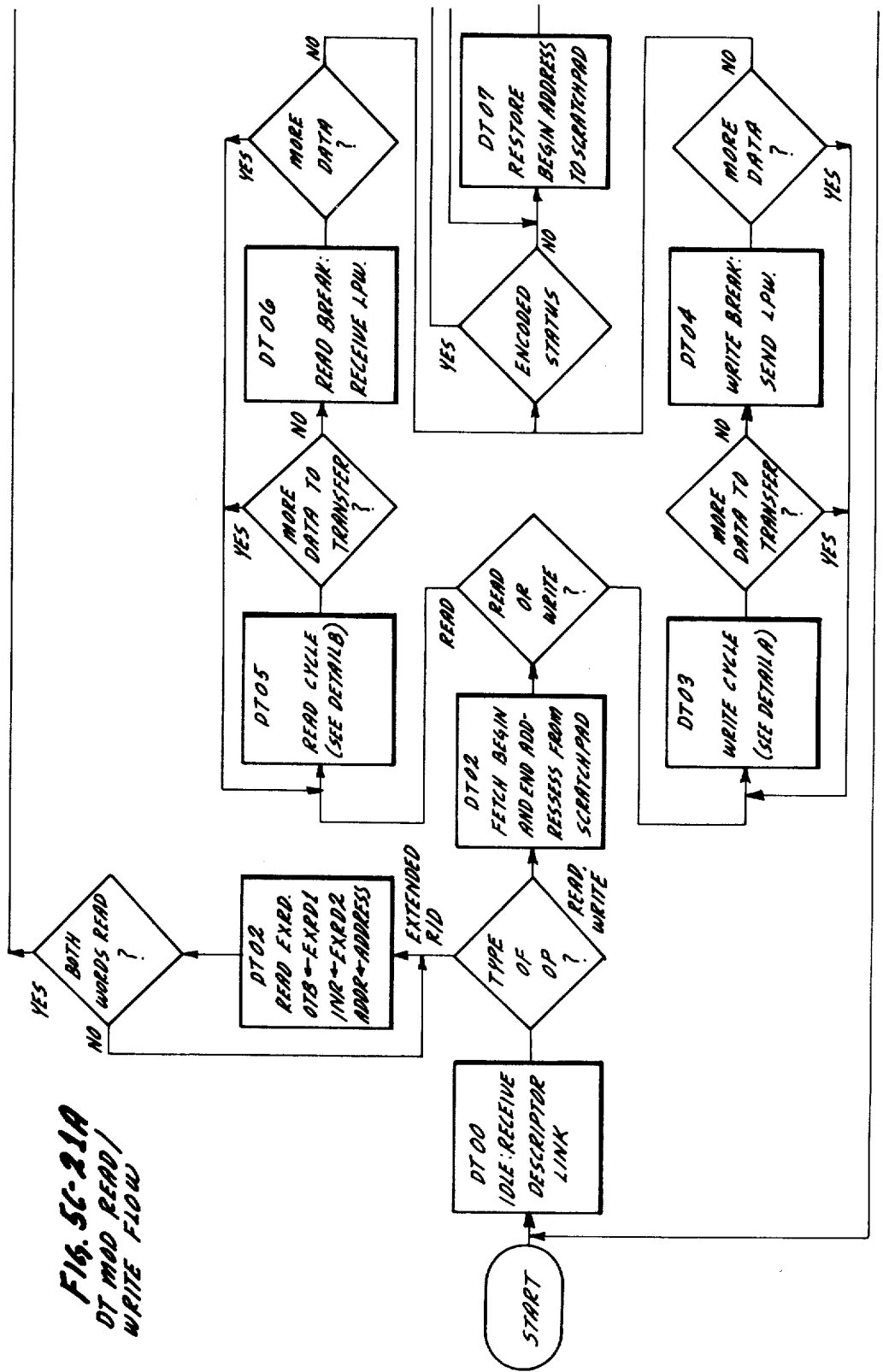

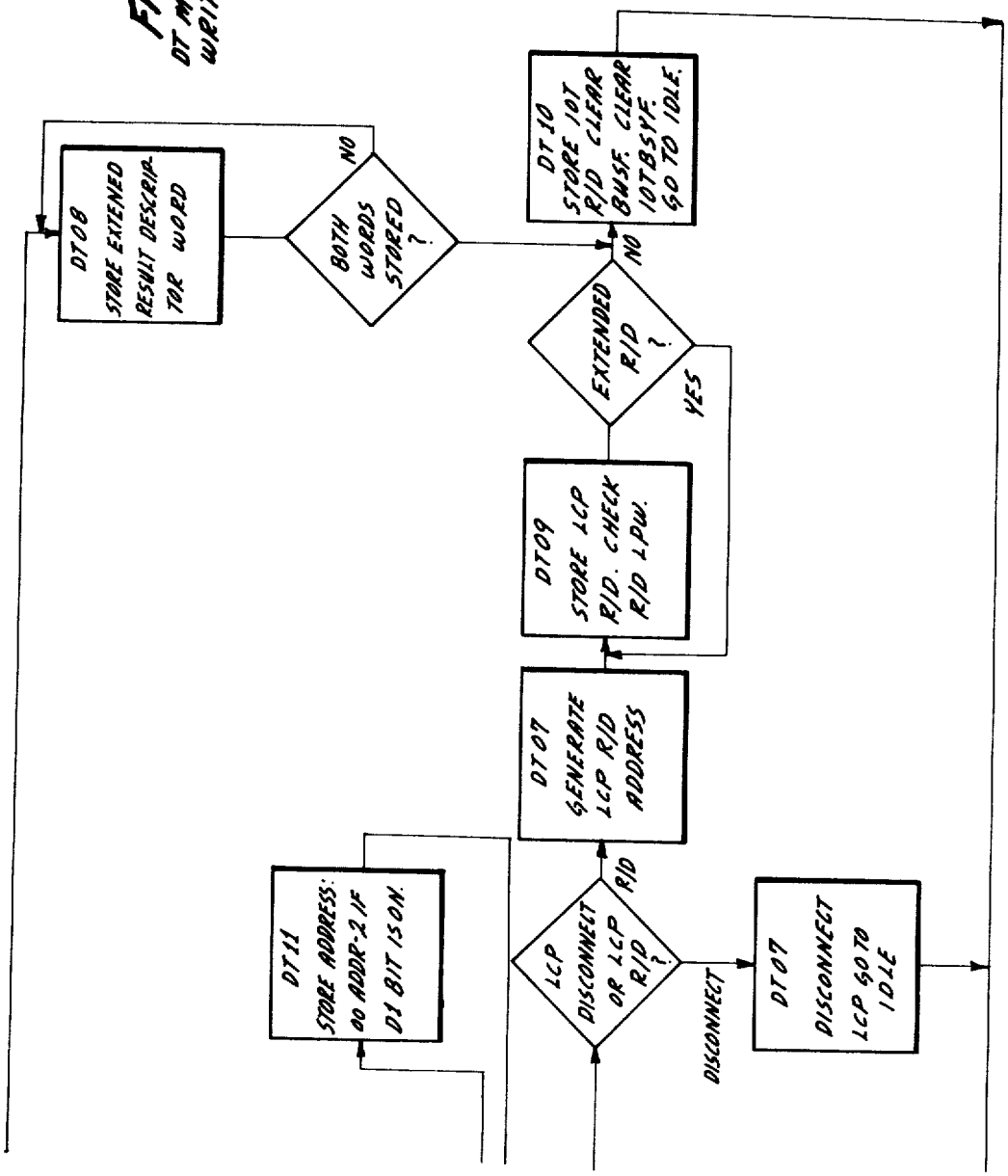
Fig. 5C-21B DT MOD READ/WRITE FLOW

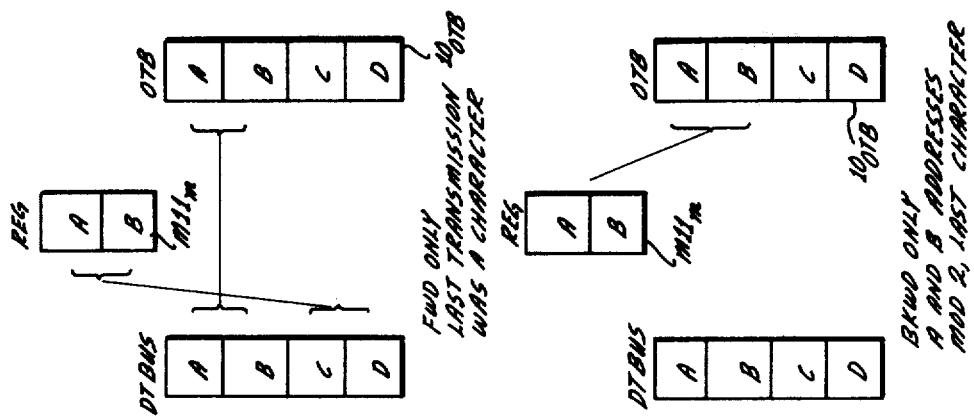
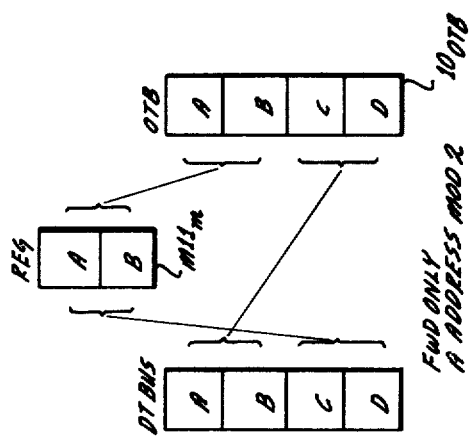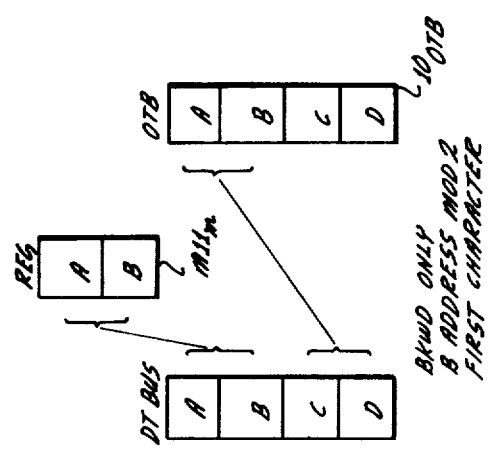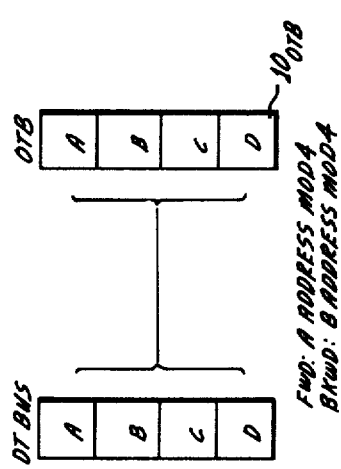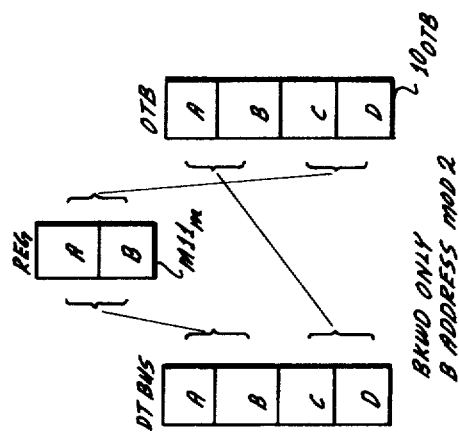

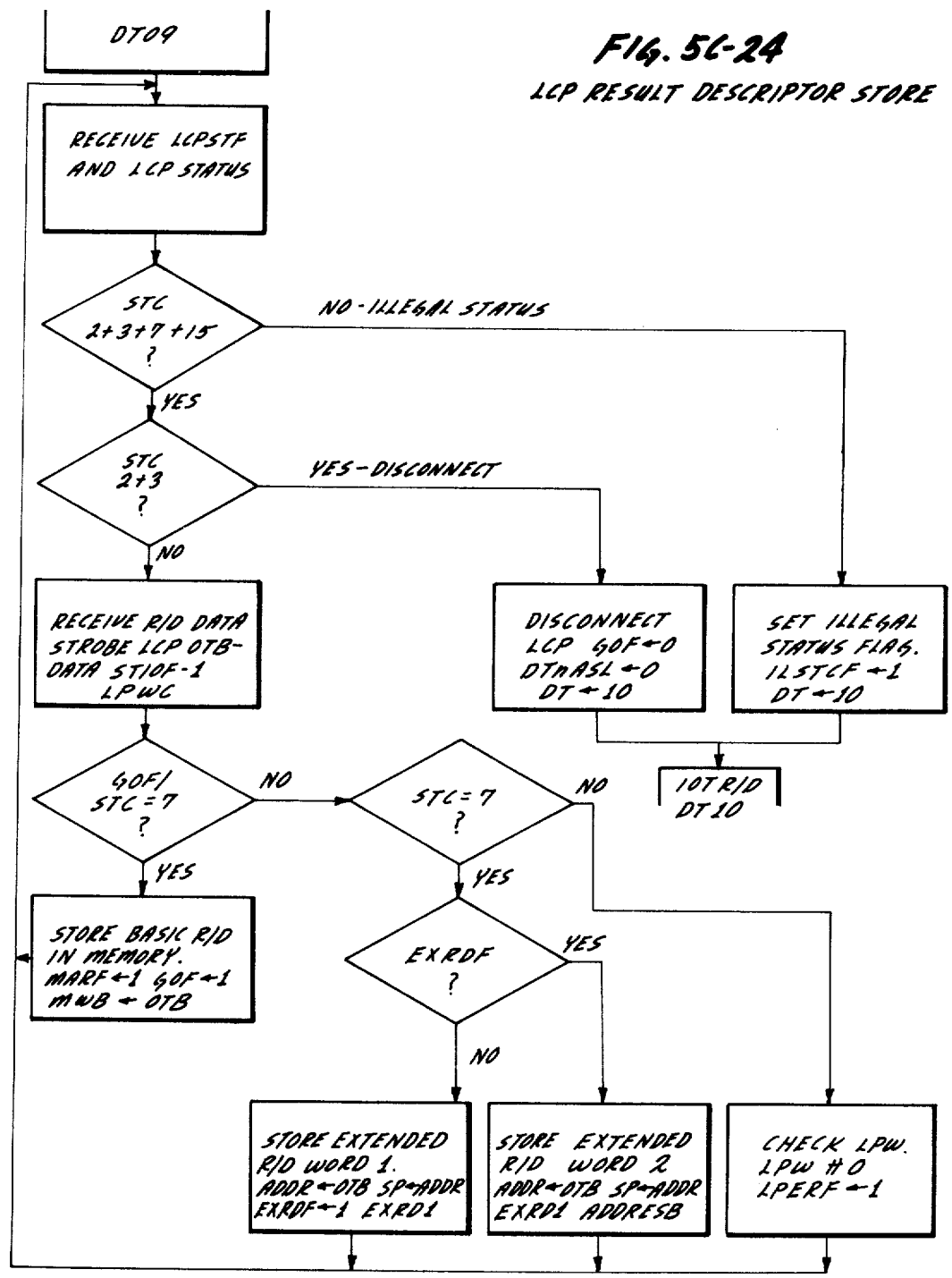

POLL REQUEST

POLL REQUEST

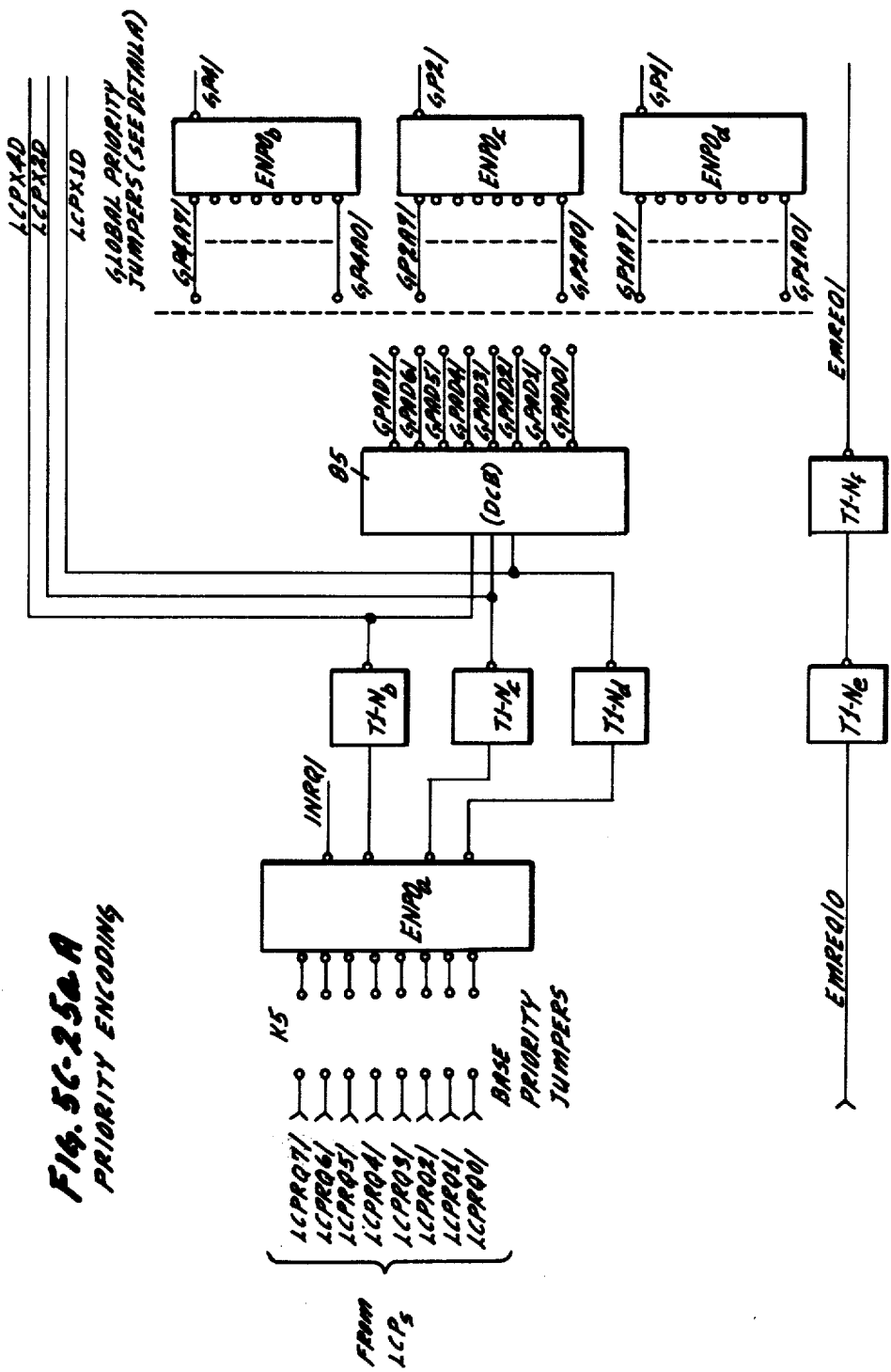

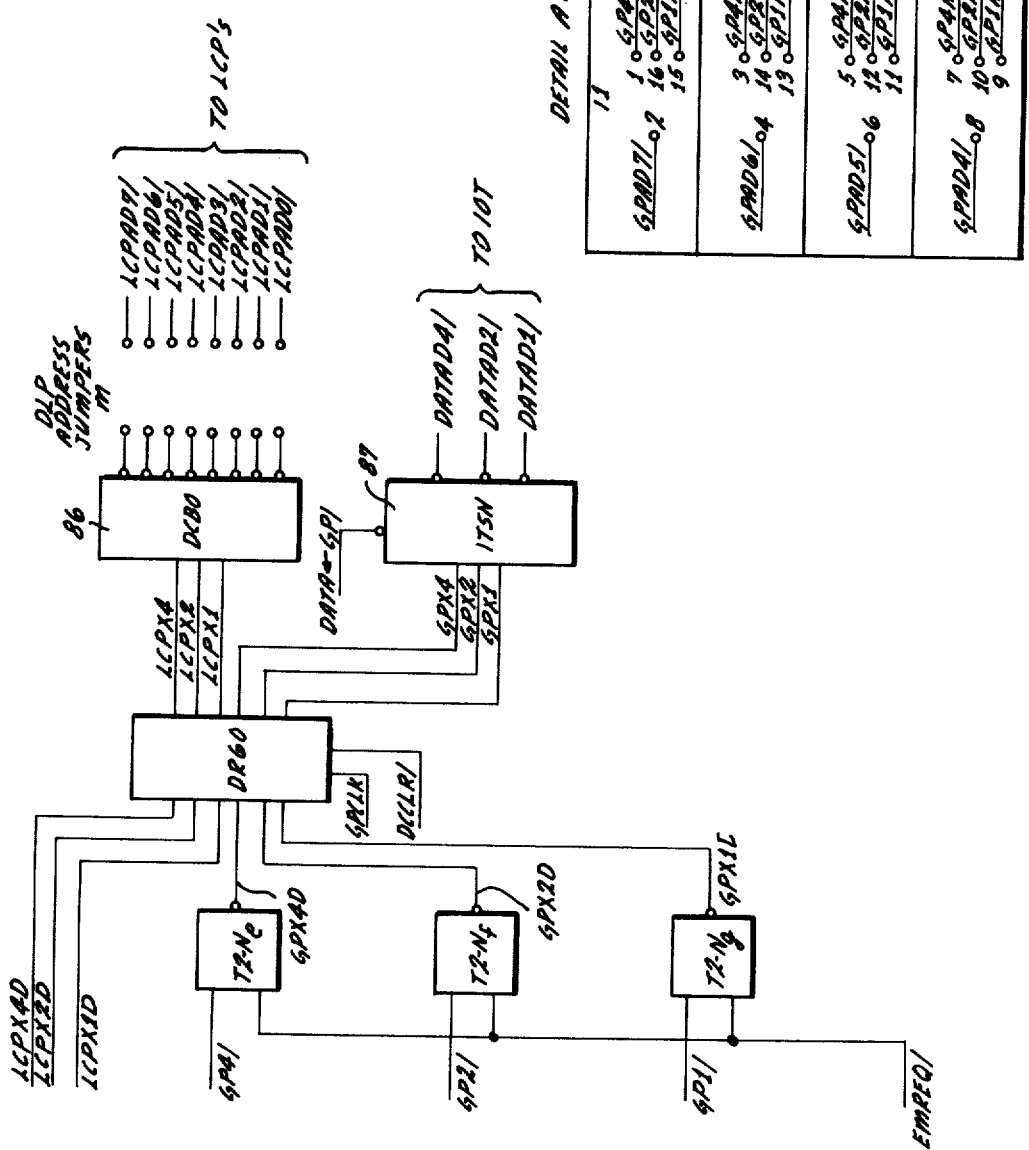

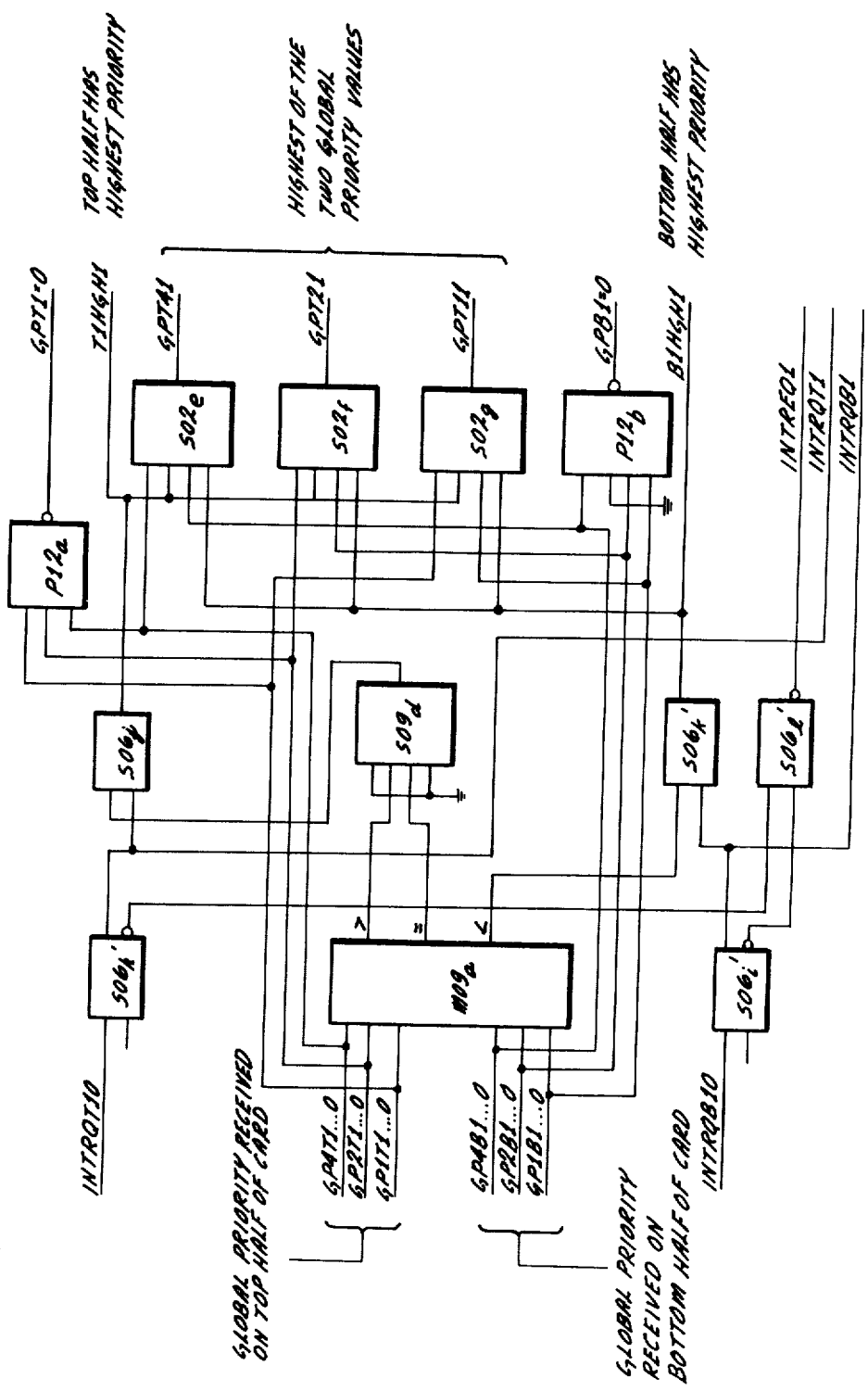

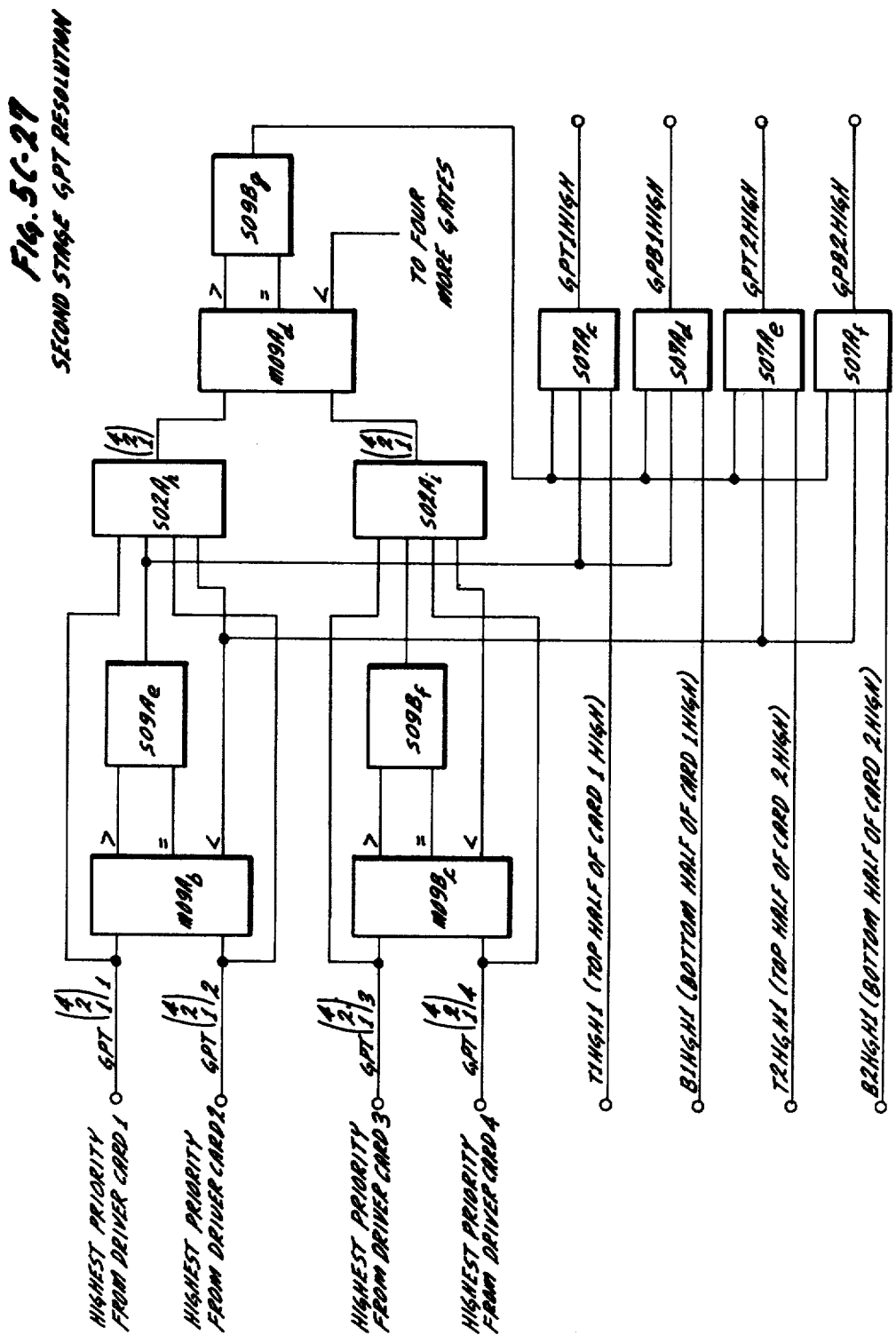

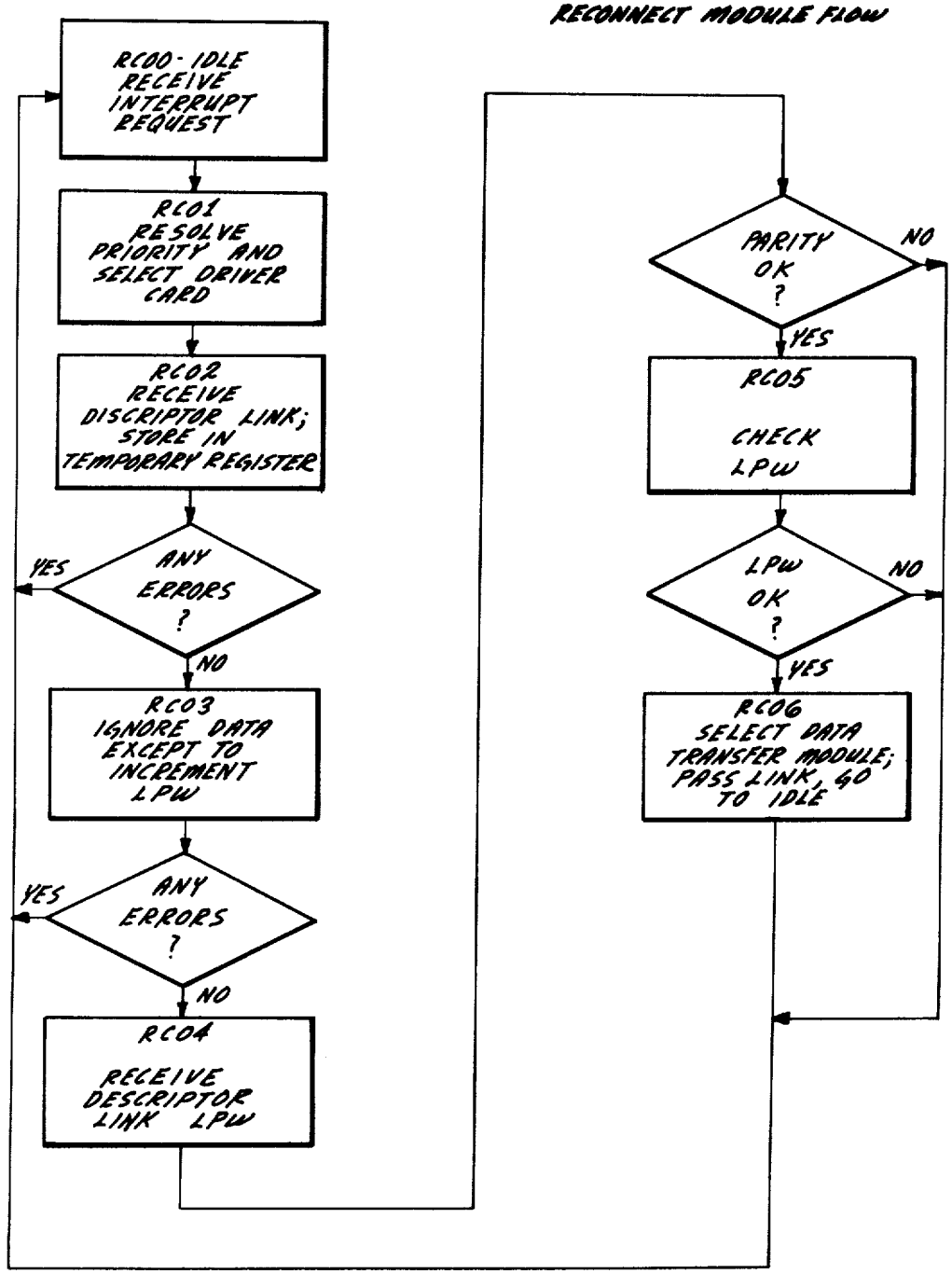

MESSAGE LEVEL INTERFACE

IOT SCRATCHPAD MEMORY

IOT ADDRESS MEMORY SCRATCHPAD

LCP/SYSTEM-INTERFACE LOGIC FLOW

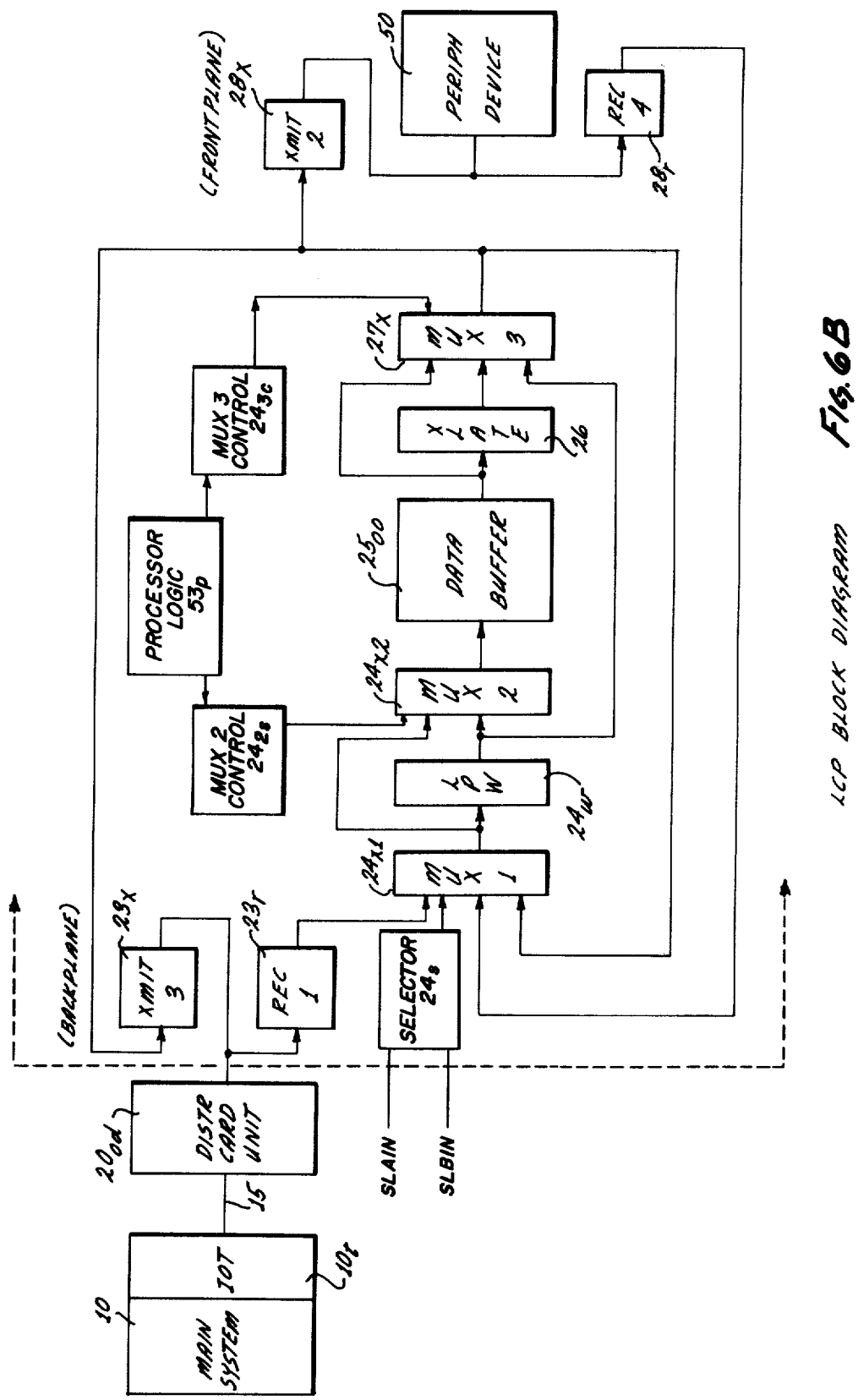

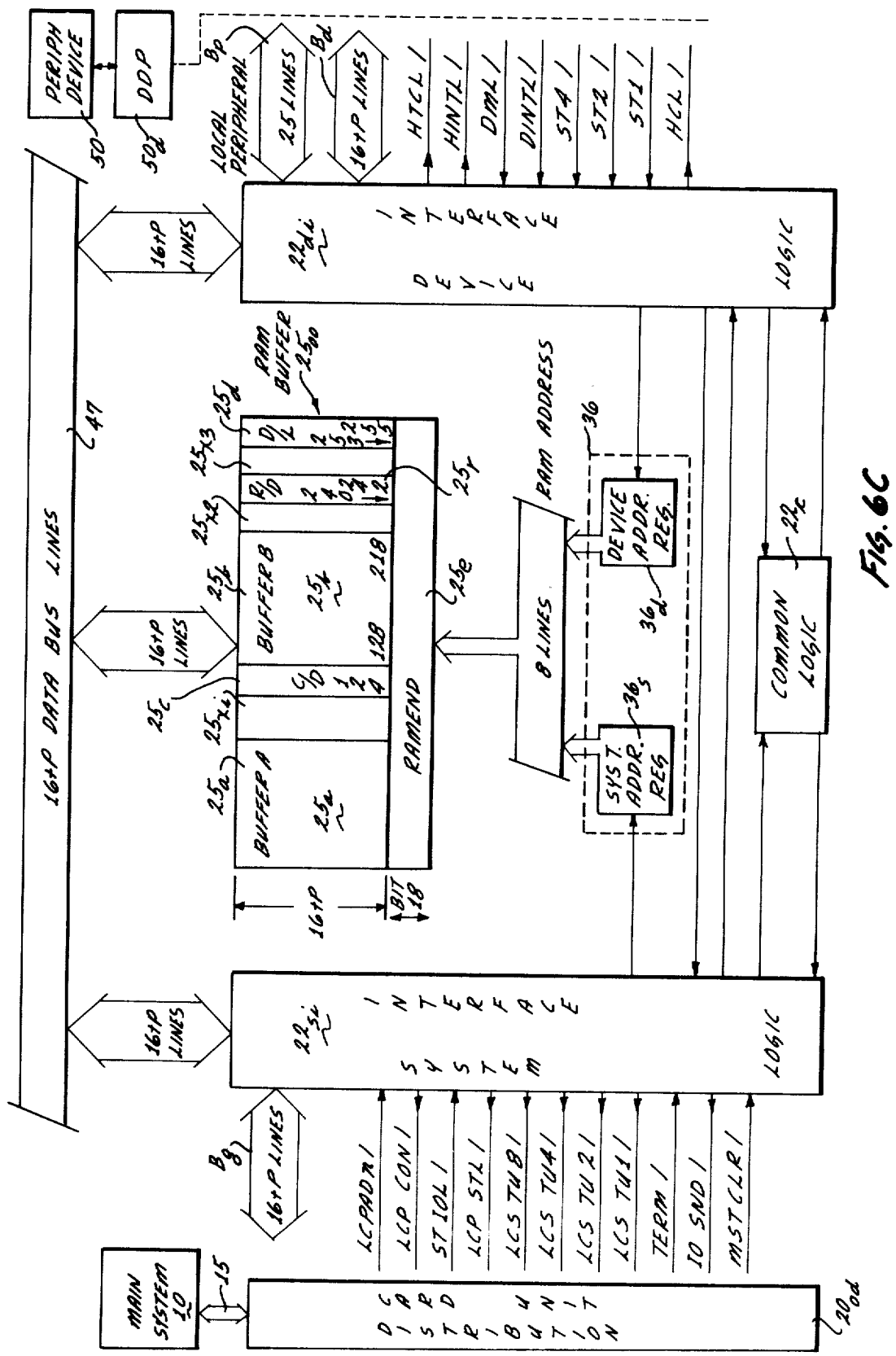

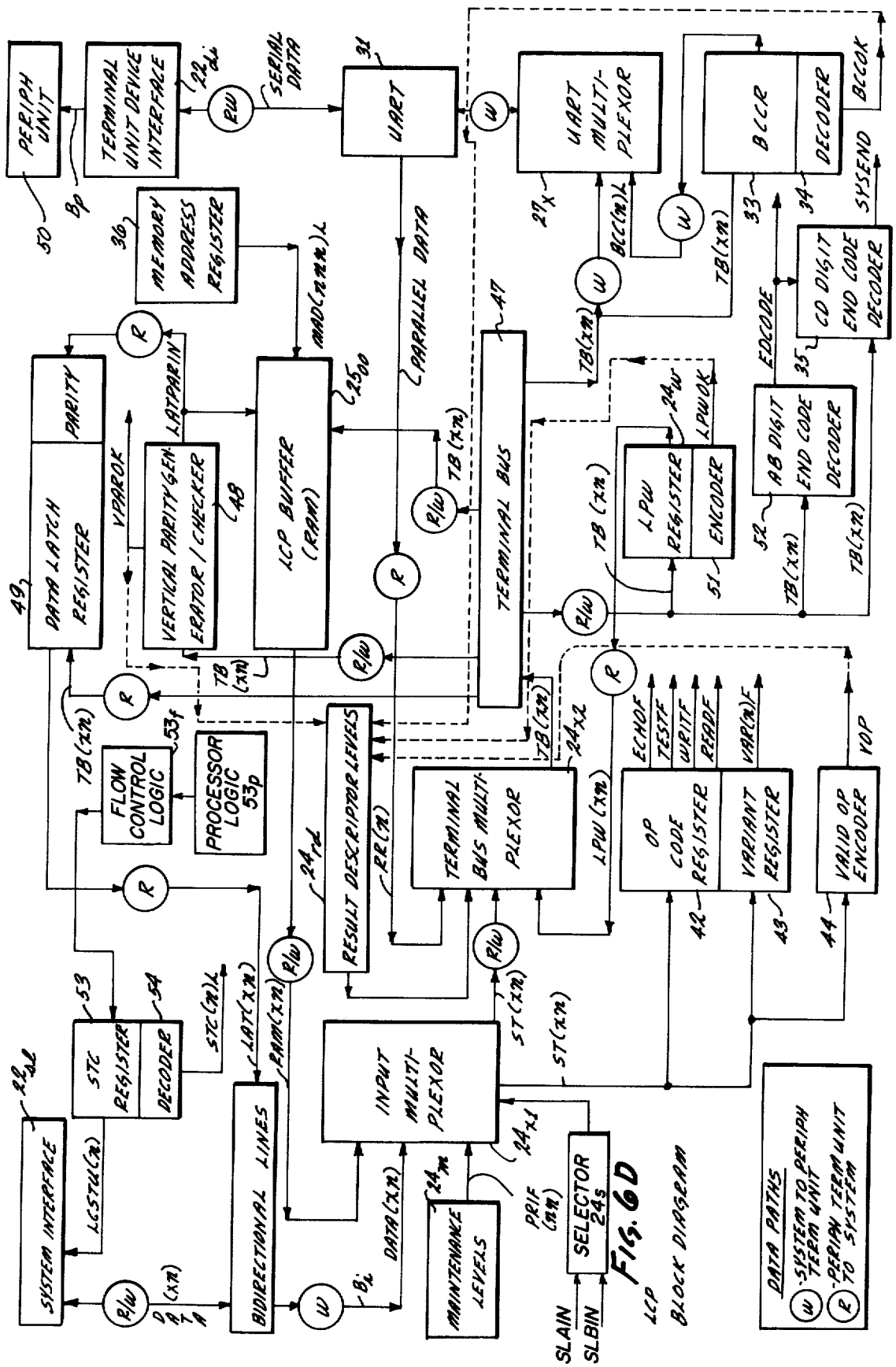
FIG. 6D LCP BLOCK DIAGRAM

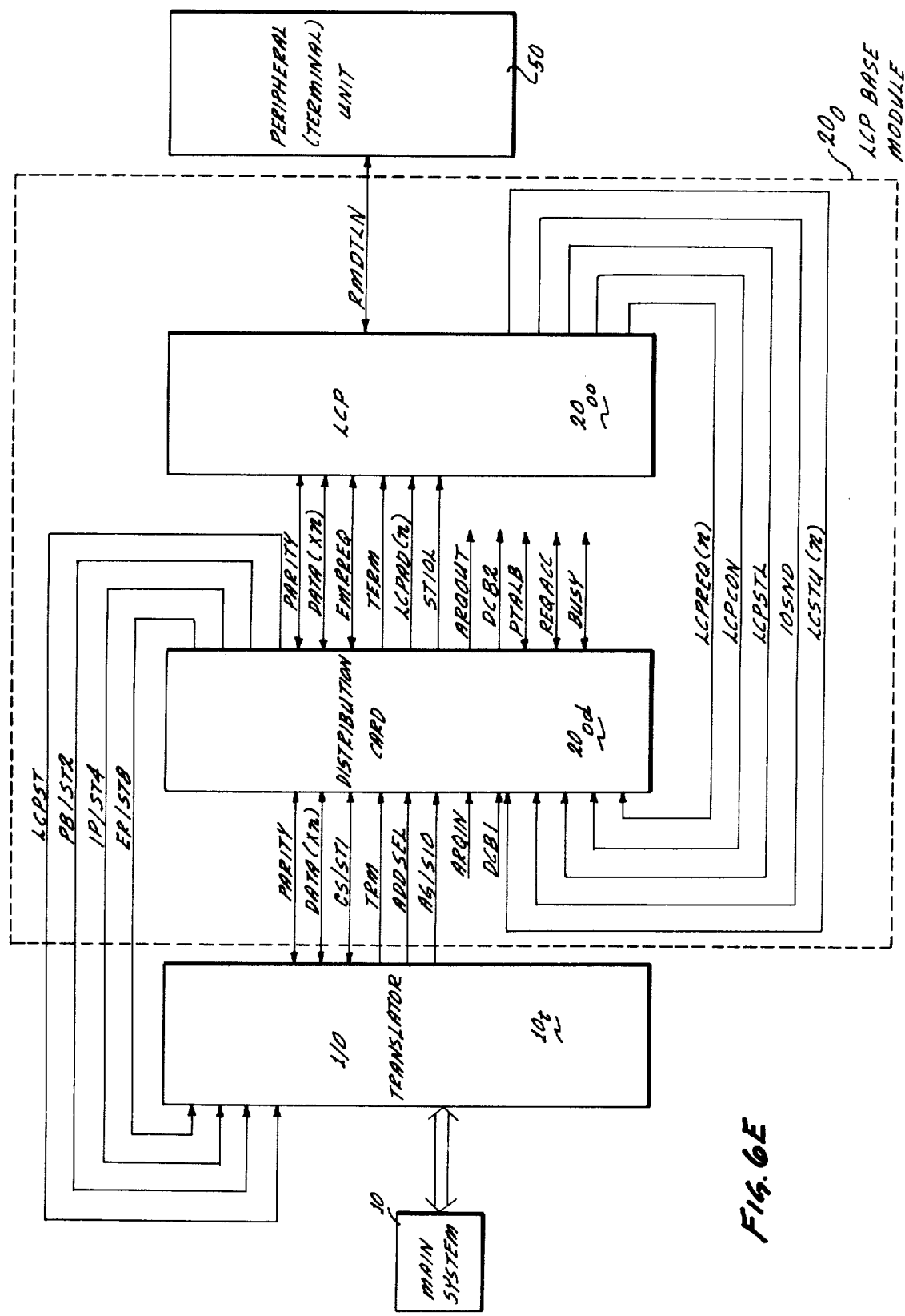

n = OR LESS THAN 90 FOR DATA
n = OR LESS THAN 3 FOR R/D
n = 3 FOR C/D
n = 1 FOR C/M

A WORD IS COMPOSED OF FOUR (4) DIGITS A, B, C, AND D PLUS A PARITY BIT, OR A TOTAL OF 17 BITS. A DIGIT IS COMPOSED OF FOUR (4) BITS 8, 4, 2, AND 1.

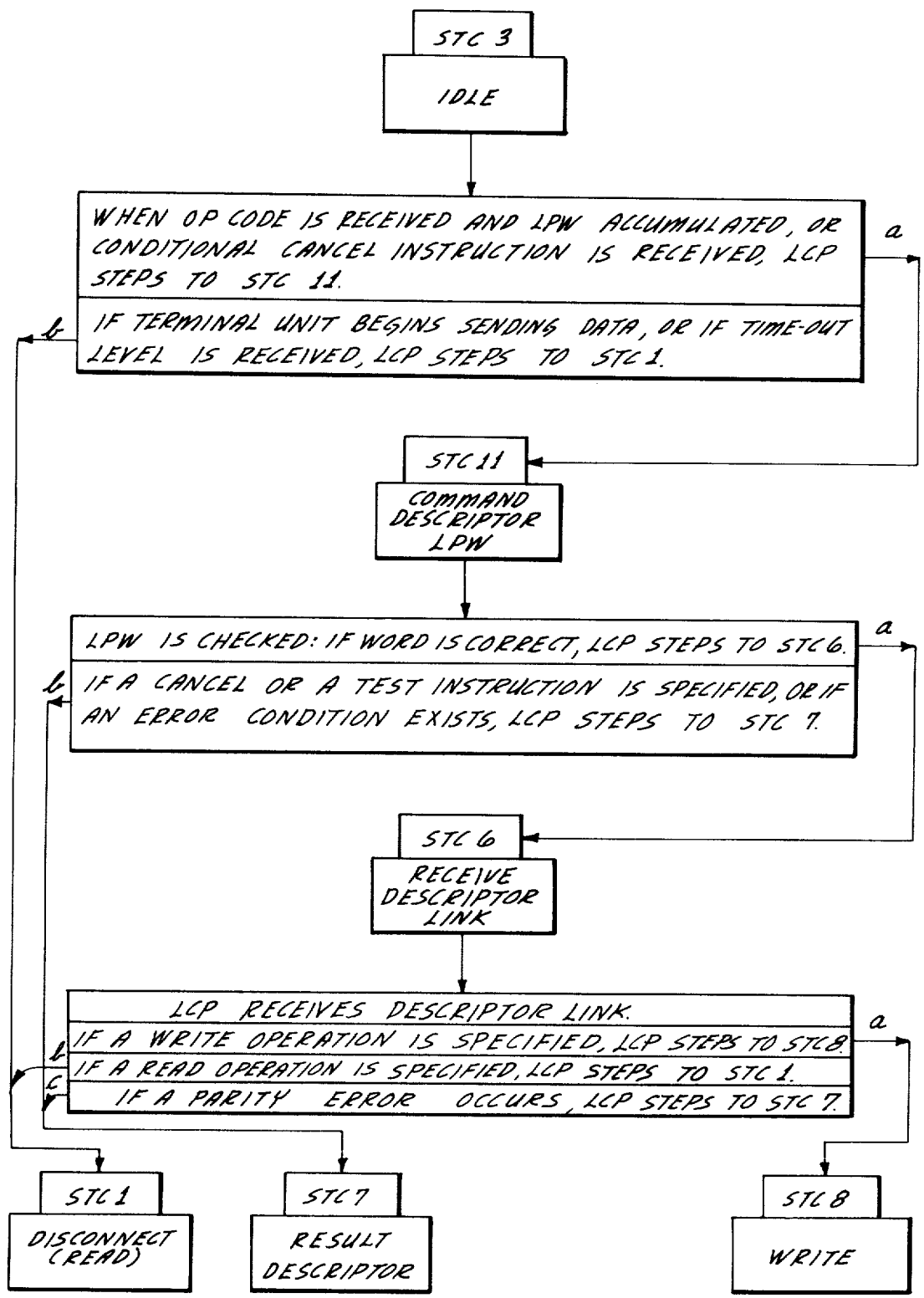
FIG. 7A SIMPLIFIED RECEIPT-OF-INSTRUCTIONS FLOW

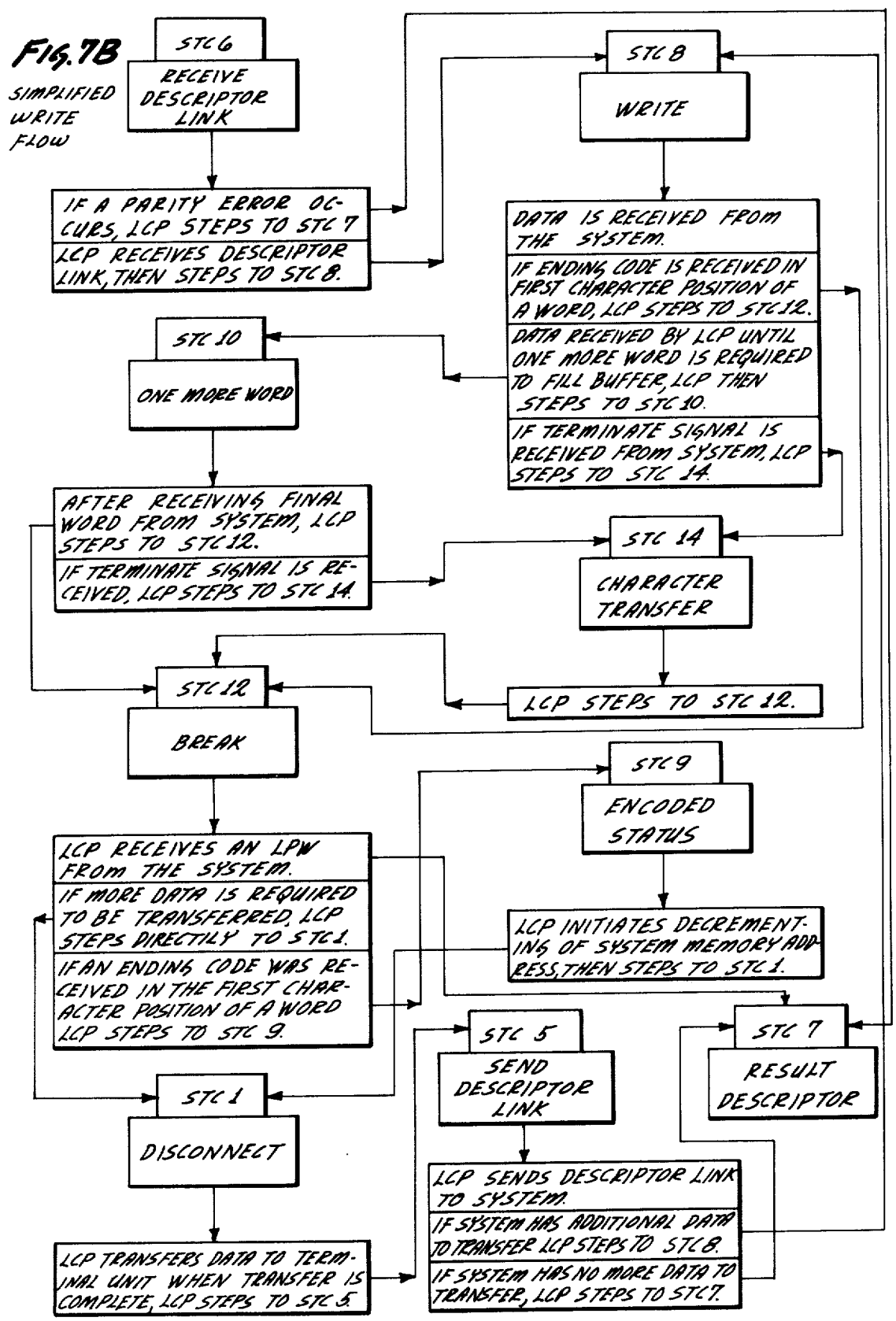

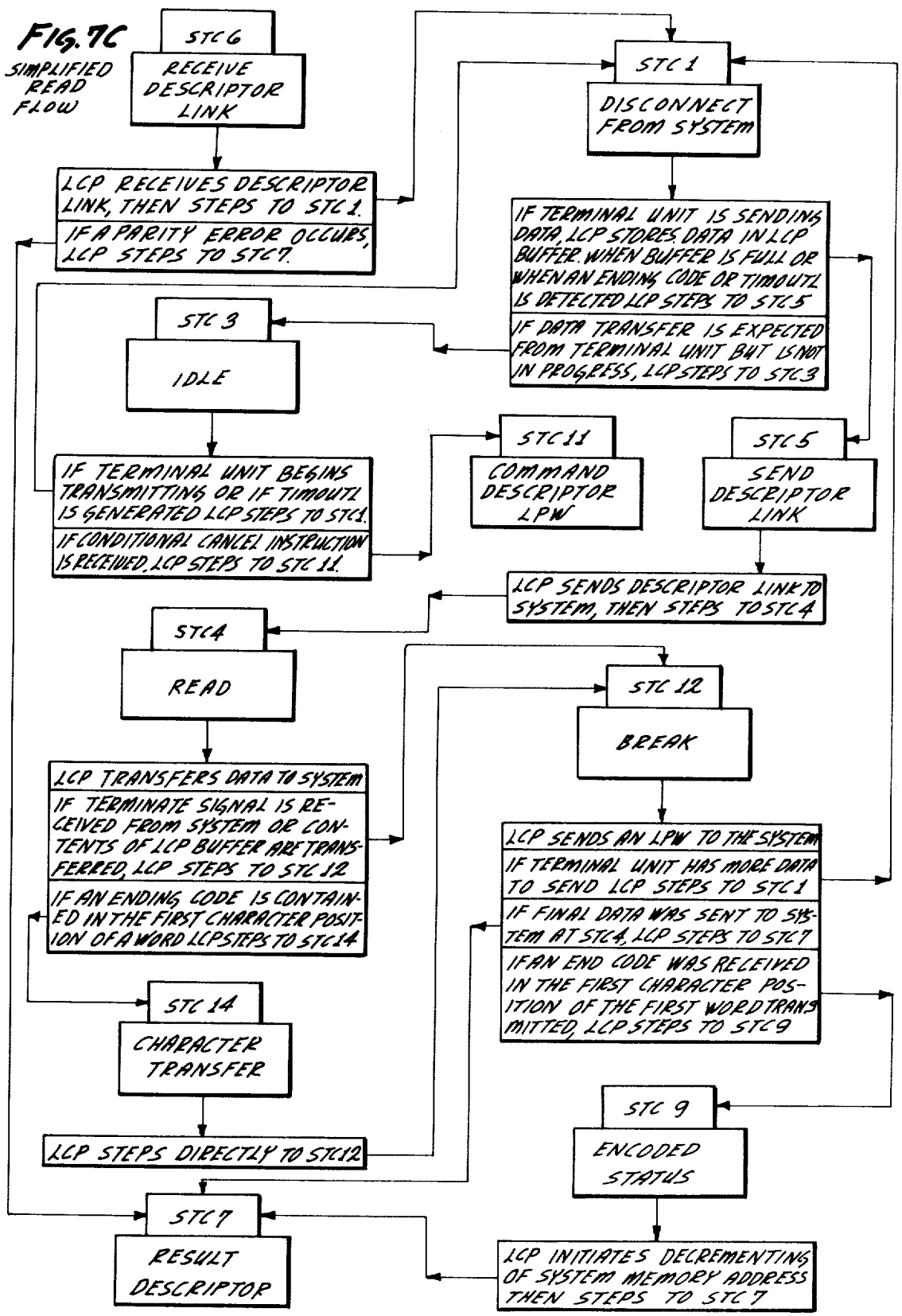

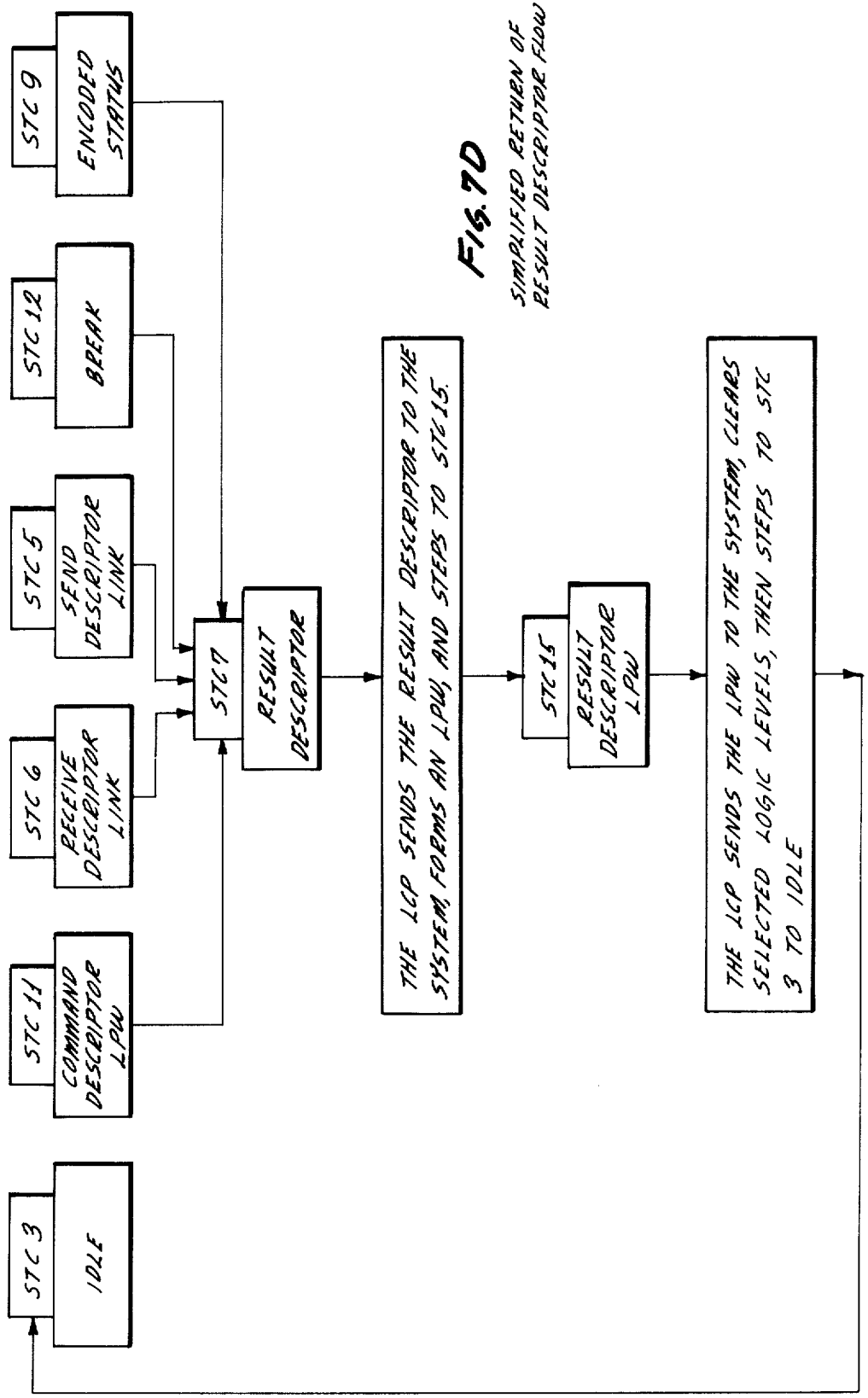

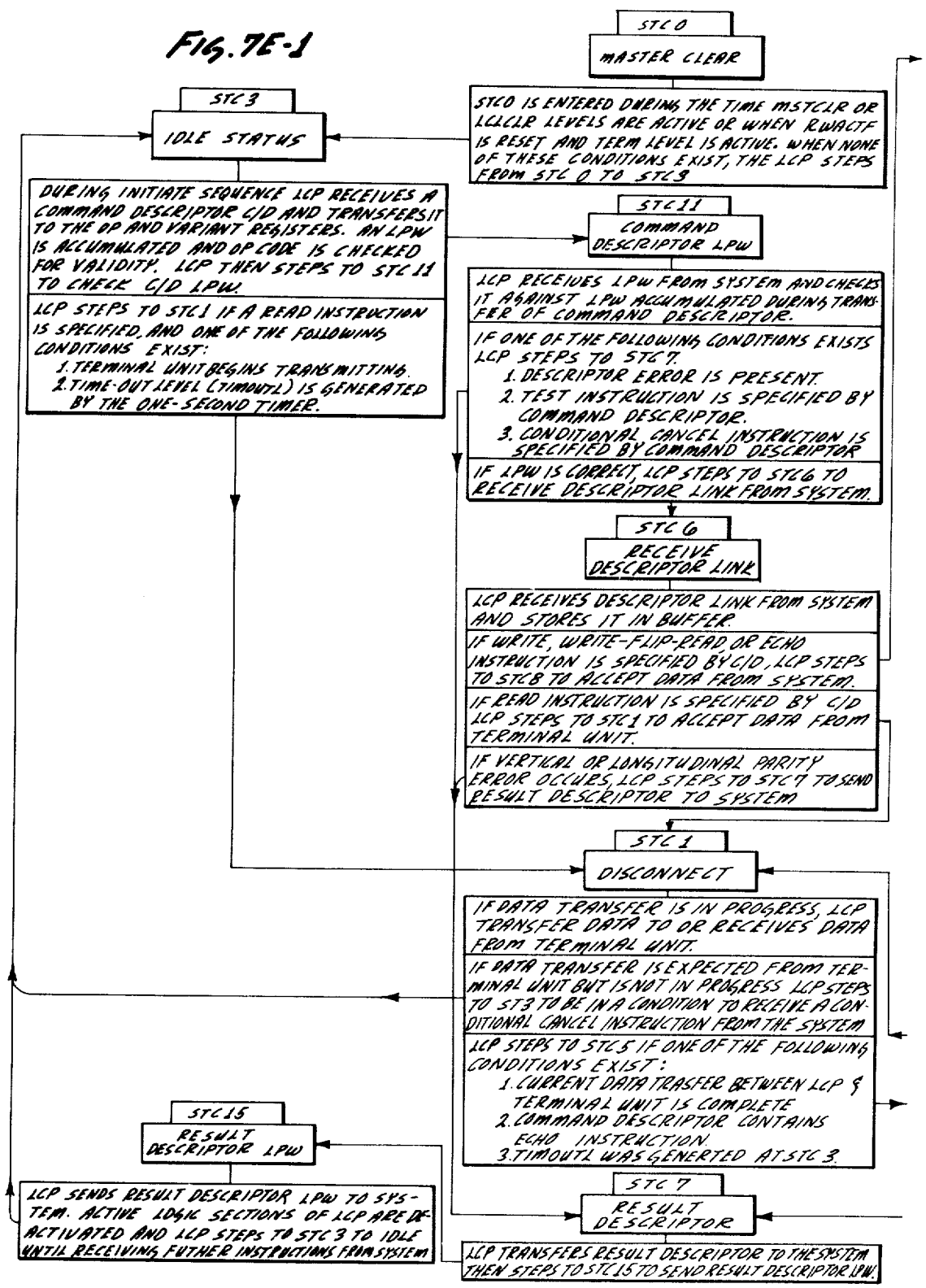

SIMPLIFIED STATUS COUNT FLOW

INPUT-OUTPUT SUBSYSTEM FOR DIGITAL DATA PROCESSING SYSTEM

This is a Continuation-In-Part of Ser. No. 728,457, filed Oct. 28, 1977 which is entitled "Input-Output Subsystem for Digital Data Processing System".

TABLE OF CONTENTS
Subject

Abstract of Disclosure
Cross Reference to Related Applications
Field of Invention Background
Summary of Invention
Brief Description of Drawings Description of Preferred Embodiment
Table I: Result Descriptor
Data Word: Table II I/O Descriptor: Table III
System Description: General
Command Descriptor C/D Descriptor Link
Descriptor Link: Table IV
Longitudinal Parity Word Input/Output Translator: General
IOT - Initiation Module
IOT Descriptor Information Register IOT - Connection Module: General; Poll Test
IOT - Data Transfer Module: General
IOT - Reconnection Module: General Table V - I/O Descriptor - Data Field Address
IOT - Scratchpad Memory
Input Output Translator: Detailed Description I - IOT - Glossary of Terms and Signals
II - IOT - Description of Hardware Elements
III - IOT - Description of Exemplary Operation Descriptor Link
Addressing
Address Modification Address Restore
Output Buffer Switching
Table Va - Switching Connections Initiation Module Flow
Connection Module Flow
Data Transfer Module Flow Reconnection Module Flow
Poll Request
Base Priority Global Priority
IOT - Reconnection Sequence
Message Level Interface Table VI: Message Level Lines LCP Status Count - STC
Base Module - Backplane Line Control Processor - General: LCP
Table VII - Status Counts
Poll Request Distribution Card
Error Checking, Longitudinal Parity Checking
Line Control Processor: Detail Descriptor Link in LCP
General: LCP - Peripheral Communication
Table VIII: LCP - Command Descriptors Table IX: LCP Generated Result/ Descriptors
"State" Lines of Peripheral Device
Table X - State Lines LCP - Peripheral Communication
LCP - Elements of
LCP - Peripheral Terminal Control LCP - Data Flow Section
LCP - System Logic
LCP - Receipt of Instructions LCP - Write Operation
LCP - Write Operation - Error Conditions
LCP - Read Operation Table X - LCP Buffer - Address Locations
LCP - Read Operation: Error Conditions
LCP - Write Flip Read Operation LCP - Echo Operation
LCP - Modes: Off-line and On-line
Table XII - LCP Operations - Summary Table XIII - LCP - "Write" Command Descriptor
Table XIV - LCP - "Read" Command Descriptor
Table XV - LCP - "Write Flip Read" Command Descriptor Table XVI - LCP - "Test" Command Descriptor
Table XVII - LCP - "Test Enable" Command Descriptor
Table XVIII - LCP - Conditional Cancel Command Descriptor Table XIX - LCP - Echo Command Descriptor

CROSS REFERENCES TO RELATED APPLICATIONS

The following commonly assigned, and concurrently pending patent applications are related to the subject matter of this application:

Ser. No. 728,456, filed Sept. 30, 1976, for Modular Block Unit for Input-Output Subsystem. This application was issued on Feb. 14, 1978 as U.S. Pat. No. 4,074,352.

Ser. No. 728,458, filed Sept. 30, 1976, for Intelligent I/O Interface Control Unit for I/O Subsystem.

Ser. No. 837,917 filed Sept. 29, 1977 (Continuation-in-Part of Ser. No. 728,455, filed Sept. 30, 1976), for Interface System Providing Interfaces to Central Processing Unit and Modular Processor-Controllers.

Ser. No. 826,597, filed Aug. 22, 1977 for Modular Block Unit for Input-Output Subsystem (Divisional).

FIELD OF THE INVENTION

This invention relates to digital computing and/or data processing systems and is concerned with the means and methods of controlling the transfer of data between a variety of different peripheral devices and the main memory of a central processing unit or main system. Basically the system involves taking the load off of the processing unit and distributing it among a variety of Intelligent I/O Interface units which can work independently of the central processor in handling data transfer operations.

This invention particularly concerns an input-output subsystem wherein most of the main tasks of data transfer are relieved from operations in the central processing unit and handled by a group of Base Module Units each of which may contain up to eight peripheral-controllers designated as "Line Control Processors". Each of the Line Control Processor handles the specific requirements of a remote peripheral terminal unit. The I/O subsystem further provides a distribution control means in each of the Base Module Units which controls and monitors communications and priorities with respect to each of the Line Control Processors. The Line Control Processors provide an efficient arrangement which they can buffer at least two full message block lengths of message data and permit simultaneous data transfer operations to occur between the buffer memory within one of the Line Control Processors and a peripheral unit, and the data transfers between the buffer memory of another Line Control Processor and the Main Memory of the host main system. Provision is thus made for a high data transfer rate in addition to the elimination of access errors because of the quality and capacity of the data buffer memory for each peripheral and it means of interfacing the main system.

BACKGROUND OF THE INVENTION

The general configuration of a data processing system typically comprises a processor or processors, a main memory, and a plurality of various types of peripheral devices or terminals (sometimes called I/O units), which more specifically may be card readers, magnetic tape units, card punches, printers, disk files, supervisory terminals, and so on. The optimum systems generally involve the configuration wherein the peripheral devices are handled by independent interface control units so that the processor is free to access and process data contained in the main memory. In configurations having separate control means for the peripheral input-output devices, it is possible to have parallel or concurrent processing occurring at the same time that input-output (I/O) operations occur. These concurrent processing I/O operations occur within the same program which operates through one of the processors, and which also initiates all input-output operations. In addition the program must have some means of determining when the I/O operations are inactive or have been completed.

As an example, if a program calls for a file of data to be loaded into the main memory, it must be able to determine when that operation has been completed before it can go ahead to make use of the data. Thus, an input-output operation is initiated or started by the program, as by some type of "initiate instruction" which provides, typically, an address pointing to an "I/O descriptor" which is stored in the main memory. This descriptor identifies the peripheral device from which data is to be received and/or transmitted, it identifies the type of operation such as a "Read" or a "Write", and also identifies the field of main memory locations to be used in the input-output operation. Generally this I/O descriptor is transferred to a control means (I/O control means) to control the transfer of data between the peripheral terminal device and the main memory.

When the input-output operation is "complete", such as by the transfer of the data from the peripheral unit to the main memory to load the main memory, then there is a need for some type of a completion statement, which is typically referred to as a "Result Descriptor". Usually this is transferred from the I/O control means to some specific location in main memory known to the program being used. Typically, the Result Descriptor includes information identifying the particular peripheral terminal device and further includes information as to the result of or the status of that particular input-output operation, — thus, to provide information as to whether the transfer was complete and correct, or whether any exception conditions occurred or whether any errors occurred or any other peculiar situations arose in regard to the transaction involving that particular peripheral terminal device.

Thus, when a program initiates an input-output operation, the program must have some means to determine when the input-output operation has been completed. A standard technique in this respect is for the program to have instructions to interrogate the Result Descriptors periodically, to determine when and if a particular input-output operation has been completed. However, it is much simpler if the input-output control means indicates when the transfer operation is finished. In accomplishing this, it is usually necessary to interrupt whatever operation the processor has underway, and force it to examine the Result Descriptors and to take appropriate action. This stopping or interruption of the processor's activities is generally designated as an "Interrupt".

Thus, when an interrupt occurs, the processor must stop the program it is working on, it must make a fixed notation of what point in the program execution it was interrupted and it must then store the contents of certain registers and control flip-flops so it can have information as to where it should return in the program after the completion of the interrupt cycle; and then the processor must transfer its attention and operation to the program designed to handle and service the Interrupt condition.

Certain systems such as the system described herein, have a program for servicing "Interrupt" conditions, which program is sometimes referred to as MCP or a master control program. This program must keep a record of current input-output operations and associate the particular Interrupt with the particular input-output operation that caused it. Then it must analyze the results of this Interrupt cycle to see if any unusual circumstances or exceptions occurred or if an error condition was reported, so that corrective and appropriate action may be taken. The Interrupt program must take the results of the input-output operation and make them available to the program that initiated the input-output operation and then further determine if other input-output operations are waiting to be initiated and, if so, to take action to initiate other needful input-output operations. Such an MCP is discussed in U.S. Pat. No. 3,693,161.

In many of the prior and present system configurations, many calls or request for memory access would come in to get memory service, but because of the limited bandpass and time available for various peripheral units, many I/O transfers would be incomplete and cause "access errors".

Also many of the prior art system configurations provided only one or two communication paths or channels to a multitude number of peripheral terminal units so that I/O transfer of a particular peripheral terminal unit had to wait their turn in sharing access and use of a communications bus. This introduced congestion and delay into the system. It also made difficulties in systems involving multi-programming since efforts are made to match a job having heavy input-output requirements with another job that is "processor-bound" and which has only limited input-output requirements.

Many of the present day data processing systems have a single communication path or a limited number of communication paths between the central processing unit and the peripheral units. Generally within the communication path there is one or more "input-output control" means. When an input-output path is requested by a processor, the path will only generally become available when: the peripheral unit is not initiating a transfer operation; the peripheral unit is not busy in a transfer or other operation with the input-output control means; the peripheral units or its input-output control means is not busy with other operations.

The data-transfer rate of the input-output control means is, of course, a limiting factor in the operation of the system since the often slow transfer rate of certain peripheral units (which are passed through the input-output control means) will unnecessarily tie up the processor and memory activity to the low speed of the peripheral terminal unit.

Thus, many data processing systems have come to be provided with a plurality of input-output control means which include buffers, to permit a particular peripheral or group of peripherals to communicate with the main system. When there are a plurality of input-output control means (through which pass the communication channels to individual peripheral units or groups of such units) some prior art systems have used the method of operating the data transfer operation in a sequential fashion so that the various input-output control means take turns in serving the peripherals which are associated with them.

A difficulty arises here in that certain peripheral units and their associated input-output control means are busier than others, and certain of the channels involved actuatlly need more communications-time than they are getting. A "channel" may be looked at as a communication path between the main system, through the input-output control means, over to the peripheral unit. Thus, there can occur situations where certain channels are "short changed" to the extent that a great number of "access errors" will be developed. Access errors involve the situation where the data bytes being transferred through the input-output control means do not comprise complete message units but consist only of non-usable fractions of message units. As a result of this, the central processing unit would not be getting or transferring useful information and would have to become fixated on continually requesting the same input-output operations over and over again. Thus, when the peripheral units are placed in a situation where they are unable to send or receive an entire message unit or record, then the likelihood of access errors occurs which leads to uncompleted cycles in regard to a particular channel and no successful completion of transfer of the required information data.

It is desired that the maximum transfer of data occur through the mentioned plurality of input-output control means, and without such access errors which lead to incomplete cycles of data transfer (which are unusable, and the time period of which is wasted and of no use, thus tying up valuable processor time).

Thus, in such a system configuration, problems arise in regard to how much time should be allocated to each of the individual channels for data transfer operations and the further problem of which channels should be given priority status over the other channels.

Now, in data processing systems where multitudes of peripheral units are involved (many of which are at differently located installation sites) it is necessary to have groupings of input-output control means to handle the variety of peripheral units at each given site. Thus, the priority problems involve not only the priority to be given as to the completion among peripheral units at one local given site, but also involve the priority problems of priority allocation as between the different locational sites, each of which have their own input-output control means.

SUMMARY OF THE INVENTION

The present invention involves a digital data processing system for the control and handling of input-output operations (data transfers) as between a plurality of various types of peripheral units and a central Main System (Processor and Main Memory).

The present invention describes an I/O subsystem which uses a series of I/O processors (LCP's) each of which executes instructions involving data transfers between a specific peripheral unit and a central main system (processor and main memory). Two types of I/O subsystems may be provided, as discussed later, however, the Line Control Processors are used only in the second type of I/O Subsystem described hereinafter.

One I/O Subsystem is a system wherein a type of intelligent interface control unit, designated as a "Line Control Processor" (LCP), is used, and wherein each LCP, while performing the same basic functions, is specifically oriented to control and handle data transfers to and from a specific type of peripheral terminal unit. For example, a basic LCP would be adapted for each specific instance to handle a card reader, a disk unit, a train printer, or other special type of peripheral unit. The LCP's are placed in groups, typically, of eight units, to form an LCP Base Module. Then each of the Base Modules are grouped in a set of three to form a LCP Cabinet Unit. A plurality of such LCP Cabinet Units may be used to constitute the first I/O Subsystem.

Another I/O Subsystem is provided for those types of peripheral terminal units for which no specific Line Control Processors (LCPs) have been developed. This second I/O Subsystem is organized so that a Central Control unit is provided to control the pathing from the Central Processor and Main Memory to selected input-output channels which provide a data path to individual peripheral units. These individual channels will each have their own memory buffer and connect through the Central Control unit over to the Main System.

The I/O subsystem using the Central Control is merely described supplementarily herein and is not part of the features of the Line Control Processor which is part of another type of subsystem.

In the I/O Subsystem using the Line Control Processors, the Main System (of Processor and Main Memory) is also provided with a unit called an Input-Output Translator unit (IOT) which becomes part of the Main System and provides an interface between the Main System and another distribution-control interface designated as "Distribution Card Unit" which handles a Base Module, (a group of Line Control Processors) and which connects a selected individual Line Control Processor into the LCP I/O Subsystem.

The Line Control Processor's (LCP's) are organized in groups of eight called the LCP Base Module each of which has a single "Distribution Card Unit" which provides the interface between the Input-Output Translator, IOT, of the Main System and the eight LCP's of any given Base Module. Each Base Module also carries a Maintenance Card unit which can provide all maintenance and checking functions for the group of eight LCP's of the Base Module. Each Base Module is also provided with one common "termination Card Unit" which provides common clocking functions for all the LCP's of the group and also provides proper terminations for the transmission lines which connect the various LCP's, the Distribution Card, and the Maintenance Card of that particular Base Module.

The IOT of the Main System works in a unique relationship with the Distribution Card Unit of the Base Module of the LCP's in the LCP I/O Subsystem, serving to setup data-transfers between the peripheral units and the Main Memory in a fashion that does not burden the Central Processor and which permits concurrent data-transfer operations to occur between any number of peripheral units and the Main Memory. This is facilitated by the use of a record-length buffer memory in each LCP. The data-transfer cycle is accomplished using complete data message-blocks which thus prevent "access errors" from occurring.

The embodiment of the invention described herein provides a system which helps alleviate certain problems inherent in prior art systems. By providing a separate channel from the Main System to each peripheral unit, there is no need for data transfers (between a particular peripheral unit and the Main System) to have to wait for the use of a shared communication channel, since each individual peripheral unit is provided with its own channel, and thus each of the plurality of peripheral units can simultaneously and concurrently consummate input operations without any further requirements from the processor or without interference to processor operations. The input-output data-transfer control means in the subsystem is provided by an individual "Line Control Processor" (LCP) for each peripheral unit. The "Line Control Processors" accept input-output commands from the Main Memory (via the I/O Translator unit) and they execute these commands indepdendently of the main processor, so that input-output control operations are performed in parallel with and asynchronously with processing.

A memory control unit $10_c$, FIG. 1A, regulates the flow of data between the Main Memory, the Central Processor and the I/O Subsystem. It allows each of the system components to have access to Main Memory on a priority basis, giving the highest priority to the I/O Subsystem. Since the Memory control operates independently of the Processor, the Processor is free to perform memory-independent functions at the same time that memory accesses are being granted to the I/O Subsystem.

The Line Control Processors are each provided with memory buffers which can store an entire message-block or record-length of data. Thus, data transfers between Main Memory and the Line Controller Processor can take place at high speed and constitute a complete message-block in itself. Since a complete message-block of data is transferred in any given cycle, the problem of access errors is eliminated so that no further memory cycle time is required to complete "incomplete former data transfer cycles", which might occur absent the record-length buffer.

The Line Control Processors are functionally the same except that minor variations may occur so that they are adaptable to work with different types of peripheral terminal units, and, as such, the LCP's are "transparent" to the Main System.

In certain cases, there are peripheral units and data storage devices involved for which no specific Line Control Processors have been developed. In this case, there is used another input-output control subsystem (using Central Control units as described in U.S. Pat. No. 3,512,133) which can operate in parallel with the LCP I/O Subsystem and its Line Control Processors (LCP).

The main or central system of the described embodiment, which may include the Processor, the Main Memory, and the Memory Control, is furnished with a unit called an Input-Output Translator or IOT. The IOT is a special portion of the Processor which, upon receipt of an I/O descriptor from memory, works in conjunction with the LCP Base Module to establish connection to the particular LCP in the channel specified by the "Initiate I/O" instruction from the program. The IOT translates the I/O descriptor into a form (Command Descriptor) recognizable to the LCP (Line Control Processor), and when connection is established, passes the translated descriptor over to the LCP after which the data transmission may begin. During the time that data is being transferred between LCP and the Main System, the IOT, upon demand by the LCP, requests memory accesses, addresses memory, then modifies and compares the data addresses. The IOT controls the routing of data between the selected LCP and the Main System, and it performs translation (ASCII/EBCDIC) of the data if so required. ASCII/EBCDIC refers to American Standard Code for Information Interchange/Extended Binary Coded Decimal Interchange Code. Upon completion of an operation, the IOT accepts Result Descriptor (R/D) information from an LCP and then stores the Result Descriptor (R/D) in a predetermined location.

The Line Control Processor, (LCP), is a device which upon receipt of a Command Descriptor (C/D) from the Main System, via the IOT, establishes a communication path to a selected peripheral unit. Once this path is established, the LCP accepts data from or passes data to, the peripheral device. Since each LCP has a "data buffer" (typically 256 words), then data can be transferred to and from the peripheral device at the comparatively low speed rate of the peripheral device; then, when the buffer is full, the data can be transferred to the central Main System at the highest rate permitted by speed of the Main Memory. Thus, a unique interworking relationship exists between the IOT (Input- Output Translator) of the Main System and the LCP, which is the interface control between the peripheral units and the Main System. Further, a unique working relationship exists between each LCP and the Distribution Card Unit of its Base Module, which interfaces a given LCP to the IOT of the Main System. The Distribution Unit not only provides for interconnection of the Main System to a selected LCP but also regulates priorities among LCP's for the access to Main Memory.

The invention herein particularly claimed within the LCP-I/O Subsystem is a peripheral controller which is called the Line Control Processor which can process and execute data-transfer instructions in addition to storing and buffering data thus to prevent access-errors.

Some of the major objectives of the Line Control Processor I/O Subsystem may be summarized as follows:

To relieve the Central Processing unit from getting involved in monitoring and controlling data transfers between the System's Main Memory and a large number of peripheral units.

To increase the rate of data transfer between a variety of different peripheral units all connected to the Main System having a Main Memory and Processor. This includes transfers from the Main Memory to any individual peripheral in this system and vice versa.

To provide an Intelligent I/O Interface control unit (Line Control Processor) which will relieve the Central Processor of many burdens and which will be responsive to the needs of various peripheral units for access to the Main Memory.

To provide an Intelligent Interface I/O control unit which can receive an I/O instruction from the Central Processing unit and then independently continue in regard to controlling, monitoring, and executing this instruction so as to accomplish data transfer between Main System Memory and any specifically desired peripheral unit. This is done asynchronously as the needs and the requirements arise. The interface unit (LCP) also handles the error-checking of all word and message block transmissions in addition to keeping the Main System informed of the status of any data-transfer cycle, as to its completeness, incompleteness, error-status. The Line Control Processor also monitors requests from a peripheral unit for access to Main Memory and informs the Main System of "busyness" of the peripheral unit or its unavailabilty.

To permit easy modular system expansion the I/O Subsystem of the Central Processing unit servicing a plurality of terminal units is setup such that the interface units (Line Control Processor) are organized in Base Modules in groups of eight units. Each module has a Distribution Card Unit which interfaces the group of eight Line Control Processors to the Main System via the IOT of the Main System. The Distribution Unit can thus set priorities as between any one of the eight Line Control Processors in the Base Module. Further, when a plurality of Base Modules occur in the System then the Distribution Unit of each Base Module can be given a priority ranking (designated global priority) as between the priority rank granted to any given Base Module, within the full set of Base Modules. Thus, another object of the I/O Subsystem involved is to provide arrangements for setting up Global Priority (priority as between Base Modules in the System) and also Local Priority. (Priority as to precedence status of each Line Control Processor in the group of eight Line Control Processors in the Base Module).

To eliminate "access errors" so that all the data required at any given time for the Main System (that is, a message length block of data) is always transmitted and error-checked in one complete cycle without interruption (except under emergency conditions).

To permit the rapid completion of a data-transfer operation as between the System's Main Memory and a given peripheral unit, without interruption or incomplete data-transfer, once a communication channel is established (except for certain emergencies).

To provide the Main System with the current status of any Line Control Processor at all times and the results (complete, incomplete or in error) of any given data-transfer cycle.

To provide modular building blocks for facilitating the expansion of the System by increasing the number of peripheral devices that can be included in the System in a simple economical fashion.

To provide an I/O Subsystem whereby the Central Processor is relieved of executing I/O data-transfer cycles and this work load is distributed throughout the system via I/O control units (Line Control Processors) grouped in modular block units (Base Modules).

BRIEF DESCRIPTION OF THE DRAWINGS

The I/O Subsystem described herein and the operative components involved will be better understood with reference to the following drawings of which:

FIGS. 1B, 1C, 1D, and 1E, are schematics which indicate various components of the Central Control type of I/O Subsystem;

FIG. 4C is a chart showing how four informational digits (ABCD) are organized such that a Line Control Processor can inform the Main System of operational results via a "Result Descriptor";

FIG. 5A is a chart of digital information (Descriptors) used by the Input-Output Translator (IOT) to generate Command Messages (C/M);

FIG. 5C-1 is a block diagram showing the relationship of the 4 modules of the Input-Output Translator to the Main System and to the Base Module units holding the Line Control Processors; FIG. 5C-1a shows a more detailed schematic;

FIG. 5C-2 shows the elements involved in the Input-Output Translator addressing scheme;

FIG. 5C-3 shows the buffers and elements involved in the Initiation Module for transferring the Descriptor Link;

FIG. 5C-4 shows the elements involved in the Descriptor Link Register;

FIG. 5C-5 shows the logic elements involved for receiving the Descriptor Link and placing it on the Descriptor Link bus;

FIG. 5C-6 shows the logical elements of the Connection Module for the driver card enable;

FIG. 5C-7 is a diagram of the logic elements for the Connection Module in regard to Bus selection;

FIG. 5C-8 shows the driver card enable logic of the Input-Output Translator;

FIG. 5C-9 shows the logic for the multiplexor inputs to provide Select Terms;

FIG. 5C-10 is a logic drawing showing generation of the Transmit Select Levels;

FIG. 5C-11 is a logic diagram showing the Output Buffer (OTB) data path switching;

FIG. 5C-12 is a logic diagram of the Data Transfer Module showing the module select logic;

FIG. 5C-13 is a more detailed drawing of the logic in the Data Transfer Module; FIG. 5C-13 is drawn on two sheets marked FIG. 5C-13A and FIG. 5C-13B;

FIG. 5C-14 shows the logic elements involved in the Input-Output Translators base driver card and data paths;

FIG. 5C-15 is a flow chart showing the sequential operational steps of the Initiation Module of the Input-Output Translator; this flow chart is on two sheets marked FIG. 5C-15A and 5C-15B;

FIG. 5C-16 is a logic diagram showing the elements for loading the B buffer;

FIG. 5C-17 is a logic diagram showing the OP buffer shift control;

FIG. 5C-18 is a flow chart showing the sequential activity of the Connection Module of the Input-Outpt Translator;

FIG. 5C-19 is a logic diagram showing the initiate I/O signals and data link bus generation;

FIG. 5C-20 is a "Poll Test" flow diagram showing the relationship of the Input-Output Translator to the other elements of the Subsystem;

FIG. 5C-20a is a logic diagram of the Base Module Distribution Card showing LCP address decoding;

FIG. 5C-20b shows logic for direction control;

FIG. 5C-21 is a flow chart showing the sequential steps of the Data Transfer Module of the Input-Output Translator; this flow chart is drawn on two sheets marked FIG. 5C-21A and 5C-21B;

FIG. 5C-21a is a detail logic flow of the Write Cycle while FIG. 5C-21b is a detail logic flow of the Read cycle;

FIG. 5C-22 is a diagrammatic sketch showing the Write cycle data transfers between major registers;

FIG. 5C-23 shows the Read cycle data transfers from the Data Transfer Bus with the major registers;

FIG. 5C-24 is a flow chart showing how the Result Descriptor is handled and stored;

FIG. 5C-25 shows the "Poll Request" operation involving the relationship of the Input-Output Translator to other sections in the Subsystem; FIG. 5C-25a shows the priority encoding circuitry from the Line Control Processors; FIG. 5C-25a is drawn on two sheets marked FIG. 5C-25aA and FIG. 5C-25aB;

FIG. 5C-26 is a logic diagram showing the first stage of global priority resolution in the Input-Output Translator;

FIG. 5C-27 shows the second stage of global priority resolution;

FIG. 5C-28 is a flow chart showing the sequential steps in the Reconnect Module of the Input-Output Translator;

FIG. 5C-29 shows the logic involved in the address selection by the Reconnection Module of the Input-Output Translator;

FIG. 6B is a generalized block diagram of a Line Control Processor;

FIG. 6C is another generalized block diagram of a Line Control Processor with detail in regard to its data buffer memory;

FIG. 6D is a detailed functional block diagram of the Line Control Processor;

FIG. 6E is a diagram showing the intercooperating logic and control signals between the Input-Output Translator (IOT) of the Main System and the Distribution Card unit for Line Control Processors within a Base Module;

FIG. 7A is a logic flow diagram of a Line Control Processor which handles a peripheral unit and shows the "status counts" for "Receipt of Instructions";

FIG. 7B is a flow diagram showing how the Line Control Processor handles a "Write" operation;

FIG. 7C is a flow diagram showing how a Line Control Processor handles the "Read" operation;

FIG. 7D is a flow diagram showing how the Line Control Processor logically handles the Result Descriptor;

FIGS. 7E-1 and 7E-2 together form a logic diagram showing the overall logic flow of the Line Control Processor.

DESCRIPTION OF THE PREFERRED EMBODIMENT

Figure 1A:
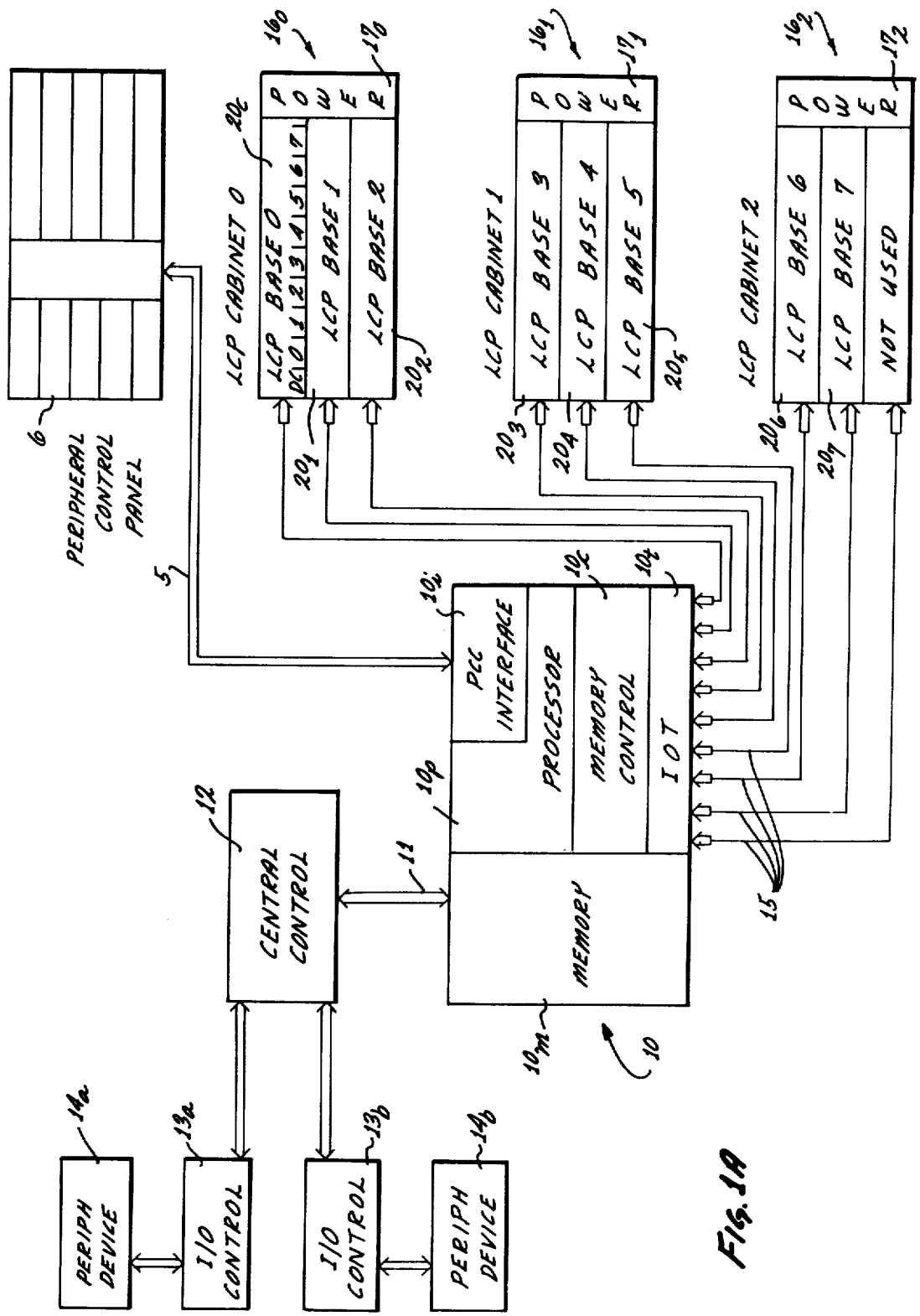
FIG. 1A is a schematic of a Central Data Processing System having two different types of I/O Subsystems; the two I/O Subsystems are designated as (a) the Central Control Subsystem (CC) with Input-Output Controllers (IOC) and (b) the Line Control Processor (LCP) Input-Output Sybsystem.

The digital system described herein consists of a Processor, a Memory, a series of Input-Output Controllers (IOC's) forming a first I/O Subsystem and a system of Line Control Processors (LCP's) that make up a second I/O Subsystem. The Line Control Processors basically handle input-output operations for specific peripherals with minimal interfernce to main processor operations. Further, no peripheral device is "hung up" waiting for memory access, since the LCP for that peripheral is always readily available to service its peripheral.

A substantial number of prior data processing systems utilize a hierarchical system of Main Memory in which a large capacity, slow bulk memory must transfer information to a small high-speed processor memory before that information can be used. The presently described system allows the Processor and the I/O Subsystem to directly access any area of memory, and since the memory size may go up to one-million bytes, far more information is available to the Processor without the imposition of additional I/O activity. This system may be provided with high-speed (250-nanosecond cycle time) bipolar memory together with an error correction system. Bipolar memory is not only fast, but is inherently more immune to the type of errors that cause program failures. If an error is detected, the error correction occurs during the normal memory cycle and there is no additional time required for a correction cycle. Various operating relationships between the processors main memory and other units of the present system may be found in a Burroughs Corporation publication entitled "Burroughs B 2800/B 3800/B 4800 series, MS-2 Reference Manual, Catalog 1090560, Copyright 1976".

Normally, I/O memory cycles account only for a small fraction of the total number of memory cycles available. However, during periods of high I/O activity, the probability of any two devices requesting the same memory cycle increases. When, due to simultaneous requests, a device fails to get access to memory within a system-allotted time period, then valuable time is lost while the operation is retried. Furthermore, during periods of low I/O activity, many memory cycles are unused.

The I/O activity problems are solved in the present system by distributing the I/O processing among a group of LCP's or Line Control Processors organized into Base Modules of eight LCP's each. In so doing, the Central Processor is only required to initiate the I/O activity and it takes no further role in the Input-Output (I/O) operation. The Central Processor initiates the I/O activity through a device called the Input-Output Translator (IOT).

The LCP, once initiated, can buffer large amounts of data and, in most cases, an entire message block. At some point in the operation, the LCP requests an access to memory and when the access is granted, LCP transfers the information from its "word buffer" to the Memory at the maximum rate of memory operation. Now, if the requested access to memory is not granted, the LCP continues to fill its word data buffer while waiting for an opportunity to access Memory. Thus, the peripheral device is now protected against no-activity since its data will be transferred to the buffer of the LCP, which then transfers it to the Main Memory without missing a memory access period.

The result of this method and system is that the peak loads imposed upon the Memory by the demands of I/O activity are eliminated; instead, the I/O Subsystem utilizes those memory cycles that would otherwise be missed. Since this method of I/O processing is more efficient, the system is more capable of a higher input-output (I/O) data transfer rate and can also support more I/O devices.

In the instant computer system wherein there are two categories of Input-Output Subsystems, that is, the first Subsystem of I/O controls and the second Subsystem of an Input-Output Translator working with a group of Line Control Processors, the control of the system is facilitated by the use of "descriptor" information which is passed among the various units.

A "Result Descriptor" is a report to the Main operating system that describes the manner in which an operation was completed or the reason why the operation could not be completed. The Result Descriptors for the Processor and for the I/O control systems are 16 bits (one word) long. The LCP Result Descriptors may be longer than one word, however, and each bit in the Result Descriptor represents the status of some condition that is to be reported to the main operating system.

The LCP's (Line Control Processors) and the I/OC's (I/O Controllers) always write Result Descriptors upon completion of an operation; the Processor writes a Result Descriptor only if an error condition was encountered. Result Descriptors are written into predetermined locations in Memory; for the Processor, the location is address 80, for example. The use of "Result Descriptors" is described in U.S. Pat. No. 3,512,133.

The Result Descriptors for the LCP's and the I/OC's are written into locations beginning at the address specified by the equation (CH×20) plus 200, where CH is the channel number of the initiated device. The IOT Result Descriptor is written into address 260. After the Result Descriptor has been written, an interrupt is generated.

LCP Result Descriptors, R/D: Upon the completion of its assigned operation, the LCP stores a Result Descriptor, which describes to the Processor the manner in which the operation was completed. An LCP Result Descriptor may consist of one, two, or three 16-bit words. The first Result Descriptor, R/D, is stored in Memory at the location specified by the equation (CH×20) plus 108, where CH is the channel number of an LCP. If more than one word of Result Descriptor information is to be written (extended Result Descriptor), the additional words are stored in the address memory of the IOT. As shown in the table I below, the first LCP Result Descriptor word is preceded by a 1-word link and the channel (IOT) Result Descriptor. Typically, the link is used by the operating System as an address to the next Result Descriptor to be examined. Table II shows the basic word format for a "data" word having 4 digits, A, B, C, D, where each digit has 4 bits and each character has 8 bits. Symbols are used to designate parts of each digit, as A8, A4, A2, A1, etc.

TABLE I

Result Descriptor

| 16-BIT CHANNEL (IOT) RESULT DESCRIPTOR | 16-BIT LINK | 16-BIT LCP RESULT DESCRIPTOR |
|---|---|---|

(CH × 20) + 100 ──┘  (points to 16-BIT CHANNEL (IOT) RESULT DESCRIPTOR)
(CH × 20) + 108 ──────────────┘ (points to 16-BIT LCP RESULT DESCRIPTOR)

Channel/LCP Result Descriptor Location in Memory

TABLE II

Data Word

| Digits · | A | B | C | D |
|---|---|---|---|---|
| | A8 | B8 | C8 | D8 |
| | A4 | B4 | C4 | D4 |
| | A2 | B2 | C2 | D2 |
| | A1 | B1 | C1 | D1 |

One Digit = 4 bits

One Character = 8 bits = AB

One Word = ABCD = 16 bits

TABLE III

I/O Descriptor Format

SYLLABLE 1 | SYLLABLE 2

| D1 | D2 | D3 | D4 | D5 | D6 | D7 | D8 | D9 | D10 | D11 | D12 |
|---|---|---|---|---|---|---|---|---|---|---|---|
| 8 4 2 1 | 8 4 2 1 | 8 4 2 1 | 8 4 2 1 | 8 4 2 1 | 8 4 2 1 | 8 4 2 1 | 8 4 2 1 | 8 4 2 1 | 8 4 2 1 | 8 4 2 1 | 8 4 2 1 |

BINARY VALUE

L-O OPERATION CODE | VARIANT DIGITS AS SPECIFIED BY EACH I/O INSTRUCTION | MSD - ADDRESS OF MOST SIGNIFICANT DIGIT

SYLLABLE 3 | SYLLABLE 4

| D13 | D14 | D15 | D16 | D17 | D18 | D19 | D20 | D21 | D22 | D23 | D24 |
|---|---|---|---|---|---|---|---|---|---|---|---|
| 8 4 2 1 | 8 4 2 1 | 8 4 2 1 | 8 4 2 1 | 8 4 2 1 | 8 4 2 1 | 8 4 2 1 | 8 4 2 1 | 8 4 2 1 | 8 4 2 1 | 8 4 2 1 | 8 4 2 1 |

BINARY VALUE

LSD + 1 - ADDRESS OF LEAST SIGNIFICANT DIGIT PLUS ONE | DISK FILE ADDRESS

---

The table III below indicates the format for the I/O descriptor which is normally stored in Main Memory and then accessed in order to regulate a particular type of Input/Output operation. As will be ssen there are four syllables, wherein each syllable is composed of 6 digits. These digits are numbered D1–D6, D7–D12, D13–D18, D19–D24, to indicate the relative positions of each digit. In syllable 1, the digits D1 and D2 always specify the type of input/output operation to be performed and are generally called the "OP-code". Digits D3–D6 are referred to as "variant digits" in that they specify the various options that a specific input-output operation can incorporate.

Syllable 2 contains the address of the most significant digit (MSD) of the Main Memory section which is used in this particular input/output operation as a memory buffer area. This buffer area is referred to as the beginning address. Syllable 3 contains the address of the least significant digit plus 1 (LSD+1) of the input/output core memory buffer area which is referred to as the "ending address". The most significant address and the least significant address plus 1 represent the maximum memory boundary limits of a record being transmitted. The length of the record may or may not utilize the entire area within this limit. But an attempt to exceed this limit causes termination of data transmission to that area.

Syllable 4 is used only for disk file descriptors and contains the disk address.

The length of the record may or may not utilize the entire area within the beginning address and ending address limits. As stated, an attempt to exceed this limit causes termination of data transmission to that area. For example, punch cards may be read into an area greater than 80 characters, that is, with a MSD and an LSD+1 at 80 characters apart, or they may be read into an area less than 80 characters; for example, the record area defined in a particular object program reflects 40 characters in a card reader record. Data within columns 1 through 40 of the punch card are stored in the record area of core memory allocated by MSD and LSD+1.

System Description: (General):

An I/O Subsystem is provided as part of a digital system environment to supply means of communication between a central data processing system and a variety of peripheral devices which are attached to and work within the system. The peripheral devices which work with the overall digital system herein vary from mass storage devices, such as disks or disk packs, to system control devices such as the operator's supervisory terminal, or to a variety of other peripheral devices such as printers, card readers, card punches, magnetic tape storage devices, and so on.

The I/O Subsystem described herein can be divided into two major subsystem categories, based on the method by which the various peripheral devices are controlled. The first category uses a method which employs I/O Controllers (IOCs) working in conjunction with the Processor and a Central Control to handle I/O activity. The second category uses an Input-Output Translator (IOT) in the central processing unit which works with individual units called Line Control Processors (LCP's). The units known as Line Control Processors are the devices which establish a communication path from the System (Main Memory and Processor) to a specific peripheral device. Once the communication path is established, the LCP can accept data from, or pass data to, the specific peripheral device, for later transmission to the Main System. Since each LCP has a built-in data buffer, then data can be transferred to and from the given peripheral device at the comparatively low speed rate of the device; however, when the data buffer of the LCP is connected to transmit to the Main System Memory and Processor, the data can be transferred to the Main System at the highest rate allowed by the Memory of the Central System.

The first category of I/O Subsystems which use IOC's as an interface from a peripheral to the Main Memory and Processor has a Central Control (CC) unit which links the I/O channel and IOC with the Central Processor and Memory. These Input-Output Controllers accept instructions from the Processor and they return data information involving the result of what happened regarding that particular instruction. This result information is placed in a specified location in the Main Memory.

The use of a Central Control unit such as element 12 of FIG. 1A and the cooperative I/O control units $13_a$, $13_b$, is described in technical manuals published by the Burroughs Corporation entitled "B 3500, Processor, Memory, Central Control" Technical Manuals Nos. 1028958, 1028982, 1028974, 1038650. The use of these elements is further illustrated in U.S. Pat. No. 3,688,273. The use of the priority control logic feature $10_{pc}$ of FIG. 1C and FIG. 1D is illustrated in U.S. Pat. No. 3,633,163.

In the second category of I/O Subsystem is the system wherein the Processor and Main Memory communicate, via an Input-Output Translator (IOT), to a group of LCP Base Modules, each Module of which constitutes a unit supporting a group of 8 Line Control Processors (LCP's). Thus, an instruction from the Processor is translated by the IOT into a specialized set of commands which is acceptable to individual LCP's. After an LCP accepts instructions from the IOT, it will then report back certain "result information" which is stored in a specified location in the Main Memory.

Thus, in this second I/O Subsystem, all communications between the main system Processor and Memory over to a specified peripheral device are controlled by an LCP which is uniquely suited to that particular peripheral device.

When a Line Control Processor, LCP (or an Input-Output Control means having a Central Control) is installed, it is assigned a unique number called its "channel number". For I/O Controls this number corresponds to a word of scratchpad memory located in the Processor. For Line Control Processors (LCP's) this "channel number" corresponds to a word of scratchpad memory in the Input-Output Translator (IOT).

To accomplish an input-output operation in the system, an I/O request is initiated by an Initiate I/O Instruction which tells the Processor where to find the appropriate I/O Descriptor in the Main Memory and also which channel number it is intended for. The I/O Descriptor contains the OP code and also the variants for the kind of I/O operation selected, and the beginning (A) and ending (B) Main Memory address of the memory area involved.

The Processor accesses this I/O Descriptor and then sends the OP code and its variants to the selected IOC (first Subsystem) or to the IOT (second Subsystem). The IOC or the IOT verifies the OP code and signifies acceptance or rejection of the request.

In the first Subsystem the Processor then loads the beginning (A) and the ending (B) addresses into a local register and informs the IOC that the addresses are available. These particular addresses are transferred by the IOC into the scratchpad memory location for that designated I/O channel.

In the second Subsystem the IOT accesses the A and the B addresses directly from the memory address lines leading to the Processor's "local register" ($10_{pr}$, FIG. 3) at the time of transfer from Main Memory and thus the IOT loads its own local scratchpad memory $10_{ps}$.

The access to Main Memory is shared by the IOT, the Central Control and the Processor. The highest priority is shared by the IOT and the Central Control. The timing may be so arranged that each Central Control is guaranteed and limited to every fourth memory cycle (at, for example, 8 MHz.). The IOT is guaranteed the remaining cycles. When The Central Control is not requesting memory, then the IOT can take all the memory cycles. The Processor takes all memory cycles available on a lowest priority basis.

Thus, I/O communications in the system require that the Processor execute an Initiate I/O Instruction (which may be designated, for example, as OP=94). This Initiate Instruction specifies the channel number of the requested device and also the location of the I/O Descriptor in Main Memory. The I/O Descriptor specifies the action to be taken by the peripheral device and specifies the boundaries in Memory of the data field. The Descriptors, and the manner in which they are executed, vary, depending on the method by which the peripheral device is controlled.

If an Initiate I/O Instruction is executed for a channel containing an I/O Control (first I/O Subsystem), then the Processor sends the Descriptor OP code, variants and a C address (if used) to the I/O Control. The A (beginning) and B (ending) addresses of the Descriptor are stored in the Processor's I/O channel address memory $10_{pam}$. The I/O Control verifies that the OP code is valid, then signals the peripheral device that a data transfer is to begin.

As was previously discussed, the embodiment of the present digital system involves a duality of Input/Output Subsystems. The second of these involve a Central System with Input-Output Translator (IOT), a Base Module having a plurality of Line Control Processors (LCP) and a plurality of peripheral units; the first I/O Subsystem involves, as seen in FIG. 1A, a Central Control unit 12 which interfaces with a plurality of I/O controls $13_a$ and $13_b$ which interface with a plurality of peripheral devices $14_a$ and $14_b$, etc.

The following discussion will involve the first I/O Subsystem involving IOC's with Central Controllers, CC. The FIG. 1B shows the system of connecting the I/O channels with the Processor, $10_p$, and the Main Memory $10_m$ through the Central Control 12. Logic levels are generated in each I/O channel 100, 101 (FIG. 1C) and combined by Central Control 12 before being sent to the Processor $10_p$ and the Main Memory $10_m$. Other logic levels are generated by the Processor, and within the Memory, and distributed by Central Control 12 to each I/O control such as $13_a$, FIGS. 1A and 1B. There are also logic levels which pass through the Central Control 12 with the Central Control performing as the connecting block between the Processor $10_p$ and I/O channels. Priority logic, $10_{pc}$ of FIG. 1C, determines which of the I/O channels will be allowed access to the Main Memory $10_m$, should more than one channel need access at the same time.

As seen in FIG. 1C, there is included, as part of Central Control 12, a plug in translator which is capable of translating BCL (Burroughs Common Language) data to or from EBCDIC (Extended Binary Coded Decimal Interchange Code) as it goes to or comes from the Core Memory $10_m$. The I/O Control units, $13_a$, $13_b$, FIG. 1A, request Central Control 12 to use the translator, $12_t$, FIG. 1C, or to bypass it. The translation takes place as data is transferred between the I/O Control unit, such as $13_a$, and the Main Memory $10_m$. Additional time is not required for I/O operation even though translation is necessary. The translator logic translates incoming Burroughs Common Language (BCL) data into EBC- DIC (Extended Binary Code Decimal Interchange Code) data or the outgoing EBCDIC data into Burroughs Common Language (BCL). Those EBCDIC codes which are not assigned a BCL code, will cause to be generated a code for a BCL symbol "?".

The Central Control 12 functions as an interface between an I/O channel and the Main Memory $10_m$ during system operation, as seen in FIGS. 1B and 1C. It determines the priority of memory accesses, should more than one channel need access, and it translates data coming to the I/O channel, as 100, from Memory $10_m$ or from the I/O channel to Memory. The Central Control correlates various functions of the channels. The sequence of events is initiated by the Processor $10_p$ when an I/O channel is needed.

When the program being performed has need of a peripheral unit such as $14_a$ or $14_b$ of FIG. 1A, the Processor $10_p$ executes the "Initiate I/O Instruction". This instruction reads an I/O Descriptor from Memory $10_m$ and then sends the necessary information to the I/O channel, 100, through Central Control 12. This information contains the type of operation (OP code) and the variant information. The remaining portion of the I/O Descriptor including the beginning (A) and ending (B) addresses, is stored in Address Memory, $10_{pam}$, FIG. 1C, of the Processor $10_p$. The channel is selected by the channel designate level (CDL) as seen in FIG. 1B, which line comes from the Processor $10_p$.

Once all the information is available, the I/O channel, 100, is released by the start channel bus (STCB), FIG. 1B, to operate independently. When the I/O channel has been released, it operates as another processor and shares the Main Memory $10_m$ with the main Processor $10_p$ or other channels (FIG. 1C).

If the operation being performed involves an "input type" peripheral unit $14_i$ such as a card reader, the data is received by the I/O channel 100 seen in FIG. 1C, and the data is stored in a buffer $C_o$ within the I/O channel 100. The I/O channel then requests access to Main Memory $10_m$ via Central Control 12. This request is processed by the priority logic $10_{pc}$ (one type of which is illustrated in U.S. Pat. No. 3,633,163) which controls other requests at the same time. Once access to Memory has been granted to the channel, the information is transferred to Memory $10_m$. The information may or may not be translated depending upon the I/O Descriptor. The information is then written into the Main Memory $10_m$ at the location specified by the beginning (A) and ending (B) addresses in the Address Memory, $10_{pam}$.

If it is desired, at some point, for data or information to be transferred out to a peripheral terminal unit, this is called an "output" operation, FIG. 1D. If an "output" operation is being performed, a similar sequence of events occurs as before, except that data goes from the Main Memory $10_m$ to an I/O channel such as 102 of FIG. 1D. Then when a peripheral unit as, for example, a printer $14_p$ needs data, the memory access request is made to the Central Control 12 via the I/O channel, 102. When priority is granted to the channel, the data is read from Main Memory $10_m$ from the address specified by the beginning and ending addresses located in the Address Memory $10_{pam}$; this data is then transferred to the I/O channel buffer $C_2$ through the translator $12_t$ (or bypassed around the translator depending upon the I/O Descriptor). As seen in FIG. 1D, the data is then transferred to the peripheral unit, such as $14_p$.

As seen in FIG. 1E the Central Control 12 provides an interface to/from the I/O channels, the Processor $10_p$, and the Core Memory $10_m$. Control information from the Processor $10_p$ is sent to the Central Control 12, where it is distributed to each I/O channel as 100, 101, etc. The Central Control 12 handles all of the Core Memory requests made by the I/O Control units in this first I/O Subsystem. Data from each I/O channel, which is to be written into Core Memory $10_m$ is placed on the Memory Write Bus by the Central Control 12, and data which is to be read from the Core Memory $10_m$ is placed on the Core Memory Read Bus and distributed to each I/O channel.

When a request is made by an I/O channel unit, the Central Control 12 will obtain the Core Memory address from the Address Memory location reserved for that specific I/O channel. This address is used to access Main Memory $10_m$ and the memory cycle is then initiated. The memory cycle could be either a "Read" or "Write" depending on the specific I/O operation.

When the Processor $10_p$ requests a memory access, the memory address involved is obtained from the Address Memory $10_{pam}$ located in the Processor $10_p$. This address is used to access Main Memory $10_m$, and the memory cycle (either a read or a write) is initiated.

Since only a single memory access can be made at a given moment, multiple memory requests must be handled individually, and this handling is accomplished automatically via Priority Control $10_{pc}$ (FIG. 1C, 1D) by Central Control 12, as previously discussed. Each Central Control 12 contains "priority logic" $10_{pc}$ which is established or changed by a field engineering adjustment. As I/O channels are added to the Central Control 12, they are also added to the priority network. The Processor $10_p$, in this case, has a lower priority than a Central Control 12. The highest priority request is granted first, and as soon as it is completed, the next highest request is automatically granted. This process is repeated until all of the multiple requests are handled. The requests are alternately granted to each Central Control unit (when multiple Central Controls are used) depending on which control was granted the last request. If a Central Control does not want the access, then it is granted to the Processor $10_p$.

During the course of a data transfer operation within the first category Subsystem, the I/OC (Input/Output Controller) may perform several functions depending on the OP code, the variants, and the type of peripheral device. Typically, the I/O Controls have the ability to buffer only one byte or at most one word. Thus, when the data buffer of a control is loaded, the I/O Controller or I/O Channel Unit 100, 101, 102, must request a memory access; therefore, the rate at which data is transferred to or transferred from the System is controlled primarily by the speed rate at which the peripheral device can read or write. The second I/O Subsystem using Base Modules with Line Control Processors does not have this speed limitation.

When the I/O Controller requests a memory access, it is, in effect, asking the Processor to perform a series of operations; these operations include: (a) the transfer of the data field address from the processor's I/O channel address memory to the local address register; (b) the initiation of a memory cycle; (c) and the restoration of the data field address to the address memory of the channel. The I/O Controller also indicates to the Processor the amount by which the address must be incremented so as to point at the next field location. Upon completion of the operation, the I/O Controller builds a Result Descriptor (R/D) indicative of how the operation was effectuated, then the I/OC stores the Result Descriptor in a reserved memory location, after which it sets the Processor Interrupt flip-flop.

In the second category of controlling I/O activity, use is made of an Input/Output Translator (IOT) interface unit which is located in the central processor unit 10. The IOT interfaces with a group of Line Control Procesors (LCP) which are installed in LCP Base Modules. Up to eight LCP's may be housed in an LCP Base Module. The Base Module for the LCP's holds up to as much as eight LCP's. The LCP is an intelligent interface unit which establishes a buffered data-transfer path between the peripheral device involved and the main system of Processor and Memory. This communication path is established by the LCP upon receipt of a Command Descriptor (C/D) from the IOT which has translated an original I/O Descriptor into a specialized Command Descriptor for the LCP.

Since each LCP has a large "data buffer" of, typically, 256 words, then data can be transferred to and from a specific peripheral device at the comparatively low rate of the device; however, when the data buffer is full, data can be transferred to the Main System at the highest rate allowed by the memory speed of the Main Memory, which is at a fast rate.

The LCP Base Module, which houses up to eight LCP's, operates in conjunction with the IOT to establish connection to and to initiate operation of a particular LCP. The LCP Base Module also supplies the timing signals, the maintenance logic, the power supply and cooling which is supportive of each group of individual LCP's.

The IOT is that portion of the central processing unit which, upon receipt of an I/O Descriptor, works in conjunction with the LCP Base Module to establish connection to a particular LCP in the channel specified by the Initiate I/O Instruction. The IOT translates the I/O Descriptor to a form (Command/Descriptor) recognizable to the LCP, and, when connection is established, passes the translated descriptor to the LCP, after which data transmission may begin. During the time that the data is being transferred between the LCP and the Main System, then the IOT, upon demand from the LCP, requests memory accesses, addresses memory, then modifies and compares the data addresses. Further, the IOT controls the routing of data between the selected LCP and the Main System, and it performs translations (ASCII/EBCDIC) of the data if so required. Upon completion of an operation, the IOT accepts R/D (Result Descriptor) information from the LCP, and then stores the Result Descriptor in a predetermined location.

The LCP system configuration allows up to 68 I/O channels. In the I/O Control Subsystem there may be two CC's (Central Controls) with eight I/O Controllers each for a total of only 16 channels.

In the LCP subsystem, however, there may exist up to eight LCP Base Modules per single IOT. Each Base Module may service and carry up to eight LCP's. Thus, one IOT may serve as many as 64 LCP's. A Multiplex Adapter may be used to provide the effect of "two" IOTs connected to common LCP Base Modules. This configuration may be used to improve I/O band pass to the Main Memory.

The entire I/O System has channel addresses which must be unique in themselves. Access to Main Memory is shared by the IOT, the Central Control and also the Processor.

In FIG. 1A there is seen an overall system diagram showing the dual categories of I/O Subsystems. The first I/O Subsystem is made of Central Control 12 which supports I/O Controls $13_a$ and $13_b$ which connect respectively to peripheral devices $14_a$ and $14_b$. This first I/O Subsystem (using Central Control) is connected to the Main System 10 by means of interconnecting bus 11.

The Main System 10 is shown comprising a Main Memory $10_m$, the Central Processor $10_p$, the Memory Control $10_c$, and the Input-Output Translator $10_t$. A PCC (Peripheral Control Cabinet) interface $10_i$ connects via bus 5 to a Peripheral Control Cabinet 6 which houses the Central Control and the I/O Control units of the first I/O Subsystem.

The Input-Output Translator $10_t$ of the Main System, FIG. 1A, forms a second I/O Subsystem through the use of cabinets shown as LCP cabinet numbers 0, 1, 2, designated as $16_0$, $16_1$, $16_2$. Each of the LCP cabinets supports three LCP Base Modules, for example, base cabinet $16_0$ carries Base Modules $20_0$, $20_1$, $20_2$; while LCP cabinet $16_1$ supports LCP Base Modules $20_3$, $20_4$, and $20_5$; likewise, LCP cabinet $16_2$ supports LCP Base Module $20_6$, and $20_7$. Each of the individual LCP Base Modules is connected to the IOT $10_t$ by means of message level interface cables (MLI) 15, each of which is made up of 25 lines.

Figure 2:
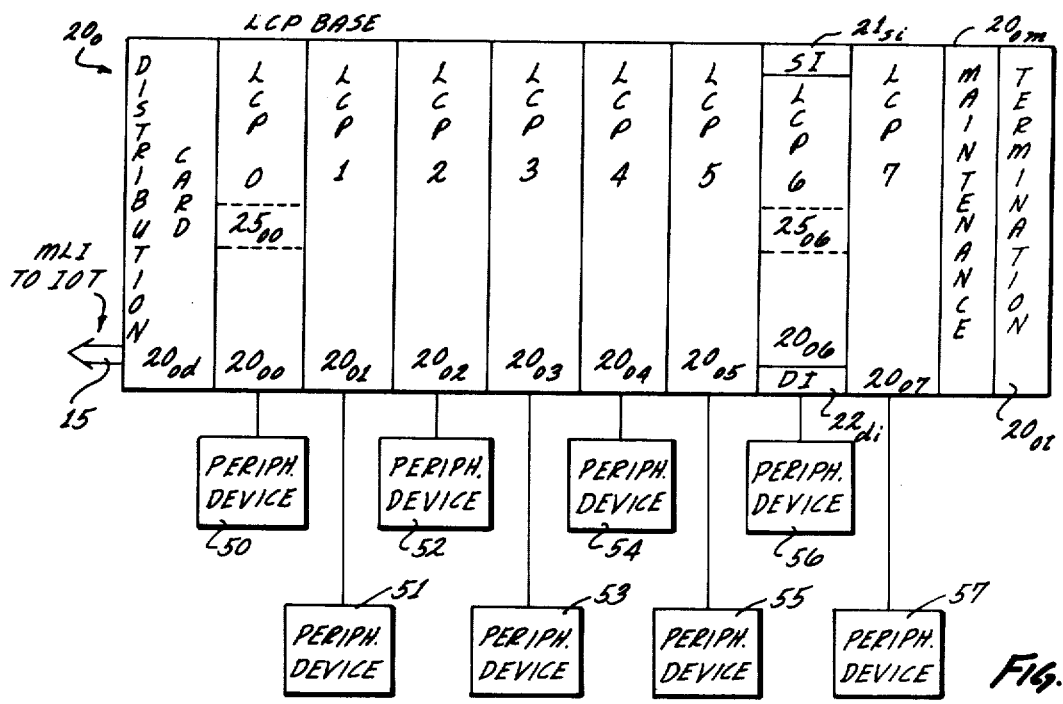
FIG. 2 is a schematic drawing of a modular unit of the LCP I/O Subsystem known as the LCP Base Module showing its relationship to a variety of peripheral devices.

Referring to FIG. 2, a typical LCP Base Module $20_0$ is shown in greater detail. The Base Module $20_0$ is composed of eight Line Control Processors (LCP's) $20_{00}$ through $20_{07}$, in addition to a common Distribution Card $20_{0d}$, a common Maintenance Card $20_{0m}$ and a common Termination Card $20_{0t}$. The Distribution Card $20_{0d}$ connects to one set of the message level interface cables 15 which connect to the IOT $10_t$ (also see FIG. 5E).

Each individual Line Control Processor is seen connected by output lines to a particular peripheral device, wherein, as seen in FIG. 2 the LCP's $20_{00}$ through $20_{07}$ respectively connect to peripheral devices 50, 51, 52, 53, 54, 55, 56, 57.

While each LCP of the Base Module may be slightly different in certain aspects in order to accommodate the idiosyncrasies of each particular peripheral device which the LCP handles, each LCP is of basically the same design and functional capability. With reference to FIG. 2, a typical example of each LCP is seen in the LCP $20_{06}$ which is seen having a System Interface $21_{si}$, a Device Interface $22_{di}$ and having a Word Buffer $25_{06}$ which is typically capable of holding 256 words.

Figure 3:
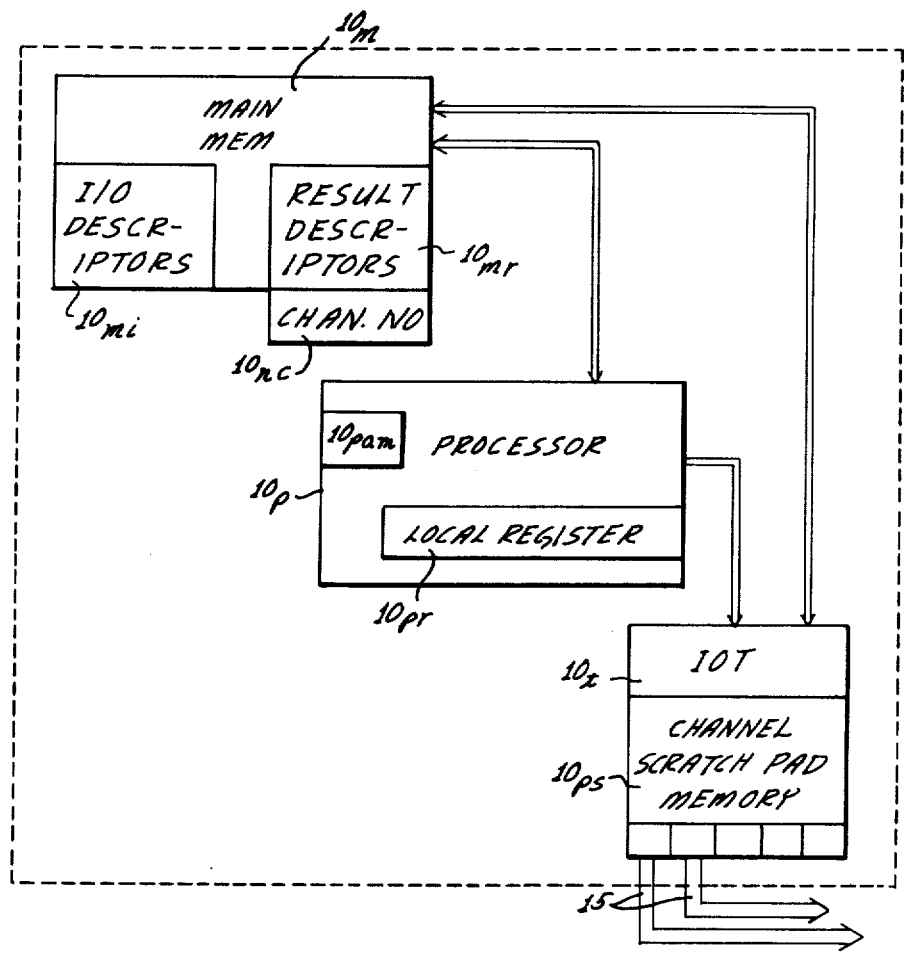
FIG. 3 is a schematic drawing of the central processing unit of the Main System of the LCP Input/Output Subsystem.

Referring to FIG. 3 there is seen a more detailed block diagram of the Main System as it relates to the I/O LCP Subsystems. The Main System 10 has a Main Memory $10_m$ in which there is a reserve portion $10_{mi}$ for I/O Descriptors and another reserve section $10_{mr}$ for Result Descriptors. In addition the Main Memory $10_m$ has another reserve portion $10_{mc}$ for storage of channel numbers. The I/O Descriptors, Result Descriptors, and Channel Numbers are information used by the System for control and for recognition of the status of operations. These will be described in detail hereinafter.

The Processor $10_p$ has a local register $10_{pr}$ which is useful for storing information for the IOT. The Input-Output Translator $10_t$ holds a channel scratchpad memory $10_{ps}$.

The local register $10_{pr}$ of the Processor $10_p$ is used for storing the beginning (A) and the ending (B) addresses of the appropriate I/O Descriptor. (In the case of the first I/O Subsystem using a Central Control, FIG. 1A, the I/O C causes these addresses to be transferred into a temporary storage location called channel scratchpad memory or channel address memory). In the case of the second Subsystem using the IOT, the IOT accesses the A and B addresses directly from the memory address lines leading to the local register $10_{pr}$ of the Processor. The channel scratchpad memory $10_{ps}$ for all 64 LCP's is contained in the IOT. The channel scratchpad memories will also contain the required channel numbers.

Figures 4A, 4B:
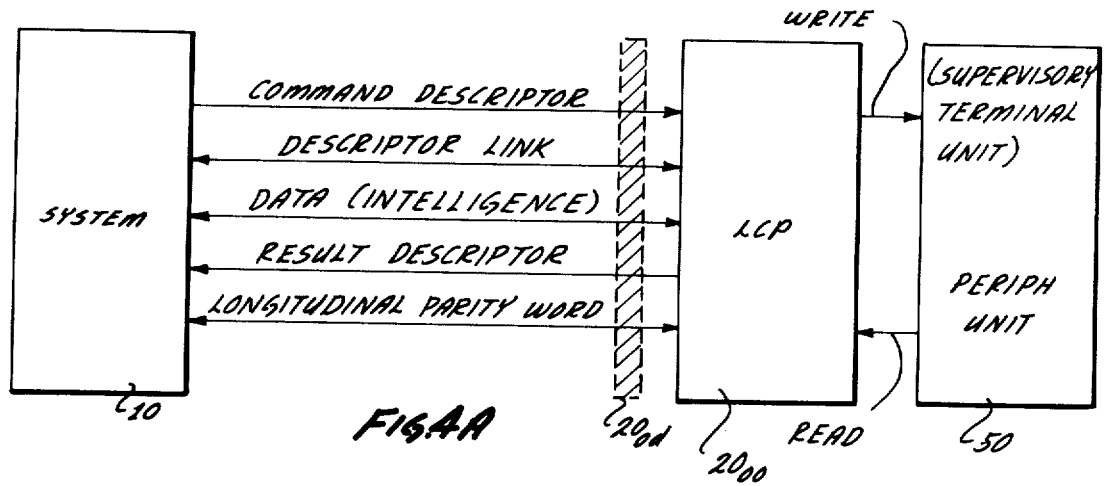
FIG. 4A is a simplified schematic showing the basic connective relationships between the Main System, the Line Control Processor and a peripheral unit within the Line Control Processor I/O Subsystem.
FIG. 4B is a chart indicating various codes for the various instructions executable by a Line Control Processor, LCP.

With reference to FIG. 4A and the transfer of information as between the main system 10 and a typical LCP $20_{00}$, a brief look at these information words and their functions will indicate the nature of the operating relationship.

Command Descriptor (FIG. 4A)

The Command Descriptor (C/D) is a modified form of the I/O Descriptor. The I/O Descriptor is the information residing in Main Memory $10_m$, FIG. 1 (and specifically in $10_{mi}$ of FIG. 3), which provides data and information as to the type of Input-Output operation to be accomplished. The modification of the I/O Descriptor is accomplished by the IOT, $10_t$ (Input-Output Translator, FIG. 1) which receives the I/O Descriptor from the System Memory $10_m$, retains a portion of the instruction, and then transmits the applicable portion to the LCP $20_{00}$ as a Command Descriptor.

The Command Descriptor is a 17-bit word, A, B, C, D, (FIG. 4B) consisting of an OP code digit (A), variant digits 1 (B), 2 (C), and 3 (D), and a parity bit. However, the LCP $20_{00}$ makes use of only the OP code digit and variant digit 1 for instructional purposes. Variant digits 2 and 3 are always equal to 0. The OP code digit (A) defines the basic operation to be performed by the LCP $20_{00}$, and the variant digit 1 (B) specifies modifications of the basic operation. No memory address information is sent to the LCP; the System Memory address functions are accomplished by the IOT $10_t$. FIG. 4B contains the Command Descriptor codes for all operations that can be performed by the LCP. These operations include: Write, Read, Write Flip Read, Test, Test Enable, Conditional Cancel, and Echo. These operations will be later described hereinafter.

Descriptor Link (FIG. 4A):

The Descriptor Link (D/L) consists of two 16-bit information words accompanied by a longitudinal parity word (LPW). The Descriptor Link is exchanged between the IOT $10_t$, (FIG. 1) and a LCP, as LCP $20_{00}$, at specific times during communication between the two units. The content of the Descriptor Link is shown in the following table. The data bits which are not listed are reserved for future use.

TABLE IV:

| Descriptor Link (also see FIG. 5D) | |
|---|---|
| Data Bit | Designation |
| A8 | Inhibit Acess to system memory. |
| A2 | ASCII Translation Required |
| C2 | Base Module Address: 4 bit. |
| C1 | Base Module Address: 2 bit. |
| D8 | Base Module Address: 1 bit. |
| D4 | LCP address: 4 bit. |
| D2 | LCP address: 2 bit. |
| D1 | LCP address: 1 bit. |

Data (Intelligence) (FIG. 4A)

These are the bidirectional communication lines for transfer of data from the System 10 over to the LCP such as $20_{00}$ for eventual transfer to a peripheral unit such as 50; or otherwise for transfer of data from the peripheral unit 50 over to the LCP $20_{00}$ and thence to the System 10 for storage in Memory $10_m$. In FIGS. 1 and 3, these channels would be the message level interface (MLI) 15. Data transmission between the System 10 and the LCP $20_{00}$ is in the form of words (Table II) except for certain transmissions which are limited to a single character or for transmissions ending in an odd number of characters. Each "data word" is composed of two 7-bit ASCH characters and a single parity bit. Data bits A8 and C8 are not used, (Table II).

It should be noted in regard to the Commnd Descriptor, that after receipt of a Command Descriptor, but prior to execution of an operation, the LCP $20_{00}$ receives the Descriptor Link from the IOT $10_t$ and stores it in the LCP buffer $25_{00}$ (FIG. 2). When the LCP $20_{00}$ disconnects from the System 10, then reconnects for further communication, the Descriptor Link is returned to the IOT $10_t$ to identify the LCP and the operation in progress.

Result Descriptor (FIG. 4A)

A Result Descriptor is generated by the LCP $20_{00}$ and forwarded to the System 10, after the instruction contained in a Command Descriptor (C/D) is executed, or when an error occurs during receipt of a Command Descriptor or a Descriptor Link. The Result Descriptor is sent to the System 10 by the LCP, in a 16-bit word format, with a parity bit. FIG. 4C shows the 16-bit format for a Result Descriptor, wherein digits A, B, C, D will each have 4-bits.

Longitudinal Parity Word (FIG. 4A)

The Longitudinal Parity Word (LPW) is a 16-bit word representing the longitudinal parity of each transmission between the System 10 and the LCP $20_{00}$. An LPW is accumulated in both the IOT $10_t$ and the LCP $20_{00}$ during a transfer of information between the two units. An LPW register is provided in the LCP $20_{00}$ wherein accumulation of the LPW by the LCP $20_{oo}$ consists of applying each word being transferred to the input of the LPW register and performing a binary add operation without carry (exclusive OR function). Then at the end of a data transfer, the exclusive OR function is again performed between LPW's of the sending and the receiving unit. If no errors have occurred, both LPW's will be identical, and the resultant value in the LPW register will be "all 0's".

Figure 5B:
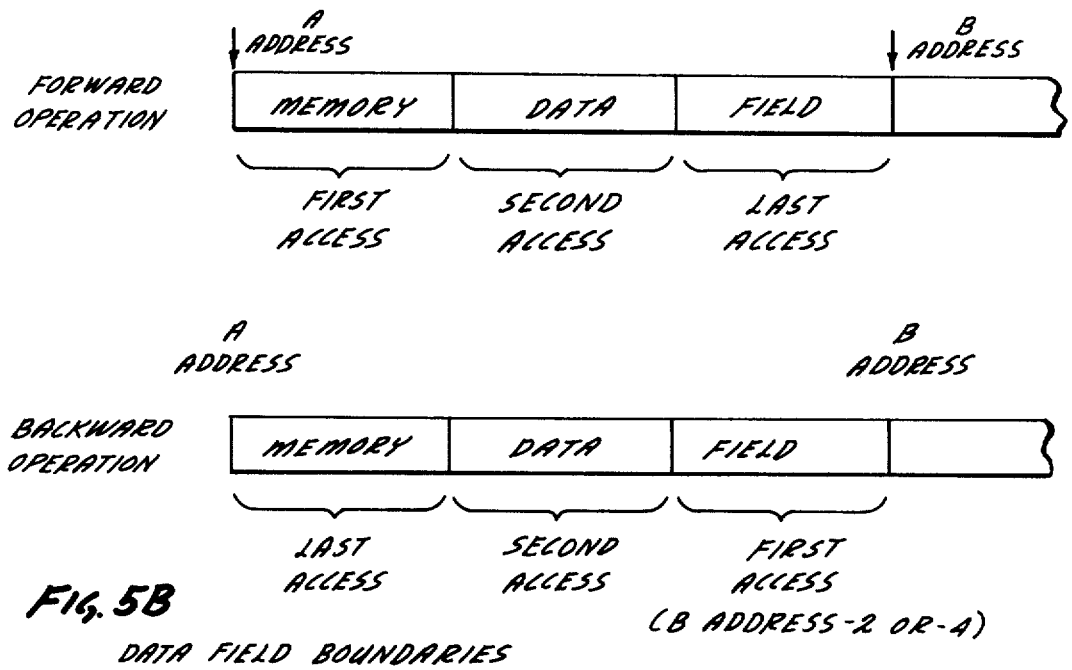
FIG. 5B is a schematic showing the data field boundaries of the Descriptors in FIG. 5A.
Figure 5D:
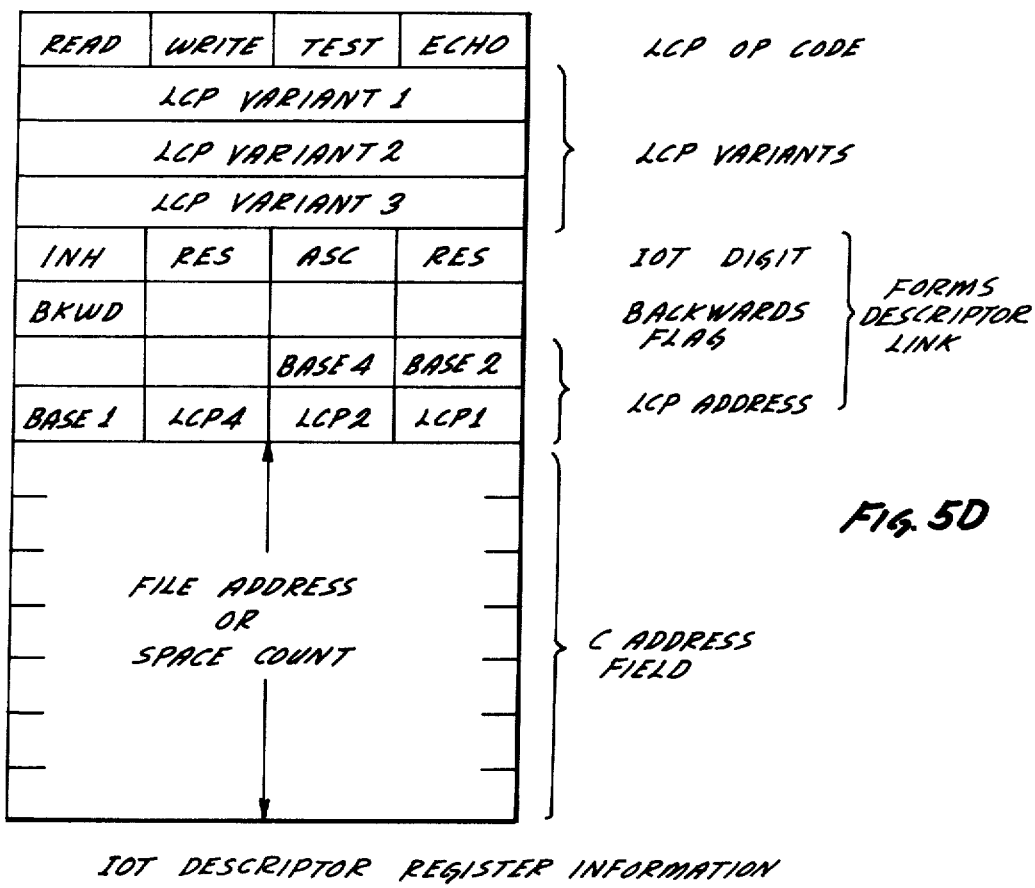
FIG. 5D is a chart showing the information array in the IOT Descriptor Register.
Figures 1A, 5C:
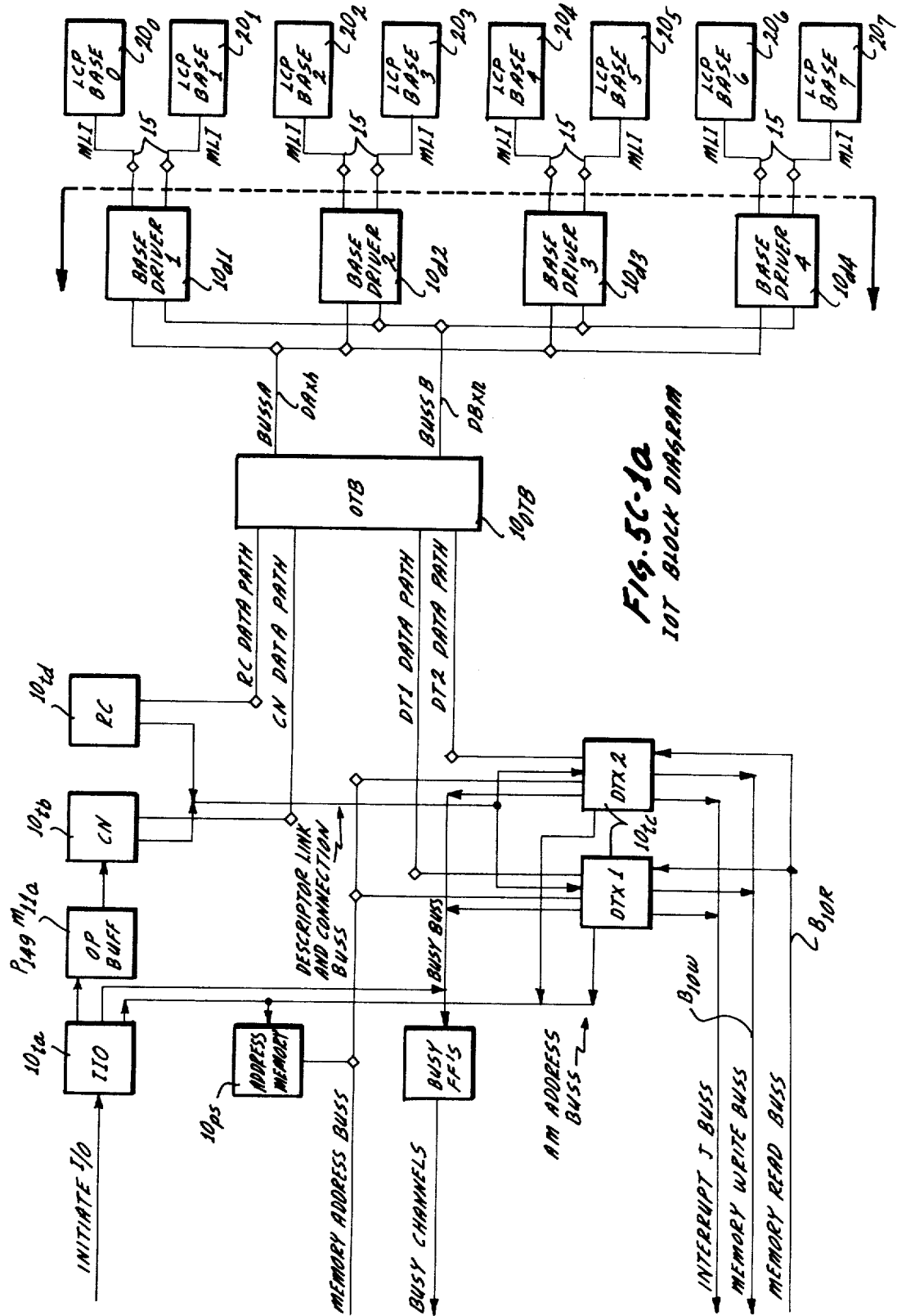
FIG. 5C is a block diagram of the Input-Output Translator (IOT) in its relationship to the Main System (Processor and Memory) and to the Line Control Processor (LCP)

Input-Output Translator (IOT) (FIG. 5C)

The IOT $10_t$ translates the system I/O Descriptors into the appropriate operational messages relevant to each LCP. In return the result messages from the LCP in the form of Result Descriptors are not translated by the IOT, but are stored directly into Memory $10_m$ at $10_{mr}$ as transmitted by the LCP's. The IOT performs all the information transfers between the LCP's and the Main Memory $10_m$ necessary to support the input-output capability of the second I/O LCP Subsystem.

The I/O Descriptors, which are sent to the IOT from Memory $10_m$, are shown in FIG. 5A. Section 1A of this figure shows the descriptors used by the IOT to generate command messages C/M for the LCP. These can also be referred to as Command Descriptors C/D. Section 1B indicates descriptors used by the IOT. Operations 40 through 58 are translated into LCP OP codes and sent to the LCP's in "message" format. The "L" digits in the variant field carry information used in the variant digits (B, C, and D) of the descriptor information sent to the LCP's. The S-digit is used by the IOT as shown by the note of section 1A of FIG. 5A.

Each operation shown in FIG. 5A has two OP codes; the difference is in the number of addresses used by the LCP. The first digit of the OP code designates the number of addresses required. For example, a value of 4 designates two-address operation (except "test" which has none); a value of 5 for the first digit of the OP code designates three address operation. The second digit of the OP code is mapped into the actual OP codes sent to the LCP's as the "A" digit.

FIG. 5B shows the data field boundaries of operations going in the forward direction and in the backward direction. (Forward = System to LCP).

FIG. 5A also shows the four types of standard operational messages used for controlling the LCP's: these are 1. Read
2. Write
3. Test
4. Echo The specific descriptor information is obtained in the form of variants which accompany these OP codes. "Read" and "Write" require system memory access. All operations which do not transfer data are considered "Test". Thus, a "Test" is defined as an operation which results in the IOT receiving result information only. "Echo" is a confidence test operation which causes the LCP to accept a buffer load of information from the System 10 and then return it to the System 10 for checkout.

All communications between the Main System 10 and the LCP is over a standard message level interface 15 (MLI). This communication between the IOT and the various LCP's is accomplished by a standard flow discipline which is common to all LCP's.

In FIG. 5C the IOT $10_t$ receives I/O Descriptors from the Processor $10_p$. The IOT then connects via Distribution Unit $20_{od}$ to the requested LCP channel and sends the translated descriptor information (Command Descriptor C/D) in a message format which indicates the LCP's task. The IOT then becomes LCP "status driven". This means that the IOT responds to the various LCP states (including memory requirements) as indicated via the control lines between the LCP and the IOT FIG. 4A. The IOT manages the transfer of information between Main Memory and the LCP's. The LCP's memory requirements drive the IOT for all data transfers except that of initiation.

Either the IOT or the LCP can initiate a connection to Main Memory $10_m$. The IOT initiates a Main Memory connection to an LCP (and its associated peripheral) by performing an algorithm which is called a "Poll Test". On the other hand, the LCP initiates a connection to IOT and Main Memory by an algorithm called a "Poll Request". Once the LCP is connected, it indicates its status via the control lines of FIG. 4A. An LCP which is initiating a "Poll Request" must compete with the other LCP's in the system; a connection to Main Memory $10_m$ is granted on a priority basis which will be described hereinafter. During an operation, the IOT $10_t$ may disconnect from one LCP in order to service another LCP.

The message transmissions between the IOT and the LCP involve data and control messages which are transmitted 16 bits at a time along with a vertical odd parity bit. Following the last message, a 16-bit longitudinal odd parity word (LPW) is transmitted accompanied by a vertical odd parity bit. Parity is checked by both the IOT and the LCP. If a parity error is detected by the LCP, then the LCP reports this in its result information transmission (Result Descriptor) and halts the operation. If the IOT detects a parity error, it is inserted in the LCP Result Descriptor.

The Input-Output Translator $10_t$ (IOT) consists of four major functional sections, each concerned with one particular aspect of input-output operation. These functional sections are shown in FIG. 5C. Further, the operating relationships between the IOT and the Main System (Processor and Main Memory) and also the LCP and the peripheral device, are also shown.

Referring to FIG. 5C, the Input-Output Translator $10_t$ communicates with the Processor 10 and the Main Memory $10_m$. The IOT $10_t$ also communicates with a selected LCP as Line Control Processor $20_{00}$ and the peripheral device 50. A series of control lines in FIG. 5C are shown from the Processor 10 to the Initiation Module $10_{ta}$, the Connection Module $10_{tb}$, the Data Transfer Module $10_{tc}$ and the Reconnection Module $10_{td}$.

Initiation Module

The Initiation Module $10_{ta}$ accepts the descriptor information, including the addresses, from the Processor 10, and then translates the descriptor OP code and assembles the information into a form usable by the LCP $20_{00}$. The A and the B addresses of the descriptor are stored in the IOT scratchpad memory $10_{ps}$, FIG. 3, which has locations reserved for each designated channel; the rest of the descriptor information is assembled in a register (as shown in FIG. 5D) for subsequent transmission to the LCP $20_{00}$. Once the information is assembled in this "descriptor information register" and the addresses are stored, then the contents of the first register are shifted to a second identical register. In this manner, the first register can be cleared and the Initiation Module $10_{ta}$ is thereby freed to accept a second descriptor.

The information contained in the IOT descriptor register of FIG. 5D consists of a number of items:

(a) LCP OP CODE: these are four mutually exclusive bits, which are translated by the IOT from the I/O Descriptor OP code; they indicate to the LCP the type of operation that is to be commenced.

(b) LCP Variants : these are three digits which are used to pass supplementary information to the LCP concerning the operation that is to be commenced.

(c) IOT Digit: this digit specifies if data transfers are to be inhibited and whether or not data is to be translated.

(d) Backwards Flag: when on, this flag bit indicates that a reverse operation is to occur.

(e) LCP Address: this is decoded from the "BF" (channel number) of the processor Initiate I/O instruction; this field contains three bits which specify one of the eight LCP Base Modules, and the other three bits which are used in combination to select a particular LCP in the designated Base Module.

(f) C Address: this is a six-digit C-Address field (file address) of the I/O Descriptor.

The combination of the IOT digit, the backwards flag, and the LCP address constitute the Descriptor Link (D/L) which is used by the LCP to re-establish connection to the System following a previous disconnection. When the Processor signals the IOT that the entire I/O Descriptor has been sent, the IOT disconnects from the Processor, and the Initiation Module $10_{ta}$ passes control to the Connection Module $10_{tb}$.

Connection Module:

The Connection Module $10_{tb}$ of FIG. 5C has the purpose of establishing a communication path between a designated LCP, such as LCP $20_{00}$, and the Input-Output Translator $10_t$. The Connection Module $10_{tb}$ decodes the channel number which appears in the Processor Initiate Instruction, and, with the decoded value, selects a communication path to the LCP Base Module such as $20_0$, FIG. 1A, in which the desired LCP is located. The Connection Module $10_{tb}$ then sends the LCP address to the selected LCP Base Module, and then signals the Base Module, such as $20_0$, to begin a "Poll Test".

Poll Test

The "Poll Test" is an algorithm used by the LCP Base Module to establish connection between the Base Module and a particular LCP; the Poll Test algorithm is a connection which is installed by the IOT (as contrasted with an algorithm called "poll request" which is a connection initiated by the LCP). Once the connection between the LCP Base Module and the specific LCP is established, the Base Module, such as $20_0$ of FIGS. 1A and 2, becomes transparent to data transfers between the LCP and the IOT. The "Poll Test" algorithm also checks for priority, transmission errors, and busy conditions, any one of which, if detected, could abort the connection attempt.

If the connection attempt is successful, the specific LCP remains connected to the IOT $10_t$ until the connection is terminated by the IOT. The LCP Base Module takes no further role in the communications between the chosen LCP and the IOT.

In the course of the attempted connection, certain conditions may be detected which will stop or abort the connection attempt, with the result that the existing condition is reported in the IOT Result/Descriptor. The following are the types of conditions detected and reported:

(a) The channel addressed does not contain an LCP or the LCP in the channel is off line.
(b) The LCP in the particular channel addressed is "busy", (that is, the LCP status is not 2 or 3; the use of "status counts" will be described hereinafter).
(c) The port is busy, that is, some other LCP in that Base Module is presently connected to the System 10.
(d) The LCP address has in it a parity error.

When the IOT and Base Module Distribution Control means uses the "Poll Test" for connection to a particular LCP, then if the Poll Test results in electrical "connection" to that LCP, the IOT $10_t$ will transmit the Descriptor Link (D/L), the LCP OP code and variants, and the C address to the LCP selected. After receiving this information, the LCP signals the IOT $10_t$ that it is either going to disconnect, or that it is now prepared to begin to transfer data. Typically, a "Write" operation (data from Main Memory $10_m$ to the peripheral device, such as peripheral 50) causes the LCP selected to request a "data transfer"; on the other hand a "Read" operation typically results in a disconnection.

If a "data" is requested, the Connection Module $10_{tb}$ passes control over to the Data Transfer Module $10_{tc}$. If the LCP $20_{00}$ "disconnected", then communication between the LCP $20_{00}$, and the IOT $10_t$ is terminated until the LCP requests a re-establishment of communication via the Reconnection Module $10_{td}$.

Data Transfer Module

In FIG. 5C the Data Transfer Module $10_{tc}$ is used by the IOT $10_t$ to control and to direct the flow of data between a connected LCP $20_{00}$ and the Main Memory $10_m$. The LCP may be in a connected state as a direct result of the actions of the Connection Module $10_{tb}$, or as a result of the actions of the Reconnection Module $10_{td}$; in either case the operation of the Data Transfer Module $10_{tc}$, is the same. When control is passed over to the Data Transfer Module $10_{tc}$, the A and B addresses of the descriptor are retrieved from IOT scratchpad memory $10_{ps}$ of FIG. 3, where they had been stored by either the Initiation Module $10_{ta}$, or by the Data Transfer Module $10_{tc}$ of FIG. 5C, at the end of a prior data transfer operation. A memory access request is made and the A address is transferred from the IOT $10_t$ over to the Processor memory address register $10_{pam}$ in the Main System 10, FIG. 3.

Assuming that a "Write" operation is in progress, in FIG. 5C, the data from the memory location specified by the A address is bussed bia $B_m$ to the IOT Data Transfer Module $10_{tc}$. Once in the module, the data is translated (if specified by the descriptor), and used to generate longitudinal parity, and then is gated via bus $B_g$ to the selected LCP such as LCP $20_{00}$, accompanied by a strobe pulse. When the LCP $20_{00}$ receives the data, it acknowledges the reception by returning a strobe pulse back to the IOT $10_t$.

While the data transfer from Memory $10_m$ over to the LCP $20_{00}$ is occurring, the IOT $10_t$ increments the A address and compares it to the B address. As long as the A address is less than the B address, the reception of the acknowledged strobe pulse from the LCP $20_{00}$ will cause another memory access to be requested and will allow the data transfer sequence to continue.

When the LCP buffer, such as $25_{00}$, FIG. 2, is filled with data from the Memory $10_m$, the LCP signals the IOT $10_t$ that it is going to disconnect; the IOT $10_t$ then restores the incremented A address to the IOT scratchpad memory $10_{ps}$, FIG. 3, and FIG. 5C-2, after which it terminates the connection between the IOT and the LCP. The LCP, such as LCP $20_{00}$, then begins data transmission via $B_p$ with its peripheral device 50; the IOT $10_t$ is now free to establish connection to another LCP.

Upon transferring the contents of its data buffer $25_{00}$ to the peripheral device 50, the LCP $20_{00}$ requests a re-establishment of the data path to Main Memory $10_m$. This re-establishment is handled by the LCP Base Module $20_0$ and the I0T Reconnection Module $10_{td}$.

In order to increase the overall rate of input-output (I/O) activity, the I0T $10_t$ may contain, as an option, an IOT Multiplexor. This multiplexor would enable the IOT to service an LCP during those memory cycles which would otherwise be lost while the I0T was busy with some non-memory function.

Reconnection Module

An LCP, such as $20_{00}$, after having been connected to the IOT $10_t$ and receiving the Command Descriptor (C/D) and the Descriptor Link (D/L), then the LCP $20_{00}$ may disconnect from the system in order to communicate with its associated peripheral device, such as device 50. Now, if that LCP subsequently requires access to Memory $10_m$, it sends a request to the Base Module $20_0$. An algorithm called the "Poll Request" is the method by which the LCP Base Module (in response to the request of the LCP) attempts to connect the LCP back to the IOT $10_t$. The Base Module Distribution Card contains hard wired logic to accomplish this. The purpose of the Reconnection Module $10_{td}$ is to acknowledge the "Poll Request" and to re-establish a data path over to the IOT $10_t$.

The Reconnection Module $10_{td}$, during the reconnection attempt, and working with the Base Module, as $20_0$, resolves any priority conflicts that may arise between various requesting LCP's. When priority is resolved, the Reconnection Module establishes the data path from the requesting LCP over to the Main Memory $10_m$.

Once the data path is re-established, the LCP returns the Descriptor Link over to the IOT $10_t$. (The Descriptor Link was originally passed to the LCP $20_{00}$ during the original connection sequence). The Base Module $20_0$ takes no further role in the LCP-IOT communication. Following the transfer of the Descriptor Link, the Reconnection Module $10_{td}$ passes control to the Data Transfer Module $10_{tc}$.

The IOT $10_t$ must have the ability to accept, store and to modify data field addresses in order to transfer data to and from the correct memory locations. Because Main Memory $10_m$ may include up to two-million digits (addresses 0 to 1,999,999), and because the various input-output devices may address the Memory $10_m$ directly, then the I/O descriptor data field addresses must be seven digits long. An I/O descriptor data field address must be either MOD 2 or MOD 4 (modulus is abbreviated to MOD); no odd addresses are permitted. Because odd addresses are not allowed, the least significant bit of the least significant digit is not required. Furthermore, since the most significant digit can be only a "1" or a "0", only one bit is required for the digit position. With these facts, it is possible to construct a seven digit address using 24 bits. The format for the I/O descriptor data field address is shown in the table V below.

TABLE V

| Bit Value | G | F | E | D | C | B | A | Digit Position |
|---|---|---|---|---|---|---|---|---|
| 8 | ✗ |   |   |   |   |   |   |   |
| 4 | ✗ |   |   |   |   |   |   |   |
| 2 | ✗ |   |   |   |   |   |   |   |
| 1 |   |   |   |   |   |   | ✗ |   |

I/O Descriptor Data Field Address
Note:
 indicates bit not used; must be zero In the address, the digit G may be a one or a zero, digits B through F may be any decimal value (0 through 9), and digit A may be any even decimal value (0 through 8).

As was indicated in FIG. 3, the IOT $10_t$ has a scratchpad memory 10. This is shown in greater detail in FIG. 5F. The IOT contains 256 words of scratchpad memory, each word of which is 24 bits long. As seen in FIG. 5F, the scratchpad memory is divided into five major areas. The areas marked A and B are used to store the begin (A) and the end (B) addresses of the memory data field; both of these addresses are 24 bits long. The areas marked EXRDW 1 and EXRDW 2 are used to store extended result descriptors wherein each of these words are 16 bits long. The area marked "temporary storage" is used to store flags indicative of errors detected during IOT operation. When the Result Descriptor is assembled, the information from the temporary storage area is added to any existing Result Descriptor information. Each of the five major areas is subdivided into 64 individual locations, one for each channel.

The scratchpad locations are addressed by a combination of eight bits which represent the Base Module number and the LCP number, the end address flag (ADDRESB), and the extended result descriptor flag (EXRDW 1). The six least significant bits of the scratchpad address (Base Module number and LCP number) are derived from the BF portion of the Processor's Initiate Instruction (BFA=base number, BFB=LCP number). The EXRDW 1 signal is generated by the IOT $10_t$ whenever access is required to either the extended Result Descriptor word, or to the temporary storage area. ADDRESB is generated by the IOT whenever access is required to a B address or to the second extended Result Descriptor area.

The memory elements of the scratchpad $10_{ps}$ consist of 24 RAMS ($256 \times 1$), organized in a $64 \times 4 \times 24$ array (64 channels, 4 words per channel, 24 bits per word). As seen in FIG. 5G, the eight-bit address bus, $B_{ad}$, goes to all RAMS, $60_0, 60_1 \ldots 60_{24}$, in the array, as does the Write Enable line 68. Each RAM has one data input line and one data output line; these individual data lines are combined to make up the data input (RAMIN) $70_1$ and the data output (RAMOUT) $70_0$ busses respectively.

When the scratchpad address is applied to the array, and the "Write Enable" is made active, the data on the IOT address bus is written into the RAMS. In order to read from the scratchpad, the desired location must be specified with the scratchpad address and the "read enable" must be made active. The requested data is then transferred from the scratchpad to the IOT address bus.

Address Store:

During the execution of an Initiate I/O Instruction, the Processor $10_p$ assembles the beginning (A) and the ending (B) addresses of the data field. The Processor then transfers the complete A address from the Processor register $10_{pr}$ to the IOT address bus. At the proper point of the IOT initiation sequence, the IOT generates the appropriate signals, then gates the Base Module and the LCP address bits to the scratchpad $10_{ps}$. Now, with the channel's scratchpad location addressed and with the "Write Enable" active, the A address can be written into the scratchpad. Subsequently the Processor $10_p$ places the end (B) address on to the IOT address bus and again the IOT generates the proper control signals along with the Base Module and LCP address. This time, however, the IOT also generates ADDRESB, thus causing the address on the bus to be written into the B address area of the scratchpad (FIG. 5F). The beginning and ending addresses of the data field have now been stored in the channel's address memory scratchpad $10_{ps}$. When the data transfer operation begins, these scratchpad locations will be accessed by the Data Transfer Module $10_{tc}$ (FIG. 5C).

Input/Output Translator: Detailed Description

The following sections will describe in detail the elements and operating functions of the Input/Output Translator as follows:

I. Glossary of terms and signals.

II. Description of hardware and elements of FIGS. 5C-1 through 5C-29.

III. Description of operations and functions of Input/Output Translator

I. The attached glossary of terms and signals will define the acronyms used in the detailed drawings of the Input/Output Translator and will also define and describe their basic functions. Hereinafter, generally, the acronyms will be used without further detailed explanation except in certain instances where a newly introduced acronym is used.

| Term | GLOSSARY (INPUT/OUTPUT TRANSLATOR) Definition and Function |
|---|---|
| AASCII | A OP Buffer ASCII Flag. Indicates that the descriptor in the A OP buffer requires ASCII translation. |
| ABASEn | Base Address Bit (n = 1,2, or 4). These three bits specify the base to which the descriptor in the A OP buffer is directed |
| ACCNCLF | Conditional Cancel Flip-flop. Indicates that a Conditional Cancel descriptor is in the A OP buffer. |
| ACVALDF | C Address Valid Flip-flop. Indicates that the descriptor in the A OP buffer contains a C address. |
| ADxn | Address Bus (x = A thru G, n = 1,2,4, or 8). The ADxn bus is bidirectional between the processor and the IOT. Within the IOT, ADxn is the path between the address register and the address memory scratchpad. Refer to FIG. 5C-2 for a representation of ADxn functions. |
| ADCM = n | Address Compare = n. ADCM = n is generated by the subtraction of CMR from the address register. The value of n is the absolute difference between the two registers, and represents the amount (in digits) remaining in the data field. |
| ADDERF | Address Error Flip-flop. Indicates that the IOT has incorrectly incremented the data-field address during the data transfer. |
| ADDRESB | B Address. ADDRESSB is used as the MSD of the IOT scratchpad address. When true, ADDRESSB causes the second half of the scratchpad to be accessed. See FIG. 5F. |
| ADMOD2 | Address is Mod 2. When true, ADMOD2 indicates that the address in the address register is mod 2. |
| ADDR | IOT Address Register, FIG. 5C-2. |
| ADRxn | Address Register Output Bus (x = A thru G, n = 1,2,4, or 8). ADRxn is the input to the CMR register and is also used as one of the inputs to the address adder. See FIG. 5C-2. |
| ADSLn | Address Select n (n = 0 thru 7). Address Select for base number n. See ADSELF. |
| ADSELF | Address Select. Address Select is a signal which is sent to a base during poll test. If the poll test is successful and the connection is made, Address Select remains true for the duration of the connection. |
| AECHO | A OP Buffer Echo OP Flag. Indicates that the A OP buffer contains an Echo descriptor. |
| AEXRDF | A OP Buffer Extended Result Descriptor Flag. Indicates that the A OP buffer contains an Extended R/D descriptor |
| AFULF | A OP Buffer Full Flip-flop. Indicates that the A OP buffer contains a complete descriptor. |
| AGLINHF | Access Granted Level Inhibit Flip-flop. Indicates that no other devices will be granted access to memory during the course of an Initiate I/O. |
| ALNINE | All Nines. ALNINE is a result of the ADDR-CMR subtraction; when the six most significant digits of the result are all nines, the least significant digit (LSD) contains the complement of the difference (in digits) between the A and the B addresses. |
| ALZER | All Zeros. ALZER is a result of the ADDR-CMR substraction; when the six most significant digits of the result are all zeros, the LSD contains the difference (in digits) between the A and the B addresses. |
| AR-CMR | Address Register Minus Compare Register. AR-CMR |

-continued

GLOSSARY (INPUT/OUTPUT TRANSLATOR)

| Term | Definition and Function |
|---|---|
| | causes the contents of CMR to be substracted from the contents of ADDR. The result is the amount of memory remaining in the data field. (See FIG. 5C-2). |
| AREAD | A OP Buffer Read Descriptor Flag. Indicates that the A OP buffer containns a Read descriptor. |
| AS-EB | ASCII-EBCDIC Translate. AS-EB activates the IOT translator; if a read is in progress, the data is translated from ASCII to EBCDIC, and if a write is in progress, the data is translated from EBCDIC to ASCII. |
| ATEST | A OP Buffer Test Descriptor Flag. Indicates that the A OP buffer contains a Test descriptor. |
| AUCNCLF | A OP Buffer Unconditional Cancel Flip-flop. Indicates that the OP buffer contains an Unconditional Cancel descriptor. |
| AWRITE | A OP Buffer Write Descriptor Flag. Indicates that the A OP buffer contains a Write descriptor. |
| BnHGH | When true, BnHGH indicates that the base module connected to the bottom half of driver card n (n = 1,2,3, or 4) has presented a higher global priority than the base connected to the top half. |
| BACKOP | Backwards Operation Flag. When true, BACKOP indicates that the operation in progress is a backward operation. |
| BADRS | B Address. BADRS is the term used in the IOT scratchpad to address the second half of the scratchpad. (See FIG. 5F). |
| BASEnP | BASE n PRESENT (n = 0 thru 7). When true, BASEnP indicates that the specified base is present in the system. |
| BCCNCLF | B OP Buffer Conditional Cancel Flip-flop. When set, BCCNCLF indicates that the B OP buffer contains a Conditional Cancel descriptor. |
| BECHO | B OP Buffer Echo OP Flag. Indicates that the B OP buffer contains an Echo descriptor. |
| BENB | B Enable. When true, BENB enables data bus B onto the base driver card, BENB is derived from the ENBCHn terms, FIG. 5C-8, which specify both the driver card and the data bus to which the driver card is to be connected. |
| BEXRDF | B OP Buffer Extended R/D Flip-flop. See AEXRDF. |
| BF | B OP Buffer Descriptor Flip-flop. When set, BF indicates that the descriptor to be executed is to be taken from the B OP buffer. |
| BF | B Field Variant. BF is that portion of the Initiate instruction which specifies the channel number of the device which is to be initiated. The MSD (most significant digit); BFA, specifies the base containing the LCP, and the LSD, BFB, specifies the address of the LCP within the specified base. |
| BFULF | B OP Buffer Full Flip-flop. When set, BFULF indicates that a complete descriptor is in the B OP buffer. |
| BLCPn | B OP Buffer LCP Address Bit n (n = 1,2, or 4). These three bits, derived from the BFB portion of the Initiate instruction, specify the address of the LCP within the addressed base. |
| BREAD | B OP Buffer Read Descriptor Flag. When true, BREAD indicates that the B OP buffer contains a Read descriptor. |
| BSEL | Bus Select. When true, BSEL enables the selection of a data path thru the IOT. See FIGS. 5C-6 and 5C-7. |
| BTEST | B OP Buffer Test Descriptor Flag. When true, BTEST indicates that the B OP buffer contains a Test descriptor. |
| BUCNCLF | B OP Buffer Conditional Cancel Flag. See AUCNCLF. |
| BUFFULF | Both Buffers Full Flip-flop. When set, BUFFULF indicates that both the A and the B buffers are full and that the IOT cannot accept another descriptor. |
| BWRITE | B OP Buffer Write Descriptor Flag. When true, BWRITE indicates that the B OP buffer contains a Write descriptor. |
| CCLUCL | Conditional/Unconditional Cancel Flag. When true, CCLUCL indicates that either a Conditional or an Unconditional Cancel descriptor is being executed. |
| CCNCLF | Conditional Cancel Flip-flop. When set, CCNCLF |

-continued

GLOSSARY (INPUT/OUTPUT TRANSLATOR)

| Term | Definition and Function |
|---|---|
| | indicates that a Conditional Cancel descriptor is being executed. |
| CEN | C Enables. CEN enables the C address of the descriptor from the selected OP buffer onto the IIO bus (see FIG. 5C-19). |
| CHNAF | Data Channel A Busy Flip-flop. When set, CHNAF indicates that the connection module, the reconnection module, or one of the data transfer modules is using data bus A (see FIG. 5C-7). |
| CHNBF | Data Channel B Busy Flip-flop. When set, CHNBF indicates that the connection module, the reconnection module, or one of the data transfer modules is using data bus B (see FIG. 5C-7). |
| CHNSELF | Channel Select Flip-flop. Channel Select is a signal which is sent to a distribution card to signal the start of a poll test operation. |
| CHSELn | Channel Select n (n = 1 thru 4). CHSEL is the designation for the Channel Select signal sent to the designated base. |
| CH8 | Channel Eight. When true, CH8 indicates that a descriptor has been issued for the IOT (the IOT is always designated as channel 8). |
| CMR | Compare Register. The Compare register is used to hold the subtrahend of the ADR-CMR subtraction. |
| CNnn | Connection Module Sequence Count nn (nn = 00 thru 08). |
| CNAF | Connection Module to Data Bus A Connection Flag. When set, CNAF indicates that the connection module is connected to data bus A. |
| CNASL | Connection Module Address Select Level. CNASL is the signal from the connection module which causes the Channel Select signal to be sent during the connection sequence. |
| CNBF | Connection Module to Data Bus B Connection Flip-flop. When set, CNBF indicates that the connection module is connected to data bus B. |
| CNDTnST | Connection Module Data Transfer Module n Start Level (n = 1 or 2), CNDTST is generated at CN08, FIG. 5C-18, time if the descriptor specifies that a data transfer is to occur immediately following the connection. |
| CNENCHn | Connection Module Enable Channel n (n = 1 thru 4). CNENCHn generates ENBCHAn or ENBCHBn, which connects driver card n to either data bus A or data bus B (FIG. 5C-1). CNENCHn also generates CHSELn (see FIGS. 5C-6 and 5C-8). |
| CNENTO | Connection Module Enable Timeout Level. When true, CNENTO starts the connection module timer; if more than 64 microseconds elapse between the transmission of ST10F and the reception of LCPSTF, the timer times out and the Timeout flip-flop is set. |
| CNGLPWF | Connection Module Gate LPW Flip-flop. When set, CNGLPWF causes the accumulated LPW to be transmitted to the distribution card. |
| CNLCP | Connection Module LCPSTF. CNLCP is LCPSTF as controlled by the connection module (see LCPSTF). |
| CNLCP<<0 | Connection Module Clear LCPSTF signal. |
| CNLPW<<0 | Connection Module Complement LPW (see LPW<<C). |
| CNLPW<<1 | Connection Module Initialize LPW (see LPW<<1). |
| CNRCSL | Connection Module Reconnection Module Start Level. |
| CNSIO | Connection Module STIOP (see STIOF). |
| CRDnBY | Driver Card n Busy (n = 1 thru 4). |
| CRDPRTn | Driver Card n Present (n = 1 thru 4). |
| CVALID | C Address Valid. When true, CVALID indicates that the descriptor being received contains a C address. |
| DAxn | Data Bus A Digit x Bit n (x = A thru D, n = 1,2,4, or 8). Data Bus A is one of the two paths between the data transfer modules and the base driver cards (see FIG. 5C-1). |
| DBxn | Data Bus B, Digit x Bit n (x = A thru D, n = 1,2,4,or 8). Data Bus B is one of the two paths between the data transfer modules and the base driver cards (see FIG. 5C-1). |
| DLB<<DL | Transfer Descriptor Link to Descriptor Link Bus. DLB<<DL transfers the descriptor link from the selected OP buffer to the Descriptor Link bus during the connection sequence. |
| DLBxn | Descriptor Link Bus digit x, bit n (x = A thru D, |

-continued

GLOSSARY (INPUT/OUTPUT TRANSLATOR)

| Term | Definition and Function |
|---|---|
| | n = 1,2,4, or 8). |
| DLR<<DAT | Transfer Data Bus to Descriptor Link Register. When true, DLR<<DAT transfers the data from the specified data bus into the Descriptor Link register (see FIG. 5C-2). |
| DTn | Data Transfer Module n (n = 1 or 2). |
| DTnAF | Data Transfer Module n to Data Bus A Connection Flip-flop (n = 1 or 2). When set, DTnAF indicates that the specified data transfer module is connected. |
| DTnENTO | Data Transfer Module n Enable Timer Level (n = 1 or 2). When true, DTnENTO starts a 64 microsecond timer at STIOF time. If the LCP does not respond with LCPSTF before the timer times out, the timeout flip-flop is set and a result descriptor is stored, reporting the error. |
| DTnGLPW | Data Transfer Module n Gate LPW (see GLPW). |
| DTnRCVxO | Data Transfer Module n Receive from Data Bus x (n = 1 or 2, x = A or B). The DTnRCVxO terms control the data path switching between the data transfer modules and the data busses for read operations (see FIG. 5C-11). |
| DTMPEF | Data Transfer Module Memory Parity Error Flip-flop. When set, DTMPEF indicates that a memory parity error has been detected. |
| EB<<AS | Translate ASCII to EBCDIC. If the translate bit is set in the IOT digit of a read descriptor, EB<<AS is generated to enable the translator during the data transfer sequence. |
| ECHO | Echo is a descriptor which causes the specified LCP to read data from memory, and then return that same data to the same area of memory. |
| EMOD2F | End Address Mod 2 Flip-flop. When set, EMOD2F indicates that the ending address of the descriptor is mod 2. |
| ENBCHxn | Enable Data Bus x to Driver Card n (x = A or B, n = 1 thru 4). The ENBCHxn terms are used during the connection sequence to connect one of the data bussses to the selected driver card. |
| EXRDF | Extended Result Descriptor Flip-flo. When set, EXRDF indicates that the LCP is storing an extended result descriptor. |
| EXRDWI | Extended Result Descriptor Word 1. EXRDW1 is used as address bit 64 of the IOT scratchpad memory, and as such, specifies those locations into which the extended result descriptor words are written. See FIG. 5F. |
| FRCBP | Force Bad Parity. If a memory parity error is detected, DTMPEE is set and FRCBP is generated. FRCBP then causes the parity error to be passed on to the LCP, which then makes the decision as to how the error is to be handled. |
| GLPWF | Gate Longitudinal Parity Word Flip-flop. When set, GLPWF causes the accumulated LPW to be transmitted to the LCP. |
| GOF | GOF is a substrate counter whose function is to flag various conditions that may occur within a logic state. The conditions flagged vary from state to state. |
| GOFF | GOFF is a substrate counter (see GOF). |
| GP | Global Priority. Global priority is the means by which the IOT determines which of several possible requesting LCPs is to be granted access to memory. |
| IIOxn | Initiate I/O bus digit x, bit n (x = A thru D, n = 1,2,4, or 8). The IIO bus transfer descriptor information from the OP buffer to the specified data bus. |
| ILSTCF | Illegal Status Flip-flop. When set, ILSTCF indicates that the IOT found the LCP to be in an incorrect status for the operation in progress. |
| INR | Information Register. The IN register is a four-digit register whose function it is to accept read data from memory for subsequent transfer to the LCP. The IN register also accepts information generated within the IOT and transfers that information to memory (see FIG. 5C-13). |
| INF | IN (Register) Full Flip-flop. When set, INF indicates that the IN register has received data. |
| INTJ | Set Processor Interrupt. When true, INTJ indicates |

-continued

| | GLOSSARY (INPUT/OUTPUT TRANSLATOR) |
|---|---|
| Term | Definition and Function |
| | that an I/O operation has been completed and that processor attention is required. |
| INTREQ | Interrupt Request. When truw, INTREQ indicates that a LCP requires access to memory and has sent its global priority level to the IOT. |
| IOCBF | I/O Compare Bus Flip-flop. When set, IOCBF indicates that the descriptor data field addresses are equal, or nearly so. |
| IOCPTM | I/O Clock Pulse Time. When true (MTCF/ * QTCF), IOCPTM allows one I/O clock pulse to go to the IOT. |
| IOTADL | IOT Address Load. When true, IOTADL enables the loading of the descriptor address into the IOT address memory scratchpad (FIG. 5C-2). |
| LPW | Longitudinal Parity Word. The LPW is a means of checking the validity of information transferred between the IOT and the connected LCP. The LPW is generated in the transmitting device by treating each word transferred as a 16-bit number and performing the binary addition (without carry) of each word in the transmission. The final sum of the additions is transmitted to the receiving device at the end of the operation; that sum is then added to a sum generated in a similar manner in the receiving device. If no errors are detected in the transmission, the addition of the two sums will yield a zero result. If an error had occurred, the addition would yield a non-zero sum. |
| LPW<<C | Complement LPW. When true, LPW<<C causes the word being transmitted to be added to the LPW sum being accumulated. |
| LPW<<1 | Initialize LPW. At the start of an information transfer, the LPW is initialized by forcing all bits in the LPW register to 1. |
| MAGF | Memory Access Granted Flip-flop. |
| MARF | Memory Access Request Flip-flop. |
| OTB | Output Buffer. The OTB is that portion of the IOT whose function it is to establish data paths thru the IOT and to handle all data transfers within the IOT (see FIG. 5C-1). |
| OTB = O/ | OTB Not Equal to Zero. Used at result descriptor time, OTB = O/ indicates that some error condition exists (the result descriptor is in the OTB register when this signal is active). |
| OTBR | Output Buffer Register. The OTBR is a four-digit register in the data transfer module (see FIG. 5C-13). |
| OTBF | Output Buffer (Register) Full Flip-flop. |
| OURCH | Our Channel. When true, OURCH indicates that the IOT has detected that the IIO instruction in progress is for a base and LCP and that the IOT must store the IIO information. |
| RAMIN | RAM Input. RAMIN is the data input to the address memory RAM chips. |
| RAMOUT | RAMOUT is the output bus from the address memory RAM chips. (See FIG. 5G). |
| RCnn | Reconnect Module Sequence Count nn. |
| RCADSL | Reconnect Module Address Select Level. See Address Select. |
| RCAF | Reconnect Module to Data Bus A Connection Flip-flop. When set, RCAF indicates that the reconnect module is connected to data bus A. |
| RCBF | Reconnect Module to Data Bus B Connection Flip-flop. When set, RCBF indicates that the reconnect module is connected to data bus B. |
| RCDTSL | Reconnect Module Data Transfer Module Start level. When true, RCDTSL indicates that the reconnection sequence is complete, and passes control to the data transfer module. |
| RCENCHn | Reconnect Module Enable Channel n (n = 1,2,3, or 4). When true, RCENCHn generates the data bus to driver card enable signals (ENBCHxn) and the Channel Select levels required to estabish a data path within the IOT (see FIG. 5C-8). |
| RCENTO | Reconnect Module Enable Timeout Level. |
| RCLPW | Reconnect Module LPW. See LPW. |
| RCLPW<<C | Reconnect Module Complement LPW. See LPW. |
| RCLPW<<1 | Initialize Reconnect Module LPW. See LPW<<1. |
| REG | Auxiliary Register. REG is a two-digit register |

-continued

GLOSSARY (INPUT/OUTPUT TRANSLATOR)

| Term | Definition and Function |
|---|---|
| | in the data transfer module which is used for character shifting in mod 2 operations. See FIGS. 5C-13, 5C-22, 5C-23. |
| STC = nn | LCP Status Count = nn (nn = 0 thru 15). The LCP status counts are used by the LCP to inform the IOT of the action the LCP is currently executing, and to inform the IOT of the action it is to take in response to the LCP's actions. |
| STIOF | Strobe I/O Flip-flop. The Strobe I/O flip-flop is used by the IOT to signal the LCP or the distribution card that a transfer of information has occurred. Upon receipt of the information, the LCP responds with LCPSTF and status |
| TnHGH | When true, TnHGH indicates that the top half of driver card n (n = 1,2,3, or 4) has received a higher global priority than has the bottom half. |
| TIMOUTF | Timeout Flip-flop. At the time the IOT sets STIOF, it also starts a 64 microsecond timer. When LCPSTF is received, the timer is reset. IF LCPSTF is not received before the timer times out, TIMOUTF is set, and an IOT TIMEOUT result description is written. |
| VPERRF | Vertical Parity Error Flip-flop. When set, VPERRF indicates that a parity error was detected on a word transfer from the LCP. |
| ZnnnGDxx | GROUND. Ground potential. |
| ZnnnM2xx | Minus 2 volts. |
| ZnnnP5xx | Plus 5 Volts |

II. cl DESCRIPTION OF HARDWARE AND ELEMENTS OF INPUT-OUTPUT TRANSLATOR

In FIGS. 5C-1, 5C-1a there is seen an overall block diagram showing the relationship of the Input-Output Translator Module to the rest of the system.

The Main Processor $10_p$ provides input-output descriptors to the Initiation Module $10_{ta}$ which then activates the Connection Module $10_{tb}$ and the Data Transfer Modules $10_{tc}$. The first and second Data Transfer Modules $10_{tc}$ connect to Main Memory $10_m$ by means of memory write bus $B_{10W}$ (MWB) and and memory read bus $B_{10R}$ (MRB). The above-mentioned IOT modules and the Reconnection Module $10_{td}$ operate through an output buffer $10_{OTB}$ to connect to either data bus A, $D_A$ or to data bus B, $D_B$. The data busses connect to four base drivers $10_{d1}$, $10_{d2}$, $10_{d3}$ and $10_{d4}$. These drivers each handle two Base Modules so that the four drivers handle Base Modules $20_0$-$20_7$.

FIG. 5C-2 shows the elements involved in addressing of the Input-Output Translator $10_t$. A multiplexor 63 receives memory address and other control signals which are transmitted to the IOT address register 60, which transmits to a dual buffer driver $M20_e$ and also to a comparison register 61, thence to a dual buffer S05 and over to Adder 62. The IOT address register 60, the comparison register 61 and the adder 62 are in the Data Transfer Module $10_{tc}$. Also providing input to the multiplexor 63 is the processor address register $10_{pr}$. Register $10_{pr}$ also provides signals to memory address register $10_{pam}$.

Data busses A (DAxn) and B (DBxn) connect to multiplexor 64 which transmits signals to a quad J-K flip-flop M11 which connects to dual quad buffer driver $M20_a$ whose output is connected to multiplexor 65, thence to a register 66 which is designated as the Data-Link Register (DLR). The output of the Data-Link Register is connected to buffer drivers $M20_c$ and $M20_b$ whose output is connected to the RAM scratchpad memory $10_{ps}$. The scratchpad addresses from the Processor $10_p$ are also fed to the IOT scratchpad memory $10_{ps}$. The address bus $AD_{xn}$...O conveys its signals to a level changer 67. The output of IOT scratchpad memory $10_{ps}$ is connected to another level changer 68 which connects to buffer driver $M20_d$. The references B/C and C/B on the level changers 67, 68 refer to BCML or Burroughs Current Mode Logic (B) and the C refers to CTL or Complementary Transistor Logic.

Thus, in order to transfer data to and from the correct memory locations, the IOT must have the ability to accept, store, modify data field addresses. This is implemented by the elements shown in FIG. 5C-2.

FIG. 5C-3 shows the elements involved in transferring the descriptor link from the OP buffers $M11_a$ and P14 on to the descriptor link bus (DLB). The descriptor link in FIG. 5C-3 comes from the main system on the Read Bus into the B and the A OP buffers, $M11_a$ and P14; it is then passed through the quad 4-1 multiplexor $M01_a$ and thence to dual quad buffer drivers $M20_f$, $M20_g$, and $M20_h$, which have outputs which form the II0 bus (initiate input-output) and the Descriptor Link Bus.

Figures 4, 5C:
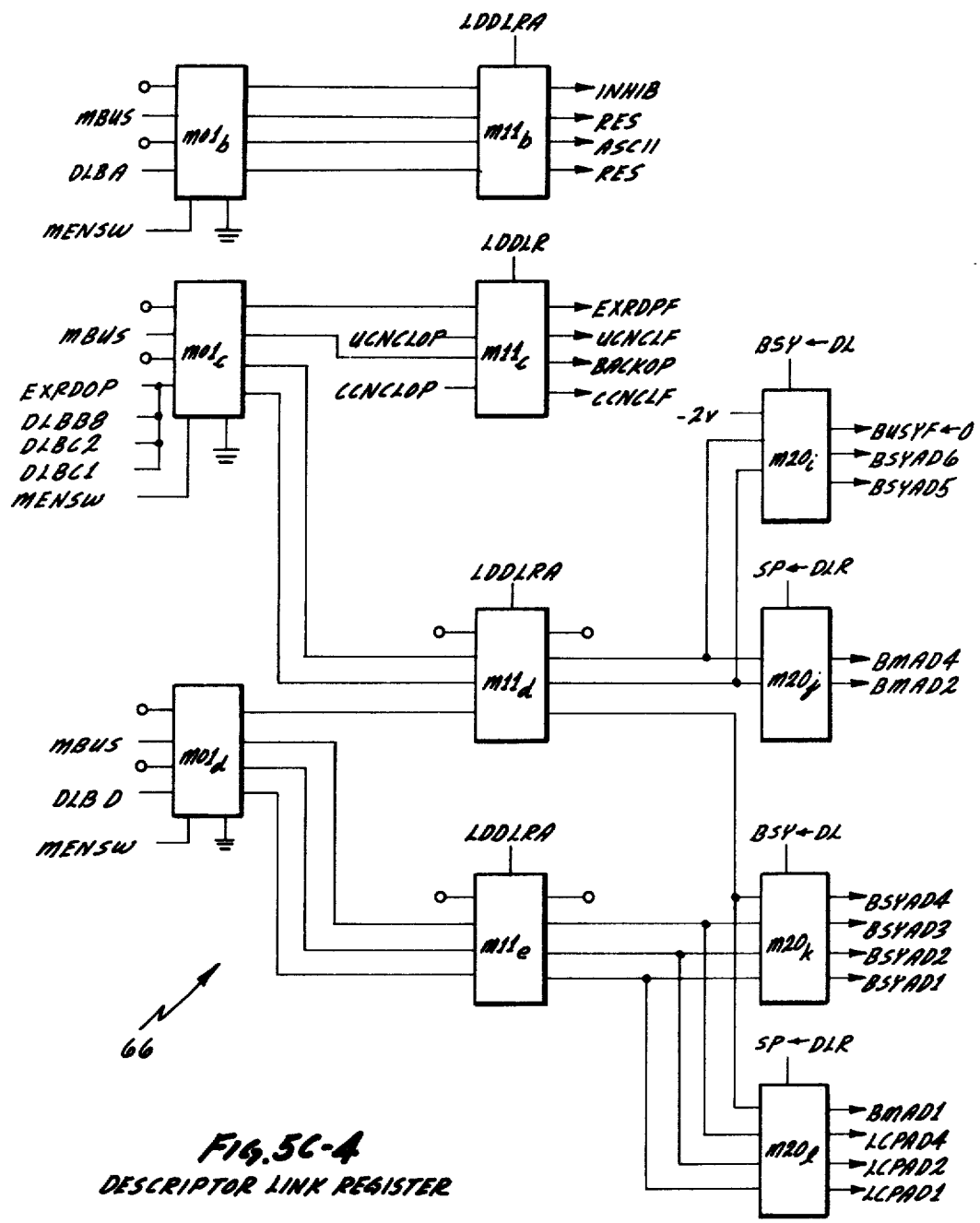

The Descriptor Link Register (DLR) 66 of FIG. 5C-2 is shown in more detail in FIG. 5C-4. The input and control signals enter a series of quad 4-1 multiplexors $M01_b$, $M01_c$, $M01_d$. The outputs of these multiplexors are then fed to a series of four quad JK-D flip-flops $M11_b$, $M11_c$, $M11_d$, $M11_e$. The outputs of the last two flip-flops are then fed to a group of dual quad buffer drivers $M20_i$, $M20_j$, $M20_k$ and $M20_l$. Thus, there has been enabled the loading of the descriptor link from the bus into the descriptor link register 66 of FIG. 5C-4.

Figures 5, 5C:
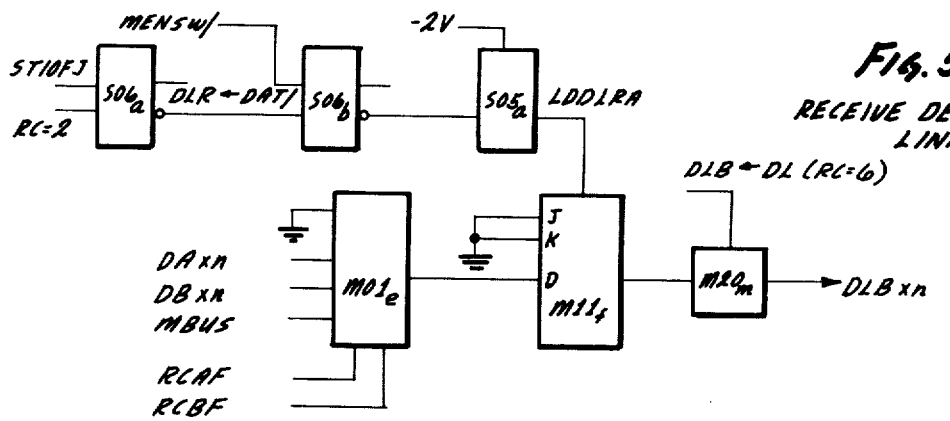

FIG. 5C-5 shows the elements involved in storing the descriptor link word into a temporary holding register. The memory bus MBUS and the data busses A and B input to a quad 4-1 multiplexor $M01_e$, which feeds its output to a quad JK-D flip-flop $M11_f$; the output of $M11_f$ is fed to a dual quad buffer driver $M20_m$, whose output forms the descriptor link bus, DLBxn. The JK-D flip-flop $M11_f$ is gated by a signal LDDLRA (Load Descriptor Link Register A) which signal derives from control signals from dual quint buffer S05$_a$, hex 2 input AND gate S06$_b$, and AND gate S06$_a$. Flip-flop outputs from the Reconnection Module to data bus A and data bus B are shown as input signals RCAF, RCBF.

Figures 5, 5C, 6, 7, 8, 9:
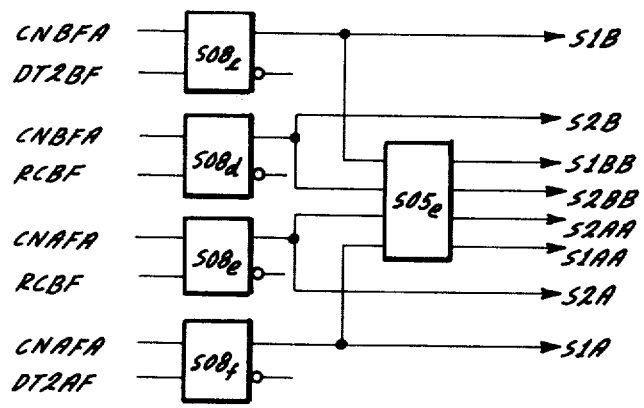
Figures 5, 5C, 6, 7, 8, 9, 10:
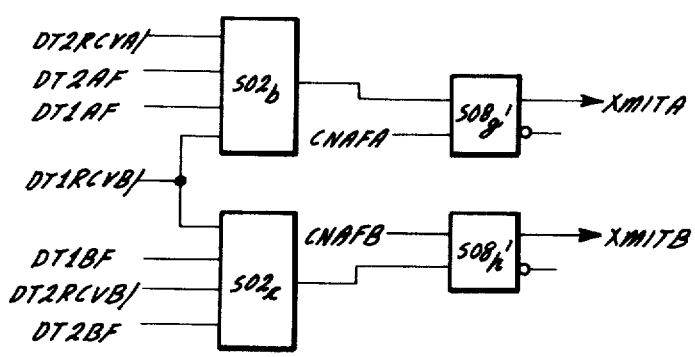
Figures 5, 5C, 6, 7, 8, 9, 10, 11:
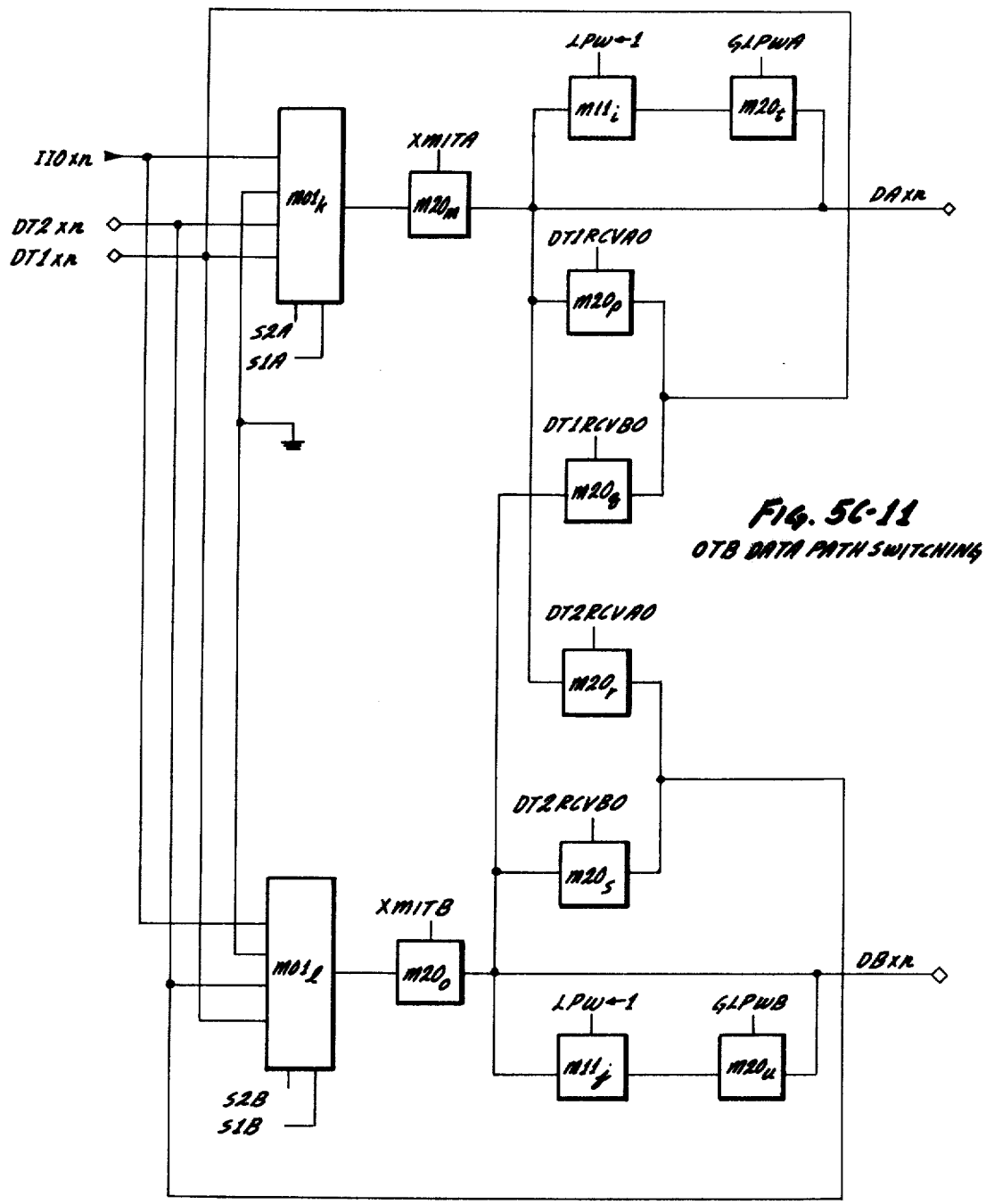
Figures 5, 5C, 6, 7, 8, 9, 10, 11, 12:
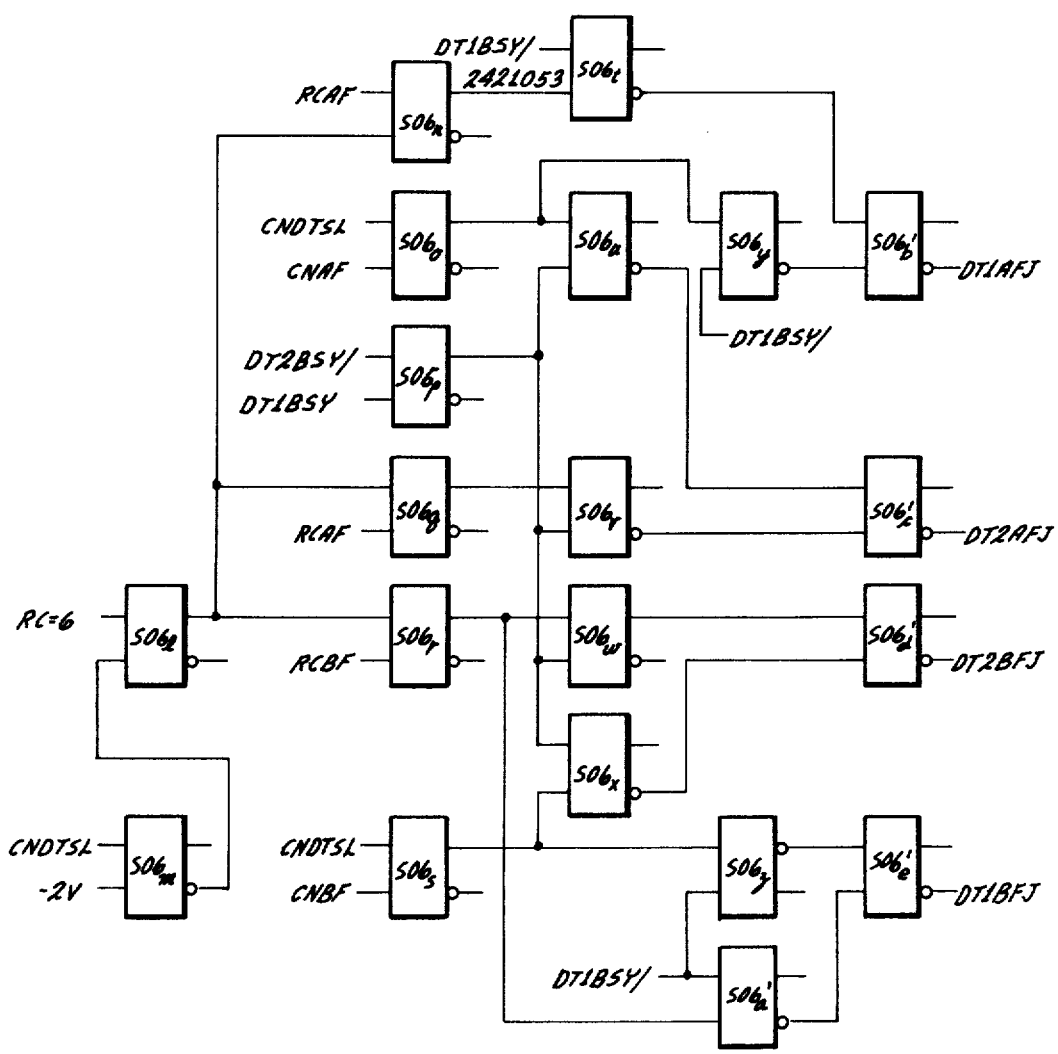
Figures 5, 5C, 6, 7, 8, 9, 10, 11, 12, 13, 14:
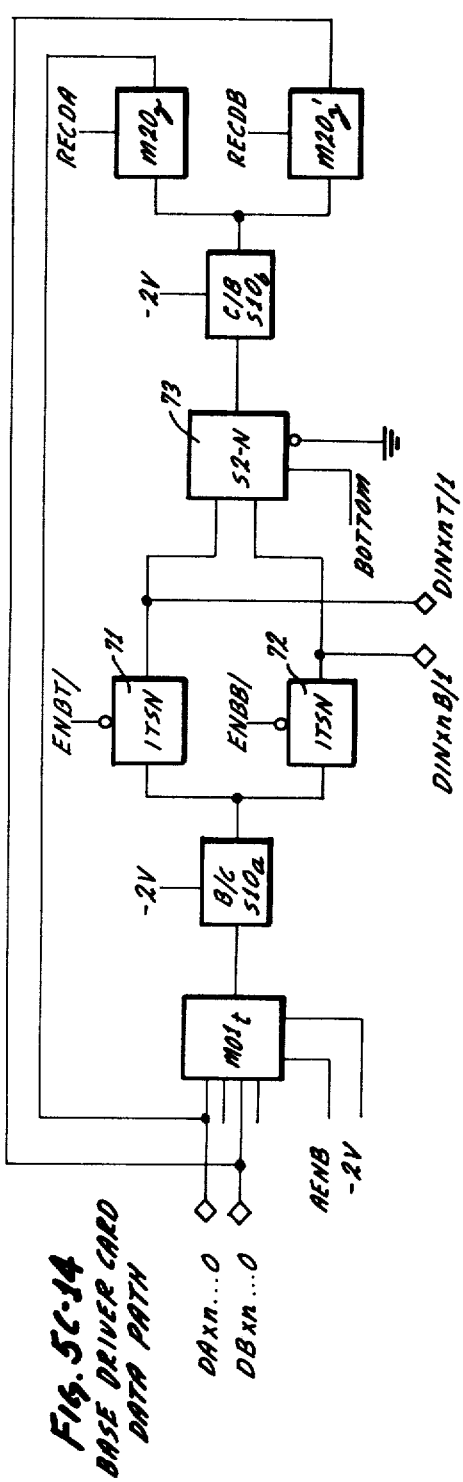
Figures 5, 5C, 6, 7, 8, 9, 10, 11, 12, 13, 14, 15, 16, 17:
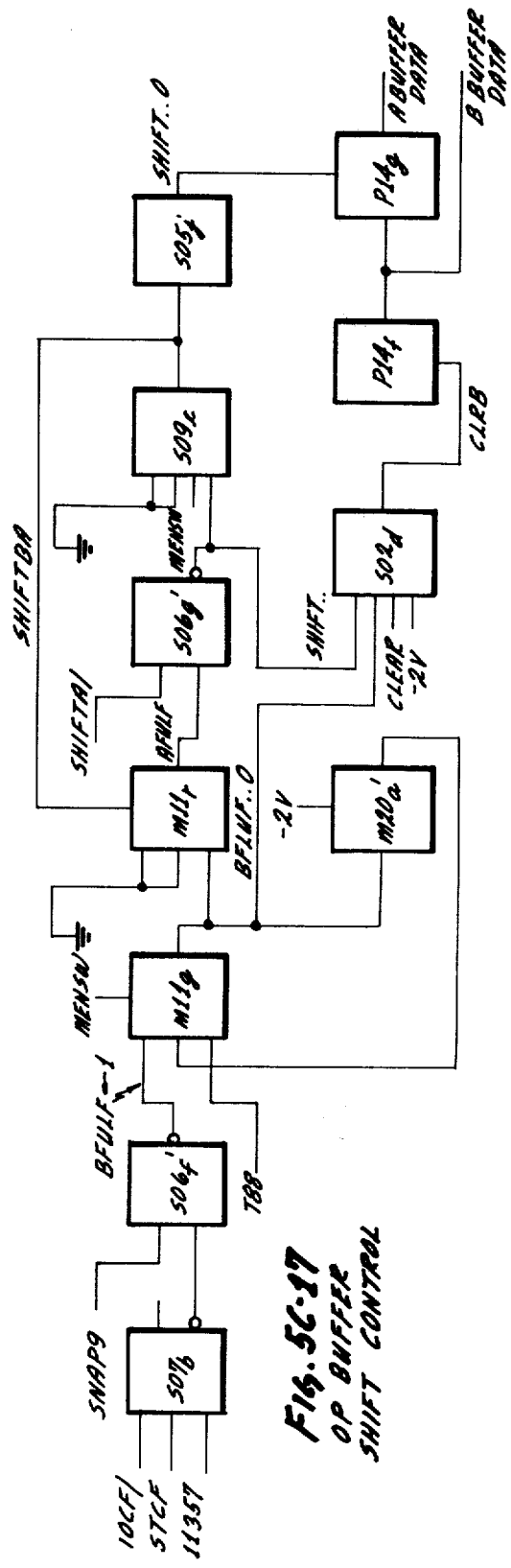
Figures 5, 5C, 6, 7, 8, 9, 10, 11, 12, 13, 14, 15, 16, 17, 18:
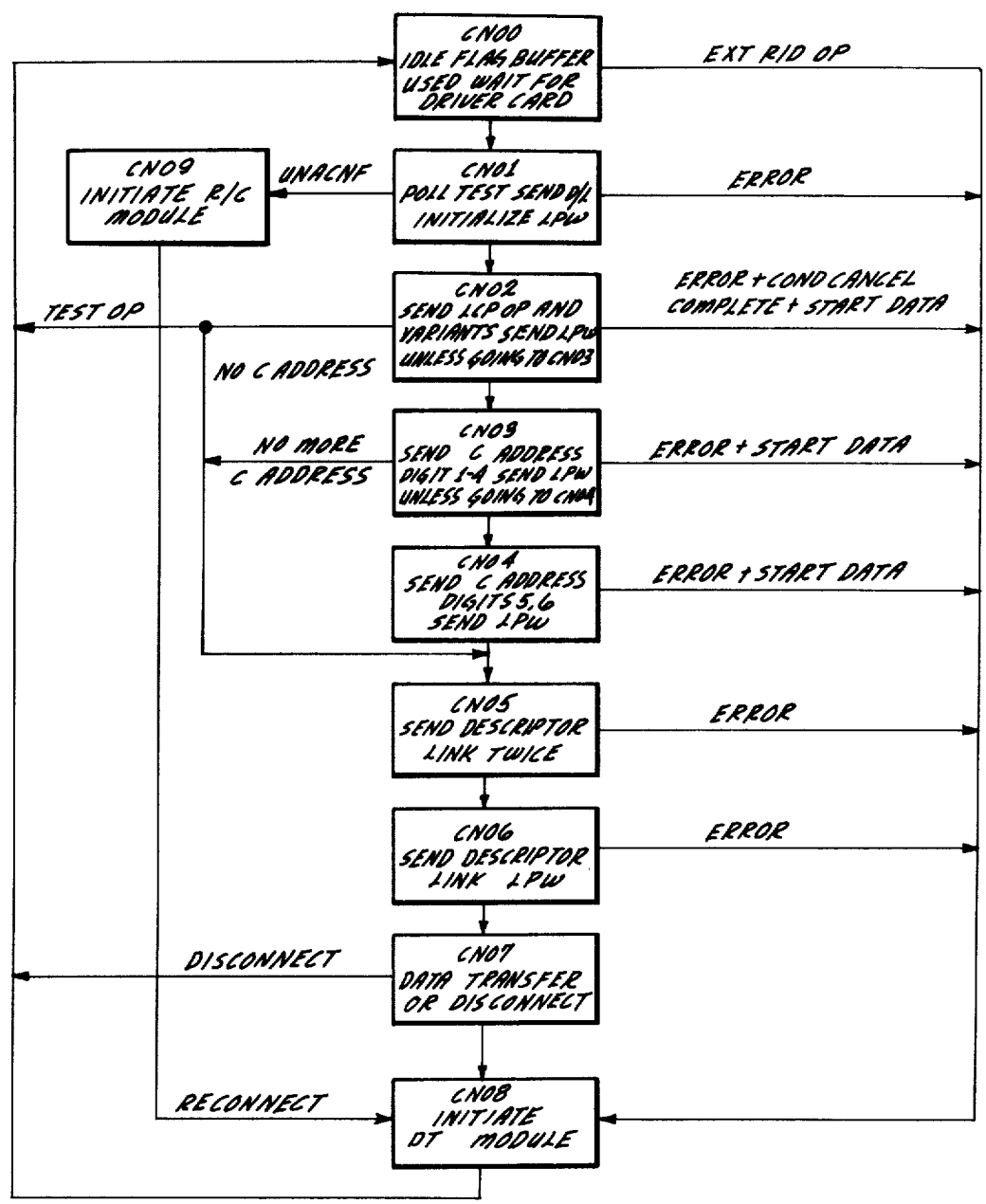
Figures 5, 5C, 6, 7, 8, 9, 10, 11, 12, 13, 14, 15, 16, 17, 18, 19, 20:
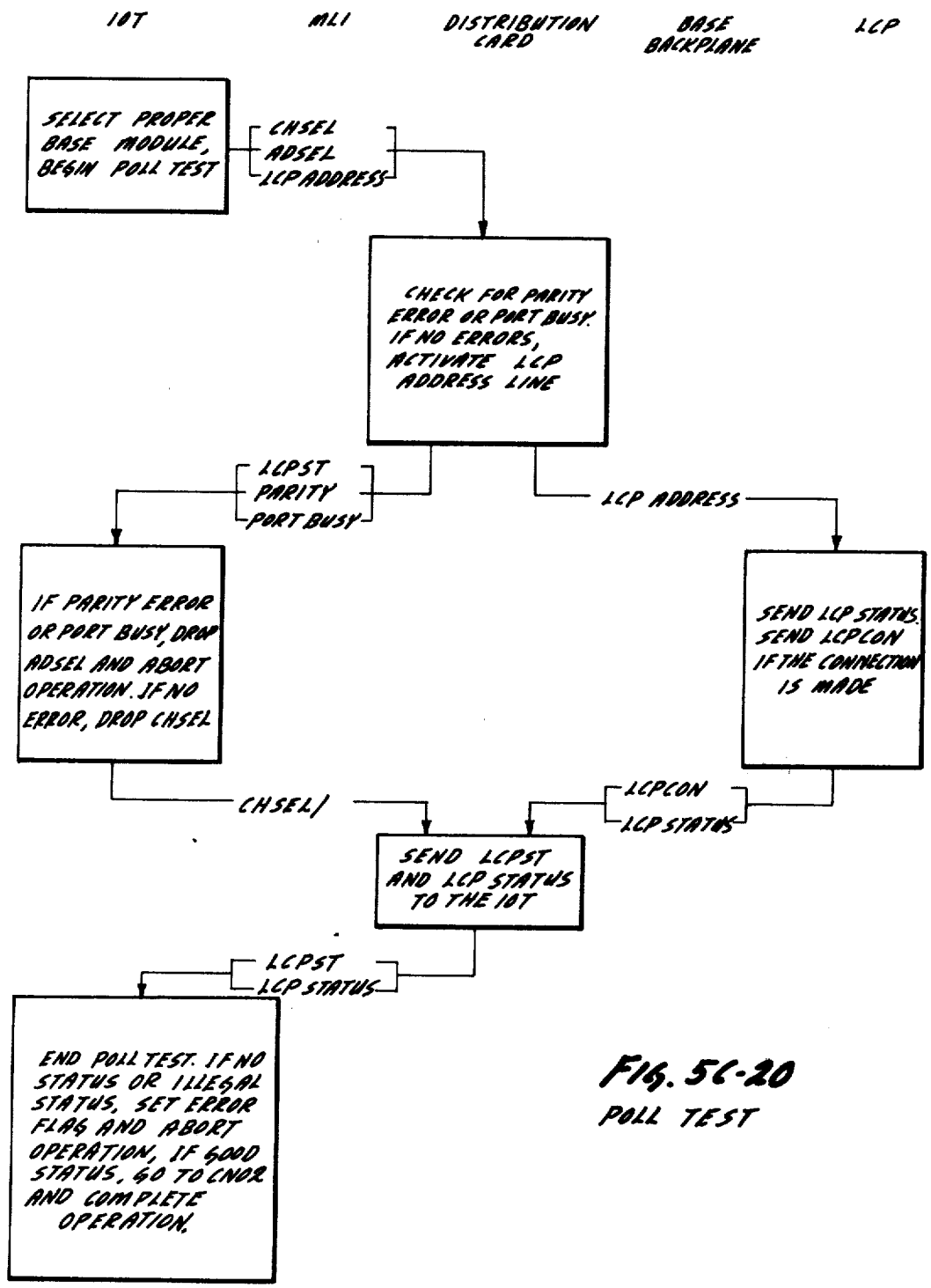
Figures 5, 5C, 6, 7, 8, 9, 10, 11, 12, 13, 14, 15, 16, 17, 18, 19, 20, 21, 22, 23, 24, 25, 25A:
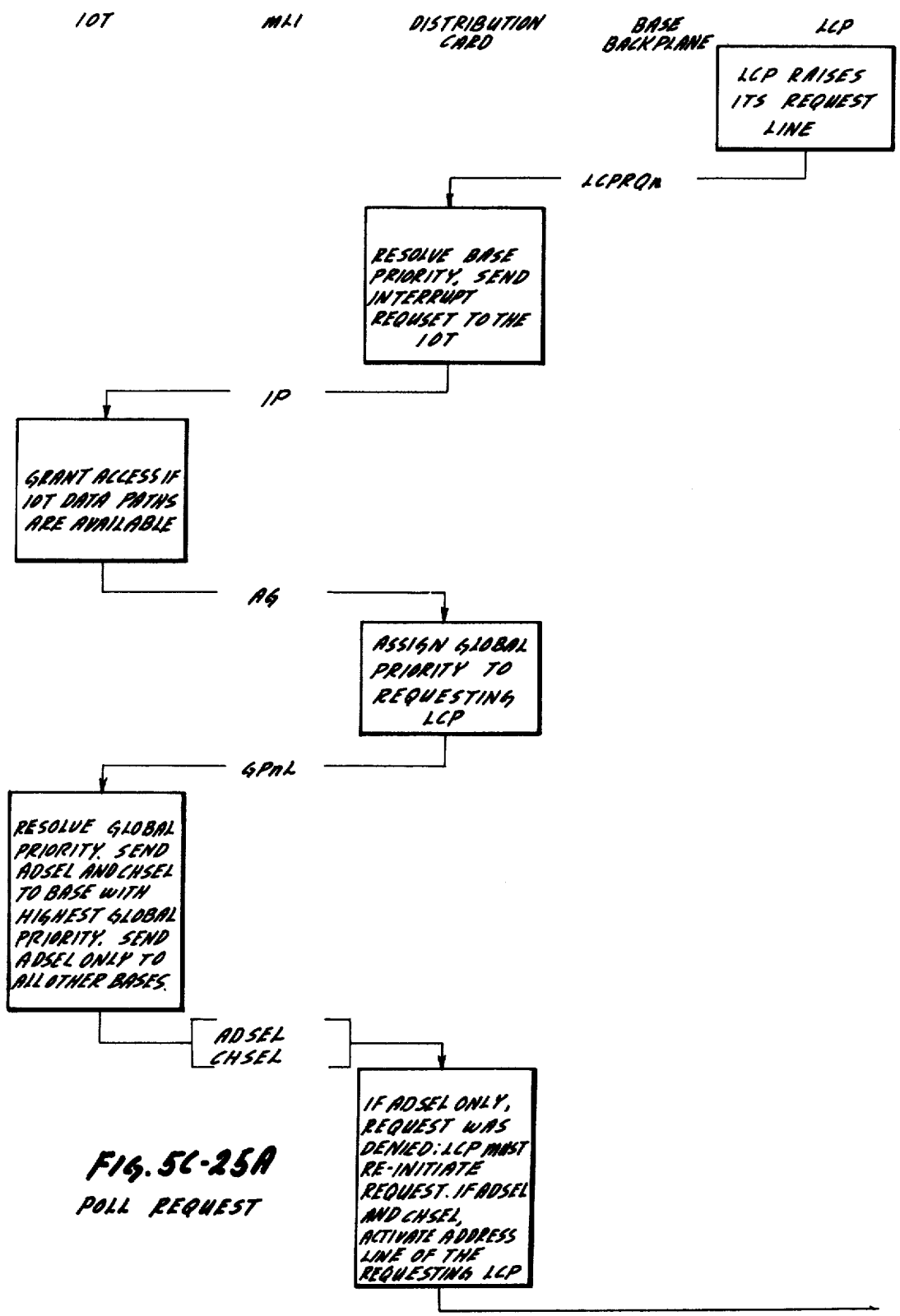
Figures 5, 5C, 6, 7, 8, 9, 10, 11, 12, 13, 14, 15, 16, 17, 18, 19, 20, 21, 22, 23, 24, 25, 25B:
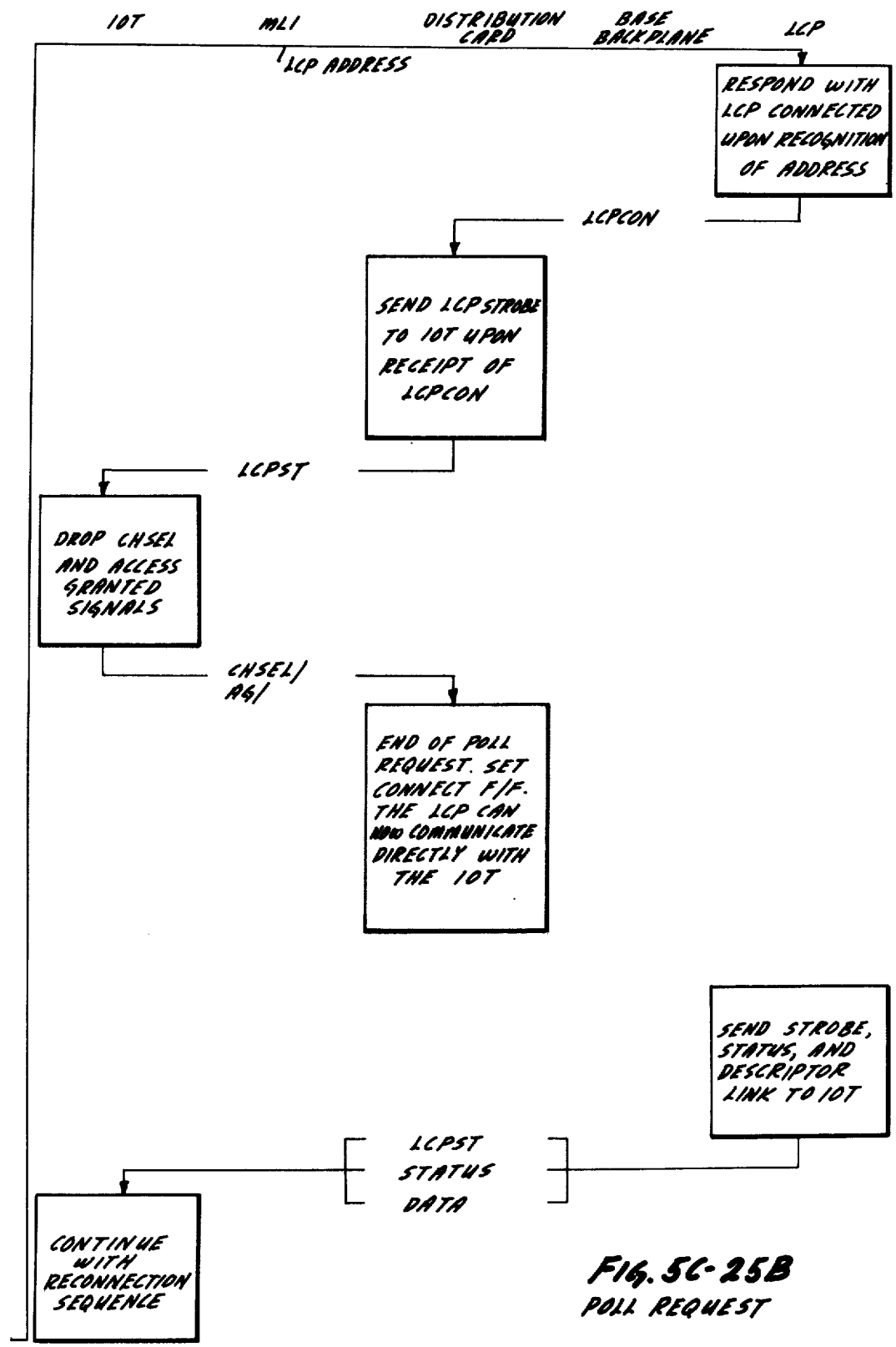

FIG. 5C-6 shows the Connection Module where the terms A BASEn or B BASEn terms are used as input selects for a pair of multiplexors, M01$_f$ and M01$_g$. The input to these multiplexors are the "busy" levels from the four base driver cards 10$_{d1}$, 10$_{d2}$, 10$_{d3}$, 10$_{d4}$ (FIG. 5C-1). The input signals to the quad 4-1 multiplexors M01$_f$, M01$_g$ are the driver card n busy signals which have a "/" mark to signify that the signal is "false". The outputs of the multiplexors are fed to hex 2-input and AND gate S06$_c$, thence to a quad input AND-OR gate S02$_a$; also to multiplexor M01$_h$ which has outputs going to a dual 1-out-of-8 Decoder M08$_a$, which then provides connection module "enable" channel signals. Dual 3-input AND gate S07$_a$ provides the bus select signal, BSEL.

FIG. 5C-7 shows the Connection Module in its selection of a bus where the bus select signal BSEL goes to what is called the output buffer communications card (OTB-COM). Flip-flop signals from the first and second Data Transfer Modules on the A bus and B bus come into dual OR gates S09$_a$, S09$_b$. The OR gate outputs go to the 2-input AND gates S06$_d$, S06$_e$ and thence to AND gates S06$_f$ and S06$_g$. The outputs of these AND gates are then fed to JK-D flip-flops M11$_g$, M11$_h$, and the other outputs are fed to Exclusive-OR gates S08$_a$, S08$_b$. The outputs of the JK-D flip-flops M11$_g$, M11$_h$ are fed to buffers S05$_c$ and S05$_d$ to provide further control output signals in developing the connection sequence.

The enable logic for the driver card busses is shown in FIG. 5C-8. The input signals for the Connection Module enable channel and the Reconnection Module enable channel are fed to quad 4-1 multiplexors M01$_h$ and M01$_i$. The outputs of these multiplexors are then fed to JK-D flip-flops M11$_i$ and M11$_j$ and part of their outputs form channel enable signals while other parts of their outputs are fed to multiplexor M01$_j$ and thence to hex 2-input AND gates S06$_h$, S06$_i$, S06$_j$, S06$_k$ to provide channel select signals.

FIG. 5C-9 shows the terms or signals to provide the control required to establish the data paths between the various modules and buses. Thus, there are generated the "select terms" to provide the control signals to establish data paths. Signals from the Connection and Reconnection Module and the Data Transfer Modules along buses A or B form inputs to Exclusive-OR gates S08$_c$, S08$_d$, S08$_e$, S08$_f$. The outputs of these gates form select term signals, some of which are derived from dual buffer S05$_e$.

FIG. 5C-10 shows generation of select levels for "transmit" whereby the signal XMITA gates the I10 bus (initiate input-output bus which contains the descriptor and descriptor link) onto the data bus A. Likewise the XMITB signal gates the I10 bus onto data bus B. The data bus A is designated as DAxn and the data bus B is designated as DBxn (FIG. 5C-11). Referring to FIG. 5C-10, signals from the first and second Data Transfer Modules of the Input-Output Translator Unit are fed to the AND-OR gates S02$_b$ and S02$_c$. The outputs of these gates are then fed to Exclusive-OR gates S08$_g$ and S08$_h$ to develop the transmit select level signals.

In FIG. 5C-11, there is shown the Output Buffer (OTB) 10$_{OTB}$ (also see FIG. 5C-1) as a data path switching element. The signals XMITA and XMITB gate the I10 bus onto the data buses DAnx or DBnx. The I10 bus feeds to multiplexors M01$_k$ and M01$_l$; their output is fed to buffer drivers M20$_n$ and M20$_o$. The outputs of these multiplexors are controlled by signals from JK-D flip-flop M11$_i$ and M11$_j$ plus buffer drivers M20$_p$, M20$_q$, M20$_r$ and M20$_s$, in addition to buffer drivers M20$_t$ and M20$_u$. Data is thus passed on to data buses A and B.

FIG. 5C-12 shows the module select logic in the Data Transfer Module. Signals from the Connection Module and the Reconnection Module and the Data Transfer Module are fed to AND gates S06$_l$, S06$_m$, S06$_n$, S06$_o$, $_{p,q,r,s,t,u,v,w,x,y,z}$ and S06$_{a',b',c',d',e'}$; thus to set the connection flip-flops for a selection from the Data Transfer Module to the data bus A or B.

Momentarily referring again to FIG. 5C-1, it will be noted that data enters the specified Data Transfer Module 10$_{tc}$ from the Main Memory 10$_m$ via the Read bus B$_{10R}$ (MRB), and then passes through the Output Buffer 10$_{OTB}$ (which provides the data path switching logic) and from there the data goes through an enabled Driver Card to the particular Base Module which contains a selected Line Control Processor.

In FIG. 5C-13 there is shown a detailed drawing of the Data Transfer Module. Data transfers from the memory Read bus (MRB) B$_{10R}$ are fed to the information register multiplexors M01$_m$ and M01$_n$. Their outputs are then fed to the information registers (INR) M11$_k$ and M11$_l$. Buffers S05$_f$, S05$_g$, S05$_h$ receive and supply the indicated data and control signals. Multiplexors M01$_p$ and M01$_q$ take the output of the Information Registers (INR) through translators 69 and 70 if necessary or bypass them over to multiplexors M01$_r$ and M01$_s$. The JK-D flip-flop M11$_m$ is a two digit register used for character shifting in MOD 2 operations. The outputs of the output buffer multiplexors M01$_r$, M01$_s$ are fed to output buffers M11$_n$ and M11$_o$ and thence to buffer drivers M20$_v$, M20$_w$, M20$_x$, and M20$_y$. Data is thus transferred to the data transfer buses DT1 (AB)n .. o and also DT1(DC)n .. o.

As seen in FIG. 5C-14, the data buses D$_A$, D$_B$ are connected to the Base Driver Cards. The data buses A and B connect to multiplexor M01$_t$ and to buffer drivers M20$_z$ and M20$_{z'}$. The output of multiplexor M01$_t$ is fed to a level changer S10$_a$ (Burroughs Common Mode Logic - Complementary Transistor Logic), thence through tri-state hex inverter 71, 72 and thence to multiplexor 73 whose output is fed to another level converter S10$_b$ (Complementary Transistor Logic-Burroughs Common Mode Logic). The inverters 71 and 72 gate the output of the level changers to one of two bases (top and bottom) connected to the Base Driver Card. At the driver card, the bases are designated as Top and Bottom. Thus, the data lines to the Base Module are designated DIN$_{xn}$B/1 or T/1 (bottom of first driver or top of first driver).

FIG. 5C-15 is a flow diagram showing the sequential steps taken by the Initiation Module 10$_{ta}$. Later discussion of exemplary operations will refer to this flow diagram.

As will be later described, the signal LOAD BOP enables the loading of the base number, the LCP number and the decoded OP-code into the B OP buffer shown in FIG. 5C-16. The B8 bit from the memory read bus (MRB) is multiplexed into various positions within the B buffer of the Initiation Module. The B8 bit from the memory read bus is fed to multiplexors M01$_u$ and M01$_v$. The B8 bit is also fed to buffer S05$_i$, the output of which connects to the input of multiplexors M01$_w$ and M01$_x$; the outputs of these multiplexors are connected to a multiplexor M11$_p$ and an 8-bit D-latch P14$_b$. The output of multiplexor M01$_u$ connects to latch P14$_a$ which has an output signal that is decoded by decoder M08$_b$ to provide the ECHO-OP signal. Multiplexor M01$_v$ is connected to 3 latches P14$_c$, P14$_d$ and P14$_e$.

FIG. 5C-17 shows the OP buffer shift control. Since the B OP buffer is shifted into the A OP buffer at each clock, but because only two digits of the B OP buffer change at any time, data is usually being shifted from the B OP buffer to the A OP buffer in a series of 2-digit transfers as seen in FIG. 5C-17 when STCF (Status Count Flip-flop) and the IOCF/(Input/Output Compare Flip-flop) are "true" indicating the end of the descriptor; then BFULF (buffer full) is set and, at the same time, the last two digits of the descriptor are shifted into the A OP buffer.

In FIG. 5C-17 the intput control signals are received by dual AND gate, S07$_b$, and then fed to AND gate S06$_f$, whose output is connected to JK-D flip-flop M11$_q$. The output of M11$_q$ is fed to JK-D flip-flop M11$_r$ and buffer driver M20$_{a'}$. The output of flip-flop M11$_r$ is fed to AND gate S06$_g$, whose output connects to dual OR gate S09$_c$ which feeds buffer S05$_j$. The other output line of AND S06$_g$ is fed to AND-OR gate S02$_d$ having output lines to latches P14$_f$ and P14$_g$. These provide outputs of B buffer data and A buffer data.

FIG. 5C-18 is a flow diagram showing the sequential steps taken by the Connection Module 10$_{tb}$. Discussion hereinafter will provide exemplary explanation in regard to how the Connection Module transmits the I/O descriptor andthe Descriptor Link from one of the OP buffers to the connected Line Control Processor.

In FIG. 5C-19 the outputs of both OP buffers are connected to a series of multiplexors, M01$_y$, M01$_z$, M01$_{a'}$ through M01$_{f'}$. The se multiplexors are the sources of the HO bus. S1 and S2 are the input select terms for these multiplexors. The outputs of the multiplexors are fed to a series of buffer drivers, M20$_{b'}$ through M20$_{m'}$. The driver enable terms (CEN and CEN/) control the selection of data placed on to the I10 bus.

The "poll test" is the sequence that occurs by which the distribution card 20$_{od}$, in response to the connection request of the IOT 10$_t$, attempts to make connection to a Line Control Processor. The sequential steps of the poll test operation are shown in FIG. 5C-20 and are discussed subsequently in the text.

FIG. 5C-20a shows the decoding of the Line Control Processor address by the Distribution Card. Tri-state buffers 83 and 84 provide the output signals of an address to a selected Line Control Processor. The buffers are fed by a pair of multiplexors 81 and 82. The multiplexors receive their input from decimal to binary decoders 75 and 80. Decoder 80 is fed by a four bit counter 76 which is clocked from NAND gates T3N$_a$, T3NN$_b$. Other control signals are developed from NAND gates T2N$_a$, T2N$_b$ and T4N$_a$.

FIG. 5C-20b shows the basic circuit for the line direction control in the Distribution Cards. This circuit uses a Hex buffer, BTSN$_{a,b,c}$ and also NAND gates T2N$_c$, T2N$_d$ plus a Hex inverter TIN$_a$. Discussion of the use of these circuits will be described subsequently hereinafter.

FIG. 5C-21 is a flow chart of the Data Transfer Module 10$_{tc}$. FIG. 5C-21a shows more detail of the sequences in the Write cycle and FIG. 5C-21b shows more detailed sequences in the Read cycle.

In FIG. 5C-22 the Write cycle data transfers between the information register (INR) N11$_{k1}$, the output buffer 10$_{OTB}$ and the character register M11$_m$ are shown for modules 4 and modulus 2 addresses, indicating how portions of one register are transferred to portions of another register as will be described hereinafter. These registers were shown in more detail previously in FIG. 5C-13.

FIG. 5C-23 shows various aspects of the Read cycle data transfers as among the data transfer bus (DTB), the character register M11$_m$ and the output buffer 10$_{OTB}$ for various directions of data transfer and for various modulus numbers. A transfer control signal, XFER, enables the transfer of data from the DT bus to the OTB register; as seen in FIG. 5C-23, several types of transfer may occur depending on the OP-code (forward or backward) the modulus of the address, and the type of transmission (word or character).

In FIG. 5C-24, there is shown a flow diagram indicating how the LCP result descriptor (R/D) is stored as part of the data transfer sequence, number 09, DT09. Normally, at the data transfer sequence number 09, the status count of the LCP is STC—7 (true) and the Result Descriptor is on the data lines. The Result Descriptor is then stored in the output buffer register (OTB) 10$_{OTB}$.

FIG. 5C-25 is a flow diagram showing the "poll request" sequence as it operates between the various parts of the system. The poll request determines which one of several possible requesting Line Control Processors is to be granted access to memory and then to connect that particular Line Control Processor to the Input/Output Translator. The sequence of the poll request has been described earlier in the text.

FIG. 5C-25a shows the priority encoding circuitry in the Base Module whereby any requesting Line Control Processor is provided with a base priority number and then with a global priority number via jumpers which can be strapped at the time of installation. The Line Control Processor's request lines are patched through the base priority jumpers into a priority encoder EN-PO$_a$. The outputs of the priority encoder are fed through inverters TIN$_{a,b,c,d}$, over to a decoder 85 (binary coded decimal to decimal decoder). The outputs of the inverters are also fed to a six-bit D register DR 60. The outputs of decoder 85 then go through jumpers or straps which provide the global priority number and are then fed to priority encoders ENPO$_{b,c,d}$. The outputs of these priority encoders then go theough to NAND gates T2N$_{e,f,g}$ from which they are fed to the six-bit D register DR 60. The outputs of the D register are fed to a decoder 86 (BCD to decimal decoder) thence through the Line Control Processor address jumpers to the individual Line Control Processors. The global priority numbers from the D register DR 60 are fed to a Hex inverter 87 to provide output signals which go to the Input-Output Translator 10$_t$.

The global priority signals from the distribution card of each of the Base Modules (of FIG. 5C-1) are seen in FIG. 5C-26 connected to an 8-bit comparator M09$_a$ which has outputs going to dual OR gate S09$_d$ and to AND gate S06$_{k'}$. Also coming from the Base Module distribution cards are the interrupt request lines from the top (T) and the bottom (B) of the driver cards. These inputs are fed to AND gates S06$_{h'}$ and S06$_{i'}$ whose outputs go to AND gates S06$_{j'}$ and S06$_{1'}$. The global priority signals are also connected to OR gates P12$_a$, P12$_b$ and AND-OR gates S02$_e$, S02$_f$, S02$_g$ to provide the output priority signals for the first stage of priority resolution in the Input-Output Translator.

FIG. 5C-27 shows the second stage of global priority resolution in the Input-Output Translator. Basically the outputs of the first and second resolution stages are compared to determine which of the 8 possible Base Modules has the highest global priority at that given moment. In this second stage, the highest priority from Driver Card 1 is compared to the highest priority from Driver Card 2; concurrently the highest priority form Driver Card 3 is compared to the highest priority from Driver Card 4; then a final comparison determines the Base Module and the LCP which has the highest global priority. In the second stage, the priority signals from the Denver Card are connected to 8-bit comparators MO9A$_b$ and MO9B$_c$. The outputs of these comparators are fed to dual OR gates SO9A$_e$ and SO9B$_f$. AND-OR gates SO2A$_h$ and SO2A$_i$ receive, from the Driver Cards, the signal inputs which are placed in a final comparator MO9A$_d$ whose output feeds to a quad OR gate SO9B$_g$. Signals from Driver Card 1 and Driver Card 2 are connected to triple input AND gates SO7A$_{c,d,e,f}$ to provide the global priority resolution signals.

The activities of the Reconnection Module 10$_r$ are seen in the reconnection sequence of FIG. 5C-28 which shows the Reconnection Module flow. This reconnection sequence is initiated when an interrupt request is received from one or more of the Base Modules.

In FIG. 5C-29 a multiplexor MO1$_n$, receives address select inputs and the reconnect address select, RCADSL, which occurs one clock time after the Channel Select. This selects the −2 volt inputs to the multiplexer in order to generate Address Select for all base driver distribution cards in the system.

III. DESCRIPTION OF OPERATIONS AND FUNCTIONS OF INPUT/OUTPUT TRANSLATOR

DESCRIPTOR LINK

During the execution of an I/O descriptor, the IOT handles all memory addressing functions for the LCP's, including incrementing the addresses and storing or retrieving them from scratchpad memory. Because LCPs may disconnect and subsequently reconnect several times during the execution of a descriptor, and because each disconnection or reconnection requires that the LCP's address be stored in, or retrieved from, scratchpad memory, the IOT needs some means to identify the location at which the LCP's descriptor addresses are stored. The IOT also must know if translation is required, if a backwards operation is specified, and if the data transfer to memory is to be inhibited. The descriptor link (FIG. 5D and Table IV) is the means by which the IOT is informed of these items.

The descriptor link (FIG. 5D) is originally assembled in the OP buffer (FIG. 5C-3), and is subsequently transmitted to the LCP during the connection sequence. The descriptor link is transmitted twice, and stored in the LCP as two identical words.

As shown in FIG. 5C-3, the descriptor link is also transferred from the OP buffers onto the descriptor link bus (DLB). At the completion of a connection or reconnection sequence, the data transfer start signal (DTSTRT) generates DLR←DL, which then generates the LDDLR levels. These levels then enable the loading of the descriptor link from the bus into the descriptor link register illustrated in FIG. 5C-4.

During the data transfer sequence, the Data Transfer Module 10$_{tr}$ generates SP←DLR, thus sending the address of the LCP to the address scratched 10$_{ams}$, FIG. 5C-2. The SP←DLR signal gates the six least significant bits (the three base address bits and the three LCP address bits) of the descriptor link to the scratchpad; the scratchpad responds with the beginning address of the connected LCP's descriptor. At the end of the data transfer sequence, the modified beginning address is placed back into the LCP's scratchpad location.

Following a successful poll request in the reconnection sequence, the LCP transmits the descriptor link back to the IOT. At RC O2, FIG. 5C-28, the LCP transmits the first descriptor link word. As shown in FIG. 5C-5 DLR←DAT and LDDLRA are generated, thus enabling the transfer of the selected data bus into a temporary holding register. The LCP transmits the second descriptor link word (identical to the first word) at RC O3, but because DLR←DAT is not generated, the word is not stored.

At the end of the reconnection sequence, the descriptor link is transferred from the temporary holding register into the selected data transfer module's descriptor link register. Once the descriptor link is in the descriptor link register, FIG. 5C-4, the Data Transfer Module can begin the operation specified by the LCP.

ADDRESSING

In order to transfer data to and from the correct memory locations, the IOT must have the ability to accept, store, and modify data field addresses. The following text, along with FIG. 5C-2, describes how the IOT accomplishes these tasks.

ADDRESS STORE: FIG. 5C-2:

During the execution of an Initiate I/O instruction, the Processor 10$_p$ assembles the beginning (A) and the ending (B) addresses of the data field. The Processor then transfers the complete A address from the Processor NI register to the IOT address bus. At IIO3, FIG. 5C-15, of the IOT initiation sequence, the IOT generates WRITE and SPSBY, and then gates the base and LCP address bits to the scratchpad 10$_{ps}$. Now, with the channel's scratchpad location addressed and the Write enable active, the A address can be written into the scratchpad, FIG. 5F.

At IIO4, FIG. 5C-15, the Processor places the end address onto the IOT address bus, and again the IOT generates WRITE and SPBSY, along with the base and LCP address. This time, however, the IOT also generates ADDRESB, thus causing the address on the bus to be written into the B address area of the scratchpad, FIG. 5F.

The begin and end addresses of the data field have now been stored in the channel's address memory scratchpad. When the data transfer operation begins, these scratchpad locations will be accessed by the Data Transfer Module 10$_{tc}$.

ADDRESS MODIFICATION:

At the start of the data transfer operations, the Data Transfer receives the descriptor link, which includes the Base and LCP number. At DTO2, FIG. 5C-13, ADDRESB is generated, which with the Base and LCP number, addresses the channel's B word of the scratchpad, FIG. 5C-2. The B address is then transferred from the scratchpad 10$_{ps}$ to the IOT address bus, ADxn, and from the bus through a multiplexer 63 to the IOT address register, 60. In the same manner, the A address is read (ADDRESB is not generated) and placed into the address register (ADDR 60) while the B address is being transferred from the address register to the comparison register (CMR), 61.

When the Data Transfer Module enters either the Read or Write sequence (DTO5 or DTO3), FIG. 5C-13, a memory access is requested (MARF). When priority is granted (PRIRTYx), the IOT transfers the begin address register to the address bus. The Processor $10_p$ then transfers the address from the bus to the memory address register, $10_{pam}$.

At MARF, Memory Access Request, time, the term ADDR-CMR is generated. This term causes the end address in CMR 61 to be subtracted from the begin address in ADDR 60. During the execution of the Initiate instruction, the Processor varifies that the A address is less than the B address; therefore, if the A address is less than 10 digits less than the B address, the six most significant digits of the result of the subtraction will be equal to 9 because of borrows from the next highest digit position. When this condition occurs (see example A below) the term ALLNINE is generated. In backwards operations, essentially the same procedure is used, except that because the B address is in ADDR and the A address is in CMR (see example B, below), the result of the subtraction would be all zeroes (ALLZER/) for the upper six digits when the addresses were less than 10 digits apart.

```
                Example A - Forward Operation
A ADDRESS IN ADDR  = 0443208
B ADDRESS IN CMR   = 0443212
ADDR-CMR RESULT    = 9999996
                     ↑ ↑
                     |  |
              GENERATES   GOES THRU 9's COMPLEMENT
              "ALLNINE"   CYCLE TO GENERATE
                          ADCMP = 4

Example B - Backward Operation
B ADDRESS IN ADDR  = 1076884
A ADDRESS IN CMR   = 1076876
ADDR-CMR RESULT    = 0000008
                     ↑ ↑
                     |  |
              GENERATES   UNMODIFIED: GENERATES
              "ALLZER/"   ADCMP = 8
```

When ALLNINE or ALLZER/ is active, the least significant digit of the result is used to generate ADCMP=n terms, where "n" indicates the difference (in digits) between the A and B addresses. In forward operations, ALLNINE causes the 9's complement of the least significant digit of the result to be used as "n"; in backwards operations, ALLZER/ causes the unmodified least significant digit of the result to be used as "n". The DT Module uses the ADCMP=n terms to determine when the end of the data field has been reached (ADCMF=0) or how much more data remains to be transferred.

At GPL (Global Priority Resolution, FIG. 5C-26) time in Read operations, or at MAGF (Memory Access Granted) time during Write operations, the data field address is modified. In forward operations, the A address is incremented, and in backwards operations, the B address is decremented. Because of the efficiency of word transfers with memory as compared to character transfers, mod 4 addressing is used whenever possible; therefore, in most cases, the address is incremented or decremented by 4 (ADDR4). There are instances, however, such as a mod 2 A address, or a final character going to a mod 4 location, that require the IOT to have the ability to modify the address by 2 (ADDR2).

Once the amount of incrementation or decrementation is determined, the increment term (ADDR4 or ADDR2) is applied to the least significant digit position of the adder 62. If a backwards operation is in progress, the MINUS level is also applied to the adder, forcing it to the subtract mode. Following the address incrementation, the modified address is transferred from the adder 62, through a multiplexor 63, back to the IOT address register 60.

ADDRESS RESTORE:

During the course of a data transfer operation, a LCP may disconnect from the IOT and begin communication with the peripheral device. When the LCP is reconnected, data must be read from, or written into, locations contiguous with those used during the prior data transfer sequence.

In order to do so, at the DT 07 (FIG. 5C-13) following a LCP disconnect, the IOT stores the current data field address in the channels's scratchpad memory $10_{ps}$. Because the end address was not changed (assuming a forward operation), only the begin address need be stored. At DT 02 of the data transfer sequence following the reconnection of the LCP, the address is read from the channels's scratchpad and transferred to the address register 60.

OUTPUT BUFFER (OTB) SWITCHING LOGIC:

As previously mentioned, the IOT consists of an initiation module, a connection module, one or two Data Transfer Modules, and a reconnection module. In the course of IOT operation, it becomes necessary to establish data and control paths from one of these modules to another, or from one of the modules to a LCP.

As shown in FIG. 5C-1, there are several different ways (shown as dotted lines) in which the paths can be established. The selection and establishment of the data path are controlled by the OTB switching logic $10_{OTB}$, and are based upon the channel number designated in the Initiate instruction and the availability of modules within the IOT. The subsequent text explaines how the paths are established, and how control is passed from one module to another.

During the initiation sequence, the number of the base containing the designated LCP was decoded from the BF portion of the Initiate command. The decoded base number was then stored in one of the two OP buffer registers (FIG. 5C-17) as ABASFn or BBASEn (n=1,2, or 4). At the same time, AFULF or BFULF was set to indicate the buffer in use.

At CN00, FIG. 5C-18, of the connection sequence, the ABASEn or BBASEn terms are used as input selects for a pair of multiplexors (MO1$_f$, MO1$_g$, See FIG. 5C-6). The inputs to these multiplexors are the busy levels from the four base driver cards. In this text, channel 43 is used as an example of the designated LCP, and that AFULF is assumed to be true. Channel 43 generates ABASE4, which allows CRD3BY/ (driver card 3 not busy) to generate AN. AN allows ABASE4 to generate EN4, which is decoded to CNENCH30, Connection Module Enable Channel 30. Because this is not an extended result descriptor operation, AEXRDF/ (Extended Result Descriptor) is true, thus enabling bus select BSEL to be generated.

BSEL goes to the OTB-COM card, (see FIG. 5C-7) where it attempts to connect the Connection Module to one of the two data buses. As shown in FIG. 5C-1, there are four possible users for each data bus: two Data Transfer Modules 10$_{tc}$, a Reconnection Module 10$_{td}$, and the Connection Module 10$_{tb}$. Each of the users has a flag which is set to indicate connection to one of the data buses. These flags and the connections they indicate are shown in Table Va.

TABLE Va

| Flag | Connection Indicated |
|---|---|
| DT1AF | DT mod 1 to data bus A - (D$_A$, FIG. 5C-1) |
| DT2AF | DT mod 2 to data bus A |
| DT1BF | DT mod 1 to data bus B - (D$_B$, FIG. 5C-1) |
| DT2BF | DT mod 2 to data bus B |
| RCAF | RC mod to data bus A |
| RCBF | RC mod to data bus B |
| CNAF | CN mod to data bus A |
| CNBF | CN mod to data bus B |

Any one of the flags of Table Va, is set, causes the appropriate data bus busy flag (CHNAF or CHNBF) to be set. If one of the data buses is not busy (CHNAF/ or CHNBF/), BSEL enables the setting of CNAF or CNBF, FIG. 5C-7, thus connecting the CN module to one of the data buses. If neither data bus is busy, CNAFJ is enabled, thus causing CNAF to set.

CNAFJ is one of the input select terms for the driver card bus enable logic (see FIG. 5C-8). CNAFJ allows CNENCH 30 (from the CON MOD card, FIG. 5C-6) to set the ENBCHA30 flip-flop (FIG. 5C-8) thus enabling the connection of driver card 3 to data bus A. CNAFJ also generates channel select (CHSEL3/), which goes to the designated base to initiate the poll test sequence shown in FIG. 5C-20.

CNAFA (and CNBFA) are used to generate the multiplexor input select terms shown in FIG. 5C-9. Because, in this discussion, CNAFA is true, S1A, S2A, S1AA, and S2AA are generated. These terms provide the control required to establish the data paths between the various modules and buses.

CNAFA also generates XMITA (see FIG. 5C-10). As shown in FIG. 5C-11, with S1A and S2A true, XMITA gates the IIO bus (which contains the descriptor and link) onto data bus A (DAxn). If CNBFA had been set (FIG. 5C-10), XMITB would have been generated, and the IIO bus would have been gated onto data bus B (DBxn).

Because ENBCHA 30 (FIG. 5C-8) has been set, data bus A (FIG. 5C-1) is gated onto driver card 3, 10$_{d3}$, and from the driver card out to the Base. The Connection Module now has a path to the Base distribution card 20$_{od}$, FIG. 2 and FIG. 4A, and the poll test sequence can begin.

At the end of the connection sequence, FIG. 5C-18, (CN08), CNDTSL is generated. As shown in FIG. 5C-12, if Data Transfer Module 1 is not busy (DT1BSY/), CNDTSL * CNAF generates DT1AF and CNAFK. If Data Transfer Module 1 is busy but Data Transfer Module 2 is not busy, CNDTSL * CNAF generates DT2AF, thus connecting the second Data Transfer Module to the previously established data path. If CNBF had been set, DT1BF or DT2BF would have been set by CNDTSL * CNBF in an equivalent logic circuit.

In FIG. 5C-12, if either DT1AF or DT1BF is set, DT1STRT is generated; if DT2AF or DT2BF is set, DT2STRT is generated. The DTnSTRT terms are used to start the data transfer sequence in the specified Data Transfer Module.

The preceding text explained how a data path is established between a designated LCP and the central system memory 10$_m$. In the following text, the actions of the elements in the data path are described for a typical "word write" operation.

As shown in FIG. 5C-1, data enters the specified Data Transfer Module from Main Memory 10$_m$ via the Read bus (MRB), passes through the OTB data path switching logic, and from there goes through the enabled driver card to the base containing the designated LCP.

A more detailed drawing of the Data Transfer Module, FIG. 5C-13, shows that data from MRB(B$_{10R}$) goes to the IN register input multiplexor MO1$_{min}$. Other inputs to this multiplexor are the CNDT bus (connection error flags), the IOT address register ADR (extended result descriptor information from the IOT scratchpad), and the maintenance bus Mbus. In a normal Write operation, INR←MRB occurs at each T2F time (FIG. 5C-21a) of DTO3. INR←MRB generates MINS1 and MINS2, which, when true, select MRB as the input to the IN register M11$_{k,l}$. When LDINR is true at INR←MRB time, the data from the Read bus is latched into the IN register.

The output of the IN register M11$_{k,l}$, goes to the first of two OTB register input multiplexors (OMB MPX), MO1$_{p,q}$. The purpose of the OMB multiplexor is to select either Read or Write data, and also to enable the shifting and selection of either the first or second character of a data word. A one-character register (REG), M11$_m$ is also an input to the OMB multiplexor. The use of REG is explained in the data transfer module logic flow.

Assuming a word Write operation and a mod 4 address, OTB←INR occurs at LCPSTF time of DT 03 (FIG. 5C-21). OTB←INR generates MOABS2 and MOCDS2, thus selecting the IN register M11$_{k,l}$ as the input to the OMB multiplexor MO1$_{p,q}$.

The output of the OMB multiplexor goes to the translator 69, 70, and also to the second OTM multiplexor, MO1$_{rs}$. The second multiplexor selects the untranslated data directly from the OMB multiplexor, translated data from the translator, result descriptor information from various error flags, or information from the maintenance bus. In a normal Write operation with no translation, all select terms for the OTB multiplexor are false, thus causing the output of the OMB multiplexor MO1$_{p,q}$ to be selected as inputs.

OTB←INR also generates the OTB register load enable signal (LDOTB), thus allowing the data from the IN register to be latched into the OTB register $M11_{m,o}$. SEND, also generated at DT 03, then gates the contents of the OTB register onto the DT1 bus (DT1xn..0).

The DT1 bus, FIG. 5c-13, is one of the inputs to the multiplexor $M01_{k,l}$ for the OTB data path switching logic shown in FIG. 5C-11. The other inputs are the DT2 bus from the second Data Transfer Module, and the IIO bus. In FIG. 5C-9, note that the input select terms for the multiplexors S1A, S1B, S2A, and S2B are controlled by the Data Transfer Module/Data Bus connection flip-flops (DTnxF). As shown in FIG. 5C-12, these flip-flops are controlled by the availability of the data transfer modules and data buses. The output of the multiplexor is then gated, FIG. 5C-11, onto the selected data bus (DAxn..0 or DBxn..0) by one of the transmit select levels (XMITA or XMITB). The transmit select levels are controlled by the logic shown in FIG. 5C-10.

The data buses DAxn, DBxn, go to the base driver cards as shown in FIG. 5C-14. AENB, which controls the selection of the data buses, is generated by the driver card enable term, ENBCHxn. In this case, because channel 43 is the designated channel, the ENBCHA30 flip-flop is set (see FIG. 5C-8), thus generating AENB and enabling data bus A into driver card 3.

In FIG. 5C-14, the output of the multiplexor $M01_l$ goes through the BCML to CTL level changer $S10_a$ to the inverters (ITSN), 71 and 72. These inverters gate the output of the level changers to one of the two bases connected to the base driver card. At the driver card, the bases are designated as top and bottom DINxnT and DINxnB. The even-numbered bases are connected to the top half of the driver cards, and the odd-numbered bases are connected to the bottom half of the driver card.

If an odd-numbered base is selected, the base address 1 bit (ABASE1 or BBASE1) is true; the presence of the 1 bit causes the term BOTTOMA0 or BOTTOMB0 to be generated, which in turn generates ENBB/. Because, in this example, an even-numbered base (4), FIG. 5C-1, was selected, ENBB/ is false, thus generating ENBT/, FIG. 5C-14, which enables the inverter 71, 72 to gate the data out to the base.

INITIATION MODULE FLOW:

The purpose of the Initiation Module is to determine if an Initiate instruction is for LCP channel, and if so, to receive and assemble the I/O descriptor information. The following text and FIG. 5C-15 explain how the Initiation Module accomplishes these tasks.

When the Processor sends the channel number of the device to be initiated (BF of the Initiate instruction), the IOT compares the requested channel number to those channels present in the IOT I/O Subsystem. If the channel number corresponds to an existing LCP channel, a signal OURCH is generated. OURCH then generates GO, which enables the SCDF and ICDF timing. These timings are used to synchronize the IOT with the Processor $10_p$ and Memory $10_m$.

During the time BF is being decoded, the descriptor OP code is received from the Read bus. The OP code is decoded, and, if it is a legitmate value, OPOK is generated. If the decoded OP code is a cancel (OP=71+72), and the IOT is not busy, the cancel is valid and the term VALID is generated. VALID is also generated for non-cancel operations, if they are not for channel 8 and the IOT is not busy.

Because BFULF is false, indicating that the entire descriptor has not yet been received, OPOK and VALID generate FILL at ICDL time. FILL then generates II+1 to increment the state counter of the Initiation Module, and also enables OPST.

OPST goes to OPBUFF card 1, where it generates LOADBOP. LOADBOP enables the loading of the base number, LCP number, and decoded OP code into the B OP buffer, FIG. 5C-17.

The initiation flow continues through its sequence, transferring a portion of the descriptor information from the memory Read bus into the B buffer at each state count. As shown in FIG. 5C-16, the B8 bit from the Read bus (MRB), (typical of all Read bus data) is multiplexed into various positions within the B buffer, dependent upon the state count and the associated register enable signal.

The preceding method is used for all transfers of descriptor information to the Initiation Module, except for the transfer of the descriptors A and B addresses, which use the following method.

At state count IIO3 (FIG. 5C-15) in conjunction with IOCPTIME, the processor sends the entire A address to the IOT via the processor-IOT address bus. The IOT generates WRITE and also gates the channel's scratch-pad address to address memory. The contents of the address bus are then written into the channel's begin word of address memory. (Refer to "Addressing", earlier discussed).

At state count IIO4, the same procedure is used, except that the IOT also generates ADDRB, thus causing the address to be written into the end (B) word of address memory.

When the entire descriptor has been transferred to the IOT, the Processor sends STCT * IOCF/ to signal the end of the transfer. Depending on the type of descriptor, STCF * IOCF/ may occur at IIO3 (no A or B addresses), IIO5 (space OP space count), or IIO7 (C address), FIG. 5C-15.

Because AFULF is not set (FIG. 5C-17), SHIFT . . . is true throughout the loading of the B OP buffer $S02_d$. Therefore, SHIFTBA. and SHIFT . . O are also true, causing the descriptor data to be loaded into the A OP buffer $S06_g$, one clock after it was loaded into the B OP buffer, $S02_d$.

The B OP buffer is shifted to the A OP buffer at each clock, but because only two digits of the B OP buffer change at any time, it appears as though the data is being shifted from the B OP buffer to the A OP buffer in a series of two-digit transfers. As shown in FIG. 5C-17, when STCF and IOCF/ are true (indicating the end of the descriptor), BFULF is set, and at the same time, the last two digits of the descriptor are shifted into the A OP buffer, $S06_g$.

Because BFULF is set, the next clock sets AFULF and clears BFULF, which then enables CLRB to clear the B OP buffer. Since SHIFTA/ and AFULF are both true, SHIFT . . . is false, thus inhibiting the transfer of the B OP buffer (now all zeroes) into the A OP buffer.

When the A OP buffer is emptied, SHIFTA/ goes false, causing SHIFT . . and SHIFTBA to go true, thus forcing AFULF to the D e-set mode. Because BFULF is cleared, AFULF is cleared at the next clock.

If the IOT receives a second descriptor before the A OP buffer is emptied, AFULF and SHIFTA/ will be true, and SHIFT . . . will be false, thus allowing the descriptor to be stored in the B OP buffer, but inhibiting the transfer into the A OP buffer. If the entire descriptor is received before the A OP buffer is emptied, BFULF is set, and no further action occurs until one of the OP buffers is emptied.

If the Processor attempts an initiate operation to a LCP before the B buffer has been cleared (BFULF true), the OP Buffers Filled Flat (BUFFULF) is set. The IOT then decodes the BF of the attempted Initiate command to generate a result descriptor address, and subsequently writes a Result Descriptor (R/D) with bit 7 (OP buffers filled) set.

CONNECTION MODULE FLOW:

The following portion of the text, along with FIG. 5C-18, explains how the Connection Module transmits the I/O descriptor and the descriptor link from one of the OP buffers out to the connected LCP.

In FIG. 5C-19, note that the outputs of both OP buffers of FIG. 5C-17 are connected to a series of multiplexors M01 which are the sources of the IIO bus. The input select terms for these multiplexors (S1 and S2), FIG. 5C-19, and the driver enable terms (CEN and CEN/), control the selection of the data that is placed onto the IIO bus. The status of S1 and CEN is controlled by the state count of the connection module flow; the status of S2 is determined by the buffer being used.

Normally, OP buffer A is used; therefore, S2 is false and the A buffer inputs to the multiplexors are selected. If, however, the driver card for OP buffer A's LCP is busy, and OP buffer B contains a descriptor, BF (B Buffer In Use Flag, not to be confused with BF of the Initiate instruction) is set, thus causing S2 to be true and enabling the B buffer inputs to the multiplexors.

The IIO bus is an input to multiplexors which select sources for data buses A and B (see FIG. 5C-11). The bus selection is determined by CNAF and CNBF, one of which was set at BSEL time (CNOO, FIG. 5C-18).

CNAF and CNBF generate CNAFA and CNBFA, respectively. As shown in FIGS. 5C-9 and 5C-10, CNAFA generates XMITA, S1A, and S2A, and CNBFA generates XMITB, S1B, S2B. Once selected, the data bus transmits the descriptor information to the driver cards. The selected data bus goes to all base driver cards; however, only the card connected to the designated LCP's base is enabled (ENBCHAn or ENBCHBn; see FIG. 5C-8).

During the time the IOT is selecting a data bus, it is also attempting to establish a data path to a specific LCP. The Connection Module receives the decoded base and LCP address, and then sends a signal (Channel Select) to the proper distribution card. The poll test is the method by which the distribution card, in response to the connection request of the IOT, attempts to connect to a LCP. The sequence of events in the poll test operation is shown in FIG. 5C-20.

Figure 5E:
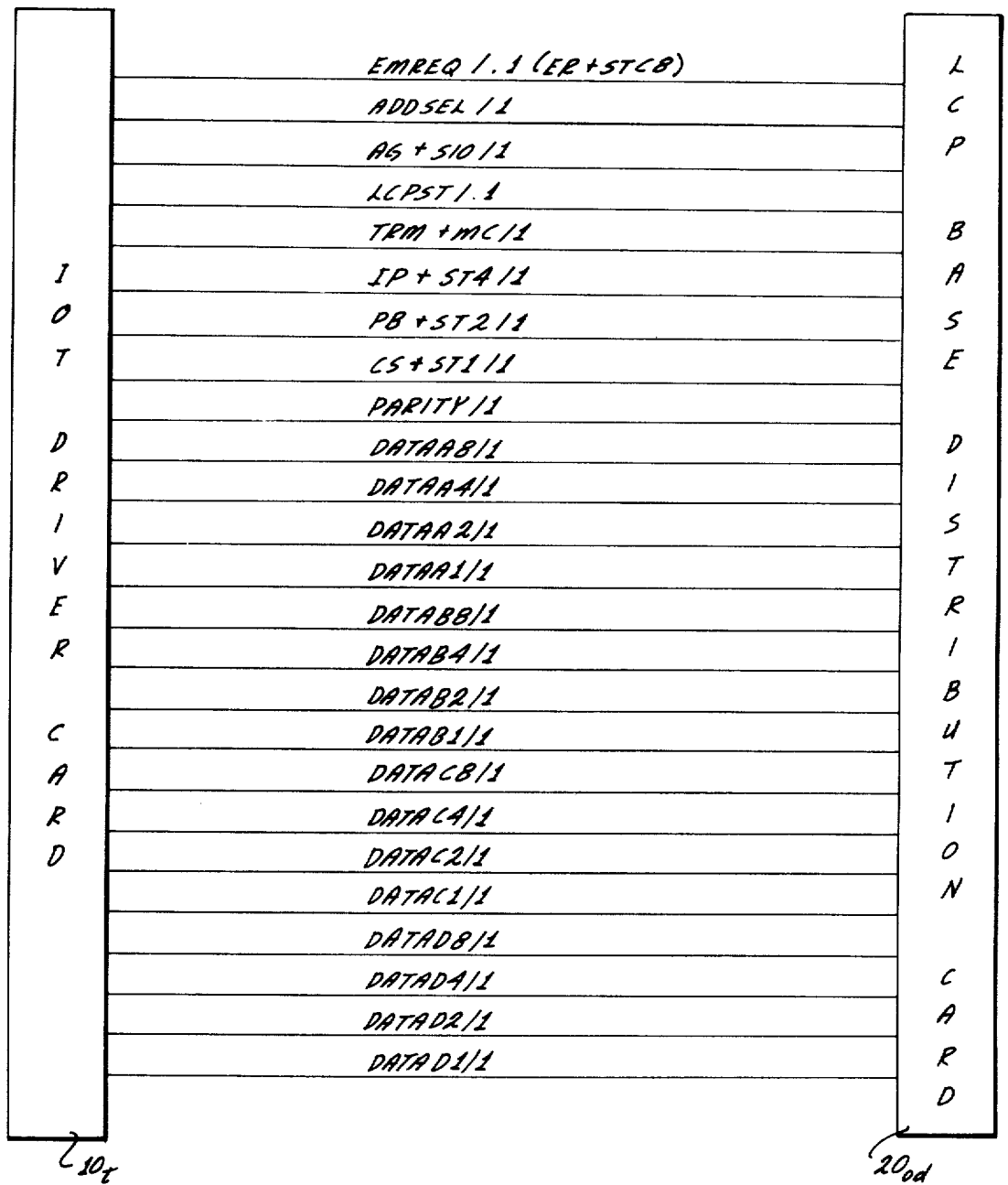
FIG. 5E shows the message level interface between the IOT and the Distribution Card Unit of the LCP Base Module.
Figure 5F:
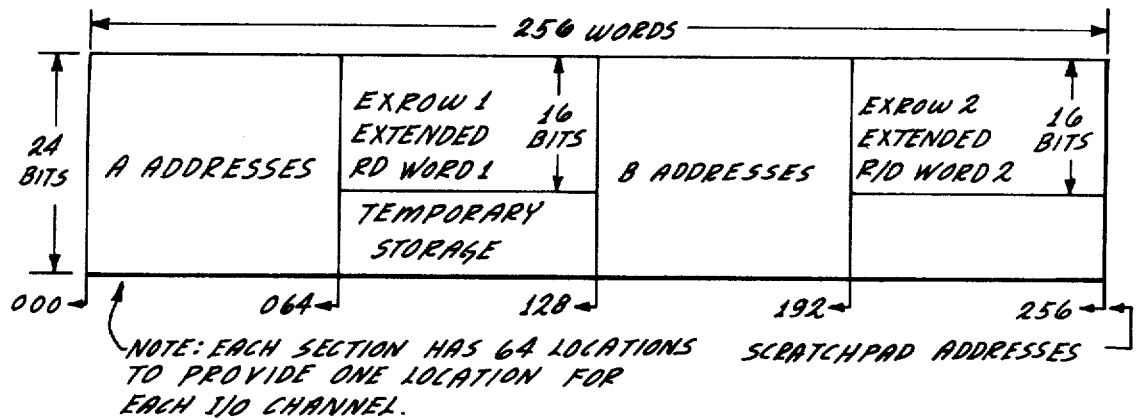
FIG. 5F is a sketch of the IOT scratchpad memory.
Figure 5F:
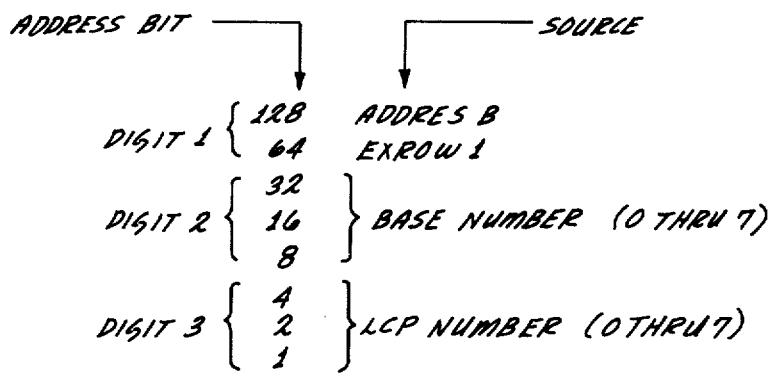
Figure 5G:
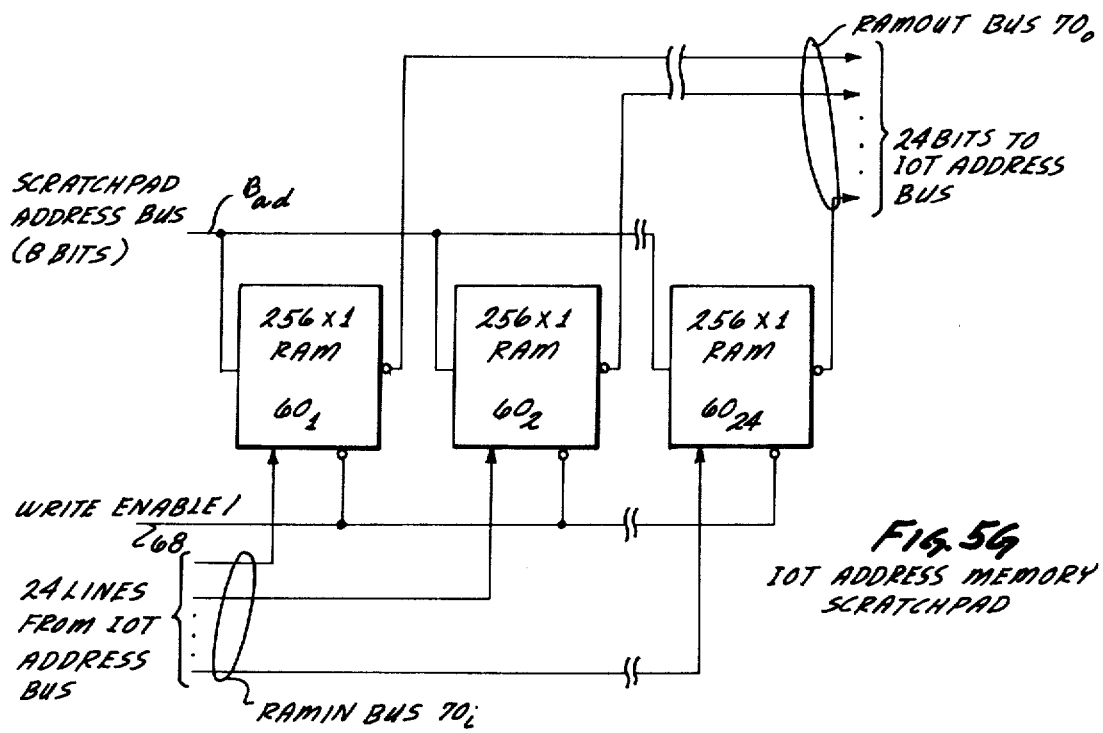
FIG. 5G is a sketch illustrating the address memory scratchpad of the IOT (Input-Output Translator)

Following the transmission of Channel Select, the IOT sends the address of the desired LCP via data lines D4, D2, and D1, FIG. 5E, to the distribution card in the selected base. At the same time, the IOT sends Address Select to all bases in the system. The distribution card that receives both Address Select and Channel Select begins a poll test and responds to the IOT with a LCP strobe; the distribution cards that received Address Select only, consider it to be a busy signal, and are inhibited from communication with the IOT. When the IOT receives the LCP strobe, it drops Channel Select.

As shown in FIG. 5C-20a, when the distribution card receives address select and channel select, PTACT/ (Poll Test Active) is generated. If no other distribution card in the base is busy, and there are no requests for access to the system, PTACT/ causes PTAFB to be generated. PTACT/ also generates DCACKF←1. PTAFB enables the LCP address on data lines D4, D2, and D1 into a LCP address register, CR 40.

The BCD output of the LCP address register is decoded by decoder 80 to enable one of eight lines. Each line represents one LCP in the Base.

Vertical parity is checked on the LCP address. If there is no parity error (PAROK), PTAFB sets PTCF (Poll Test Connect Flip-Flop) and LCPADF (LCP Address Flip-flop).

PTCF forces a pair of 2-to-1 multiplexors 81, 82 to select the output of the BCD to decimal address decoder as inputs. The other input to the multiplexors is from the poll request circuits. LCPADF enables the tri-state buffers 83, 84 (BTSN), thus gating the LCP address line onto the base backplate.

When a LCP detects that its address line is active, that LCP responds to the distribution card with the signal LCPCON (LCP Connected). When LCPCON is received in the distribution card, the Connect flip-flop (CONF) is set. If the base is not in local mode (a maintenance function), and CONF is set, the term CF * BL/ is generated.

Depending on the state of the I/O send line (IOSND/) from the connected LCP, CF * BL/ activates either RECDATA/ (receive data) or SNDDATA/ (send data). As shown in FIG. 5C-20b, SNDDATA/ and RECDATA/ control the direction of the data lines between the LC and the IOT.

When the distribution card detects the absence of Channel Select, it responds to the IOT with the LCP status, accompanied by a strobe. The LCP is now connected to the IOT, and remains connected until the IOT drops Address Select; the distribution card takes no further part in the IOT-LCP communications.

The preceding text outlined the events leading to a successful connection attempt; it should be noted, however, that the connection attempt could have failed due to one of the following causes:

a. There was not a LCP at the location addressed, or the LCP at the addressed location was off-line.
b. The LCP was busy (that is, LCP status was not 0 or 2 or 3).
c. The port was busy (that is, a second distribution card in the base was busy).
d. A parity error was detected in the address.

The detection of any one of these errors would cause the connection attempt to be aborted, and a result descriptor (R/D) indicative of the failure to be written.

There now exists, via the IIO bus, one of the data buses, and the enabled base driver card, a data path from the OP buffer to the LCP Base Module.

Portions of the descriptor are placed onto the IIO bus at the state counts shown in the connection module flow chart, FIG. 5C-18. The IOT sends a strobe pulse (STIOF) with each portion of the descriptor transmitted; the LCP responds to each transmission with a strobe pulse (LCPSTF), accompanied by the LCP status count.

When the entire descriptor has been transmitted (indicated by reception of STC=11 from the LCP), the IOT sets the Gate LPW flip-flop (GLPWF), thus enabling the transmission of the I/O descriptor LPW. The LCP responds to the transmission of the LPW with a strobe pulse and the current LCP status count.

The LCP may branch to any one of several status counts subsequent to the reception of the I/O descriptor and LPW. In this discussion, assume that the LCP returns a status count of 6 (receive descriptor link).

When STC=6 is detected, the flow goes to CNO5, FIG. 5C-18, where the first descriptor link word is transmitted. When the LCP acknowledges the reception of the first descriptor link word, the IOT sends the second descriptor link word and branches to CNO6. The second descriptor link word, a retransmission of the first word, is not used by the system. When the reception of the second descriptor link word is acknowledged, the IOT transmits the descriptor link LPW, and then branches to CNO7.

At CNO7, the LCP status is again examined; if STC=4+7+8, the flow branches to CNO8 to initiate the data transfer sequence. If STC=1, the Address Select Flip-flop (ADSELF) is cleared, thus disconnecting the LCP.

The connection sequence is now complete; the LCP has the I/O descriptor and is free to begin transferring data from its buffer to the data transfer module, or, if disconnected, to begin communication with its associated peripheral device.

DATA TRANSFER MODULE FLOW:

The following portion of the text, along the FIG. 5C-21, explains how the data transfer module transfers data between memory and the connected LCP.

DTO0 - IDLE:

The Data Transfer Module is initiated at DTO0 by the signal DTSTART, which may be generated in either the connection or the reconnection module. At the time DTSTART is generated, the connection or reconnection module also gates the descriptor link onto the descriptor link bus. When DTSTART is detected at DTO0, the Data Transfer Module transfers the descriptor link from the bus into the Descriptor Link Register (DLR) 66. If there were any error flags set during the connection sequence, they are stored in the IN register M11$_{k,1}$, FIG. 5C-13, at DTO0 (INR←CN).

Assuming this to be the first time the data transfer module is initiated, and that the initiation is not for a cancel operation, DT←O2 occurs and the Read Scratchpad Flip-flop (RIDSPF) is set.

During the connection sequence, the beginning and ending addresses of the data field were stored in the initiated LCP channel's address scratchpad. RIDSPF enables the floating logic to read the initiated channel's addresses from scratchpad memory and place those addresses into the appropriate registers. To do so, RIDSPF gates the scratchpad address (decoded from the LCP channel number) from DLR to the scratchpad (SPAD←DL), then gates the output of the addressed scratchpad into the address register (ADDR←ADB). The previous contents of the address register are shifted to the comparison register (CMR←ADDR), and RIDSPF is cleared.

DTO2 - ADDRESS FETCH:

On the initial pass through DTO2 during a forward operation, ADDRESB is enabled, concurrent with the floating logic enabled by RIDSPF at DTO0. ADDRESB is used as the most signficant bit of the scratchpad address, and as such, causes the end address to be read by the floating logic. On the second pass through DTO2, ADDRESB is inhibited; therefore, when RIDSPF is set, the begin address is read from scratchpad and transferred to the address register 60, FIG. 5C-2, and the end address is transferred from the address register to the comparison register 61. When the addresses are read from scratchpad, their boundaries are checked; if the end address is on a character boundary (MOD2), the End Address Mod 2 Flip-flop (EMOD2F) is set; if the beginning address is mod 2, the Begin Address Mod 2 Flip-flop (MOD2F) is set.

At the end of the address fetch cycle, ADDR-CMR occurs, causing the end address in CMR 61 to be subtracted from the begin address in ADDR 60. Because the Processor has already verified that the end address is larger than the begin address, the result of the subtraction, expressed as ADCMP=n, where "n" is the absolute difference, indicates the amount (in digits) by which the begin address may be incremented before becoming equal to the end address.

After the second address has been read, the data transfer module examines the LCP's status count; if STC=8 is true, the flow goes to DTO3 to begin the Write cycle. If an Extended Result Descriptor operation is in progress, the flow remains at DTO2. IF STC=4 is true, the flow goes to DT O5 to begin the Read cycle.

DTO3 - WRITE CYCLE:

The Write cycle begins by setting MARF, thus requesting a memory cycle for the data in the location specified by the contents of ADDR. MARF enables the address comparison (ADDR-CMR), and, when the Data Transfer Module gets priority (PRIRTYX), transfers the memory address from the IOT address register 60 to the Processor's memory address 10$_{pam}$ (ADB←ADDR). When memory control responds (GPL) to the access request, MARF is cleared, MAGF is set, and the results of the address comparison are examined. If the begin address is not at least 4 less than the end address, IOCBF is set.

At MAGF time, the begin address is incremented. If MOD2F is set, indicating that the begin address is mod 2, the address is incremented by 2(ADDR2), thus advancing the address to a mod 4 value. If MOD2F is not set, the address is incremented by 4 (ADDR4) to the next word.

Subsequent to the incrementation, the address is restored to the address register (ADDR←ADD). Restoration of the address causes the floating logic to generate LDADDR as the direct-set level for the register, and MADRS2 as the MUX select level to gate the output of the adder into the address register.

MAGF also causes MAGF←0 and T2F←1. At T2F time, FIG. 5C-21a, the requested data is received from memory and stored in the IN register (INR←MRB), the IN register full flag is set (INF←1), and T2F is cleared.

Now, the INF set, XFER, which is used as an enable term to load various data registers, is generated.

If the begin address is mod 4, XFER enables the transfer of the data word from the IN register to the OTB register (see FIG. 5C-22), sets the OTB register full flag (OTBF←1), and sends a strobe (STIOF←1) to the LCP, signaling that data is available.

If the begin address is mod 2, memory control reads only one byte, and then places that byte on both halves of the Read bus. At T2F time, the two duplicate bytes are transferred from MRB into INR. At XFER time, the most significant byte in INR is transferred to the least significant byte of OTB (OTCD←INAB), the least significant byte is transferred to the character register (REG←INCD), and contents of the character register M11$_m$ are transferred to the most significant byte of OTB (OTAB←REG), and INF is cleared.

If GOFF is set, indicating a mod 2 address, OTBF←1 and STIOF←1 are inhibited, and the character in OTB is not transmitted to the LCP. Detection of INF/ and OTBF/ causes a request for a new memory cycle. At the previous MAGF time, the address was incremented by 2; the address is now mod 4, so the memory cycle results in an entire word being read from memory and placed into INR.

Once set, MOD2F remains set throughout the operation, even though the begin address is no longer mod 2; therefore, at XFER time, the transfers from INR to REG and OTB occur as before. As shown in FIG. 5C-22, the first character read, which is now in REG, is transferred to OTAB, and the most significant character in INR is transferred to OTCD. GOFF is cleared at XFER time, so the OTB full flag can be set, and a strobe pulse can be sent to the LCP to signal that data is available. The least significant character in INR is transferred to REG, where it will remain until the next cycle causes it to be transferred to OTAB.

A new memory cycle is requested when INF is cleared, indicating that INR has transferred its data to OTB (or to OTB and REG, if MOD2F is set), or when OTB is empty (OTBF/), and a LCP strobe is detected, indicating that the data in INR is going to be transferred before the new data can arrive from memory. Memory cycles continue until the end of the memory data field is reached (indicated by IOCBF←1), or until the LCP signals a change of status, indicating that no additional data is required (that is, an ending code was detected, or the LCP data buffer is full).

If IOCBF is detected, the IOT sets TERMF, thus causing the TERMINATE level to be sent to the LCP along with the last data transfer. Upon detection of TERMINATE, the LCP changes its status from 8 to 14. At STC 14, the LCP must be informed if the last data transferred consisted of a word or a character. In order to do so, the IOT examines the begin and end addresses of the data field to determine if the total number of characters transmitted was odd or even; if the term (MOD2F (+) EMOD2F) is false, indicating that both the begin and end addresses were mod 2, or that they were both mod 4, an even number of characters was sent, and the last transmission consisted of a full word. Because the last transmission consisted of a full word, TERMF is cleared and the TERMINATE level is dropped; the absence of TERMINATE indicates to a LCP in STC 14 that the last transmission consisted of a full word.

If the term (MOD2F (+) EMOD2F) is true, indicating that the begin address or the end address, but not both, is mod 2, there were an odd number of characters sent, and the last transmission consisted of only one character. In this case, TERMF is not cleared, nor is TERMINATE dropped. The detection of TERMINATE indicates to a LCP in STC 14 that the last transmission consisted of one character only.

If, due to some error, the LCP does not go to STC 14 following the detection of TERMINATE at STC 8, and the last transmission consisted of only one character, the LCP data buffer address will have been incremented one character position too far; in this case, the IOT sets the Address Error Flip-flop (ADDERF←1), and reports the condition in the IOT result descriptor.

Once the LCP has determined whether a word or a character was transferred, the status is changed from 14 to 12.

As previously mentioned, the LCP can halt the data transfer operation by changing status, typically going from STC=8 to STC =12. If the LCP initiates the halt, there is a possibility that the IOT has already read the next word and incremented the address. In this case, the LCP cannot accept the word; therefore, the IOT must decrement the address so as to enable the rereading of the word at some future time.

When STC=12 is detected, and there is no data being held in the IOT (OTBF/ and INF/), the flow exits to DT04 (Write Break).

DT04 - WRITE BREAK:

Upon entry into DT04, a LCP is typically at STC=12; when the IOT detects STC=12, a strobe pulse is sent to the LCP, and GOF, which enables the transmission of the longitudinal parity word, is set. The LCP responds to the strobe pulse by changing its status to one of the following:
  a. STC=1 Disconnect
  b. STC=7 Result descriptor (i.e., end of operation)
  c. STC=9 Encoded status (i.e., address modification may be required).
  d. STC=13 Break enable (i.e., the LCP requests to return to the Write cycle).

DT05 - READ CYCLE:

The Read cycle begins by setting MARF, and transferring the data field address from ADDR to the Processor's memory address register (FIG. 5C-2). Concurrent with the setting of MARF, the IOT generats XFER and sends a strobe pulse to the LCP.

XFER enables the transfer of data from the DT bus to the OTB register. As shown in FIG. 5C-23, there are several types of transfers that may occur, depending on the OP code (forward or backward), the mod of the address, and the type of transmission (word or character). At GPL time, the address is incremented, and at MAGF time, the data in the OTB register is written into memory.

The IOT waits for a LCP strobe pulse; when the strobe is detected, MARF is set and the next memory cycle begins. Memory cycle continue until the data field is filled, in which case the IOT sets the Terminate flip-flop, thus indicating to the LCP that no more data can be accepted, or until the LCP signals that there is no more data to be transferred.

Detection of a strobe pulse from the IOT accompanied by the TERMINATE level causes the LCP to change status from STC=4 (Read) to STC=12 (Break). When the IOT detects STC=12, it sends another strobe pulse to the LCP. This strobe causes the LCP to change status to either STC=1 (Disconnect), STC=7 (Result descriptor), STC=9 (Encoded status), or STC=13 (Break enable). When one of these status counts is detected, the IOT goes to DT 06.

DT06 - READ BREAK:

The Read Break state is used to check for longitudinal parity errors in the data received in DT05, and also to examine the LCP status so as to determine the next action the IOT must take.

Detection of a LCP strobe pulse at DT06 causes GOF and TERMF to be cleared. The LCP status which accompanied the strobe pulse is examined; if the status indicates disconnect (STC=1) or result descriptor (STC=7), the flow is forced to DT07 to store the current data field address. If STC=9 (encoded status) accompanied the strobe pulse, the IOT responds with an IOT strobe (STIOF←1) and goes to DT11 to examine the encoded status.

A status count of 13 indicates that the LCP is requesting a return to the Read cycle (DT05). The IOT acknowledges the LCP request by setting GOF and returning a strobe pulse to the LCP. If, due to some other request (BSEL or EMREQ), the LCP cannot be returned to the Read cycle, TERMF is set, causing the TERMINATE level to be sent to the LCP. Detection of TERMINATE in the LCP causes the status to change from STC=13 to STC=1; when the IOT detects STC=1, it goes to DT07 (store address).

If the request by the LCP for a return to the Read cycle is granted, a strobe pulse is sent by the IOT, but TERMF is not set. Detection of an IOT strobe and TERMINATE/ causes a LCP at STC=13 to change status to STC=4. When the IOT detects STC=4, the flow returns to the Read cycle (DT05).

The last transmission during the Read cycle (when the LCP was at STC=12), consisted of the LCP LPW. If there had been no errors during the Read cycle data transmissions, the reception of the LCP LPW would have cleared the IOT LPW.

Upon reception of the first LCP strobe in DT06, the IOT LPW is examined; if it is not cleared, the Longitudinal Parity Error Flip-flop (LPERRF) is set.

If any of the error flip-flops have been set, GOF is set and the status of the error flip-flops transferred to the address register (ADDR←RD). RITSPF, which was cleared by the scratchpad write floating logic, is again set, causing WRITE to be generated. WRITE and GOF cause EXRDW1 to be generated, which causes the contents of the address register to be written into the first extended result descriptor word. Concurrent with the generation of EXRD1, GOF causes DT←00 to occur, forcing the flow to the idle state.

If the LCP has completed its operation and is going to write a result descriptor (STC=7), the data field address is restored to the channel's scratchpad, and a strobe pulse is sent to the LCP. When WRITE is detected, the flow goes to DT09 to store the result descriptor, and LCPRDA is generated.

LCPRDA is used to determine the memory address of the LCP channel's result descriptor, and then to place that address into the address register. The result descriptor address is specified by the expression (CH×20) +108, where CH is the channel number of the LCP.

DT09 - STORE LCP RESULT DESCRIPTOR:

In response to the I/O strobe received from the previous state, the LCP returns its status, accompanied by a LCP strobe. As shown in FIG. 5C-24, upon reception of the LCP strobe at DT09, the status is examined; at this time, status should indicate that the LCP is in one of the following states:
 a. STC=2 (Not Ready)
 b. STC=3 (Ready)
 c. STC=7 (Result Descriptor)
 d. STC=15 (Result Descriptor LPW)
Any other status is illegal and will be flagged as such.

STORE RESULT DESCRIPTOR:

In the course of a normal operation, STC=7 is true when the flow enters DT09, and the result descriptor is on the data lines. The result descriptor is stored in the OTB register, GOF is set, and a strobe pulse (ST1OF←1) is sent to the LCP. A memory cycle is requested for the channel's result descriptor location (specified by LCPRDA in the previous state), and the result descriptor in OTB is written into main memory.

When the next (second) LCP strobe is received, the LCP status is again examined; this time, the status should indicate that the result descriptor LPW is on the data lines (STC=15), or that an extended result descriptor is to be written (STC=7).

Assuming STC to be 15, the LPW from the LCP is stored in OTB; at the same time, the LPW being assembled in the IOT is incremented by the LCP LPW. If there have been no errors in the transmission of the result descriptor, the addition of the LCP LPW will clear the IOT LPW; if the IOT LPW is not cleared, the Longitudinal Parity Error Flip-flop (LPERF) is set to flag the error. Because GOF is set, there is no request for memory access; the flow idles until the next LCP strobe is detected.

Typically, the status count accompanying the next LCP strobe indicates that the LCP is Not Ready (STC=2) or Ready (STC=3); in either case, GOF is cleared and Address Select is dropped (DT×ASL←0), thus disconnecting the LCP. The flow then goes to DT10.

STORE EXTENDED RESULT DESCRIPTOR:

If, upon detection of the second LCP strobe, the status count is 7, the result descriptor information from the LCP is stored in OTB as was done following the first LCP strobe. Because GOF is set, there is no memory access request; instead, the Extended Result Descriptor Flip-flop (EXRDF) is set. EXRDF enables the transfer of the contents of OTB to the IOT address register, and initiates the floating logic which subsequently transfers the contents of the address register to the channel's scratchpad memory. EXRDF also generates EXRD1, which is used with the scratchpad address to specify the location in scratchpad memory following that of the channel's end word.

Detection of a third LCP strobe accompanied by STC=7 causes essentially the same events to occur; i.e., the result descriptor information is received from the LCP and stored in the OTB register, transferred from OTB to the address register, then transferred from the address register to scratchpad memory. During this sequence, GOFF, which was set with the first extended result descriptor word was stored, enables ADDRESB, which with EXRD1 causes the data from the address register to be written into the scratchpad location following that of the first extended result descriptor word.

After transmitting the second extended result descriptor word, the LCP sends a strobe, this time accompanied by STC=15 and the result descriptor LPW. From this point, the flow is the same as the basic result descriptor store flow; i.e., at STC=15, the LPW is checked, at STC=02 or 3, the LCP is disconnected, and the flow goes to DT10.

DT10 - STORE IOT RESULT DESCRIPTOR:

The IOT result descriptor stored at DT10, FIG. 5C-21, may be the result of a LCP descriptor completing, in which case the result descriptor is stored in the main memory location specified by the equation (CH×20)+100, where CH is the channel number of the initiated LCP, or it may be the result of an IOT cancel descriptor (OP 71 or OP 72) completing, in which case the result descriptor is stored in main memory location 260 (channel 8 result descriptor area).

Assuming that this pass through DT10 is the result of a LCP operation, GOF is in the cleared state, thus allowing the error flags (LPERF, VPERF, ILSTCF, etc). to be transferred to the OTB register (OTB←RD). GOF is then set, and a memory cycle is requested for the LCP channel's result descriptor location. At MAGF time, the result descriptor word in OTB is transferred to the Write bus, and a signal (INTJ) is sent to the Processor to indicate that a result descriptor has been written. Subsequently, the Channel Busy Flip-flop is cleared, and the flow goes to the IOT idle state, DT00.

If DT10 is entered as a result of an IOT cancel operation (OP 71 or OP 72), GOF is in the set state, indicating that the result descriptor information is already in the OTB register as a result of the actions in DT00; therefore, OTB←RD is inhibited. A memory cycle is requested, this time for the channel 8 result descriptor location (260), and the IOT result descriptor is written. The IOT Busy Flip-flop is cleared and the flow goes to the IOT idle state, DT00.

DT11- ENCODED STATUS:

During a read or write operation, the IOT increments the A address by 4 for each data transfer. Therefore, if the first character of a word transferred between the IOT and the LCP happens to be an ending code, the LCP's A address will have been incremented two digits beyond the end of the message.

The LCP signals the IOT that the first character was an ending code by raising STC=9 during the IOT Read or Write sequence (DT05 or DT03). Upon detection of STC=9, the IOT flow leaves the Read or Write sequence, goes to the appropriate break state, and from the break state, goes to DT11. During this time, the LCP has changed its status to either 1 or 7, and set the D1 bit on the data bus to indicate that the address must be modified.

At DT11, when STC=1+7 is detected, the flow is forced to DT07 to restore the A address to the channel's scratchpad memory. If the D1 data bit from the LCP is on at DT11, the begin address is decremented by 2 prior to writing it back into the address scratchpad.

RECONNECTION MODULE FLOW

After having been connected to the IOT and receiving the descriptor and descriptor link, a LCP may disconnect from the system in order to communicate with its associated peripheral device. If that LCP subsequently requires access to memory, it must re-establish a connection and return the descriptor link to the IOT.

When a LCP requests access to memory, it sends a signal (LCPRQ) to the base distribution card $20_{od}$. In response to the request by the LCP, the distribution card initiates a "poll request" operation.

POLL REQUEST:

The poll request determines which one of several possible requesting LCPs is to be granted access, and then connects that LCP to the IOT. As shown in FIG. 5C-25, the poll request is initiated when a LCP activates its request line (LCPRQ). The distribution card then resolves any base priority conflicts that may occur, and forwards an interrupt request signal (IP) to the IOT. If the IOT has a Data Transfer Module available, it responds to the distribution card with the Access Granted (AG) signal. Upon receipt of AG, distribution cards in bases having requesting LCPs send the global priorities of those LCPs to the IOT.

The IOT determines which distribution card sent the highest global priority, and then responds to that distribution card with Address Select and Channel Select. The other distribution cards with lower global priorities receive Address Select only, which indicates to them that their requests were denied, and that they must initiate another poll request.

The distribution card that receives both Address Select and Channel Select activates the address line of the requesting LCP. When the LCP detects its address, it enables its backplane receivers and drivers, and then responds to the distribution card with the LCP connected signal, LCPCON.

Upon receipt of LCPCON, the distribution card sends a strobe pulse (LCPST) to the IOT as an indication that the LCP is connected. Detection of LCPST causes the IOT to drop Channel Select and Access Granted, thus ending the poll request portion of the reconnection sequence.

PRIORITY:

For those instances when two or more LCPs simultaneously request a reconnection, a 2-level priority resolution scheme has been implemented. This scheme considers priorities both internal and external to the LCP Base Module.

BASE PRIORITY:

The internal priority resolution scheme (Base Priority) determines which one of the several possible requesting LCPs within a base is to be allowed to compete with LCPs from other bases for access to the IOT. The base priority for each LCP is set by strapping on the distribution card. The base priority for a LCP may be any value from 0 (lowest) to 7 (highest); no two LCPs within the base may have the same base priority. The selection of the base priority value is dependent upon the relative transfer rates of the peripheral devices. Those LCPs connected to high transfer rate devices, such as magnetic tape or disk pack, are typically assigned the higher piorities (4 through 7), and those LCPs connected to low transfer rate devices, such as card readers, printers and operator terminals, are assigned the lower priorities.

If a base contains only low transfer rate LCPs, those LCPs may be assigned the higher priorities (4 through 7); conversely, if the base contains only high transfer rate LCPs, they may be assigned the lower priorities (0 through 3). If a base contains two or more of the same type of LCP, those LCPs may be assigned sequential priority values. As shown in FIG. 5C-25a, the request lines (LCPRQn/) from the LCPs are strapped to the inputs of a priority encoder (ENPO).

The output of the encoder is the BCD equivalent of the highest value input; that is, the requesting LCP with the highest base priority.

GLOBAL PRIORITY:

Once base priority has been resolved, a LCP must contend with LCPs from other bases for access to the IOT. Global priority resolution is the means by which a LCP is selected from the several possible requesting LCPs. Global priority is assigned (by strapping) at installation time, and is based upon the absolute transfer rate of the LCPs associated peripheral device. The global priority may be any value from 1 (for a low-speed device) to 6 (for a high-speed device). It is acceptable to have more than one LCP with the same global priority in a base.

As shown in FIG. 5C-25a, the BCD output of the base priority resolution encoder is the input to a BCD-to-decimal encoder (DCBO). Each of the GPADn/ output lines from the DCBO is jumpered to the appropriate pin or pins of a group of three ENPOs, to generate the desired global priority value (see detail A in FIG. 5C-25a). Note that if a LCP activates its emergency request line (EMREQ), a global priority of 7 is generated.

The distribution card holds the global priority value until the IOT sends Access Granted. When Access Granted is detected, the distribution card sends the global priority to the IOT on data lines D1 through D4.

If an IOT data path is available when an interrupt request is received, the IOT sends Access Granted (AG) to all distribution cards in the system. When the individual distribution cards detect AG, send the global priority levels of their requesting LCPs to the IOT. The IOT then examines the global prioritites to determine which is the highest.

The IOT may have up to four base driver cards, with each card divided into two sections (top and bottom). Each half of each driver card can connect to one of the eight bases that may be in the system.

In the IOT, the global priority values from the distribution cards are bused to the global priority resolution circuits. The global priority levels from the two distribution cards that may be connected to each base driver card are compared, FIG. 5C-26. A signal is generated which indicates that either the top or bottom half of the driver card received the highest priority value. The half receiving the highest priority from its associated distribution card then forwards that priority to the next stage of comparison, FIG. 5C-27.

In the next stage, the highest priority from driver card 1 is compared to the highest priority from driver card 2, and the highest priority from driver card 3 is compared to the highest priority from driver card 4. As shown in FIG. 5C-27, the outputs of these two stages are compared, thus determining which of the eight possible bases has the highest global priority.

IOT RECONNECTION SEQUENCE:

The RC sequence (shown in FIG. 5C-28) is initiated when an interrupt request is received from one or more of the bases. Detection of the interrupt generates INTREQ, which, at RC00, generates RCNECT.

RCNECT goes to the RCN-COM card, where it sets the Reconnect Flip-flop (RCNCTF), which enables the selection of an IOT data bus (RCAF or RCBF; see previous discussion on "OTB Switching Logic" and FIG. 5C-7). The selection of RCAF or RCBF also generates RCSTART on the OTB-COM card.

RCSTART increments the RC counter (RC+1), and also sets the Access Granted Flip-flop, thus causing AG to be sent to all bases. In response to Access Granted, the requesting distribution cards send their individual global priorities to the IOT. The IOT compares the global priorities of the requesting distribution cards, and then sends the Channel Select signal to the requesting distribution card having the highest global priority.

As shown in FIG. 5C-29, RCADSL, which occurs one clock after Channel Select, selects the -2 volt inputs to the multiplexor, thus generating Address Select for all base driver and distribution cards in the system.

The distribution card that receives both Channel Select and Address Select responds to the IOT with a LCP strobe, then sets its LCP Address Flip-flop, thus driving the address line of the requesting LCP. When the LCP detects that its address line is active, it responds to the distribution card with the LCP connected signal (LCPCON).

Upon receipt of the LCP strobe, the IOT drops Access Granted and Channel Select; when the distribution card detects the absence of Access Granted and Channel Select, and the presence of LCPCON, it assumes the connection to be completed, and responds to the IOT with LCP strobe, accompanied by the LCP status.

The poll request is now complete; the distribution card takes no further part in the LCP-IOT communication. The LCP and the IOT continue with the reconnection sequence until the LCP is connected, after which control is passed to the IOT Data Transfer Module. The LCP remains connected until the IOT drops Address Select.

Following a successful poll request (RC 02), FIG. 5C-28, the IOT receives and stores the descriptor link. At RC 03, the LCP transmits the second descriptor link word, but because DLR←DAT is not generated, no information is stored. The second descriptor link word does, however, increment the LPW.

At RC 04, the descriptor link LPW is received, and at RC 05, the LPW is checked. If the LPW is correct, the flow goes to RC 06 , where RCDTSL is generated.

RCDTSL enables the selection of a Data Transfer Module, and also generates the appropriate start signal for that module. The Data Transfer Module then assumes control and begins communications with the reconnected LCP.

Message Level Interface:

As was previously described in reference to FIG. 2, the LCP Base Module $20_0$ is typical of the other Base Modules in that each individual Base Module contains a Distribution Card $20_{0d}$ which services up to eight LCP's. In addition, each LCP Base Module has a Maintenance Card such as $20_{0m}$ and a Termination Card $20_{0t}$.

The Distribution Card for each LCP Base Module provides an interface between the LCP Base Module and the Input-Output Translator $10_t$ of the Main System 10. As seen in FIG. 2, the message level interface 15 provides a channel to the IOT $10_t$ from each LCP Base Module by means of 25 lines. These lines are shown in FIG. 5E. The functions of each of these individually identified lines are listed in Table VI herein below:

TABLE VI

| | (Refer to FIG. 5E also |
|---|---|
| Signal Name | Description |
| ADDSEL | Address Select. This signal, when active, indicates that the IOT is connected to, or is attempting to connect to, a specific LCP. Once the connection is made, the LCP remains connected until the IOT drops ADDSEL. |
| AG + SIO | Access Granted or Strobe I/O. If an LCP is not connected; this signal indicates that the LCPs request for reconnection has been granted, and initiates the "Poll Request" |

TABLE VI-continued
(Refer to FIG. 5E also)

| Signal Name | Description |
|---|---|
| | algorithm. If the LCP is connected, this signal is the IOT's acknowledgement for information received, or strobe for information transmitted. |
| TRM + MC | Terminates or Master Clear. If no LCP's are connected, this signaL will cause all on-line LCP's to clear. If an LCP is connected, this signal will terminate the connected LCP. |
| LCPST | LCP Strobe. If aN LCP is connected, this signal is the LCP's acknowledgement for information received, or the strobe for information transmitted. This signal is also used by the Distribution Card as an acknowledgement during Poll Test and Poll Request. |
| ER + ST8 | Emergency Request or LCP Status 8. When activated by an unconnected LCP, this signal indicates that the LCP requires immediate access to the IOT. If activated by a connected LCP, this signal indicates that bit 8 of the LCP status is set. |
| IP + ST4 | Interrupt Request, Poll Test Parity Error, or LCP Status 4. When activated by an unconnected LCP, this signal indicates that the LCP requires access to memory, i.e., the LCP is requesting a reconnection. If activated during a system-initated connection sequence (Poll Test), this signal indicates that a parity error was detected during the Poll Test. If activated by a connected LCP, IP + ST4 indicates that bit 4 of the LCP status is set. |
| PB + ST2 | Port Busy or LCP Status 2. When detected during a Poll Test, this signal indicates that the LCP Base is "busy". If activated by a connected LCP, PB + ST2 indicates that bit 2 of the LCP status is set. |
| CS + ST1 | Channel Select or LCP Status 1. When activated by the IOT and transmitted to an LCP Base, this signal indicates "channel select", and that a connection or reconnection attempt has been initiated. If activated by a connected LCP, CS + ST1 indicates that bit 1 of the LCP status is set. |
| PARITY | Parity. This bidirectional line carries the proper (odd) parity for the information on the 16 data lines. |
| DATAxn | Data Lines (x = A, B, C, or D; n = 1, 2, 4, or 8). In the unconnected state, these 16 bidirectional lines are used for addressing and priority resolution in connection or reconnection attempts. In the connected state, these lines are used for the transfer of data between the IOT and the LCP. |

The message level interface 15 (MLI) which consists of 25 signal lines connecting the Distribution Card as $20_{0d}$, of a particular LCP Base Module as $20_0$, to the IOT $10_t$ provides assurance that the signal discipline presented to the IOT is a standard one regardless of the variations of logic and operation found in the different types of LCP's. It will be noted that some of the MLI signal lines 15 shown in FIG. 5E are bidirectional, and are assigned multiple functions, depending on the source of the signal and the state (connected or disconnected) of the LCP.

The Distribution Card $20_{0d}$ for a given LCP Base Module is used to provide a part of the Message Level Interface between the IOT and the individual LCP's within the Base Module. The Distribution Card also works in conjunction with the IOT Connection Module $10_{tb}$ to establish a data path to a specified LCP (Poll Test), and, upon request by an LCP, works with the IOT Reconnection Module $10_{td}$ to establish a path from that particular LCP to the IOT (Poll Request).

LCP Status Counts:

During the time a particular LCP is connected, it follows a standard communication procedure with the IOT. Although the sequence of events followed in the communication procedure may not be identical for all LCP's, the events occurring in any one point in the sequence will be identical.

Figure 6A:
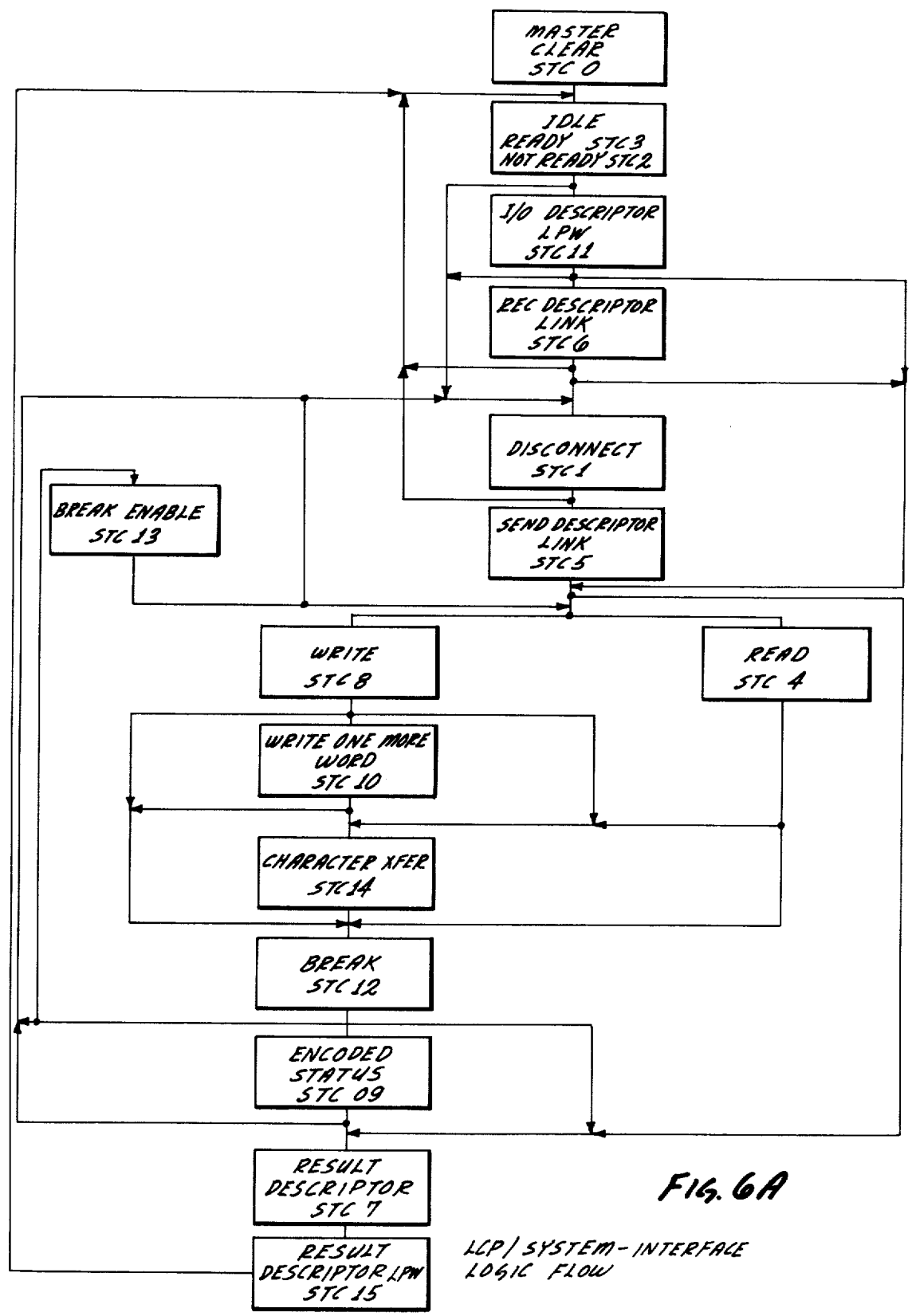
FIG. 6A is a logic flow diagram of the interface between the Main System and the Line Control Processor (LCP)

The steps in the sequence, which are numbered 0 through 15, are called "Status Counts" and are transmitted to the IOT. The IOT examines the "Status Counts" each time it receives a strobe pulse from the LCP and, based upon that status count, takes appropriate action. More detail in the sequence and use of status counts will be provided hereinafter. FIG. 6A is a diagram showing the various status counts and the logic flow which they involve. Detailed explanation of this logic and the status counts involved will be provided hereinafter.

LCP Base Module Backplane:

A local common backplane is provided in each of the LCP Base Modules $20_0$, $20_1$, $20_2$, etc. Each backplane connects to all the eight LCP's in the Base Module. The backplane is constructed so that all signal lines are bussed the length of the backplane, thus making each line available to all LCPs in that Base Module. From the individual position of a single LCP, these backplane lines fall into two general types: (a) those going to the Distribution Card and on to the IOT; and (b) those going to the Maintenance and Termination Cards. With the exception of the various clock and voltage lines, those lines going to the Maintenance Card, (such as for example, $20_{0m}$ of FIG. 2) are used for local or off-line maintenance functions.

Of those lines which go to the Distribution Card, and on to the IOT, some, such as the data and the parity lines, must be gated to individual LCPs. This gating is enabled only when the LCP is in the "connected" state; when the LCP disconnects, the gating is disabled. The LCP is in a "connected" state when the LCP can transfer data between the IOT and itself. The "disconnected" state of an LCP is where the LCP is disconnected from the IOT, but is now able to transfer data between itself and its peripheral unit.

In addition to the gated lines, there are some lines which are dedicated to each individual LCP, for example, the line which goes from the Distribution Card to only one LCP. Those lines, which require no gating, are used for signals such as the LCP request for reconnection or the LCP address lines.

During the time an LCP is connected to the IOT, that LCP has the exclusive access to the Base Module Backplane. It is during this "connected" time that the IOT-LCP data transfer occurs. Upon cessation of the data transfers, the LCP disconnects from both the IOT and the Base Module Backplane, thus freeing them for use by other LCP's in the sysem. Once disconnected, the LCP is free to communicate, via the frontplane, with its associated peripheral device, such as device 50. When a disconnected LCP requires that the connection to the IOT be re-established, that LCP sends a request signal, via one of its dedicated backplane lines, to the Distribution Card, such as $20_{0d}$. Reception of the LCP request causes the Distribution Card to begin the "Poll Request" algorithm and to initiate the IOT Reconnection Module, $10_{td}$, FIG. 5C.

Line Control Processor:

An LCP, Line Control Processor, is a device which is used as an interface unit between a specific peripheral device and the Main System. The LCPs are made in a variety of types, each designed to operate with a specific type of peripheral device. Since peripheral devices are differet in their operational characteristics, the LCP is devised to handle, control and be particularly adaptable to its own specific peripheral device. However, there are certain general characteristics of the LCP interface unit which establish a common characteristic for all LCPs. Basically, the common characteristics of each LCP involve: the ability to transform serial data to parallel data or to transform parallel data to serial data; to transform format from character to word-format, or to transform from word to character-format; to recognize and take appropriate action in response to certain standard control characters or signals.

A generalized block diagram of a Line Control Processor is shown in FIG. 6B, which also indicates the relationship to Distribution Card Unit $20_{od}$ and IOT $10_t$. If the LCP is assumed to be in the "connected" state, and that a "write" operation has been initated, then data from the IOT $10_t$ enters the LCP through the backplane receivers $23_r$. Then the Multiplexor $24_{x1}$ is used to select the "data source" for the operation, which in this case is the IOT $10_t$.

The output of Multiplexor $24_{x1}$ is bussed to both the LPW (longitudinal parity word) circuitry $24_w$ and also to the Multiplexor $24_{x2}$, which gates the data from Multiplexor $24_{x1}$ into the data buffer $25_{00}$. The LCP continues to receive data from the IOT $10_t$ until the data buffer $25_{00}$ is filled.

In the period that the LCP is receiving data, the LPW circuitry $24_w$ is generating the LPW sum; then at the end of the transmission, the IOT $10_t$ sends a longitudinal parity word LPW, (consisting of the "complement" of the transmitted word) which, if there were no errors in the transmission "clears" the LPW circuitry $24_w$. If the circuitry $24_w$ does not clear, then an error is indicated.

When the data buffer $25_{00}$ is filled, the LCP disconnects from the Main System (IOT) by disabling its backplane transmitter drivers $23_x$ and backplane receivers $23_r$; the LCP then establishes a data path to the peripheral device, such as 50, by enabling its frontplane transmitter drivers $28_x$ and frontplate receivers $28_r$. Once this path is established, the LCP uses Multiplexor $27_x$ to select data (translated or untranslated) from the data buffer $25_{00}$ to be transmitted to the peripheral device 50. The transmission continues until the data buffer $25_{00}$ is empty, at which time the LCP requests a "reconnection" (to the IOT), either to store a Result Descriptor or to request more data.

If a "read" operation is in progress and the LCP is disconnected from the Main System (IOT), data from the peripheral devie 50 enters the LCP via the frontplane receiver $28_r$. The output of the receiver $28_r$ is bussed to Multiplexor $24_{x1}$, which now selects the peripheral device 50 (through frontplane receiver $28_r$) as the "data source". The output of Multiplexor $24_{x1}$ bypasss the LPW circuitry $24_w$ and goes on to Multiplexor $24_{x2}$, which selects Multiplexor $24_{x1}$ as the input to the data buffer $25_{00}$. When the data buffer $25_{00}$ is filled, the frontplane receivers $28_r$ and the frontplane drivers $28_x$ are disabled, then the LCp reconnects to the IOT $10_t$, and the backplane receivers 23r and backplane drivers $23_x$ are enabled.

The LCP now begins transmission (to the Main System 10) of the data from the data buffer $25_{00}$, through the Multiplexor $27_x$ and driver $23_x$, over to the IOT $10_t$. During this transmission, the output of Multiplexor $27_x$ also goes through the Multiplexor $24_{x1}$ over the LPW circuit $24_w$. When the data buffer $25_{00}$ becomes emptied, the LCP sends a signal to the IOT $10_t$ indicating that the longitudinal parity word, LPW, is coming, after which it then gates the final LPW sum through Muliplexor $27_x$ and driver $23_x$ over to the IOT $10_t$.

After the transmission of the longitudinal parity word (LPW), the LCP may either disconnect from the Main System (IOT) in order to receive additional data from the peripheral device 50, or, if there is no further data, the LCP may store a Result Descriptor and go on to an "idle" state.

In the above described operations, the informational data could have been transferred between the LCP and the peripheral device in the form of bits, characters, or words, depending on the type of peripheral device involved. The method of data transmission is typically controlled by the type of peripheral device used.

The above mentioned transmitter drivers $23_x, 28_x$ and the receivers $23_r, 28_r$ are items kown in the art and are often called "tri-state buffers". Such type of tri-state devices are desribed in a book published by the Texas Instrument Company and entitled "TTL-Data Book for Design Engineers", 2nd edition, 1976. One typical tri-state buffer is designated as a "hex bus and driver with three state output". Likewise, the above mentioned multiplexors $24_{x1}$, $24_{x2}$, $27_x$ are also known in the art and described in the above mentioned data book for design engineers published by Texas Instrument Company. The use of similar transmitters and receivers is illustrated in U.S. Pat. Nos. 3,675,209, 3,680,055 and 3,975,712. The use of multiplexors is further illustrated by U.S. Pat. No. 3,408,632 and U.S. Pat. No. 3,972,030 and 3,377,619.

Typically, the informational data is transferred between the LCP and the IOT $10_t$ as "words", with some instance of character transfers, as for example, the first or the last character of a transmission. These data transfers between the IOT $10_t$ and the LCP of FIG. 6B are controlled by the exchange of strobe pulses, and the recognition by the IOT $10_t$ of the LCP "status counts", to be described hereinafter.

As previously introduced in connection with FIG. 6A, the status count of an LCP provides standardized information which is transmitted to the IOT $10_t$ and which permits the IOT to take the next appropriate action based on the status count information.

During the time an LCP is "connected" to the Main System, it follows a standard communication procedure with the IOT $10_t$. Even though the sequence of events followed in the communication procedures may not be identical for all LCPs, the particular events which occur at any one point in the sequence of communication procedure are all similar. The steps in the communication sequence, numbered 0 through 15, are called "status counts" and designated "STC". These status counts are transmitted to the IOT $10_t$ which examines the status count (STC) each time it receives a strobe pulse from the LCP, and, based upon that status count, the IOT can take appropratiate action.

Referring to FIG. 6A and the following table, it will be seen that each status count has a particular function and further, depending on the type of LCP and Descriptor involved, the status count will have different exits. The following table VII briefly describes the various LCP status counts:

TABLE VII

| Status Count | Description |
| --- | --- |
| STC = 0 | Master Clear |
| STC = 1 | Disconnect. The LCP is communicating with it's peripheral device. |
| STC = 2 | Not Ready. The LCP is idle. The Peripheral device is not ready. The LCP can receive descriptor information from the System. |
| STC = 3 | Ready. The LCP is idle. The peripheral device is ready. The LCP can receive descriptor information from the System. |
| STC = 4 | Read. The LCP transmits data from its buffer to the System. |
| STC = 5 | Send Descriptor Link. The LCP sends the Descriptor Link to the IOT in order to re-establish connection. |
| STC = 6 | Receive Descriptor Link. The LCP receives the Descriptor Link from the IOT during the IOT "connection" sequence. |
| STC = 7 | Result Descriptor. The LCP transmits its Result Descriptor to the IOT |
| STC = 8 | Write. The LCP receives data from the System. |
| STC = 9 | Encoded Status. One character transmitted; LCP sets D1 bit (FIG. 4C Result Descriptor) as a flag to the IOT. The IOT decrements the address by 2. |
| STC = 10 | Write One More Word. The LCP data buffer can hold only one more word. |
| STC = 11 | I/O Descriptor LPW. The LCP receives and checks the LPW for the I/O Descriptor received in STC = 2 or STC = 3. The I/O Descriptor, after being translated by the IOT, then becomes known as the Command Descriptor. |
| STC = 12 | Break. There is no more data to be transferred. The LPW, is transmitted and checked. |
| STC = 13 | Break Enable. Data transfer has been halted; the LCP is requesting a return to STC = 8 (Write) or to STC = 4 (Read). |
| STC = 14 | Character Transfer. The last transmission consisted of a character instead of a word. |
| STC = 15 | Result Descriptor LPW. The LCP sends the LPW for the Result Descriptor to the IOT. |

Referring to FIG. 5C, the Processor $10_p$ starts the chain of input-output operations by the execution of an Initiate I/O instruction. In this situation, the Processor passes certain information, including the channel number of the desired LCP over to the IOT Initiation Module $10_{ta}$ of FIG. 5C. The channel number is decoded to determine the Base Module number and the address of the LCP, which are then passed over to the Connection Module $10_{tb}$. The Connection Module then selects the proper LCP Base Module and sends a signal (channel select) to the appropriate Distribution Card, as $20_{0d}$, for that Base Module, as $20_0$, requesting that a connection attempt be made. The above described operation is called a "Pool Test" and is a means for the Main System to seek connection to an LCP; it is, further, a method by which the Distribution Card $20_{0d}$, in response to the connection request, also attempts to connect to a specific LCP.

Following the transmission of a "Channel Select", the IOT $10_t$ sends the address of the desired LCP to the Distribution Card in the selected Base Module. At the same time, the IOT sends "Address Select" to all Base Modules in the system. The Distribution Card that receives both the Address Select and Channel Select begins a "Poll Test" and responds to the IOT with an "LCP Strobe"; the Distribution Cards that received the Address Select only, consider it as a "busy" signal, and they are inhibited from communication with the IOT.

When the IOT $10_t$ receives the LCP Strobe, it drops the Channel Select.

When the Distribution Card receives an "Address Select" and "Channel Select", a signal is generated which enables the LCP address to be placed into an LCP address register in the Distribution Card. The BCD (Binary Coded Decimal) output of the LCP address register is decoded to enable one of eight lines. Each line represents one LCP in the Base Module. When an LCP detects that its address line is active, then tht LCP responds to the Distribution Card with the signal LCPCON meaning "LCP connected". When this connected signal is received in the Distribution Card, a connect flip-flop (CONF) is set. Then depending on the state of the I/O send line (ISOND/ FIG 6C) from the connected LCP, this will cause an activation of control lines for either receiving data or sending data as between the LCP and the IOT (FIG. 6C).

If a Distribution Card detects the absence of Channel Select, it responds to the IOT with the LCP's status, accompanied by a strobe. The LCP is now connected to the IOT and remains connected until the IOT drops Address Select; the Distribution Card takes no further part in the IOT-LCP communications.

The above events show the steps leading to a successful "connection" attempt; however, the connection attempt could have failed due to one of the following causes;

(a) there was no LCP at the location addressed or the LCP at the address location was off-line;

(b) the LCP was busy, that is the LCP status count was not 0 or 2 or 3;

(c) the port was busy, that is, a second Distribution Card in the Base Module was busy;

(d) a parity error was detected in the address.

The detection of any of these errors would cause the connection attempt to be aborted and a Result Descriptor indicative of the type of failure to be written and sent to the Main System in $10_{mr}$ of Memory $10_m$ (FIG. 3).

In subsequent discussions, reference may occasionally be made to specific flip-flops and signal levels which are not specifically shown within the block diagrams. Since the design and use of such elements are well known, it is considered to be redundant and over-complex to show all such elements.

Poll Request:

An LCP, after having been connected to the IOT $10_t$ and receiving the Command Descriptor and the Descriptor Link, may "disconnect" from the Main System 10 in order to communicate with its associated peripheral device, such as 50. If that LCP subsequently requires access to Memory $10_m$, it sends a request (LCPRQ) over to the Distribution Card. The "Poll Request" is the method by which the Distribution Card, in response to the LCP's request, attempts to reconnect the LCP to the IOT. A number of events occur during a "Poll Request" operation.

If several LCPs within the Base Module $20_0$ simultaneously request access, the Distribution Card $20_{0d}$ determines which one of them is to gain access by checking their priority levels; thus, the requesting LCP which has the highest priority level (this priority selected at installation time) is given access to the Distribution Card. This priority level is called "Base Priority" as it involves which LCP has what level of priority as among the eight LCPs residing in that particular Base Module.

Once the "Base Priority" is resolved, the Distribution Card assigns a "Gobal Priority" (which has also been assigned and selected at installation time) to the requesting LCP. The "Global Priority" establishes the priority rank between different Base Modules in the overall system rather than just the priority rank of LCPs in one single Base Module.

The Distribution Card $20_{0d}$ contains a series of pins or socket-type connections which are connected to each individual LCP. These pin-socket connections can be jumpered (by a field engineer) to a priority encoder which assigns an internal base priority number from zero (low) to seven (highest) to each LCP. Thus, if several LCP's in the same Base Module request connection concurrently, then the Distribution Card control means will put through the LCP with the highest priority.

Another set of pin-sockets on the Distribution Card are connected to each LCP. These are "jumped" or "strapped" by a field engineer so that each LCP is given a "global" or external priority number to permit the Input/Output Translator interface of the Main System to select amongst LCP's which reside in different Base Modules of the system. Thus, when the "global" priority number is received by the IOT, and there are concurrent requests from other LCP's in other Base Modules, the IOT will select the LCP with the highest global priority number, but this occurs only after internal base priority has been resolved by the Distribution Card.

Those Distribution Cards receiving requests from their associated LCPs, each send an "Interrupt Signal" (IP+ST4) over to the IOT $10_t$. (See message level interface FIG. 5E and Table VI). When the IOT $10_t$ detects the signal IP+St4, it begins the "reconnection" sequence and sends a signal (Access Granted) to all the Base Modules in the system. The "Access Granted" signal causes those Distribution Cards that sent the IP+ST4 to the IOT $10_t$ to being their individual "Poll Request" algorithms.

In response to the "Access Granted" signal, the requesting Distribution Cards send their individual Global Priorities over to the IOT $10^t$, The IOT compares the Global Priorities of the requesting Distribution Cards (that is, sends the Channel Select signal over to the requesting Distribution Card which has the highest Global Priority one clock-time later) and the IOT sends an Address Select signal to all Distribution Cards in the system. The Distribution Card that receives both the "Channel Select" and the "Address Select" responds to the IOT with the LCP Strobe, then sets its LCP Address flip-flop, thus driving the specific address line of the requesting LCP. When the LCP detects that its own address line is active, it then responds to the Distribution Card with the LCP connected signal (LCPCON).

Upon receipt of the LCP Strobe, the IOT $10_t$ drops "Access Granted" signal and the "Channel Select" signal; and when the Distribution Card detects the absence of the "Access Granted" and the "Channel Select" and detects the presence of LCPCON, it then assumes a connection to be completed and responds to the IOT with an LCP strobe, accompanied by the LCP Status Count and the Descriptor Link.

The Poll Request is now complete; the Distribution Card takes no further part in the LCP-IOT communication. The LCP and the IOT continue with the reconnection sequence until the LCP is connected, after which control is passed to the IOT Data Transfer Module $10_{tc}$, FIG. 5C. The LCP remains connected until the time when the IOT drops its "Address Select" signal.

Error Checks:

Each transmission between the IOT and a particular LCP is checked for errors. The error checking methods used are (a) vertical parity checking on each word transmitted, and (b) longitudinal parity checking on each block transmitted.

(a) Vertical Parity:

In "Read" operations, the LCP sends information to the IOT $10_t$ on 16 message level interface (MLI) data lines, (FIG. 5E) accompanied by the parity bit on the MLI parity line, FIG. 5E. The data and parity lines go to a parity generator-checker on an IOT base driver card. In "Read" operations, the parity generator checker is used to count the number of 1-bits on the MLI data and parity lines. If the total number of 1-bits (including the parity bit) is odd, then parity is correct and a signal term (PAROK, FIG. 6D) from parity-generator 48 is generated. If the total number of one bits is even, then the PAROK signal is not generated; the absence of PAROK at the time that data is received, caused the IOT to set a vertical parity error flip-flop (VPERRF).

Similarly, in "Write" operations the 16 data lines from the Main System 10 are bussed to a parity generator-checker on the IOT base driver card. The data on the 16 lines is examined and if an even number of 1-bits is detected, the term PARGEN is generated. This PARGEN signal is then used to force a "1" bit onto the message level interface parity line to accompany the data to the LCP. On the LCP Base Distribution Card, the state of the parity bit controls the parity generator-checker circuit. The parity generator-checker circuit examines the states of the 16 data lines and generates PAROK if the total number of 1-bits, including parity, is odd.

(b) Longitudinal Parity Checking:

Longitudinal parity checking is an error detection method in which a check word generated by a sending unit is compared to a check word generated in the same manner by a receiving unit. These check words are generated by treating each word in the transmission as a 16-bit number, then performing an exclusive OR operation (binary addition without carry) of each word in the transmission. At the end of the transmission, the sending or transmitting device sends the check word it has assembled over to the receiving device. If there have been no errors in the transmission, the addition of the check word from the transmitting device to the check word in the receiving device results in a sum of "0". Thus, if the sum is not "0", a longitudinal parity error flip-flop is flagged (LPERRF).

As was discussed in connection with FIG. 6B, the LCP was provided with LPW circuitry $24_w$. Likewise, there is longitudinal parity checking circuitry in the IOT $10_t$. This circuitry connects in a parallel path to the data bus shown as the lower 16 lines of FIG. 5E.

The Line Control Processor (LCP), such as element $20_{00}$, may be better understood with reference to FIG. 6C which represents a basic block diagram of the major elements involved in addition to some specific details with regard to the RAM buffer such as $25_{00}$ of the LCP, $20_{00}$.

The LCP buffer $25_{00}$ is a random access memory (RAM) which is functionally 256 bits (0–255) wide and 18 bits deep. It can thus hold 256 words of 18 bits each. In one typical embodiment, the buffer $25_{00}$ may have a section designated buffer A, $25_a$, having provision for 90 longitudinal words of 18 bits each; another section designated $25_{xi}$; a Command Descriptor C/D section designated $25_c$; a buffer area B, $25_b$ which may typically be 90 words long, (i.e., from address 128 over to address 218); another buffer area designated $25_{x2}$; a Result Descriptor R/D area $25_r$; another area designated $25_{x3}$; and a Descriptor Link D/L area designated $25_d$.

The RAM buffer $25_{00}$ is addressed by a memory address register 36 having a system address register section $36_s$ and a device address register section $36_d$, which communicate to the buffer $25_0$ via an eight-bit address bus, $B_8$. The RAM buffer $25_{00}$ is functionally composed in the vertical direction (FIG. 6C) of 16 bits plus a parity bit, plus an eighteenth bit called an "end flag bit", the end flag bits residing in a storage section designated as $25_e$.

A "data bus" 47 provides a data input and output channel for the buffer $25_{00}$ to communicate to the Main System 10 through the system interface logic $22_{si}$; and for the buffer $25_{00}$ to communicate to its peripheral unit via a device interface $22_{di}$. The system interface logic $22_{si}$, the device interface logic $22_{di}$, and the common logic $22_c$ schematically represents blocks which refer to more specific elements which are described in connection with FIG. 6D.

As will be later discussed, the system interface $22_{si}$ would include the logic functions which generate the result descriptor and the logic functions which decode and execute the operands including (FIG. 6B) transmitter and receiver $23_{x1}$, $23_r$, the multiplexors $24_{x1}$, $24_{x2}$ and standard clocking logic for the signal lines between data memory buffer $25_{00}$ and the Distribution Card $20_{0d}$. The device interface logic $22_{di}$ would include logic circuitry for parity checking and logic to transfer data between the peripheral device to the data buffer and thence to the Main System. The system interface logic $22_{si}$ would properly include the (FIG. 6D) elements of the STC register 53 and its decoder 54 plus the input multiplexor $24_{x1}$ and the bi-directional lines $B_i$. The device interface logic $22_{di}$ would include the universal asynchronous receiver transmitter (UART) 31 and the UART multiplexor $27_x$ (FIG. 6D).

Figure 6F:
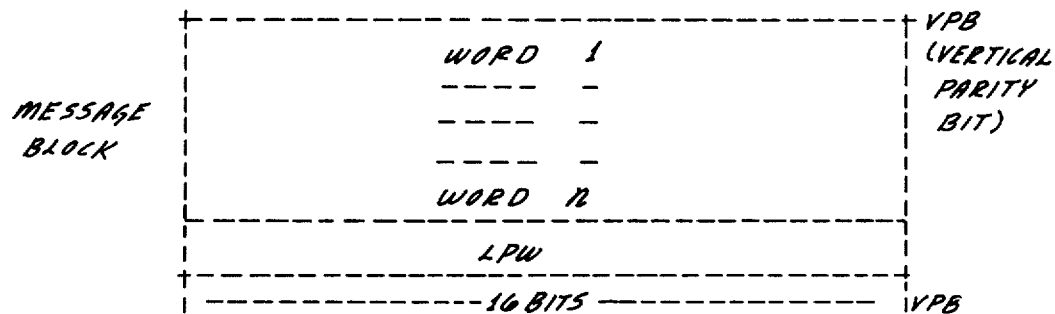
FIG. 6F is a chart showing the arrangement of a message block and the composition of a digital word.
Figure 6F:
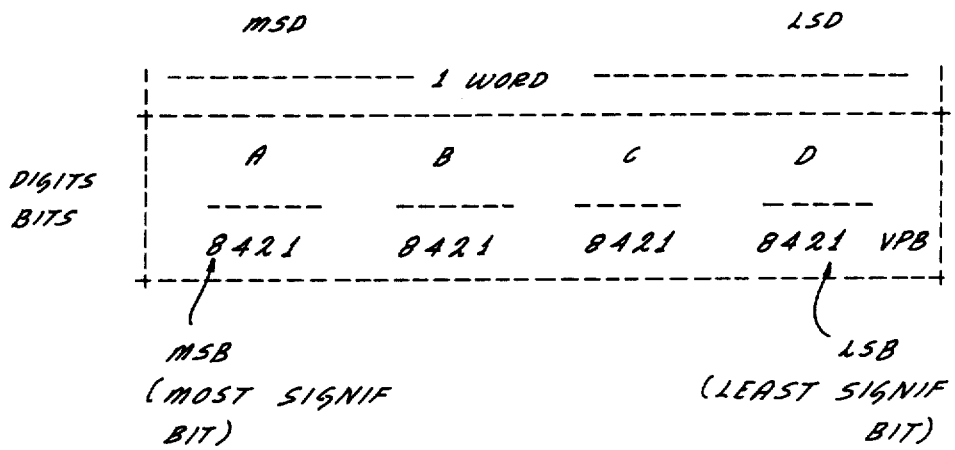

Referring to FIG. 6F, there is shown a "message block" of the type used in the LCP buffer $25_{00}$ of FIG. 6C.

As mentioned with the discussion of FIG. 6C in regard to the RAM buffer $25_{00}$, this is typically a message block of "n" words, which block provides 90 words (or n=90) for data storage; and also there may be provided three words for Result Descriptors R/D; there may be provided three word locations for Command Descriptors C/D; and there may be one word location for Command Messages C/M.

FIG. 6F also shows the basic word format, in that a word is composed of four digits which are: A, B, C, and D plus a parity bit marked VPB (vertical parity bit), which normally makes a total of 17 bits per word.

As seen in the drawing of FIG. 6F, the four digits A, B, C and D are each made up of four bits designated as the "8" bit, the "4" bit, the "2" bit, and the "1" bit.

In FIG. 6C, the buffer $25_{00}$ is also provided with an 18th bit or "end flag" bit which is placed in the location designated $25_e$ of FIG. 6C.

The central or Main System 10 communicates with the peripheral terminal unit via the LCP. The LCP provides the means for transferring control information and data from the Main System 10 to the peripheral terminal units, such as 50, and vice-versa. The LCP looks at the Command Descriptor C/D received from the Main System 10 and sets itself up to perform the operation required if it is sensitive to that particular command. It also transfers the same Command Descriptor C/D unmodified to the peripheral terminal unit. The peripheral terminal unit acts upon the Command Descriptor C/D and returns Result Descriptors R/D to the Main System 10 via the LCP. The message block and the word formats have been shown in FIG. 6F. Typical Command Descriptors C/D and Result Descriptors R/D will be shown subsequently hereinafter.

The LCP accepts the Command Descriptor C/D transmitted by the Main System 10. The C/D contains a digit of the OP code, 3 digits of variants, and 6 digits of C address. The Command Descriptor C/D is received by the LCP via 4 digits per transmission for a total of 3 words (4 digits per word). The two least significant digits contain all zeros. With each word there is a vertical parity bit (VPB) and the entire C/D is followed by a longitudinal parity word (LPW). Should a parity error be detected on transmission of the C/D, the LCP will branch to a Result Descriptor R/D mode and report a descriptor error to the Main System 10.

The random access memory buffer $25_{00}$ (RAM of the LCP) buffers the entire Command Descriptor, the vertical parity bit and the longitudinal parity word within the LCP, Line Control Processor.

The LCP examines the first word of the Command Descriptor C/D and determines whether it is an ECHO OP, HOST LOAD OP, or READ NO timeout OP. If it is one of these, it sets the appropriate flag.

Descriptor Link (D/L):

Following the receipt of the Command Descriptor C/D, the Line Control Processor LCP proceeds to accept the Descriptor Link D/L. This is a two word transmission followed by a longitudinal parity word LPW. Should there be an error, the LCP branches to the Result Descriptor R/D mode, and reports a descriptor error to the System 10.

The random access memory RAM of the buffer (such as $25_{00}$) acts as the buffer for the entire Descriptor Link D/L, the vertical parity bit (VPB) and the longitudinal parity word LPW.

Disconnect Mode:

Following the receipt of the Descriptor Link D/L, the LCP goes to the "disconnect mode".

Reconnect Mode:

If it is an ECHO OP, the Line Control Processor LCP proceeds to "reconnect mode" and starts operating on the ECHO OP which involves the receiving of two buffers of data (each 180 bytes, or 90 words of 16 bits) and the transmitting of the same data back to the System Memory $10_m$.

If it is other than an ECHO OP, the LCP examines the readiness of the peripheral terminal unit. Should the peripheral device be in the "not-ready" state, the LCP branches to the Result Descriptor R/D mode and reports this to the System 10.

If the peripheral device is "ready" the LCP starts communicating the Command Descriptor C/D to the peripheral device, while at the same time branches to the "idle" state to make itself available for a possible "Conditional Cancel OP". The Line Control Processor LCP stops in this "idle" state until one of two things happen:

1. The peripheral device sets up the Line Control Processor LCP to a "data transfer" state.
2. The System 10 communicates a "Conditional Cancel OP" or an Unconditional Cancel.

If it is number 2 above, the Line Control Processor LCP accepts one word from the System 10 followed by the longitudinal parity word LPW, and the LCP determines if it is a valid Conditional Cancel OP. In any case the LCP communicates this to the peripheral device. If the situation involves number 1 above, the LCP branches back to the "disconnect" state, where data transfer between the LCP and its peripheral can occur.

After transmission of the Command Descriptor C/D to the peripheral, the LCP is driven by the peripheral device "state", which defines the operation mode and the memory requirements. Data is transferred in "message blocks" together with a longitudinal parity word (LPW) of 16 bits following each block and with a parity bit on every word (except in a disk pack controller situation, the message block would consist of a segment). If the Line Control Processor LCP detects an error on data received from the peripheral device or from the Main System 10, it reports this information to the peripheral device and then branches to the Result Descriptor R/D mode and reports it to the Main System 10.

In the "Read" mode, the data transfer between the Line Control Processor LCP and the peripheral device is dependent on the requirements of the peripheral device. On the other hand, data transfer between the LCP and Main Memory $10_m$ is dependent upon the memory access rate of the Main System 10. Since the Peripheral device may operate in a "stream" mode, and the LCP must compete with other LCP's for access to memory, the LCP alternates between its two buffer areas to accommodate the transfer rate of the peripheral device.

Table VIII below indicates certain types of Command Descriptors C/D which are used and acted on by the LCP. All other C/D's are transparent to the LCP and pass through to the peripheral device:

TABLE VIII

Command Descriptors
The LCP is transparent to all Command Descriptors except for the following as determined by testing the first word of the C/D:

| | |
|---|---|
| 1. ECHO OP | (bit A1 is true) |
| 2. HOST LOAD | (A4 and B8 are true) |
| 3. READ NO T/O (timeout) | (A8 and B8 are true) |
| 4. CONDITIONAL CANCEL OP | (A2 and B8 are true). |
| 5. UNCONDITIONAL CANCEL | |

OP code digits of the C/D are defined as follows:

| | |
|---|---|
| Read (A8) - | Any operation where data is transmitted from the LCP buffer to the Main System. (1000) |
| Write (A4) - | Any operation where data is transferred from Main System Memory to LCP buffer. (0100) |
| Test (A2) - | Any operation where no data transfer takes place between LCP and System Memory but results in a R/D storage in System Memory. (0010) |
| Echo (A1) - | Operation that results in receiving a message block from System Memory and then transmitting the same block back to System Memory. (0001). |

Normally Result Descriptors R/D are generated by the peripheral unit and accepted by the LCP in one, two or three words. When the LCP generates a R/D, only one word is sent to the Main System 10. Table IX shows the conditions for the LCP to generate a Result Descriptor:

TABLE IX

| Bits | Result Descriptors Condition |
|---|---|
| A8 | Not Ready |
| A4 | Descriptor Error |
| A2 | System Vertical Parity Error |
| A1 | System LPW Error |
| B8) | Time-Out |
| B4 | Remote Device Vertical Parity Error |
| B2 | Remote Device LPW Error |
| B1 | (blank) |

Referring to FIG. 6C with respect to the lines between the device interface $22_{di}$ and the peripheral unit, the peripheral device unit may be provided with a port interface which may be designated as a DDP or device dependent port interface, $50_d$, which is tailored to the requirements of each specific type of peripheral device.

The LCP communicates to the peripheral via the DDP in an asynchronous mode. The "Write" operation is defined as a transfer where the LCP is writing into the peripheral device unit. The "Read" operation is defined as a transfer where the LCP is reading from the peripheral device unit.

Referring to FIG. 6C the line marked HTCL/ may be designated as the Host Transfer Control Level, and when the LCP "Writes" into the peripheral device unit, this signal is the asynchronous level, which signifies the presence of data on the data lines. This level is de-activated by the peripheral unit sending DML/ (peripheral message level) or by sending DINTL/ (peripheral device interrupt level) to the LCP.

When the LCP is "Reading" data on a Result Descriptor R/D from the peripheral unit, this HTCL/ signal is the asynchronous acknowledgement that the data on the data lines has been received by the Line Control Processor LCP. Upon receipt of this level, the peripheral device unit must deactivate DML/ or DINTL/. When the peripheral unit causes the de-activation of DML/ or DINTL/, then the LCP de-activates HTCL/ (the Host Transfer Control Level).

When the peripheral device unit drives the LCP to the Command Message C/M mode, the Host Transfer Control Level HTCL/ is sent to the peripheral device unit when the LCP's buffers are empty and no system terminate has been detected. The HTCL/ must be answered by the peripheral device unit with a DINTL/ and a change-of-state.

The line in FIG. 6C marked HINTL/ is designated as the Host Interrupt Level and is used by the LCP to indicate to the peripheral unit that the LCP wishes to interrupt the operation. The response to this level by the peripheral device must be DINTL/ and a change-of-state, to which the LCP responds by de-activating its Host Transfer Control Level, HINTL/. Following the detection of the trailing edge of HINTL/, the LCP will respond to the new mode of operation described by the state line shown on FIG. 6C as ST-4/, ST-2/, ST-1/.

When an interrupt from the System 10 is activated in the "Write" mode, the Host Interrupt Level HINTL/ signifies that the last word of data has been transmitted and the LPW is on the data line of bus 47. The peripheral unit needs to respond to the interrupt with a DINTL/ and a change-of-state.

In the "Read" mode when the LCP detects the "Read Terminate" command, the LCP will activate the Host Interrupt Level HINTL/. In the Command Message C/M mode, the LCP will activate the Host Interrupt Level HINTL/ if a "Read Terminate" has been detected.

The line of FIG. 6C designated HCL/ refers to "Host Clear" which indicates to the peripheral unit that the LCP is being cleared by the Main System 10, or that a parity error has occurred during a read.

A combination of the Host Transfer Control Level and the Host Interrupt Level (HTCL/ - HINTL/) indicates to the peripheral unit the presence of a Host Load Command Descriptor C/D. The peripheral unit responds by activating the line marked DINTL/ (peripheral interrupt level) and the Status Count ST=2; the LCP acknowledges by de-activating both levels of HTCL/ - HINTL/. Following the trailing edge of DINTL/, the LCP transfers data in the "Write mode".

In FIG. 6C a bidirectional data bus $B_d$ is provided having 16 data lines and a parity line between the LCP and the peripheral unit. When controlled by the LCP, these lines are active as long as the Host Transfer Control Level HTCL/ is active. When control is held by the peripheral unit, these lines are active as long as the peripheral device message level DML/ is active. The direction of transfer is determined by the status of the peripheral unit. The line designated DML/ refers to the peripheral device message level and is a unidirectional line. When the LCP is reading data or a Result Descriptor R/D from the peripheral unit to the LCP, the peripheral device message level DML/ is used as a transit signal to indicate the presence of stable data on the data lines. When the peripheral device receives a Command-Descriptor C/D or data from the LCP, this signal, DML/, is used as an acknowledge level for data.

The peripheral device (via its port interface) uses the DINTL/ (peripheral interrupt level) to request the LCP to change its mode of operation. This is done by activating DINTL/ and presenting the proper state on the state lines, ST-4/, ST-2/, ST-1/. The state lines must be stable during the time that DINTL/ is active.

In the "Write Mode":

DINTL/ is the acknowledge level to the Host Transfer Control Level HTCL/ and the LPW data word; or else it is the response to HTCL/ or HINTL/ in the Command Message C/M mode. DINTL/ will cause a change-of-state to occur for either the above. When the LCP is writing into the peripheral unit, the peripheral device interrupt level DINTL/ is based on the leading edge of HTCL/ or HINTL/. DINTL/ is de-activated by the trailing edge of these signals (HTCL/ - HINTL/).

In the "Read Mode":

The peripheral interrupt level DINTL/ is a no-data transfer "strobe" used exclusively to change states, DINTL/ is acknowledged by the Host Transfer Control Level HTCL/ in the Read Mode. When the LCP is reading from the peripheral device unit, the peripheral device activates DINTL/ instead of the peripheral message level DML/, and de-activates DINTL/ when the peripheral unit detects the leading edge of the Host Transfer Control Level HTCL/.

In the Host Load Mode:

This mode involves the transfer or loading of data from the peripheral device, as 50, FIG. 6C, into the LCP (Host) for the "Read Mode" and vice versa for the "Write Mode".

The peripheral device interrupt level DINTL/ is the acknowledge level to HTCL/ - HINTL/ as the Host Load Command. The peripheral device activates DINTL/ and changes to State 2 (Table X). The LCP acknowledges this by de-activating both HTCL/ - HINTL/, and if in the "Write Mode", starts writing into the peripheral device memory. To interrupt this mode the peripheral device unit 50 activates DINTL/ in the same manner as in a regular "Write Mode".

The "State" lines:

In FIG. 6C, these unidirectional lines ST-4/, ST-2/, ST-1/, indicate to the LCP the state of the peripheral device, and from this, the LCP determines what kind of operation mode is required. For example, in a typical embodiment, there may be eight states, 0-7, as seen in Table X, for the peripheral device which might be used to indicate the following conditions: peripheral device not on-line; Read operations; Write operations; Result Descriptor; Command Message (C/M); reset LCP timer (RT); ready or writing Command Descriptor (C/D); last word of a block or the Result Descriptor and longitudinal parity word (R/D-LPW) is next to be transmitted.

A typical coding system for the state lines from a typical peripheral device unit is shown herein below in Table X:

TABLE X

| ST= | State Lines ST-4/ | ST-2/ | ST-1/ | Condition | Data Line Direction | |
|---|---|---|---|---|---|---|
| 0 | 0 | 0 | 0 | Peripheral Device Not On Line | | |
| 1 | 0 | 0 | 1 | Read | From | Peripheral Device |
| 2 | 0 | 1 | 0 | Write | To | Peripheral Device |
| 3 | 0 | 1 | 1 | R/D | From | Peripheral Device |
| 4 | 1 | 0 | 0 | Command Message | No Data Xfer | |
| 5 | 1 | 0 | 1 | Reset HD Timer (RT) | No Data Xfer | |
| 6 | 1 | 1 | 0 | Ready or Writing C/D | To | Peripheral Device |
| 7 | 1 | 1 | 1 | Last Word of a Block or R/D-LPW is next | To or From | Peripheral Device |

The interface discipline between the LCP and the peripheral device unit via the peripheral device unit port interface (DDP 50$_d$, FIG. 6C) may again be locked at in terms of a "Reading Mode" and a "Writing Mode".

Reading Mode:

with the Line Control Processor LCP reading from the peripheral device unit (State=1+7), the peripheral device unit (as 50, FIG. 6C) places a word on the data lines and activates the peripheral device message level DML/. The LCP acknowledges this by activating the Host Transfer Control Level (HTCL/). The peripheral device unit now de-activates DML/, and then the LCP de-activates the HTCL/. This process continues in State=1 until:

1. The LCP activates the Host Interrupt Level (HINTL/). The peripheral unit acknowledges by de-activating the peripheral message level (DML/), if active, and activates the peripheral device interrupt level (DINTL/) with a change-of-state. This indicates to the peripheral device that the LCP has a "Command Message" C/M to send to the peripheral device.

2. The peripheral device activates the peripheral device interrupt level DINTL/ instead of the peripheral message level DML/, with the proper change in the State Lines. The LCP acknowledges by activating the Host Transfer Control Level (HTCL/), and, following the de-activation of DINTL/, it de-activates the Host Transfer Control Level HTCL/ and goes on to the proper State. DINTL/ does not transfer data on the data lines.

3. When the peripheral device detects it is transmitting the Last Word of a block, the peripheral device changes to Status ST=7 with the leading edge of DML/. The LCP answers the peripheral device with a Host Transfer Control Level (HTCL/) and expects the next transfer to be the longitudinal parity word LPW. The LPW is transmitted with the peripheral message level DML/ and answered with a Host Transfer Control Level (HTCL/).

4. If the LCP detects a vertical or longitudinal parity error, the LCP will not acknowledge the peripheral message level DML/ from the peripheral device. Instead the LCP will generate a Host Clear Level (HCL/).

In the Writing Mode:

If the LCP is writing data into the peripheral device (State=2+7), the following actions take place:

The LCP places a word on the data lines and activates the Host Transfer Control Level (HTCL/). The peripheral device acknowledges by activating the peripheral device message level (DML/). The LCP now de-activates the Host Transfer Control Level (HTCL/), and then the peripheral device de-activates the peripheral message level (DML/).

This process continues (Table X) in Status ST=2 until:

1. The peripheral device changes state to ST=7, then activates the peripheral message level DML/ which flags the LCP that the Last Word of that block has been received. The next word in the data lines must be a longitudinal parity word LPW when the Host Transfer Control Level HTCL/ becomes active again. Then the peripheral device activates the peripheral interrupt level DINTL/ instead of the peripheral device message level DML/, accompanied by a change in the State Lines.

2. At ST=2 or ST=7, the LCP activates the Host Interrupt Level HINTL/ instead of the Host Transfer Control Level HTCL/. In this mode, HINTL/ signifies an interrupt and that a longitudinal parity word LPW is on the data lines. The peripheral device acknowledges by activating the peripheral interrupt level DINTL/ and a change-of-state. The LCP de-activates the Host Interrupt Level HINTL/ and goes to the proper mode after DINTL/ is de-activated.

In another mode called the "Result Descriptor R/D Mode", the LCP reads a Result Descriptor R/D from the peripheral device (State=3+7). When in the R/D Mode, the LCP is reading the Result Descriptor on the data lines from the peripheral device. The Result Descriptor R/D can be from 1 to 3 words long plus a longitudinal parity word LPW. The first and second words of the 3-word Result Descriptor R/D are read in Status ST=3. The last word of the Result Descriptor R/D is read in Status ST=7. The peripheral device message level DML/ signifies there is stable data on the data lines. Each Result Descriptor R/D word transferred is then acknowledged with a Host Transfer Control Level HTCL/. If a 1-word Result Descriptor R/D is received by the LCP, then data transfer occurs after going from Status ST=3 to Status ST=7 together with a peripheral device message level DML/ which signifies a 1-word Result Descriptor R/D. The next word on the data lines is the R/D longitudinal parity word LPW which is strobed by the peripheral device message level DML/. After the LCP finishes reading a complete Result Descriptor R/D together with its appropriate longitudinal parity word LPW, the peripheral device returns to Status ST=6. It can now accept a Command Descriptor C/D.

Command Message C/M Mode:

This involves the situation in which the LCP is writing a Command Message into the peripheral device (State ST=4). When the LCP is in the "Read" mode and is directed to the Command Message C/M mode (DINTL/+ST=4), the LCP continues to send data to the Main System 10 until:

1. The "read-system terminate" is detected which results in activating the Host Interrupt Level HINTL/ or:

2. Data buffer areas A and B (of buffer $25_{00}$, FIG. 6C) are empty and the "read-system terminate" is not detected. This causes the LCP to activate the Host Transfer Control Level HTCL/, indicating that the Main System 10 expects more data.

The Reset Timer (R/T) Mode:

This occurs when the peripheral device resets the LCP time (State ST=5). A change-of-state to ST=5 resets the LCP timer. This change-of-state occurs without a strobe. The peripheral device unit must remain in ST=5 for at least 500 nanoseconds.

The Send Command Descriptor (C/D) Mode:

In this case the LCP is writing a Command Descriptor C/D into the peripheral device (State=6). In this send Command Descriptor Mode C/D, the LCP writes 3-words followed by a longitudinal parity word LPW. The Host Transfer Control Level HTCL/ that accompanies the C/D and LPW is acknowledged by the peripheral device interrupt level DINTL/ and a change to the proper state.

The Last Word of Block Mode:

This is the State=7 (of Table X) and during a "Read" operation with ST=7, the LCP is reading the last word of a block of data (or else a Result Descriptor R/D) from the peripheral device. The next word will be an LPW. During a "Write" operation with ST=7, the LCP is writing the last word of a block into the peripheral device. The next word will be a longitudinal parity word LPW.

Conditional Cancel:

After the LCP writes the Command Descriptor C/D into the peripheral device unit and before the peripheral device changes from Status ST=6 with the peripheral interrupt level DINTL/, the Main System 10 can terminate the operation (OP) by issuing a "Conditional Cancel". In this case, the LCP de-activates the Host Transfer Control Level HTCL/ and then activates the Host Interrupt Level HINTL/ as long as the Status ST=6 and DINTL/ is not active.

Unconditional Cancel:

The Main System 10 can generate an "Unconditional Cancel". This causes the LCP to generate the Host Clear Level HCL/ to the peripheral device. No acknowledgement is required from the peripheral device.

The LCP (Line Control Processor) Subsystem consists of a number of individual LCPs which communicate to the Main System 10 through the IOT $10_t$. While each of the several LCPs have basically the same design and provide the same basic system functions, there are variations of a minor nature as between the various types of LCPs, since each LCP is tailored to meet the operational requirements of the particular peripheral terminal unit that it services.

The discussion following herein will involve an operational description of one preferred embodiment of a particular LCP which is provided for a peripheral terminal unit known as the "Supervisory Terminal".

The necessary functional elements of the LCP include registers, counters, encoders, decoders, busses, logic elements, etc. In addition there is a large scale integrated (LSI) receiver/transmitter for implementing communication between the LCP and its peripheral terminal unit. Within the LCP, there are functionally two divisions that are used for communication between the LCP and the Main System 10. They are designated as the "read module" and "write module". These modules exist "functionally", but they are not separate components, since many of the logic levels of which they are composed are shared by both modules. The "read module" is used to transfer data from the LCP over to the Main System 10, and is active when the transmit flip-flop (XMITF) in the LCP is set. The "write module" is used to transfer data from the Main System 10 over to the LCP, and is active when the receive flip-flop (RECVF) is set.

Functionally, the components of the LCP are contained in three major sections: (A) Terminal Control; (B) Data Flow; and (C) System Logic Section. In order to understand the means by which the LCP communicates with the Main System 10 and with the associated peripheral terminal unit, such as 50, the functional characteristics of the following components will be discussed:

A. Peripheral Terminal Control Section
  1. Universal Asynchronous receiver/transmitter (UART).
  2. UART Multiplexor.
  3. Block check character register (BCCR).
  4. Block check character decoder.
  5. End code decoder.
  6. Memory address register.
B. Data Flow Section
  1. Input Multiplexor
  2. OP code register.
  3. Variant register.
  4. Valid OP encoder.
  5. LCP buffer (RAM).
  6. Terminal bus multiplexor.
  7. Terminal bus.
  8. Vertical parity generator/checker.
  9. Data Latch register.
  10. Longitudinal parity word (LPW) register.
  11. LPW encoder.
  12. End code decoder.
C. System Logic Section
  1. Status Count (STC) register.
  2. STC decoder The above mentioned functional components will be understood with reference to FIGS. 6B, 6C, 6D, 6E, and 6F, with particular references to FIG. 6D.

Examples of types of interconnections between peripheral devices and I/O interface units may be found in U.S. Patents, such as Nos. 3,510,843; 3,514,785; 3,526,878. Examples of the circuitry involved in communication between remote units and corresponding buffer registers in a typical fashion can be found by reference to U.S. Pat. No. 3,390,379.

With reference to FIG. 6D and the Peripheral Terminal Control (Section A) previously mentioned, the universal asynchronous receiver transmitter (UART) 31 is used as the interface between the asynchronous serial data channel of the terminal unit device interface $22_{di}$ and the parallel data transmission channel of the LCP. The transmitter section of the UART 31 converts a parallel data character and the control levels into serial information containing a start bit, data, a parity bit, and a stop bit. The receiver section of the UART 31 converts serial information, containing a start bit, data, a parity bit, and a stop bit, into a parallel data character. The UART 31 generates a parity bit for information transferred to the terminal unit device interface $22_{di}$, and it also checks the vertical parity of information received from the device interface terminal unit $22_{di}$.

The UART 31 has provisions for selecting various character lengths, odd or even parity generation/-checking, and a choice of one or two stop bits. For use with a particular LCP, the UART 31 has options selected to provide the following characteristics:

(a) a character containing seven data bits;
(b) generation/checking of even vertical parity;
(c) one stop bit.

The UART Multiplexor $27_x$ accepts an 8-bit character from either the AB (first two) digits of the terminal bus 47 or from the block check character register (BCCR) 33. The selected input is sent to the parallel data input bus of the UART 31. The UART Multiplexor $27_x$ is used only for the transfer of data or for a block check character from the LCP over to the terminal device interface $22_{di}$.

The block check character register (BCCR) 33 is a register which consists of eight separate flip-flops operated in the "toggle" mode, with inputs connected to the AB digits of the terminal bus 47. While the LCP is transferring data to the terminal device interface $22_{di}$, the BCCR 33 accumulates a block check character (BCC) to be sent to the device interface terminal unit $22_{di}$. When the LCP is receiving data from the device interface terminal unit $22_{di}$, the BCCR 33 also accumulates a "block check character" to be checked against yet another "block check character" (BCC) sent from the device interface terminal unit $22_{di}$. The block check character accumulation is started upon the receipt of the first character following a STX (start of text) or a SOH (start of heading) character, and continues until an ETX (end of text) character is received. Only messages and control sequences containing a STX or a SOH character will cause a block check character (BCC) to be accumulated.

The accumulation of the BCC consists of applying each character being transferred to the input of the BCCR 33 and performing a binary addition without carry (Exclusive OR function). Prior to each operation in which a BCC will be accumulated in the BCCR 33, the register is cleared. At the end of a data transfer, the exclusive OR function is again performed between BCC's of the sending and receiving units. If no errors have occurred, both BCC's will be identical and the resultant value in the BCCR 33 will be "all zeros".

The block check character decoder 34 receives the output of the BCCR 33. At the end of a transmission from the peripheral terminal unit 50, a BCC is received and checked against the contents of the BCCR 33. IF the two BCC's are identical, then the output of the BCCR is equal to "all zeros" and the decoder 34 generates the BCCOK level (Block check character OK) which is used in the BCC error logic.

The memory address register 36 is an eight bit register which develops addresses for a 256 word LCP buffer $25_{00}$. The register 36 is controlled so as to provide selective or sequential addressing of the buffer, as required by the data transfer operation which is to be performed.

The Termination Card $20_{0t}$ (of FIG. 2) provides a one-second timer which is enabled for operation only during a "read" operation when the LCP is conditioned to receive data from the peripheral unit, such as 50. When enabling inputs are active, the timer allows the peripheral terminal unit a one-second period in which to begin a transmission or continue an interrupted transmission over to the LCP. If the one-second period elapses without a transmission from the peripheral terminal unit, a time-out flip-flop (TIMOUTF) is set, generating time-out level (TIMOUTL), and the LCP then initiates an end to the read operation by setting an end flip-flop (ENDF). However, this timer can be programmatically inhibited from operating by placing the proper code in the variant-1 digit of the Command Descriptor (FIG. 4B).

With reference to FIGS. 6B and 6D and the prior discussion regarding the Data Flow section of the LCP, (Section B), the input multiplexor $24_{x1}$ provides the selection of a 17-bit word from three sources: the data input lines $B_i$, the output lines $B_{25}$ from RAM data buffer $25_{00}$ or the peripheral device interface levels $24_m$ which are generated on the Maintenance Card (such as $20_{0m}$, FIG. 2) from the outputs of push-button switches on the maintenance panel. The selected levels received by input multiplexor $24_{x1}$ are transferred to the OP code register 42 and variant register 43, the terminal bus multiplexor $24_{x2}$ or the valid OP encoder 44, as required by the operation to be performed.

The OP code register 42 receives the digital OP code of the Command Descriptor C/D, and in conjunction with the output of the variant register 43, specifies the operation to be performed by the LCP. The variant register 43 receives the variant digits contained in the Command Descriptor C/D and, in conjunction with the output of the OP code register 42, specifies further details of the operation to be performed by the LCP.

The Valid OP Encoder 44 is a network which receives Command Descriptor C/D information at its input; then, if the OP code digits and the variant digits 1,2, and 3 coincide with values representing valid operations for the LCP, this encoder develops the valid OP (VOP) level, which enables the Command Descriptor C/D to be loaded into the OP code register 42 and the variant register 43.

The LCP RAM buffer $25_{00}$ is made of a network of 18 RAM devices, each one of which has a capacity of 256 information bits. Reference to FIG. 6C will show more detail of the RAM buffer $25_{00}$. The buffer network can store 18-bits in each of its 256 address locations; 16 are data bits, one bit is a parity bit, and one bit is an end-flag bit ($25_e$ of FIG. 6C) to identify a word location containing an ending code.

Referring again to FIG. 6D, the terminal bus multiplexor network $24_{x2}$ provides selection of a 17-bit word from four sources: the input multiplexor $24_{x1}$; the UART 31 parallel data output line; the LPW $24_w$ register output; and the Result Descriptor levels $24_{rd}$. The output of the terminal bus multiplexor network $24_{x2}$ goes to the terminal bus 47. Appropriate voltage levels are provided to those LCP components, (such as the data latch register 49, vertical parity generator/checker 48, buffer $25_{00}$, LPW register $24_w$, decoder 52 and end code decoder 35 etc.) which have inputs received from the terminal bus 47.

The terminal bus 47 connects the output of the terminal bus multiplexor network $24_{x2}$ over to the following components: the data latch register 49, the LCP RAM buffer $25_{00}$, the LPW register $24_w$, the vertical parity generator/checker 48, the BCC register 33, the end code decoders 52 and 35, and the UART multiplexor $27_x$.

The vertical parity generator/checker 48 generates odd parity for every word transferred by the LCP over to the Main System 10. The generator/checker 48 also checks for odd parity of every word transferred from the Main System over to the LCP. Each word to be transferred from the particular LCP over to the Main System 10 is first placed in the 17-bit register called the data latch register 49. The data latch register 49 then transfers the word over to the Main System 10. The use of the data latch register increases the rate of data transfer by allowing quicker access to data stored in the LCP RAM buffer $25_{00}$.

The longitudinal parity word (LPW) register $24_w$ is made of 16 separate flip-flops operated in the "toggle" mode. It receives its inputs from the terminal bus 47. When the Main System 10 sends a Command Descriptor C/D, a Descriptor Link D/L, or data, over to the LCP, the LPW register $24_w$ accumulates a LPW (longitudinal parity word) to be checked against an LPW from the System 10. When the LCP sends data or a Result Descriptor R/D over to the System 10, the LPW register $24_w$ also accumulates an LPW to be sent to the System 10. Accumulation of the LPW consists of applying each word being sent or received to the input of the LPW register $24_w$ and performing a binary addition without carry (exclusive OR function).

The LPW register $24_w$ is initialized to "all ones" prior to each operation in which an LPW will be accumulated in the LPW register. At the end of a data transfer from the Main System 10, the exclusive OR function is performed between the accumulated LPW and an LPW from the System 10. If no errors have occurred, both LPW's will be identical and the resultant value in the LPW register $24_w$ will be "all zeros".

In FIG. 6D the end code decoders 52 and 35 are used to determine the receipt of an ending code character. Decoder 52 handles the AB digits and decoder 35 handles the CD digits. The AB digit end-code decoder 52 is used to identify an ending code in the first character position of a word from the Main System. This decoder is also used to identify an ending code in any character sent from the terminal unit device interface $22_{di}$. If decoder 52 receives such an ending code, it causes the level EDCODE and the level SYSEND to be generated. The CD digit decoder 35 is used to identify an ending code in the last character position of a word from the System. Receipt of such an ending code by decoder 35 will cause the voltage level SYSEND to be generated.

The above mentioned elements of the Data Flow Section B has described items such as encoders, decoders, multiplexors, and parity generators. These elements are known in the state of the art and are described in 1972 publications of the Texas Instrument Company entitled "The Integrated Circuits Catalog for Design Engineers" and "TTL - Data Book for Design Engineers". Further, the use of such multiplexors is shown in U.S. Pat. Nos. 3,408,632 and 3,972,030. The use of encoders and decoders is shown in U.S. Pat. Nos. 3,639,909, 3,673,576, 3,810,105, 3,972,023.

The Result Descriptor (R/D) which is latched in Data Latch Register 49 for transmission to the Main System, is generated by the Result Descriptor Levels logic $24_{rd}$ of FIG. 6D.

Result Descriptor Logic

The Result Descriptor logic is composed of flip-flop units such as described in TTL Handbook for Design Engineers, published by Texas Instruments Company. This type of unit is called an Edge Triggered Dual J-K Flip-Flop and designated as V, Series 54H/74H.

As will be seen from FIG. 6D the Result Descriptor logic $24_{rd}$ receives signals from the valid OP encoder 44, the LPW encoder 51, the block check character decoder 34 or vertical parity generator 48.

Thus should an invalid operations code occur, or a longitudinal or vertical parity word error occur, or a block check character error occur, then this is reflected in to the Result Descriptor logic $24_{rd}$ which generates a Result Descriptor word which reflects the condition which occurred. This word can then be sent through the terminal bus multiplexor $24_{x2}$ and on through the terminal bus 47 into the Data Latch 49, after which at the appropriate time it can be passed on to the IOT and the system to notify the system of what was amiss in order that corrective action can be taken.

In summary, the Result Descriptor logic $24_{rd}$ generates Result Descriptors to notify the Main System of unusual conditions which might occur. In this function the R/D logic is connected to receive signals from:

(a) the vertical parity generator/checker 48;
(b) the Valid OP encoder 44;
(c) the LPW-register-encoder 51;
(d) the block check character register and decoder 33 and 34;
(e) the time-out clock signal;
(f) the conditional cancel signal.

The system address register $36_s$ and the device address register $36_d$ are part of a counting logic device 36. These are used in conjunction with the 90 word memory buffer sections $25_a$ and $25_b$ of FIG. 6C.

In a typical fashion the address registers $36_s$ and $36_d$ are originally set to "0". When the buffer memory area A ($25_a$) is being filled, the system address register $36_s$ counts from zero up to 89 until the 90 spaces are filled up with the 90 words.

Meanwhile, the device address register $36_d$ could be emptying data (previously received) out of its memory buffer section B ($25_b$) and counting the words (previously received) which have now been removed. Thus, there can be a simultaneous operation in which one buffer section, A, is receiving data and the other buffer memory section, B, is releasing or removing data from its memory section.

In FIG. 6D the input multiplexor $24_{x1}$ selects, at any given moment of cycle time, permits the passage of data from either the system or from the RAM buffer memory $25_{00}$. (For test purposes signals can be inserted from the maintenance level logic $24_m$. This is done by a manual switch.).

Selector logic $24_s$ is used to provide four output states which are fed to the input multiplexor $24_{x1}$. The input to the selector logic $24_s$ is the SLAIN signal and the SLBIN signal. Table X-A shows how these signals apply to Read and Write operations.

TABLE X-A

| OPERATION | CHARACTER ADDRESS SELECT LEVEL | BUFFER WRITE ENABLE LEVELS | | BIDIRECTIONAL LINE CONTROL | INPUT MULTIPLEXOR SELECT LEVELS | | TERMINAL BUS MULTIPLEXOR SELECT LEVELS | | SOURCE/DESTINATION OF DATA |
|---|---|---|---|---|---|---|---|---|---|
| | EVNF | ERWA | ERWB | IOSF | SLBIN | SLAIN | SLBRAM | SLARAM | |
| WRITE | X | 1 | 1 | 0 | 0 | 0 | 0 | 0 | ABCD DATA FROM SYSTEM TO LCP BUFFER |
| | 0 | 0 | 0 | 0 | 0 | 1 | 0 | 0 | AB DATA FROM LCP BUFFER TO TERM. UNIT |
| | 1 | 0 | 0 | 0 | 1 | 0 | 0 | 0 | CD DATA FROM LCP BUFFER TO TERM. UNIT |
| READ | 0 | 1 | 0 | 0 | X | X | 0 | 1 | AB DATA FROM TERM. UNIT TO LCP BUFFER |
| | 1 | 0 | 1 | 0 | X | X | 0 | 1 | CD DATA FROM TERM. UNIT TO LCP BUFFER |
| | X | 0 | 0 | 1 | 0 | 1 | 0 | 0 | ABCD DATA FROM LCP BUFFER TO SYSTEM |

Thus, the selector logic $24_s$ may be made to signal the following four states:
- a "first" state to signify "data" from the Main System 10;
- a "second" state to signify RAM buffer character AB of a RAM word;
- a "third" state to signify the RAM character CD of the RAM word;
- a "fourth" state to signify "maintenance interface logic".

The terminal bus multiplexor $24_{x2}$ of FIG. 6D (which corresponds to MUX2 of FIG. 6B) serves the function of transferring, at any given cycle time, data from the UART 31, a Result Descriptor R/D from RD logic $24_{rd}$ or signals from the input multiplexor $24_{x1}$, over to the terminal bus 47 which can transfer data into the RAM buffer memory $25_{00}$ or to the UART multiplexor $27_x$. This last named multiplexor corresponds to MUX3 of FIG. 6B and provides the function of, at any given cycle time, transmitting data or a block check character on to the UART 31 for transmission to the peripheral unit 50.

The Status Count Register 53 (STC) is a four-bit register. This register develops Status Count levels (STCnL) for use in the LCP and levels designated LCSTUn (LCP Status Levels) for transmission to the Main System 10. In conjunction with providing floating logic levels, the STC register 53 also controls the sequencing of operations for the LCP. Each Status Count developed by the STC register 53 specifies a different phase of operation in the execution of a Command Descriptor C/D, as was previously outlined in connection with FIG. 6A. The decoder 54 is a binary coded decimal (BCD) to decimal decoder which changes the BCD values of the STC register 53 to decimal values required by the LCP system.

In FIG. 6D, the Status Count Register 53 and decoder 54 is a standard four bit binary counter and is described in the TTL Handbook for Design Engineers published by Texas Instruments Company, Inc. 1962, and designated as a "Synchronous four-bit Counter".

Thus, this counter is enabled to count up or down and also can be preloaded to a set value as a normal condition. Signals supplied to the Status Counter register 53 are logically handled in order to provide a "Status Count" in the register 53 which will reflect the conditions of the Line Control Processor over to the IOT $10_t$ of the Main System so that the Main System can then logically determine the next action to take.

The Status Count register 53 (STC) uses inputs from various encoding devices. This four-bit register develops Status Count levels for use in the Line Control Processor and the LCSTU levels (signalling the Status Count of a selected LCP, see FIG. 6E) for transmission to the Main System. In conjunction with providing floating logic levels, the STC register controls the sequencing of operations for the Line Control Processor (LCP). Each Status Count developed by the STC register specifies a different phase of operation in the execution of a Command Descriptor (C/D) by the Line Control Processor.

The STC decoder 54 of FIG. 6D is a BCD-to-decimal decoder which changes the binary coded decimal values of the STC register 53 into decimal values required by the Line Control Processor.

In FIG. 6D, the STC register 53 is seen receiving its input signals from Flow Control Logic $53_f$ and Processor Logic $53_p$. These logic units are standard type logical circuitry well known in the art. The Processor Logic $53_p$ provides for the switching of bistable devices for enabling execution of OP codes or instructions given to the LCP by the Main System 10.

In FIG. 6B, switching of the first multiplexor $24_{x1}$ is controlled by Selector $24_s$ having input lines SLAIN, SLBIN hereinafter described at page 188. Multiplexors $24_{x2}$ and $27_x$ are switched by controls $24_{2c}$ and $24_{3c}$ which connect to Processor Logic $53_p$.

Hardware wise this type circuit is described in the book TTL Handbook for Design Engineers, published by Texas Instruments Company, 1962. The Status Count register is a counter and register which operates as an Up-Down Counter and one typical type is designated as a synchronous 4-bit counter, SN 74161. The decoder portion is designated a four-ten Line Decoder also described in the book TTL Handbook for Design Engineers, published by Texas Instruments Company, and identified as SN 7442A.

Reference to FIG. 6E will be instructive in reviewing the system interrelationships between the major LCP elements involved in regard to the logic and control signals operating between these elements. FIG. 6E shows the major logic and control lines between the IOT (Input-Output Translator) $10_t$, the Distribution Card $20_{0d}$ (for the Base Module $20_0$), the particular Line Control Processor LCP $20_{00}$ and the peripheral terminal unit 50.

First referring to the lowermost group of control lines, the LCP $20_{00}$ and its Distribution Card $20_{0d}$, the designation LCPREQ (n) is a group of eight "request" lines where the letter "n" represents the numbers 0-7 for each specific LCP in the Base Module $20_0$. Each of these signals is driven by one particular LCP over to the Distribution Card $20_{0d}$. This signal is used by a particular LCP to "request" a connection to the System 10 and causes the Distribution Card $20_{0d}$ to set up a "Poll Request".

The next designation LCPCON is the designation for "LCP connected". This line is driven by the connected LCP (0-7) to the Distribution Card $20_{0d}$. This signal is driven by the LCP when it detects its own particular LCP address and it is not in an "off-line" condition. The signal is a response to the LCP address and signifies to the Distribution Card $20_{0d}$ the presence of the LCP addressed.

The designation LCPSTL signifies "LCP Strobe Level". This line is driven by the "connected" LCP over to the Distribution Card. It is the particular LCP's designation of "send" or "acknowledge", depending on the data direction involved.

The IOSND designates I/O send. This line is driven by the "connected" LCP to the Distribution Card $20_{0d}$. This line defines the direction of the bidirectional data lines marked DATA (xn). When this line is active low, the data lines will be driven by the Distribution Card $20_{0d}$ to the Main System 10 via IOT $10_t$.

The LCSTU (n) designates the status of the particular LCP where "n" may designate either of LCP's 0-7. This line is driven by the particularly-connected LCP to the Distribution Card $20_{0d}$ and reveals the "Status" of the LCP as shown in FIG. 6A.

Referring to FIG. 6E, a number of connections are provided as between the LCP, such as $20_{00}$ and the Distribution Card $20_{0d}$. The DATA (xn) represents the "message level interface" (as previously shown in FIG. 5E of which the lower 16 lines are the data lines for the digits ABCD). The next higher line is the PARITY line which carries the parity bits. These 17 lines constitute the message level interface and are of a bidirectional nature, that is to say, transmission may occur in either direction along these lines depending on the logic control lines used to determine the direction of transmission.

The designation EMRREQ in FIG. 6E signifies the "emergency request" line. This line is driven by one or more LCPs to the Distribution Cards. The LCP may drive the emergency request line at any time. The emergency request signifies that an LCP needs system access quickly to avoid a data transfer failure. Only LCP's whose lack of system access will necessitate operator intervention or difficult error recovery, will drive the emergency request in conjunction with their LCP request. Those LCPs which are not emergency requesting, will disable their LCP request with this line. A Distribution Card detecting an emergency request, will cause a Global Priority of "seven" to be transmitted to the Main System 10 during a "Poll Request".

The designation TERM in FIG. 6E designates a "terminate" voltage level. This is generated on a Distribution Card and is sent to the LCP to terminate or end an operation.

The designation LCPAD "n" in FIG. 6E designates the LCP address (where "n" can be 0-7) to designate the individual LCPs. One of these eight signal lines is driven by the Distribution Card to each particular LCP. The receiver in the LCP will be jumpered to the proper line. This signal is functionally a connection line to the LCP. An LCP receiving its LCP address is "connected" to the Main System 10 through the Distribution Card.

The STIOL in FIG. 6E signifies the "Strobe I/O Level". This line is driven by the connected Distribution Card. It represents the System's "send" or "acknowledge" depending on the data direction.

The ARQOUT line of FIG. 6E is the output end of the Distribution Card which has an input designated ARQIN. These represent "access request in" and "access request out". These signals are driven and received by Distribution Cards only and consist of short lines between adjacent Distribution Cards. They are used during "Poll Test" to resolve Distribution Card priority. The lines DCB 1 and the DCB 2 represent Distribution Card "busy" levels. These are generated on each active Distribution Card in a Base Module to resolve Distribution Card priority in the module during a "Poll Request" sequence.

The PTALB line designates "Poll Test Active Level". This is a bidirectional signal level between Distribution Cards in the same Base Module. A Distribution Card performing a "Poll Test" operation sends this level to the other Distribution Cards, thus inhibiting them from conducting a "Poll Test" or a "Poll Request" sequence.

Each Base Module may service not only one "main system" 10 via its Distribution Card ($20_{0d}$, FIG. 2) but may be provided with multiple Distribution Cards to cooperate with and service other host "main systems". Each Distribution Card in a Base Module can service a different host system and each host system would follow the same basic organization shown in FIG. 3.

The REQACC line designates "Request Access". This line is driven by and received by Distribution Cards only. The line is used to signify an interrupt request as being "active" by the Distribution Cards.

The BUSY line of FIG. 6E designates a Base Module "Busy" level. This is a bidirectional signal level developed on a Distribution Card when that card has made a "connection" with the Main System 10. The level is sent to other Distribution Cards on the same Base Module to indicate that the LCP backplane is in use.

Now, further in reference to FIG. 6E, the relationships between the IOT $10_t$ and the Distribution Card $20_{0d}$ will be discussed. At the upper left of FIG. 6E, the LCPST designates the LCP Strobe Pulse. This is generated on a Distribution Card from the LCP strobe level and is sent on to the Main System via the IOT $10_t$.

The PB/ST 2 designates "Port Busy" or the LCP status 2 line. This line resides on the message level interface as shown in FIG. 5E. In the "unconnected" state, this line indicates a Port Busy condition during a "Poll Test" algorithm. In the "connected state", this line carries bit 2 of the LCP's status to the System 10.

The IP/ST 4 designates an Interrupt Request or a Poll Test parity error, or an LCP status 4 line. In the unconnected state, this line is used to carry an "Interrupt Request" from the LCP or else to indicate an address parity error during a "poll test" connection attempt. An Interrupt Request indicates that a LCP is requesting access to memory. In the "connected" state, this line carries bit 4 of the LCP's status to the Main System.

The ER/ST 8 designates "emergency request" or the LCP status 8 line. In the "unconnected" state, this line represents an emergency request from the LCP. "Emergency request" designates that a LCP needs immediate access to the Main System. In the "connected" state, this line carries bit 8 of the LCP's status to the Main System. Once connected, the LCP indicates its System Memory requirements by its status. The LCP status is gated continuously and may only be considered valid by the System at LCP "Send/Acknowledge" time.

Further in FIG. 6E to the connections between the IOT $10_t$ and the Distribution Card $20_{0d}$, the connections designated PARITY and DATA "xn" refer to the message level interface lines previously discussed. The CS/ST 1 designates "Channel Select" or LCP status 1 line. In the "unconnected" state, these lines carry "Channel Select" from the System 10 to the Distribution Card. "Channel Select" is used in conjunction with "address select" in both connection algorithms. However, in the "connected" state, this line carries bit 1 of the LCP's status to the Main System 10. This line is a bidirectional line. The receiver on the Distribution Card will be any standard TTL device. The driver on the Distribution Card will be a tri-state driver such as a 8097/8098 (National Semiconductor Corp.) or equivalent which will be active only in the connected state.

The TRM designates the "terminate" level. This is sent from the Main System 10 to a Distribution Card when a data transfer operation is to be terminated.

The ADDSEL line of FIG. 6E designates "address select". This signal line indicates that the Main System is connected or is attempting connection to a specific LCP. This line is used in conjunction with "Channel Select" for both connection algorithms to achieve connection. Once a connection to the LCP is achieved, the System and LCP remain connected until the signal line is inactivated by the System. When the line is active, the System can be considered "busy".

Again referring to FIG. 6E, the AG/SIO designates "access granted" or "Strobe I/O". When the interface is in an "unconnected state", this line carries an "access granted" signal. "Access granted" is used to acknowledge an Interrupt Request for connection and to begin a "Poll Request" algorithm. With the interface in a "connected" state, this line carries a "Strobe I/O" signal. This signal is the System's Send/Acknowledge line in transferring information between the System 10 and the LCP Base Module. The actual signal is a 100 nanosecond minimum pulse sent from the System and latched by the Distribution Card. The Distribution Card will generally clip the first 50 nanoseconds from the signal to allow for cable settling time.

In regard to FIG. 6E, the control signals as between the LCP 20$_{00}$ and the peripheral terminal unit 50 indicate a line designated RMDTLN. This designates Remote Data Line Level. This is a bidirectional signal level which permits the transfer of serial data between the LCP and the peripheral terminal unit in one direction or the other direction as determined by the level.

Discussed here and below are the operational sequences of the LCP. The logic terms are referred to as either being active or inactive in order to avoid any ambiguity that might result from using the terms True and False.

Receipt of Instructions by Line Control Processor

Previously in FIG. 6A, the logic flow involving the Status Counts (STC) between the LCP 20$_{00}$ and the Main System 10 was discussed. Now referring to FIG. 7A there will be seen in greater detail a simplified flow diagram illustrating the receipt of instructions by the LCP. This flow chart shows the basic actions of the LCP during receipt of instructions and also shows those actions which can occur due to modification of the original instructions, the receipt of a time-out level, and the occurrence of error conditions.

Prior to receiving any of the seven possible instructions from the Main System 10, the LCP is normally in an "idle" state at Status Count 3. However, the LCP can also be in a STC 3 during a "Read" operation, awaiting either a conditional cancel instruction from the Main System 10, or a data transmission from the peripheral terminal unit, such as The following will describe the actions of the LCP during receipt of instructions from the System 10 and during preparation for the instruction execution. These actions are itemized as (a), (b), and (c).

(a) System-LCP connection: with the LCP in STC 3, the System makes a connection with the LCP through a "Poll Test" sequence, and the LCP receives its unique address level (LCPAD) (n), as was illustrated in FIG. 6E. The receipt of LCPAD (n) causes the LCP to send the LCP connection level (LCPCON, FIG. 6E) to the associated Distribution Card 20$_{0d}$ and generates LCPADL (LCP Address Level), which "enables" portions of the LCP system logic section. The address level LCPAD (n) also enables the LCP backplane network by generating a gate system level (GATSYS). Then a strobe (STIOL) is received from the Distribution Card (20$_{0d}$, FIG. 6E) causing STIOF (Synchronous Strobe Flip-Flop) to be set. The setting of STIOF activates the desired module of the LCP by setting RECVF (Receive Flip-Flop), enables setting of the LPW register (24$_w$, FIG. 6D) to logic "1's", and sets selected flip-flops to a beginning state. The Command Descriptor C/D is received in the LCP and is loaded into the OP code register 42 and variant registers 43 (FIG. 6D). Receipt of the C/D results in an LPW being placed into the LPW register 24$_w$. The C/D is checked for validity and the valid OP flip-flop (VOPF) is set. The LCP then steps from STC 3 over to STC 11 (FIG. 7A) to receive an LPW from the System 10.

(b) Receipt of LPW by the LCP: In FIG. 7A at STC 11, a longitudinal parity word (LPW) is received from the System 10 and is checked against the contents of the LPW register 24$_w$ to validate longitudinal parity of the C/D transfer. Vertical parity is also checked, then a vertical level OK (VLOK) and vertical parity OK level (VPAROK) is set. The LCP buffer address is preset to 253 in the memory address register MADR 36 (FIG. 6D), and setting of the LPW register 24$_w$ to logic "1's" is again enabled; then the LCP steps to STC 6 to receive the Descriptor Link D/L from the System 10.

(c) Receipt of Descriptor Link and Descriptor Link LPW: at STC 6, the LCP receives the two words of the Descriptor Link D/L from the System 10 and a LPW is accumulated in the LPW register 24$_w$. A LPW is then received from the System 10 and is checked against the contents of the LPW register 24$_w$. The Descriptor Link D/L and the LPW are stored in buffer address locations specified by the memory address register MADR 36 as addresses 253, 254 and 255 (FIG. 6C). From STC 6, the LCP branches to STC 8 for a "Write" operation, or to STC 1 for a "Read" operation, or to STC 7 if a Descriptor Link error occurred.

There are alternate flow path situations such as: (a) when a "conditional cancel" instruction is received from the System 10, or (b) a data transmission is received from the peripheral terminal unit, such as 50, or (c) a time-out level is generated, or (d) a receipt of test instructions. To further amplify these alternate flow path situations per FIG. 7A: (a) receipt of Conditional Cancel Instruction: at STC 3, if a conditional cancel instruction is received from the System 10, while the LCP is awaiting a transmission from the peripheral terminal unit 50, a cancel flip-flop (CANCF) is set and the LCP steps to STC 11 to receive a Command Descriptor longitudinal parity word, LPW. From STC 11, the LCP steps to STC 7 and sends a Result Descriptor to the System 10, indicating that the cancel operation is completed.

(b) Receipt of Transmission from the Peripheral Terminal Unit: at STC 3 during a "Read" operation, if the terminal busy flip-flop (TRMBSYF) is set, indicating that terminal unit has started transmitting, the LCP steps to STC 1 to receive data from the peripheral terminal unit. The LCP continues to receive data and completes the remainder of the Read operation in accordance with instructions contained in the Command Descriptor C/D.

(c) Receipt of Time-Out Level: during a "Read" operation, with the LCP in STC 3 awaiting a transmission from the peripheral terminal unit (and if the 1-second timer is not inhibited) then if there is a 1-second delay in receiving the transmission, the time-out level (TIMOUTL) is generated. With TIMOUTL active, the end flip-flop (ENDF) is set, the terminal complete (TMCNP) level is generated, and the LCP steps to STC 1. At STC 1 a request for reconnection to the System is initiated and the LCP steps to STC 5, FIG. 7B. At STC 5 with ENDF set, the Read operation is terminated and the LCP steps to STC 7 to send a Result Descriptor, R/D, to the System 10. A time-out level can also be received with the LCP at STC 1.

(d) Receipt of Test Instructions: at STC 11, FIG. 7A, if TESTF (Test Flip-Flop) is set indicating that a test instruction was received, the LCP completes the test operation by stepping to STC 7 and sending a Result Descriptor R/D to the System 10.

Error Conditions: the occurrence of two types of error conditions (ea) and (eb) during the receipt of instructions will be acted upon by the LCP, as follows: (ea) Command Descriptor parity error: In FIG. 7A, at STC 11, if the VLOK (Validity Level OK) level is not active, or if VOPF (Valid Operation Flip-Flop) is not set, the LCP steps to STC 7 to send a Result Descriptor R/D containing a descriptor error to the System; (eb) Descriptor Link parity error: at STC 6, if the VLOK level is not active, the LCP steps to STC 7 to send a Result Descriptor R/D containing a Descriptor Link error to the System 10.

Write Operation

Referring to FIG. 7B, there is seen a sequential logic diagram which is simplified to show the steps involved in the "Write" operation. Let us assume that one buffer load of data will be transferred from the System 10 to the peripheral terminal unit 50, followed by a partial buffer of data containing an ending code character in the last character position (CD digits) of a word.

The following steps (a through i) describe actions of the LCP, such as $20_{00}$, during transfer of data from the System 10 over to the LCP, and from the LCP to the peripheral terminal unit, such as 50.

(a) Receipt of data from system: at STC 6, if a "Write" operation is specified by the Command Descriptor C/D, the LCP enables the setting of the LPW register $24_w$ to logic "1's", then steps to STC 8 to receive data from the System 10. An IOSF (I/O Send Flip-Flop) is used and put in a reset state at this time to enable the bidirectional data lines for transfer of data from the System 10 over to the LCP. There are provided multiplexor control levels SLAIN (Select A Input Multiplexor) and SLBIN (Select B Input Multiplexor). These are both inactive, connecting the data lines to the input multiplexor network $24_{x1}$ of FIGS. 6B and 6D. There are other multiplexor control levels SLARAM (Select A Level Terminal Bus Multiplexor) and SLBRAM (Terminal Bus Multiplexor Select B Level). These also are both inactive, connecting the input multiplexor network $24_{x1}$ to the input of the Terminal Bus Multiplexor Network $24_{x2}$.

At STC 8, the Receive Flip-Flop (RECVF) is set, activating the write module of the LCP. The setting of RECVF causes the write enable level (WESYS) for the LCP buffer to be active. Thus, data is transferred from system Main Memory $10_m$ over to the LCP buffer $25_{00}$, one word at a time, by way of the terminal bus 47 of the LCP. An Asynchronous Strobe (STIOL) from the associated Distribution Card $20_{0d}$ (FIG. 6E) accompanies the transfer of each word, and as each word is received by the LCP, the LCP sends a strobe level (LCPSTL) to the System 10 to "acknowledge" receipt of the word. As each word is placed on the terminal bus 47, then, in addition to being sent to the buffer $25_{00}$, it is also applied to the input of the vertical parity generator/checker 48, the LPW register $24_w$ and the end code decoders 52 and 35. Vertical parity is checked and a longitudinal parity word is accumulated in the LPW register $24_w$. Transfer of words continues until the next to last data word address 251 is attained in the Memory Address Register 36. The LCP then steps to STC 10 of FIG. 7B to receive one final word from the System. At STC 10, the LCP receives the final word to fill the buffer, and then steps to STC 12 to receive an LPW from the System 10.

(b) Receipt of LPW and disconnect from the System 10: at STC 12, the LCP receives an LPW from the System 10 and checks it against the LPW accumulated in the LPW register $24_w$ during the data transfer. The LCP then enables setting of the LPW register $24_w$ to logic "1's" and steps to its STC 1, disconnecting from the System 10 in order to transfer data to the peripheral terminal unit, such as 50. Terminal bus multiplexer control levels SLARAM and SLBRAM (Select A and Select B of $24_{x2}$) are both inactive thus to connect the output of the buffer $25_{00}$ with the input to the terminal bus multiplexor network $24_{x2}$. The input multiplexor $24_{x2}$ has control levels SLAIN (Input Multiplexor Select A Level) and SLBIN (Input Multiplexor Select B Level) which will be controlled during the data transfer by the state of the even flip-flop (EVNF) in order to access a character alternately from the AB digits and the CD digits of a word in the buffer $25_{00}$.

(c) Transfer of Data to Peripheral Terminal Unit: with further reference to FIG. 7B, at STC 1, the receive flip-flop (RECVF) is reset, thus enabling the receive module of the LCP. The terminal start level (TERST) is generated to prepare the LCP for operation with the peripheral terminal unit. The TERST level enables the setting of master clear UART flip-flop (MCUARTF) in order to clear the UART 31 (FIG. 6D). The setting of a terminal active flip-flop (TRMACTF), a send flip-flop (SENDF), and the terminal busy flip-flop (TRMBSYF) are also enabled, activating terminal control logic for a Write operation and specifying that the peripheral terminal unit is in a "busy" state. The Memory Address Register 36 (FIG. 6D) is set to MADR O to access the first word in the buffer $35_{00}$. In the UART 31, the "transmitter holding register empty" (THRE) level is active, and the setting of the UART empty flip-flop (UARTETF) is enabled to provide a strobe level to the UART multiplexor $27_x$.

The UART 31 accepts one character at a time from the LCP buffer $25_{00}$. The even flip-flop (EVNF) is used in conjunction with the Memory Address Register 36 to control accessing of characters. When loaded with a character, the UART 31 transfers the character serially over to the peripheral terminal unit, such as 50. As each character from the buffer $25_{00}$ is placed on the terminal bus 47, it is also applied to the input of the block check character register (BCCR) 33, which (after a STX/SOH, "start of test/start of heading" character has been received) begins to accumulate a block check character during the data transfer. The UART 31 continues to accept characters from the buffer $25_{00}$, then transferring them to the peripheral terminal unit 50, until memory address level MADR 252 is attained in the Memory Address Register 36, indicating that the last word in the buffer has been accessed.

(d) Request for Reconnection to System 10: the memory address level MADR 252 causes the buffer transfer flip-flop (BFXFRF) to be set, indicating that the buffer $25_{00}$ needs service, and the LCP initiates a request for reconnection to the System by enabling the setting of the LCP request flip-flop LCPRQF. The setting of IOSF (I/O Send Flip-flop which indicates the direction of data flow on the message level interface) is enabled to condition the data lines for transfer of data to the System 10, and the setting of MADR 253 level is enabled to allow access to the Descriptor Link D/L (FIG. 6C). The LCP then steps to STC 5 of FIG. 7B to send the Descriptor Link D/L to the System 10. There are floating logic levels which generate LCPADL (LCP Address Level) when the LCP address levels (0-7), LCPADn, is received from the associated Distribution Card during the reconnection sequence, and the LCP generates a level called gate system (GATSYS) to enable the backplane network. The level LCP connected (LCPCON) is sent to the Distribution Card $20_{od}$ to indicate that the LCP is connected.

(e) Transfer of Descriptor Link and the Descriptor Link LPW: in FIG. 7B, at STC 5, the transmit flip-flop (XMITF) is set, activating the "Read" module of the LCP. The LCP transfers the Descriptor Link D/L and the LPW (previously received at STC 6) back to the System 10. The LCP enables the setting of the LPW register $24_w$ to logic "1's" and if the Main System has more data to send, the LCP steps again to STC 8 to receive additional data from the System 10.

(f) Receipt of Additional Data and Ending Code from System 10: at STC 8, the actions of the LCP while receiving the "second" buffer load of data from the System 10 are the same as those performed during receipt of the first buffer load, up to the point that an "ending code" is recognized by the terminal bus 47. When an "ending code" in the last character position (CD digits) of a word is placed on the terminal bus 47, then a system end level (SYSEND) is generated. SYSEND level causes the data input for the end-flag $25_e$ of FIG. 6C (RAM 18 L) to be active and the end-flat bit (ENDFG) and the ending code character are both stored in the current buffer address. The LCP then steps to STC 12 to receive an LPW from the System 10.

(g) Receipt of LPW and Disconnect from System 10: at STC 12 of FIG. 7B, the LCP receives the longitudinal parity word LPW and checks it against the LPW accumulated in the LPW register $24_w$. The LCP then steps to STC 1, disconnecting from the System 10, to transfer the remaining data and the ending code to the peripheral terminal unit.

(h) Transfer of Data and Ending Code to Peripheral Terminal Unit: at STC 1, the actions in transferring the remaining data to the peripheral terminal unit are the same as those performed during transfer of the first buffer load, up to the point that an "ending code" is recognized on the terminal bus 47. When an ending code is placed on a terminal bus 47 from the output of the buffer $25_{00}$, the ending code is transferred and the end flip-flop (ENDF) is set. The accumulated block check character in the BCCR 33 (if a BCC is being generated) is then transferred to the peripheral terminal unit such as 50. SENDF (send flip-flop) and TRECF (terminal receive flip-flop) are both in a reset state, causing terminal complete (TMCMP) level to be active. The terminal complete level causes the LCP to initiate a request for connection to the System 10.

(i) Request for Reconnection to Terminate Write Operation: the LCP requests a reconnection to the System by enabling the setting of LCPRQF (LCP Request Flip-flop). In conjunction with the reconnection, the LCP steps to STC 5 of FIG. 7B, sends the Descriptor Link D/L to the System 10 and then steps to STC 7 to send a Result Descriptor R/D to the System 10.

The above discussion completes the explanation of the general flow path for a "Write" operation in which more than one buffer load of data was transferred, and in which the operation was concluded by receipt of an "ending code". This describes the normal situation. However, there could be alternate flow paths and possible error conditions which might occur as follows, in reference to FIG. 7B. The following items (a) through (c) describe the actions of the LCP when "modifications" to the original Write instructions are made by the System 10 or the LCP.

(a) Request for Emergency Access to System 10: during transfer of data from the LCP to the peripheral terminal unit 50, when the LCP buffer $25_{00}$ is completely empty, a flip-flop BFXFRF is set. This is the buffer transfer flip-flop which is located on the Terminal Card; this flip-flop is set when the LCP buffer is filled with data from the terminal unit, or when emptied of data during transfer of data from the LCP to the peripheral terminal unit. When BFXFRF is set, this enables the setting of LCPRQF (LCP Request Flip-flop, which, when set, indicates that the LCP requires access to the Main System Memory $10_m$). The setting of the LCPRQF initiates a request for reconnection to the System 10 to either send data to the Main System or to obtain more data if the buffer is empty. If a reconnection is not completed prior to the time the transmitter-holding register of the UART 31 is ready to accept another character, the LCP causes the emergency request level (EMRREQ) to be generated. The EMRREQ level is sent to the associated Distribution Card $20_{od}$ to initiate an emergency request for reconnection to the system.

(b) Receipt of Ending Code (AB digits): if an ending code is identified in the first character position (AB digits) of a word from the System 10, then EDCODE (end code level) is generated. EDCODE is generated on the terminal control card when an end code character is in the A and B digits of the terminal bus 47. Also generated is SYSEND (System End Code Level). When active, the SYSEND level indicates that an end code character is on the terminal bus 47. At STC 8, the ENCODE level enables the setting of a character end flip-flop (CHARENF), and the SYSEND level generates the 18th bit end-flag, RAM 18 L. The Write end-flag level is generated on the terminal control card from the EDCODE level; this is the data input level for the end-flag RAM of the LCP buffer $25_{00}$. The ending code and the ENDFG (end-flag level is generated on the data flow card from RAM 18 L; when active, this level identifies the address of an end code in the LCP buffer) are stored in the current buffer address of the LCP, and the LCP steps over to STC 12 (FIG. 7B) to receive a longitudinal parity word LPW. At STC 12, the LCP receives an LPW from the System 10 and checks it against the accumulated LPW in the LPW register $24_w$. The LCP then steps to STC 9 to initiate decrementing of the System Memory Address. (The address must be decremented by two digits to accurately reflect the address of the ending code in System Memory). From STC 9, the LCP steps over to STC 1 to transfer data and the ending code to the peripheral terminal unit 50. At STC 1, recognition of the ending code on the terminal bus 47 causes the LCP to perform the same actions described during the previous "Write" operation at STC 1 when data, ending code, and block check characters are transferred to the peripheral terminal unit 50, after which the LCP disconnects from terminal unit 50 and reconnects to the System 10 and terminates the "Write" operation.

(c) Receipt of Terminate Signal from System 10: a terminate signal (TERM level, FIGS. 6C, 6E) is sent from the System 10 to the LCP whenever System Memory space designated for LCP operation is to be exceeded. During a "Write" operation, the TERM level can be received at STC 8, STC 10, or STC 12, FIG. 7B.

The actions of the LCP upon receipt of the TERM level (Terminate Level) depend upon the Status Count in which the LCP is operating, and upon whether or not the receipt of TERM level is preceded by a receipt of an "ending code" from the System as follows:

(1) Receipt of Terminate Signal Before Ending Code: if the TERM level is received at STC 8 or STC 10, the LCP steps over to STC 14. At STC 14, regardless of whether TERM level remains active or is now inactive, the LCP steps over to STC 12, receives and checks a longitudinal parity word LPW, then steps over to STC 7 to send a Result Descriptor R/D to the System 10. If an ending code is received in the CD digits (last character) of a word at STC 8 or STC 10, and the TERM level is also received, the LCP steps to STC 14. At the STC 14, if the TERM level is still active, the ending code was not placed in the LCP buffer $25_{00}$. The LCP then steps to STC 12, receives and checks an LPW, then steps over to STC 7 to send a Result Descriptor R/D to the System 10.

(2) Receipt of Terminate Signal After Ending Code: if an ending code is received in the CD digits of a word at STC 8 or STC 10, the LCP steps to STC 12 to receive LPW. At STC 12, if the TERM level is now received, the ending code is transferred to the LCP buffer $25_{00}$ and the LCP steps over to STC 1 to transfer remaining data and the ending code to the peripheral terminal unit 50. At STC 1, recognition of the ending code on the terminal bus 47 causes ENDF to be set. (End flip flop: when set, this flip-flop indicates that the terminal control section of the LCP has ended its operation). The setting of ENDF indicates that there is no more data to be transferred; after the data, ending code, and block check character are transferred to the peripheral terminal unit 50, the LCP disconnects from terminal 50, reconnects to the System 10, to terminate the "Write" operation.

As illustrated hereinunder, at STC 1, the recognition of the ending code on the terminal bus 47 causes the ENDF (end flip-flop) to be set. The setting of ENDF indicates that there is no more data to be transferred; after the data, ending code and block check character are transferred to the peripheral terminal unit 50, the LCP reconnects to the System 10 to terminate the "Write" operation.

If an ending code is received in the AB digits of a word at STC 8 or STC 10, and the TERM level is also received, the LCP steps to STC 14. At STC 14, if TERM level is inactive, the whole word containing the ending code in the AB digit was transferred to the LCP buffer $25_{00}$. A correction of System Memory Address is necessary. The LCP steps to STC 12, receives and checks the LPW, then steps to STC 9 to initiate decrementing of the System Memory Address. The LCP then steps to STC 1 to transfer data and ending code to the peripheral terminal unit 50.

If the TERM level was still active at STC 14, then only the ending code character was transferred to the LCP buffer $25_{00}$ and no correction of System Memory Address is required. The LCP steps to STC 12, receives and checks the LPW, then steps directly to STC 1 to transfer data and the ending code over to the peripheral terminal unit 50.

Error Conditions: During a "Write" operation the following error conditions (a,b,c,d) will be acted upon by the LCP:

(a) Access Error: after transmitting EMRREQ level to the associated Distribution Card, if the LCP does not receive a reconnection to the System 10 prior to the time the UART 31 is completely empty, the LCP enables the setting of the access error flip-flop (ACCERF). The setting of ACCERF enables setting of the end flip-flop (ENDF), and the LCP initiates a request for reconnection to the System 10 to terminate the "Write" operation and to send an error Result Descriptor R/D to the System 10.

(b) System Vertical Parity Error: during transfer of data from the System 10 to the LCP, if the vertical parity is not O.K. and the VPAROK is not active after each check of vertical parity, then the vertical parity error flip-flop (VPERF) is set to indicate the existence of a vertical parity error. The absence of VPAROK level also prevents the vertical longitudinal OK level (VLOK) from being generated, and at STC 12, the LCP steps over to STC 7 to send an error Result Descriptor R/D to the System 10.

(c) Longitudinal Parity Error (FIG. 7B): when the longitudinal parity word is checked after a data transfer from the System 10 to the LCP, if longitudinal parity OK level (LPOK) is not active, the longitudinal parity error flip-flop (LPERF) is set to indicate existence of a longitudinal parity error. The absence of LPWOK level (the LPW OK level: is generated on the data flow card from the terminal bus 47 levels; when active, it indicates to the System Logic Section of the LCP that the LPW is correct) prevents VLOK level from being generated, and at STC 12, the LCP steps over to STC 7 to send an error Result Descriptor R/D to the System 10.

(d) Terminal Vertical Parity Error: during transfer of data from the LCP buffer $25_{00}$ to the UART 31, if the vertical parity OK (VPAROK) level does not remain active for each character transferred, the terminal vertical parity error flip-flop (TVPERF) is set to indicate existence of a vertical parity error. When the LCP reconnects to the System 10 and terminates the "Write" operation, the Result Descriptor R/D sent to the System 10 at STC 7 will indicate the parity error.

Read Operation:

Referring to FIG. 7C, there is seen a simplified logic chart showing the "Read" operation. A "Read" operation is generally accomplished in conjunction with some form of "Write" operation. As an example, assuming that a "Write" operation has been completed and the peripheral terminal unit 50 has responded with an acknowledge character (ACK), indicating that the peripheral terminal unit 50 is now capable of sending information. Again, assuming there will be no delay in receipt of data from the peripheral terminal unit 50, and that one buffer load of data will be received followed by a partial buffer of data containing an ending code. It is also assumed that the ending code will be received in such a way that it will be placed in the last character position (CD digits) of a word in the LCP buffer $25_{00}$ (FIG. 6C).

General Flow Path: The following paragraphs (a) through (l) describe the actions of the LCP during transfer of data from the peripheral terminal unit 50 to the LCP, and also from the LCP over to the System 10.

(a) Disconnect from Main System 10: referring to FIG. 7C, at STC 6, when a "Read" instruction is specified in the Command Descriptor C/D, from the System, the READF (read flip-flop: located on the data flow card; the logic state of the read flip-flop is controlled by output levels from the OP code register; the set state of READF indicates that a "Read" operation is being performed by the System) is set. The LCP enables setting of the LPW register $24_w$ to logic "1's", then steps to STC 1, disconnecting from the System 10 to receive data from the peripheral terminal unit 50. The terminal bus multiplexor $24_{x2}$ (FIG. 6D) select A level (SLARAM) is active, and SLBRAM, SLAIN and SLBIN levels are inactive to provide a path for data from the UART 31 over to the LCP buffer $25_{00}$.

(b) Receipt and Storage of Data from Terminal Unit: referring to FIG. 7C, at STC 1, with READF set, the terminal start (TERST) level is active. This TERST level causes the UART 31 to be master cleared and enables the setting of TERMACTF (terminal active flip-flop; located on terminal control card; the logic state of this flip-flop is controlled by TERST, TRECF and SENDF; the set state of TRMACTF indicates that the terminal control section of the LCP has been activated for a "Read" or a "Write" operation) to activate terminal control logic. READF also enables the setting of the terminal receive flip-flop (TRECF) to allow receipt of data from the peripheral terminal unit 50. The buffer $25_{00}$ has its address preset to MADR location 255 and if the even flip-flop (EVNF) is not already set, its setting is enabled to initiate control of buffer addressing. Data characters are transferred serially from the peripheral terminal unit 50 to the UART 31 in the LCP, and the UART checks each character for even vertical parity.

(b-1) Receipt of First Character and Generation of Vertical Parity: with the terminal receipt flip-flop (TRECF) set, and the data store flip-flop (DATASTF), in a reset state, receipt of the first character causes the data received level (DR) to be active. The DR level enables setting of the reset UART flip-flop (RSUARTF) and also the terminal busy flip-flop (TRMBSYF). The even flip-flop, EVNF, is set, causing the buffer address to be incremented to MADR location 0. The setting of the data store flip-flop, DATASTF, and the resetting of EVNF are then enabled, in preparation for storing the first character in the buffer. With RSUARTF set, the SLARAM level is generated which places the first character on the AB digits and also on the CD digits of the terminal bus 47, forming a complete word. A parity bit is not included with this word. The contents of the terminal bus 47 are applied to the vertical parity generator/checker 48 of FIG. 6D. Parity for the word on the terminal bus 47 is generated and a flip-flop, used to designate odd vertical parity is set or reset, as applicable to indicate parity, until receipt of a second character from the peripheral terminal unit 50.

(b-2) Storage of First Character in Buffer: with the data store flip-flop DATASTF set, the reset state of EVNF causes the buffer write enable A (ERWA) level to be active. The System Write Enable (WESYS) level is also active, and these two levels provide the Write Enable input for the AB and CD digits of the buffer network. The first character is then stored both in the AB and the CD digit locations of MADR location 0 of Memory Address Register 36. Transfer of the first character from the UART 31 to the buffer $25_{00}$ causes the reset UART flip-flop (RSUARTF) to be reset. The data receive level (DR) is then made inactive, followed by the resetting of DATASTF (Data Store Flip-Flop). This combination of logic prepares the UART 31 to accept the second character from the peripheral terminal unit 50.

(b-3) Receipt and Storage of Second Character: when the second character is received by the UART 31, the data receive level (DR) is again made active and RSUARTF is set. This logic in combination with the reset state of the even flip-flop EVNF inhibits the buffer address from being incremented. The setting of the data store flip-flop DATASTF and the even flip-flop EVNF are then enabled in preparation for storing the second character in the buffer. The terminal bus multiplexor selects A level, SLARAM, is still active and the character is placed on both the AB and the CD digits of the terminal bus 47. The contents of the terminal bus 47 are again applied to the vertical parity generator/checker 48. Parity is generated for the word on the terminal bus 47 and is compared with the parity generated during receipt of the first character. From the results of the comparison, a single parity bit is generated for the first and second characters.

With the data store flip-flop DATASTF and the even flip-flop EVNF set, the ERWB level (Write Enable level for CD digits of LCP buffer) is generated and the second character is stored in the last character position (CD digits) of buffer $25_{00}$ at address location MADR 0, overwriting the character previously placed there. The character on the AB digits of the terminal bus 47 is not stored in the buffer $25_{00}$ because the ERWA level is not active (ERWA is the Write Enable level for the AB digits of the LCP buffer). A parity bit from the vertical parity generator/checker 48 is added to the complete word now contained in the Memory Address Register at MADR 0.

(b-4) Receipt of Additional Characters and Start of Block Check Character (BCC) Accumulation: additional characters are accepted by the LCP. With the receipt of each character, the logic state of the even flip-flop EVNF is complemented to control incrementing of the Memory Address Register 36, so as to place data into the buffer $25_{00}$ in word format. With the receipt of the "start of heading/start of text" character (SOH/STX) from the peripheral terminal unit 50, the block check character register 33 of FIG. 6D is enabled and each character following the SOH/STX character is applied to the BCCR 33 to accumulate a block check character BCC for the message being received. Accumulation of a BCC will continue through receipt of the first buffer load of data and through receipt of succeeding buffer loads of data until the ending code (ETX character) is received. The actions that occur when an ending code is received will be described subsequently hereinafter.

(c) Buffer Filled: when the LCP buffer $25_{00}$ is completely filled with data, the even flip-flop EVNF and the Memory Address MADR 252 level are set, enabling the setting of the buffer transfer flip-flop (BFXFRF). The setting of BFXFRF indicates that the LCP buffer $25_{00}$ needs service, and the LCP initiates a request for a reconnection to the System 10.

(d) Request for Reconnection to System 10: after disconnection, STC 1, the LCP initiates a request for a reconnection to the System by enabling the setting of the LCP request flip-flop LCPRQF. The setting of the I/O send flip-flop (IOSF) is enabled also, to condition the data lines for transfer of data to the System 10, and the setting of the Memory Address MADR 253 (FIG. 6C) is enabled to allow access to the Descriptor Link D/L. The LCP then steps to STC 5 to send the Descriptor Link D/L and the LPW to the System 10.

The term MADR refers to Memory Address levels. These are generated on the Terminal Control Card from outputs of the Memory Address Register 36.

These levels represent address locations, shown in Table XI, in the LCP buffer 25₀₀ (FIG. 6C) which are reserved for the following:

TABLE XI

| Location | Description |
|---|---|
| 251 | Next-to-last data word |
| 252 | Last data word |
| 253 | Descriptor link information word |
| 254 | Descriptor link information word |
| 255 | Descriptor link LPW |

When one of the eight LCP address levels, LCPADn, isreceived from the associated Distribution Card 20₀d during the reconnection sequence, then the LCP address level, LCPADL, is active. The LCPADL address level is generated on the Terminal Control Card when the applicable LCPADn level is active. The LCPADn level also generates the gate system level, GATSYS, to enable the LCP backplane network. The LCP connected (LCPCON) level is sent to the Distribution Card 20₀d to indicate that the LCP is reconnected. The SLAIN level is active and the SLBIN, SLARAM, and the SLBRAM levels are inactive in order to allow the Descriptor Link D/L to be transferred to the Latch Register 49 (FIG. 6D).

(e) Transfer of Descriptor Link D/L and the Descriptor Link LPW: in FIG. 7C, at STC 5, the transmit flip-flop (XMITF) is set. The transmit flip-flop is located on the System Logic card and the set state indicates that the LCP is transferring data to the System 10, thus, activating the "read" module of the LCP. LCP transfers the Descriptor Link D/L and the longitudinal parity word LPW (previously received at STC 6) back to the System 10. The LCP then enables setting of the LPW register 24ᵥᵥ to logis "1's", and steps to STC 4 to transfer data to the System 10.

(f) Transfer of Data to System 10: at STC 4 of FIG. 7C, the transmit flip-flop XMITF and the I/O send flip-flop, IOSF, are still in the "set" state from the operation at STC 5. The asynchronous strobe flip-flop (ASYNCF) is set to enable asynchronous transfer of data to the System 10. Data is transferred from the LCP buffer 25₀₀, by way of the data latch register 49 (FIG. 6D) to the System 10 (via the system interface 22ₛᵢ of FIG. 6C). Transfer is accomplished one word (plus a parity bit) at a time. The LCP strobe level LCPSTL accompanies the transfer of each word, and as each word is received by the System 10, the System sends a strobe pulse to acknowledge receipt of a word. Each word placed on the terminal bus 47 of FIG. 6D for transfer to the System 10 is applied simultaneously to the latch register 49 and the LPW register 24ᵥᵥ. The LPW register 24ᵥᵥ accumulates the longitudinal parity word LPW during the data transfer. When the last data word address of the LCP buffer 25₀₀ (MADR 252) is attained, the synchronous flip-flop (SF, which is located on the Terminal Control Card and is set when the LCP is also transferring data to the peripheral terminal unit) is set, resulting in the development of the synchronous level, SFL, and then the LCP steps over to STC 12 to send an LPW to the System 10.

(g) Transmission of Longitudinal Parity Word to System 10: in FIG. 7C at STC 12, the LPW accumulated in the LPW register 24ᵥᵥ during operation at STC 4, is sent to the System 10. The LCP then enables setting of the LPW register 24ᵥᵥ to logic "1's" and steps to STC 1 to receive additional data from the peripheral terminal unit 50 (via the terminal unit device interface 22ₐᵢ of FIG. 6C). After this, the LCP steps to StC 5 to send a Descriptor Link to the Main System 10.

(h) Receipt of Additional Data and Ending Code from Peripheral Terminal Unit: upon the second entry to STC 1, a terminal active flip-flop (TRMACTF) and a terminal receive flip-flop (TRECF) are both in a set state from the previous operation at STC 1. The terminal receive flip-flop TRECF is located on the terminal control card and this flip-flop is set when the LCP is receiving data from the peripheral terminal unit; the terminal active flip-flop, TRMACTF, is also located on the terminal control card and, in its set state, indicates that the terminal control section of the LCP has been activated for a "Read" or "Write" operation. The LCP buffer address is again set to MADR 255 in preparation for receipt of data from the peripheral terminal unit 50. At STC 1, the actions of the LCP while receiving the second buffer load of data from the peripheral terminal unit 50 are the same as those performed during the receipt of the first buffer load, up to the point that an ending code is received on the terminal bus 47.

Assuming that prior to receipt of the end code, at STC 1, that the following two conditions exist: (1) EVNF is reset, indicating that the next character to be received will be placed in the last character position (CD digits) of a word; and (2) both RSUARTF (Reset UART Flip-Flop) and the data store flip-flop (DATASTF) are reset. When the ending code character is received, RSUARTF is set, providing the necessary logic level to generate the Write Enable (ERW 18) level for the ending code RAM. Receipt of an ending code is recognized by the LCP when the character is on the terminal bus 47. Recognition of the ending code causes the end code level, EDCODE, to be generated, which develops the data input level (RAM 18 L) for the ending code RAM; the end-flag bit (ENDFG) is then stored in the present buffer address of the buffer 25₀₀. The setting of EVNF and DATASTF is then enabled, which conditions the LCP to store the ending code in the buffer 25₀₀. With EVNF set, the ERWB (Write Enable level for CD digits) level is active and the character is stored in the last character position of the same word address in which the end-flag level, ENDFG, is stored.

(i) Check of BCC and Request for Reconnection to System 10: with DATASTF set, the EDCODE level enables the setting of the end flip-flop (ENDF). The LCP now receives a block check character (BCC) from the peripheral terminal unit 50 and checks it against the accumulated BCC in the block check character register 33. The setting of the end flip-flop ENDF causes the terminal receive flip-flop TRECF to be reset, and the terminal complete level (TMCMP) to be active, terminating the actions of the terminal control section of the LCP. The LCP then initiates a request for a reconnection to the System and steps from STC 1 to STC 5 to send the Descriptor Link D/L to the System 10.

(j) Transfer of Descriptor Link D/L and the Descriptor Link LPW: as in the preceding reconnection to the System, at STC 5 the LCP sends the Descriptor Link D/L and the LPW to the System, and then steps to STC 4 (Read) to transfer data to the System 10.

(k) Transfer of Data to System 10: at STC 4, the actions of the LCP are the same as described before at STC 4, until the word containing the ending code character is placed on the transfer bus for transfer to the System 10. Recognition of the ending code causes the System end level (SYSEND) to be developed, and the LCP steps to StC 12 to send an LPW to the System 10.

(1) Transmission of LPW and Result Descriptor R/D to System 10: the LCP sends the LPW accumulated in the LPW register $24_w$ to the System 10. After the LPW is sent, since the terminate complete level (TMCMP) is now active, indicating that there is no more data to be transferred, the LCP steps to STC 7 to send a Result Descriptor R/D to the System 10.

At STC 7, the LCP sends a Result Descriptor R/D to the System 10, then steps to STC 15 (FIG. 7D), and sends an LPW, then returns to idle at STC 3 to await another instruction from the System 10.

The above discussion has involved the general flow path for a "Read" operation in which more than one buffer load of data was transferred from a peripheral to the Main System, and in which the operation was concluded by receipt of an ending code.

Figures 2, 7E:
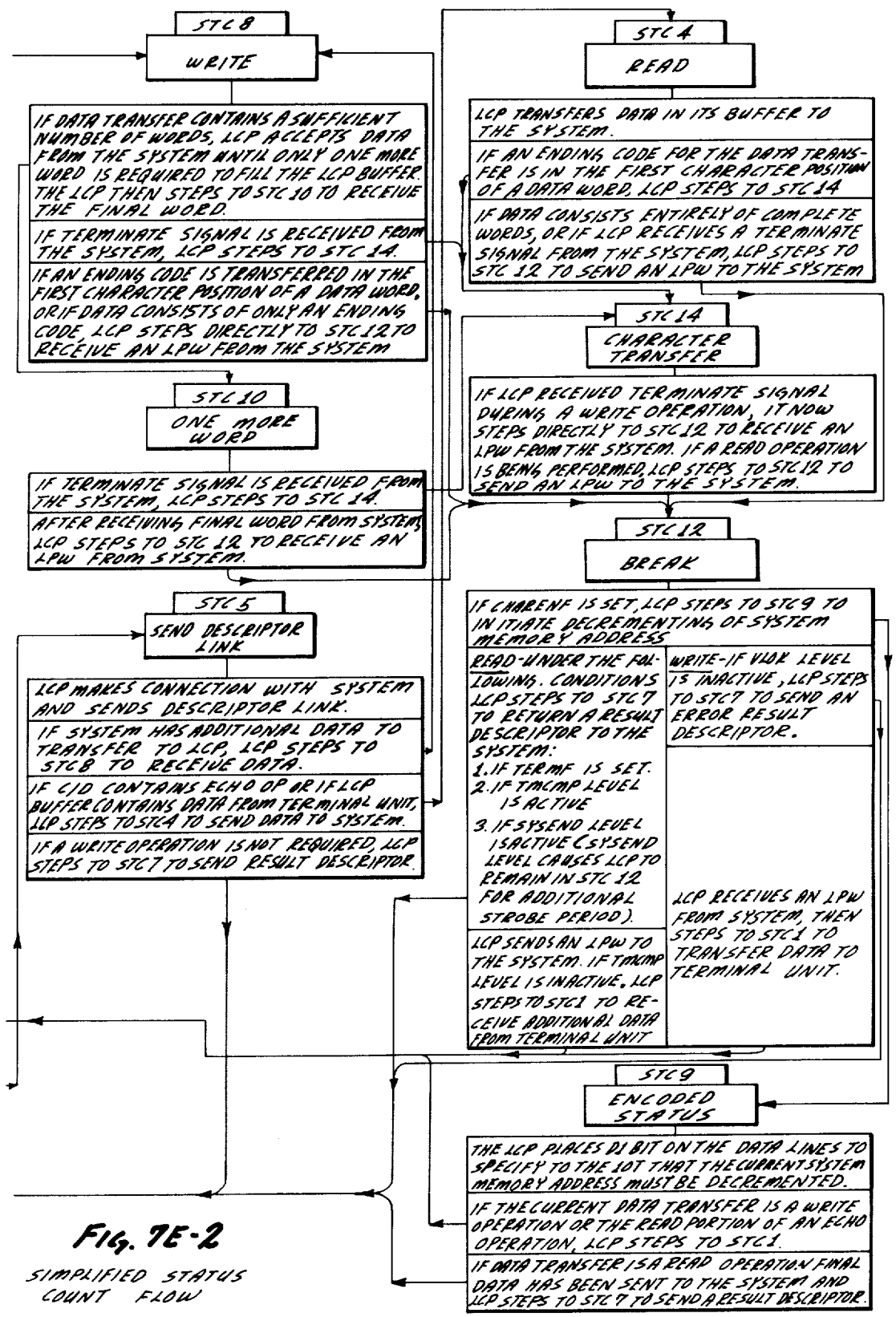

However, during a "Read" operation, other situations may occur to cause alternate logic flow paths and the handling of possible error conditions. The following sections (a) through (d) indicate the actions of the LCP when modifications to the original "Read" instructions are made either by the System 10 or by the LCP:

(a) Receipt of Time-Out Level: referring now to FIG. 7E, which is made of two sheets, 7E-1 and 7E-2; at STC 1, with operation of the one-second timer not inhibited, and data being received by the LCP from the peripheral terminal unit 50; if the sending of data is interrupted for a period of one second, the time-out level (TIMOUTL) is generated. With TIMOUTL active, the end flip-flop (ENDF) is set, and the terminal complete level (TMCMP) is generated. A request for reconnection to the System 10 is initiated and the LCP steps over to STC 5. At STC 5, with the end flip-flop (ENDF) set, the Read operation is terminated and the LCP steps over to STC 7 to send a Result Descriptor R/D to the System 10. A time-out level can also be received with the LCP at STC 3 as can be seen in FIG. 7E at STC 3 "idle status".

(b) Transmission Still Expected from Peripheral Terminal Unit: in FIG. 7E, at STC 1, with the LCP conditioned to receive data from the peripheral terminal unit 50, then if data is not being received, the LCP steps immediately to STC 3 in order to be in a condition to receive a conditional cancel instruction from the System 10. The LCP will return from STC 3 over to STC 1 if a data transmission begins. (c) Request for Emergency Reconnection: during transfer of data from the peripheral terminal unit 50 to the LCP, when the buffer $25_{00}$ is completely filled, a buffer transfer flip-flop (BFXFRF) is set, initiating a request for a reconnection to the System 10 to store data. (The buffer transfer flip-flop (BFXFRF) is set when the LCP buffer $25_{00}$ is filled with data from the peripheral terminal unit 50, or when emptied during transfer of data from the LCP to the peripheral terminal unit). If a reconnection is not completed prior to the time the UART 31 receives another character, the emergency request level (EMRREQ) is generated. The EMRREQ level is sent to the associated Distribution Card $20_{0d}$ to initiate an emergency request for a reconnection to the System 10.

(d) Receipt of Ending Code (AB digits): the actions of the LCP relating to receipt of an ending code, which will be placed on the AB digits (first character) of a word, are more varied than those involved with receipt of an ending code to be placed on the CD digits of a word. This condition exists because a transmission from the peripheral terminal unit may consist of data followed by an ending code, or it may consist merely of an ending code by itself. Additionally, decrementing of the System Memory Address may or may not be required when storing the ending code, in order to reflect the accurate location of the ending code in System Memory $10_m$. Thus, the following actions of the LCP for these various conditions are discussed below in paragraphs d1 and d2:

(d1) Receipt of Ending Code Following Data: if the ending code follows a series of data characters and is received on the terminal bus 47 when the even flip-flop (EVNF) is set, the character, when stored, will be placed in the AB digit position of a word in the LCP buffer $25_{00}$. When the character is received, the end code level (EDCODE) is generated, causing RAM 18 L (Write end-flag level) to be active, and the end-flag level (ENDFG) is stored in the presently current buffer address. (The end code level (EDCODE) is generated on the terminal control card when an end code character is in the A and B digits of the terminal bus 47. The end-flag level, ENDFG, is generated on the data flow card from RAM 18 L, and when active, this level identifies the address of an end code in the LCP buffer $25_{00}$. The write end-flag level (RAM 18 L) is the data input level for the end-flag RAM of the LCP buffer $25_{00}$). The set state of the even flip-flop (EVNF) then causes the buffer address to be incremented to the next word address. The setting of the data store flip-flop (DATASTF) and the complementing of the even flip-flop (EVNF) are then enabled. With EVNF reset, the write enable A (ERWA) level is generated and the ending code is stored in the AB digits of the buffer address following the one in which the end-flag level (ENDFG) was stored. The LCP then initiates a request for reconnection to the Main System to transfer data and the ending code to the System 10.

During transfer of final data from the LCP buffer $25_{00}$ to the System 10 at STC 4, an ending code in the AB digits of a word will be recognized when ENDFG (end-flag level) level is active and the system end code level (SYSEND) is inactive. This logic combination indicates that the next word to be transferred contains an ending code in the AB digits. In FIG. 7E, the LCP steps to STC 14 to accomplish transfer of a single character. At STC 14 the setting of a word transfer control flip-flop (WTCF) is enabled uncoditionally. The setting of the character transfer flip-flop (CTSF) is enabled to specify that the character transfer state was entered. The ending code is stored in System Memory $10_m$, and the LCP steps first to STC 12 to send a longitudinal parity word LPW to the System 10, then steps over to STC 7 to send a Result Descriptor R/D to the System 10.

(d2) Receipt of Ending Code Only: as per FIG. 7E, at STC 1, if the transmission from the peripheral terminal unit 50 consists of a single character (end code), it will be received on the terminal bus 47 with the even flip-flop EVNF in a set state, and will be placed on the AB digit position of a word in the LCP buffer $25_{00}$. The character is stored and the LCP initiates a request for reconnection to the System to transfer the character, as seen in the 3rd block of FIG. 7E at STC 5. This steps over to STC 4, and with the end code level (EDCODE) active, the setting of the character end flip-flop (CHARENF) is enabled. The character is transferred (STC 14) to the System 10 and the LCP steps over to STC 12 to send a longitudinal parity word (LPW) to the System 10. At STC 12, the set state of CHARENF (the character end flip-flop) causes the LCP to step directly to STC 9 to initiate decrementing of the System Memory Address $10_m$. Then the LCP steps to STC 7 in order to send a Result Descriptor R/D to the System 10.

(e) Receipt of Terminate Signal from System: a terminate signal (TERM level) is sent from the System to the LCP during a Read operation whenever available system memory space designated for the LCP operation is to be exceeded. During a Read operation, the TERM level may be received (FIG. 7E) at STC 4, STC 14, or STC 12. The actions of the LCP upon receipt of the TERM level depend upon the status count in which the LCP is operating when the TERM level is received, and upon whether or not the receipt of the TERM level is preceded by the receipt of an ending code character from the peripheral terminal unit 50. Under these conditions, the actions of the LCP are discussed in the following paragraphs e1 and e2:

(e1) Receipt of Terminate Signal Before Ending Code is Received: if the LCP receives the TERM (terminate signal) level from the System before it has sufficient time to receive and store an ending code, the LCP then acts as follows:

e1 (a) The receipt of the TERM level while the LCP is transferring data to the System at STC 4, causes the terminate flip-flop (TERMF) to be set, and the LCP steps over to STC 12. A longitudinal parity word LPW is sent to the System 10 and the set state of the terminate level (TERMF) causes the LCP to terminate the Read operation and step over to STC 7 to send a Result Descriptor R/D to the System 10.

e1 (b) In FIG. 7E, the LCP steps from STC 4 over to STC 12 after transferring a word containing an ending code in the CD digits over to the System 10. If the TERM level is now received at STC 12, the setting of the word transfer control flip-flop (WTCF) is enabled, and the LCP remains in STC 12 for an additional strobe time. If during the second strobe time, the TERM level is still active, this indicates that the ending code was not transferred. The setting of TERMF (terminate flip-flop) is enabled and the LCP steps over to STC 7 to send a Result Descriptor R/D to the System 10.

e1(c) The LCP steps from STC 4 over to STC 12 when the last word in the buffer $25_{00}$ has been transferred. If the TERM level is now received at STC 12, the LCP remains in STC 12 for additional strobe time. The word transfer control flip-flop (WTCF) is set and regardless of the logic state of the TERM level during the second strobe time, the LCP terminates the Read operation and steps over to STC 7 to send a Result Descriptor R/D to the System 10.

e1 (d) The LCP will be in STC 14 if the last data word transferred at STC 4 is to be followed by an ending code in the AB digits of the next word. If the terminate (TERM) level is now received at STC 14, the ending code is not stored and the LCP steps to STC 12, it sends an LPW to the System, and then steps to STC 7 to send a Result Descriptor R/D to the System 10.

(e2) Receipt of Terminate Signal After Ending Code is Received: if the LCP receives the terminate level (TERM) from the System 10 after an ending code has been received from the peripheral terminal unit 50, then the LCP acts as shown in the following paragraphs e2 (a), e2 (b), e2 (c):

e2 (a) In FIG. 7E, the LCP steps from STC 4 over to STC 12 after transferring a word containing an ending code in the CD digits to the System 10. If the TERM level is now received at STC 12, the setting of the word transfer control flip-flop (WTCF) is enabled and the LCP remains in STC 12 for an additional strobe time. If during the second strobe time, the TERM level is no longer active, this indicates that the ending code was transferred. The LCP then steps over to STC 7 to send the Result Descriptor R/D to the System 10.

e2 (b) The LCP steps from STC 4 over to STC 14 if the last word transferred at STC 4 is to be followed by an ending code in the AB digits of a word. If the LCP progresses through STC 14 without receiving the TERM level, the ending code is transferred to the System 10, and the LCP steps over to STC 12 to send a longitudinal parity word LPW. If the TERM level is now received at the STC 12, the LCP takes no action upon its receipt, but steps to STC 7 to send a Result Descriptor R/D to the System 10.

e2 (c) If a transmission from the peripheral terminal unit 50 consists of a single character (ending code), then at STC 4, the LCP enables the setting of the character end flip-flop (CHARENF) and steps over to STC 12 to send a longitudinal parity word LPW. At STC 12, if the TERM level is now received, the LCP will remain in STC 12 for an additional strobe time. If during the second strobe time, the TERM level is still active, this indicates that only the first half of the word containing the ending code was transferred and the System Memory Address was not incremented to the next word address. The LCP steps over to STC 7 to send a Result Descriptor R/D to the System 10. If the TERM level is inactive during the second strobe time, this indicates that the System Memory Address was incremented to the next word address and requires decrementing. The set state of the character end flip-flop (CHARENF) and the inactive state of the terminate level (TERM) cause the LCP to step over to STC 9 to initiate decrementing of the System Memory Address. From STC 9, the LCP steps over to STC 7 to send a Result Descriptor R/D to the System 10.

Error Conditions: During the course of a "Read" operation, certain error conditions may occur which will be acted upon by the LCP, as follows:

(a) Access Error: after transmitting the emergency request (EMRREQ) level, if the LCP has not received a reconnection to the System 10 prior to receiving a second character in the UART 31, the UART 31 generates a level called overrun error level (OE). The OE level causes the enabling of the access error flip-flop (ACCERF) and of the end flip-flop (ENDF). The LCP then initiates a request for reconnection to the System 10 to terminate the Read operation and to send an error Result Descriptor R/D to the System 10.

(b) Terminal Vertical Parity Error: during transfer of data from the UART 31 to the LCP buffer $25_{00}$, if the parity error level (PE) is generated by the UART 31, the terminal vertical parity error flip-flop (TVPERF) is set to indicate existence of a vertical parity error. This flip-flop, TVPERF, has a logic state which is controlled by an output from the LCP vertical parity generator/checker 48, or from the parity error output of the UART 31 (FIG. 6D). The set state of the flip-flop indicates that a vertical parity error occurred during transfer of data between the LCP and the peripheral terminal unit 50. This flip-flop is located on a Terminal Control Card.

(c) Block Check Character Error: during the transfer of data (FIG. 6D) from the UART 31 to the LCP buffer $25_{00}$, if the block check character OK level (BCCOK) is not active after the block check character has been checked, the block check character error flip-flop (BCCERF) is set to indicate the existence of a block check character error. The BCCOK level is provided by decoder 34 of the block check character register 33 in FIG. 6D.

Write Flip-Read Operation:

This operation is essentially a Write operation followed by a Read operation. Basically the previous discussion regarding the "Write" operation and the "Read" operation of FIGS. 7B and 7C are applicable here. The receipt of a Command Descriptor C/D for the "write flip read" operation into the OP code and the variant registers 42 and 43 (FIG. 6D) respectively, causes a "Write" operation to be initiated and a FLIP level (Flip Level) to be generated. Data is transferred from the System 10 to the peripheral terminal unit 50 during the "Write" portion of the operation. When an ending code is recognized on the terminal bus 47 during data transfer from the LCP to the peripheral terminal unit 50 at STC 1 (FIG. 7C), then the end code level (EDCODE) is generated. The EDCODE level enables the setting of the end flip-flop (ENDF) indicating that the data transfer is complete. The set state of the end flip-flop (ENDF) and the generation of the FLIP level enable the setting of the read flip-flop (READF), the terminal receive flip-flop (TRECF), and the even flip-flop (EVNF), the resetting of the write flip-flop (WRITF), the terminal busy flip-flop (TRMBSYF), and the presetting of the buffer address to MADR 255. With these actions, the LCP is conditioned to receive data from the peripheral terminal unit 50, without reconnecting to the System 10 to receive additional instructions.

To initiate the "Read" portion of the Write-Flip-Read operation, the LCP does not reconnect to the System 10. As per FIG. 7E, from StC 1, the LCP steps over to STC 3 to await a transmission from the peripheral terminal unit 50. Receipt of the first character from the peripheral terminal unit 50 causes the DR level (Data Received) in the UART 31 to be active, enabling the setting of the reset UART flip-flop (RSUARTF) and the terminal busy flip-flop (TRMBSYF). The setting of the terminal busy flip-flop causes the LCP to return to STC 1 to receive the data. The "Read" operation progresses through to completion, subject to the same conditions discussed previously for a regular Read operation.

Test Operation: The "test operation" provides the System 10 with the capability for determining the operational status of the LCP without requiring a transfer of data to or from the System Memory $10_m$. Located on a data flow card is a test flip-flop (TESTF). The logic state of this flip-flop is controlled by output levels from the OP code register 42, FIG. 6D. The set state indicates that a test instruction was received from the System 10. In FIG. 7E, at STC 11, with the test flip-flop (TESTF) set, the LCP has no requirement to step to STC 6 to receive a Descriptor Link D/L. It steps instead to STC 7 to return a Result Descriptor R/D to the System 10. From STC 7, the LCP steps over to STC 15, and then STC 3 (idle), where it remains until another Command Descriptor C/D is received. Under normal conditions, the Result Descriptor R/D sent to the System 10 for a "test operation" will have all bits equal to zero. The System 10 will recognize, by this condition, that the LCP is operational. Test Enable Operation: The receipt of a Command Descriptor C/D containing a "test enable" instruction conditions the LCP so that the peripheral terminal unit 50 can initiate a communication with the System 10. The peripheral terminal unit 50 initiates a request for communication by sending an inquiry character (ENQ) to the LCP. Upon receipt of the inquiry character (ENQ), the "test enable" operation is terminated and the System initiates a "Read" operation to receive data from the peripheral terminal unit 50. If the terminal unit sends any other character but an ENQ inquiry character, the character will not be recognized and the LCP will take no action. The "test enable" operation operates (in reference to FIG. 7E) as follows:

At STC 3, upon receipt of a "test enable" instruction, the variant register flip-flop No. 3 (VAR3F) is set. The "VAR (1–4) F" represents the 4 variant register levels. These are generated on the Data Flow Card by outputs of the variant register 43, FIG. 6D. The logic state of these levels is dependent upon the numerical value contained in the variant digit 1 of the Command Descriptor C/D. The setting of VAR3F inhibits the setting of the test flip-flop (TESTF) but allows the read flip-flop (READF) to be set. The LCP steps over to STC 11 to receive the Command Descriptor longitudinal parity word LPW from the System 10, and then steps over to STC 6 to receive the Descriptor Link D/L from the System. At STC 6, because the "Read" flip-flop (READF) is set, the LCP disconnects from the System 10 and steps over to STC 1 to receive an inquiry character (ENQ) from the peripheral terminal unit 50. At STC 1, (unless an inquiry character (ENQ) is received immediately) the LCP steps over to STC 3 to await a transmission from the peripheral terminal unit 50. When the terminal unit transmits, the terminal busy flip-flop (TRMBSYF) is set, causing the LCP to step over to STC 1 to receive the inquiry character (ENQ). When the ENQ is received, the set state of the variant register level, VAR3F, inhibits the LCP from stepping over to STC 4 and also inhibiting the transfer of the character to the System 10. Instead the LCP steps over to STC 7 to return a Result Descriptor R/D to signify to the System 10 that the "test enable" operation is complete.

Conditional Cancel Operation: The "conditional cancel operation" provides the System 10 with a capability to cancel a previously sent Command Descriptor C/D containing a "Read" operation. Referring to FIG. 7E, if the LCP has initiated a "Read" or a "Write flip Read" operation, but the expected data transfer from the peripheral terminal unit 50 is not in progress, the LCP will remain at STC 3 awaiting a possible "conditional cancel" instruction. If a conditional cancel instruction is now received, the "Read" operation is cancelled and the cancel flip-flop (CANCF) is set. This cancellation will not be effectuated unless the LCP is at STC 3. The LCP then steps over to STC 11 to receive a Command Descriptor longitudinal parity word LPW from the System 10. The set state of the cancel flip-flop CANCF inhibits the LCP from stepping to STC 6. Instead, the LCP steps over to STC 7 to return a Result Descriptor R/D to the System 10, indicating that the conditional cancel operation is completed.

Echo Operation: The "echo operation" is a maintenance aid to trouble shooting of the LCP. This operation begins with a "Write" operation in which data is transferred from System Memory $10_m$ over to the LCP buffer $25_{00}$. This is followed by a "Read" operation in which the same data is transferred back to System Memory $10_m$. Assuming, for example, that less than a full buffer load of data will be transferred and that the operation will be terminated by receipt of an ending code in the last character position of a word; and since the "echo operation" is essentially a Write operation followed by a Read operation, the following discussion will involve only those LCP actions which are unique to the echo operation. (Read and the Write operations were previously discussed in connection with FIGS. 7B and 7C). Now referring to FIG. 7E, at STC 6, and with the echo flip-flop (ECHOF) set, the LCP steps over to STC 8 to accept data from the System 10. Beginning at STC 8, the LCP operates as previously discussed during a regular "Write" operation up to the point that the LCP receives an ending code and then steps over to STC 12. At STC 12, although no data is to be transferred from the LCP to the peripheral terminal unit 50, the LCP disconnects from the System 10 by stepping momentarily over to STC 1. When disconnected at STC 1, the LCP initiates a request for reconnection to the System 10 by enabling the setting of: the LCP request flip-flop (LCPRQF); the I/O send flip-flop (IOSF); and by the presetting of the buffer address to MADR 253 (Descriptor Link, FIG. 6C). The LCP then steps over to STC 5 to send the Descriptor Link D/L to the System 10. At STC 5, the LCP transfers the Descriptor Link D/L to the System 10. The set state of the echo flip-flop (ECHOF) then causes the LCP to step over to STC 4 to return data in the buffer $25_{00}$ back to the System Memory $10_m$. Beginning at STC 4, data is transferred from the LCP over to the System 10. The actions performed by the LCP are as those previously described during a regular "Read" operation up to the point that the LCP identifies an ending code on the terminal bus 47 and then steps over to STC 12. At STC 12, the Read operation is completed and the set state of the echo flip-flop (ECHOF) causes the LCP to step over to STC 7 to return a Result Descriptor R/D over to the System 10. Return of Result Descriptor R/D: FIG. 7D is a simplified logic flow diagram regarding the return of the Result Descriptor R/D. The LCP steps over to STC 7 to return a Result Descriptor R/D to the System 10 under any of the following conditions listed as a, b, c, d:

a. At STC 12 or STC 9 when a "Read" or an echo operation is completed.

b. At STC 5 when a "Write" operation is completed.

c. At STC 11 when any one of the following conditions occur:

(c1) A descriptor error occurred; (c2) A test operation is specified by the Command Descriptor C/D being executed;

(c3) The conditional cancel flip-flop (CANCF) is set.

d. At STC 6 if a vertical or longitudinal parity error has occurred.

At STC 7, if the transmit flip-flop (XMITF) is not set, it is set at this time to activate the LCP Read module. The terminal bus multiplexor select A level (SLARAM) and the terminal bus multiplexor select B level (SLBRAM) are both active, which allows the terminal bus multiplexor network ($24_{x2}$ of FIG. 6D) to select a word made up of Result Descriptor levels for transmission to the System 10. When the Result Descriptor word is placed in the data latches, 49, it is also applied to the LPW register $24_w$ to generate an LPW for the Result Descriptor transfer. The LCP then steps over to STC 15 to send the R/D LPW to the System 10.

At STC 15, the terminal bus multiplexor select A level (SLARAM) is inactive and the terminal bus multiplexor select B level (SLBRAM) is active, which allows the terminal bus multiplexor network ($24_{x2}$ of FIG. 6D) to select outputs of the LPW register $24_w$ for transmission to the System 10. (The SLBRAM) is used in conjunction with the SLARAM to select one of four inputs to the terminal bus multiplexor network). These are generated on the System Logic Card from outputs of the STC decoder 54 of FIG. 6D. The LCP transfers the LPW, resets selected logic levels to a beginning state, and then steps over to STC 3. The LCP remains at STC 3 until another Command Descriptor C/D is received. In summary the LCP operates in two "modes"—the "off-line" mode and the "on-line" mode.

Off-line mode:

Operation of the LCP/Terminal Unit combination in an off-line mode is for the purpose of performing maintenance functions. In the field, a variety of operations can be performed to verify the condition of the LCP or for simple trouble shooting. These operations can be carried out without effecting the normal operation of other LCP's in the same Base Module.

On-line mode:

The two basic operations controlled by the LCP in the on-line mode operations are (1) a Write operation in which data is received from the System by the LCP and which data is transferred to the peripheral terminal unit; and (2) a Read operation in which data is received from the terminal unit by LCP and is transferred to the System Memory $10_m$.

In addition to these basic operations, the LCP can change from a "Write" to a "Read" operation with a single instruction, and can also perform selected test operations. The following items represent the specific operations which the LCP can perform by means of program instructions from the Main System 10. This is done by means of Command Descriptors (C/D) and herein follows a brief summary of what is accomplished by each operation.

Table XII here below summarizes the specific operations which the LCP can perform:

TABLE XII

| a. Write | d. Test |
|---|---|
| b. Read | e. Test Enable |
| c. Write Flip Read | f. Conditional Cancel |
| | g. Echo |

Command Descriptors:

The Command Descriptors (C/D) are instructions from the Main System 10 to the LCP regarding certain operations to be performed. The following items will summarize briefly the Command Descriptors associated with each of the instructions (of Table XII) from the Main System 10:

(a) Write:

The "Write" Command Descriptor is an instruction to transfer data from System Memory $10_m$ to the peripheral terminal unit desired, for example, such as peripheral terminal unit 50. The LCP accepts data from the System 10 until the LCP buffer $25_{00}$, for example, is full, or until the data transfer is stopped by the receipt of an "ending code" or a "terminate" signal from the Main System 10. When the LCP buffer $25_{00}$ is full, or when an "ending code" is received, the LCP transfers the contents of the buffer $25_{00}$ to the peripheral terminal unit 50. The "Write" Command Descriptor is identified as shown in Table XIII below:

TABLE XIII

(Write C/D)

| Data Lines | Digit Value | |
|---|---|---|
| A8 | 0 | |
| A4 | 1 | OP Digit |
| A2 | 0 | |
| A1 | 0 | |
| B8 | 0 | |
| B4 | 0 | Variant Digit 1 |
| B2 | 0 | |
| B1 | 0 | |

(b) Read: The "Read" Command Descriptor is an instruction to transfer data from the peripheral terminal unit involved, such as unit 50, over to the System Memory $10_m$. The LCP first accepts data from the peripheral terminal unit 50 until the LCP buffer $25_{00}$ is full, or until the data transfer is stopped by the receipt of an "ending code" from the peripheral terminal unit. When the LCP buffer $25_{00}$ is full, (or when the ending code is received), the LCP transfers the contents of the buffer $25_{00}$ over to the System Memory $10_m$, unless the Main System 10 sends a "terminate" signal to stop the Read operation because System Memory space is not available to store any more data. If, after initiating a Read operation, the LCP receives no data for a period of one second, the LCP "times out" and sends a Result Descriptor (R/D) to the Main System 10. The one-second timing interval can be inhibited by setting a bit (B1) of the variant digit 1 of the Command Descriptor equal to 1. Table XIV below shows the "Read" C/D.

TABLE XIV

(Read C/D)

| Data Lines | Digit Value | |
|---|---|---|
| A8 | 1 | |
| A4 | 0 | OP Digit |
| A2 | 0 | |
| A1 | 0 | |
| B8 | 0 | |
| B4 | 0 | Variant Digit |
| B2 | 0 | |
| B1 | see note | |

If B1 is equal to 1, the one-second time-out period, allowed to the terminal unit to respond, is inhibited.

(c) Write flip Read:

The "Write flip Read" Command Descriptor is an instruction to the LCP to accomplish a Write operation, at the conclusion of which an immediate Read operation is performed without any intervention from the Main System 10. Data is accepted from the Main System 10 and transferred to the peripheral terminal unit until an "ending code" is received. Upon receipt of the ending code from the Main System 10, the LCP transfers the ending code to the peripheral terminal unit and then changes to the Read Mode. The LCP then accepts data from the peripheral terminal unit and transfers it to the System Memory $10_m$ until an ending code is received from the peripheral terminal units, or until a terminate signal is received from the Main System 10. If, after beginning of the Read portion of the operation, the LCP receives no data for a period of one-second, then the LCP "times-out" and sends a Result Descriptor (R/D) to the Main System 10. Of course, the one-second time interval can be inhibited if desired, by setting the bit B1 of the variant digit 1 of the Command Descriptor equal to one. Table XV below illustrates the "Write flip Read" Command Descriptor.

TABLE XV

(Write flip Read C/D)

| Data Lines | Digit Value | |
|---|---|---|
| A8 | 0 | |
| A4 | 1 | OP Digit |
| A2 | 0 | |
| A1 | 0 | |
| B8 | 1 | |
| B4 | 0 | Variant Digit |
| B2 | 0 | |
| B1 | see note | |

If B1 is equal to 1, the one-second time-out period, allowed to the terminal unit to respond, is inhibited.

(d) Test:

The "test" Command Descriptor is an instruction to the LCP to indicate its "operational status" by returning a Result Descriptor (R/D) to the Main System 10. If the LCP is present and available, the Result Descriptor will be equal to all "0's". Table XVI below shows the Test Command Descriptor:

TABLE XVI

(Test C/D)

| Data Lines | Digit Value | |
|---|---|---|
| A8 | 0 | |
| A4 | 0 | OP Digit |
| A2 | 1 | |
| A1 | 0 | |
| B8 | 0 | |
| B4 | 0 | Variant Digit 1 |
| B2 | 0 | |
| B1 | 0 | |

(e) Test Enable:

The "test enable" Command Descriptor is an instruction to the LCP to monitor incoming data from the peripheral terminal unit, and upon receipt of an Inquiry Character (ENQ), to form and transmit a Result Descriptor (R/D) to the System 10. This instruction is used to allow the peripheral terminal unit to initiate a communication with the Main System 10. Table XVII below illustrates this Command Descriptor.

TABLE XVII

(Test Enable C/D)

| Data Lines | Digit Value | |
|---|---|---|
| A8 | 0 | |
| A4 | 0 | OP Digit |
| A2 | 1 | |
| A1 | 0 | |
| B8 | 0 | |
| B4 | 1 | Variant Digit |
| B2 | 0 | |
| B1 | see note | |

Note:
If B1 is equal to 1, the one-second time-out period, allowed to the terminal unit to respond, is inhibited.

(f) Conditional Cancel:

The "Conditional Cancel" Command Descriptor is an instruction to the LCP to initiate cancellation of another Command Descriptor under certain conditions. When the Conditional Cancel Command Descriptor is received by the LCP, and, if data is not being received from the peripheral terminal unit during the applicable portion of a Read operation, then the previous Command Descriptor will be cancelled. This C/D is shown in Table XVIII:

TABLE XVIII

| (Conditional Cancel C/D) | | |
|---|---|---|
| Data Lines | Digit Value | |
| A8 | 0 | |
| A4 | 0 | OP Digit |
| A2 | 1 | |
| A1 | 0 | |
| B8 | 1 | |
| B4 | 0 | Variant Digit 1 |
| B2 | 0 | |
| B1 | 0 | |

(g) Echo:

The "Echo" Command Descriptor is an instruction to the LCP to accept a full buffer of data (or less) from the Main System 10 and then to return the same data back to the Main System 10 to be stored. This provides a maintenance check and trouble shooting diagnosis cycle for the System-LCP operations. Table XIX illustrates this Echo Command Descriptor.

TABLE XIX

| (Echo C/D) | | |
|---|---|---|
| Data Lines | Digit Value | |
| A8 | 0 | |
| A4 | 0 | OP Digit |
| A2 | 0 | |
| A1 | 1 | |
| B8 | 0 | |
| B4 | 0 | Variant Digit 1 |
| B2 | 0 | |
| B1 | 0 | |

The above specification has described and illustrated the basic elements and configuration of an Input-Output Subsystem which, working in coordination with a main host system and its IOT interface uses a plurality of I/O processors (LCP's) organized in Base Module units which can efficiently and accurately execute and control data transfer operations between specific peripheral devices and the main system to provide a high bandpass and minimize access errors. The following claims are made

What is claimed is:

1. In a system involving a plurality of remote peripheral terminal units at remote stations, each peripheral terminal of which is connected to its own specific peripheral-controller, said peripheral-controllers being organized into groups designated as base modules at each remote station, and wherein each base module has its own message level interface bus connecting it, via main system interface unit, to a central main system comprising a processor and main memory, an input-output subsystem comprising:

(a) a main system interface unit connected between said main system and a plurality of base modules housing a plurality of peripheral-controllers, said main system interface unit including:

(a1) means to formulate an I/O task command and a Descriptor-Link Word to identify a particular data transfer task for a particular peripheral-controller, said task command and Descriptor-Link Word being communicated to a specific peripheral-controller;

(a2) means to determine the highest priority signal code from competing peripheral-controllers which are requesting access to main memory and to grant connecting access to main memory to the highest priority coded peripheral-controller;

(a3) means to connect or disconnect main memory to an addressed peripheral-controller;

(a4) means to asynchronously transfer data between main memory and an addressed peripheral-controller;

(a5) means to store addresses and address counts for data transfers occurring between main memory and a connected peripheral-controller, said main system interface unit operating independently of said main processor for data transfers with said main memory;

(a6) means to receive a result descriptor word from a peripheral controller, said result descriptor word representing the completion, incompletion or error-status of an I/O task command;

(b) a message level interface bus connecting each base module to said main system interface unit for providing a connected peripheral-controller in a base module with its own communication bus for message level data transfers with said main system;

(c) a base module for each remote station for supporting a plurality of peripheral-controllers at that station, said base module including:

(c1) Distribution Control means for selectively connecting an addressed peripheral-controller to said main system, for assigning local base priority signal codes to each peripheral-controller and for assigning overall global-system priority signal codes to each peripheral-controller;

(c2) common backplane connection means for connecting each peripheral-controller in a base module with common clock and common power supply and common maintenance-test means, and including address lines for selectively connecting an addressed peripheral-controller to said Distribution Control means;

(c3) interrupt signal means for requesting access to main memory from a peripheral-controller whose buffer memory is either full or empty and thus needs data transfer service from main memory;

(c4) a plurality of peripheral-controllers, each of which is dedicated via its own communication bus to a specific peripheral unit and wherein each of said peripheral-controllers includes:

(c4-1) processor logic means for execution of I/O task command received from said main system;

(c4-2) buffer memory storage means for storage of at least two full message length blocks of data, for storage of I/O task commands, Descriptor-Link identifier words and result-descriptor words;

(c4-3) means to formulate result-descriptor word signals to sense completion, incompletion or error of an I/O task, said result-descriptor word signals being subsequently transmitted to said main system for initiation of corrective action;

(c4-4) means to transfer message length blocks of data from the peripheral-controller to/from said main memory at the highest transfer speed of main memory while transfers of data are simultaneously occurring between other peripheral-controllers and their peripheral terminals;

(c4-5) status count means providing digital signal counts to aid in controlling the sequential steps of communications between said peripheral-controller and to said main system system interface unit.

2. The input-output system of claim 1, wherein said main system interface unit includes:

means providing separate channels for parallel data transfer between said main memory and said plurality of peripheral-controllers, wherein each peripheral-controller is organized to control data transfer operations between itself and a particular peripheral unit, the number of peripheral units and the number of peripheral-controllers being determined by the number of parallel path channels provided in the main system interface unit.

3. The input-output subsystem of claim 1, wherein each of said peripheral-controllers includes:

means for using a predetermined routine of communication and control sequence steps, each step of which is numbered digitally and communicated by said peripheral-controller to said main system interface unit and to said processor logic means within said peripheral-controller, to permit said peripheral-controller to signal its requirements and the status of its step sequences to said main system interface unit.

4. The input-output subsystem of claim 1, wherein each of said peripheral-controllers includes:

status count generation means for generating a digital number signal representing each step of a predetermined communication discipline in order to signal said main system interface unit with information which includes indicators:

(i) of the clearance of buffer memory;
(ii) that main system access is not needed by the peripheral-controller;
(iii) that the peripheral terminal unit connected to the peripheral-controller is not available for data transfer;
(iv) that the peripheral terminal unit connected to the peripheral-controller is now available for data transfer;
(v) that the buffer memory storage means is full and ready to transmit to the main memory;
(vi) that the peripheral-controller requests connection to main memory;
(vii) that the peripheral-controller requests a Descriptor-Link Word to identify a particular data transfer task;
(viii) that the peripheral-controller is transmitting result information to the main system interface unit;
(ix) that the peripheral-controller is accepting data from the main system;
(x) that one character has been transmitted from the peripheral-controller to the main system;
(xi) that the peripheral-controller can accept one more word from the main system;
(xii) that the peripheral-controller has received and checked the longitudinal parity of an I/O task command word;
(xiii) that the peripheral-controller does not need any more data from the main system;
(xiv) that the peripheral-controller has completed the data transfer of one block of data to the main system and has another block to transfer;
(xv) that the peripheral-controller has only one character to transfer;
(xvi) that the peripheral-controller will transmit a result-descriptor word to signal the main system of the completion/incompletion of a special data transfer task that was initiated.

5. The input-output subsystem of claim 1 wherein each of said base modules includes:

means for establishing a local base priority code for each peripheral-controller in a base module;

means for establishing an overall network global priority code for each peripheral-controller in each base module;

means for comparing the global priority codes in a base module of the peripheral-controllers concurrently requesting memory access in order to select the highest priority coded peripheral-controller for connection to said main memory interface unit;

and wherein said main memory interface unit includes:

means to select, for main memory access, that peripheral-controller having the highest global priority code; and means to provide the highest priority for main memory accesses to the data transfer operations of the input-output subsystem thereby permitting main memory accesses by the main processor only during unused memory cycles.

* * * * *

UNITED STATES PATENT AND TRADEMARK OFFICE
CERTIFICATE OF CORRECTION

PATENT NO. : 4,189,769

DATED : February 19, 1980

INVENTOR(S) : Darwen J. Cook and Donald S. Millers II

It is certified that error appears in the above-identified patent and that said Letters Patent are hereby corrected as shown below:

Col. 3, line 21, change "Processor" to --Processors--.
Col. 15, line 37, change "ssen" to --seen--.
Col. 23, line 63, change "Acess" to --Access--.
Col. 24, line 15, change "ASCH" to --ASCII--,
 line 17, change "Commnd" to --Command--.
Col. 28, line 3, change ""data"" to --"data transfer"--,
 line 31, change "bia" to --via--.
Col. 30, line 2, change "10" to --$10_{ps}$--, line 39, change "$70_1$" to --$70_i$--.

Col. 41, line 22, change "description" to --descriptor--.
Col. 41, line 29, delete "cl".
Col. 44, line 39, change "DT1(DC)n...o." to --DT1(CD)n...o.--.
Col. 45, line 36, change "$M01_f$." to --$M01_{f'}$.--.

line 37, change "HO bus." to --IIO bus.--.
Col. 47, line 13, change "Denver" to --Driver--.
Col. 51, line 38, change "is" to --if--.
Col. 54, line 46, change "$S06_g$" to --$S06_{g'}$--.

line 56, change "$S06_g$." to --$S06_{g'}$.--.

Col. 55, line 8, change "Flat" to --Flag--.
Col. 56, line 34, change "LC" to --LCP--.
Col. 65, line 26, after "AG," insert --they--.
Col. 69, line 57, change "devie" to --device--.

UNITED STATES PATENT AND TRADEMARK OFFICE
CERTIFICATE OF CORRECTION

PATENT NO. : 4,189,769
DATED : February 19, 1980
INVENTOR(S) : Darwen J. Cook and Donald S. Millers II It is certified that error appears in the above-identified patent and that said Letters Patent are hereby corrected as shown below:

Col. 71, line 54, change "Pool Test" to --Poll Test--.
Col. 83, line 23, change "time" to --timer--.
Col. 95, line 41, after "as" insert --50.--.
Col. 99, line 27, change "end-flat" to --end-flag--.
Col. 108, line 47, change "uncoditionally" to --unconditionally--.

Signed and Sealed this

Third Day of June 1980

[SEAL]

Attest:

SIDNEY A. DIAMOND

Attesting Officer

Commissioner of Patents and Trademarks